(12) United States Patent
Seifert et al.

(10) Patent No.: US 12,522,663 B2
(45) Date of Patent: *Jan. 13, 2026

(54) MULTIVALENT BINDING MOLECULES

(71) Applicant: UNIVERSITÄT STUTTGART, Stuttgart (DE)

(72) Inventors: Oliver Seifert, Stuttgart (DE); Roland Kontermann, Nürtingen (DE); Fabian Richter, Kirchheim unter Teck (DE)

(73) Assignee: UNIVERSITAT STUTTGART, Stuttgart (DE)

(*) Notice: Subject to any disclaimer, the term of this patent is extended or adjusted under 35 U.S.C. 154(b) by 0 days.

This patent is subject to a terminal disclaimer.

(21) Appl. No.: 18/452,699

(22) Filed: Aug. 21, 2023

(65) Prior Publication Data

US 2024/0059779 A1 Feb. 22, 2024

Related U.S. Application Data

(63) Continuation of application No. 16/982,714, filed as application No. PCT/EP2018/057331 on Mar. 22, 2018, now Pat. No. 11,780,926.

(51) Int. Cl.

| C07K 16/28 | (2006.01) |
| *A61K 38/00* | (2006.01) |
| *A61K 39/395* | (2006.01) |
| *A61P 35/00* | (2006.01) |
| *C07K 16/32* | (2006.01) |
| *G01N 33/50* | (2006.01) |

(52) U.S. Cl.
CPC .... *C07K 16/2863* (2013.01); *A61K 39/39533* (2013.01); *A61P 35/00* (2018.01); *C07K 16/2878* (2013.01); *C07K 16/32* (2013.01); *A61K 38/00* (2013.01); *C07K 2317/30* (2013.01); *C07K 2317/526* (2013.01); *C07K 2317/60* (2013.01); *C07K 2317/62* (2013.01); *C07K 2317/64* (2013.01); *C07K 2317/66* (2013.01); *C07K 2317/73* (2013.01); *C07K 2317/75* (2013.01); *C07K 2317/92* (2013.01); *C07K 2317/94* (2013.01); *G01N 33/5091* (2013.01)

(58) Field of Classification Search
None
See application file for complete search history.

(56) References Cited

U.S. PATENT DOCUMENTS

| 11,008,402 B2* | 5/2021 | Kontermann ...... C07K 16/2809 |
| 11,780,926 B2* | 10/2023 | Seifert ............. A61K 39/39533 424/179.1 |
| 2010/0254989 A1* | 10/2010 | Bossenmaier ....... C07K 16/468 536/23.53 |
| 2014/0213772 A1 | 7/2014 | Ghayur et al. |
| 2016/0289343 A1 | 10/2016 | Wu et al. |
| 2017/0233472 A1 | 8/2017 | Barat et al. |

FOREIGN PATENT DOCUMENTS

| WO | 2002/002781 | 1/2002 |
| WO | 2007/024715 | 3/2007 |
| WO | 2013/156148 | 10/2013 |

OTHER PUBLICATIONS

Moore et al., mAbs 2(2): 181-189 (Year: 2010).*
The International Search Report (ISR) with Written Opinion for PCT/EP2018/057331 dated Sep. 28, 2018, pp. 1-26.
Spiess, Christoph et al. "Alternative molecular formats and therapeutic applications for bispecific antibodies" Molecular Immunology (2015) vol. 67(2) pp. 95-106.
Steinmetz, Anke et al. "CODV-Ig, a universal bispecific tetravalent and multifunctional immunoglobulin format for medical applications" MABS (2016) vol. 8(5), pp. 867-878.
Lloyd et al., Protein Engineering, Design & Selection 22:159-168 (Year: 2009).
Edwards et al., J Mol Biol. 334(1 ): 103-118 (Year: 2003).
Yu et al., Investigative Ophthalmology & Visual Science 49(2): 522-527 (Year: 2008).
Piche-Nicholas et al., MABS 10(1): 81-94 (Year: 2018).
Alt et al., FEBS Letters 454: 90-94 (Year: 1999).
Seifert et al., Protein Engineering, Design & Selection 25(10): 603-612, 2012 (Year: 2012).
Seifert et al., Molecular Cancer Ther 13(1 ): 101-111 (Year: 2013).

* cited by examiner

*Primary Examiner* — Phuong Huynh
(74) *Attorney, Agent, or Firm* — McDonnell Boehnen Hulbert & Berghoff

(57) ABSTRACT

The present invention relates to a modular multivalent antigen-binding protein complex, use of the antigen-binding protein complex in medicine and use of the antigen-binding protein complex in the prophylaxis, treatment or diagnosis of a disorder or disease.

13 Claims, 112 Drawing Sheets

Figure 1A:
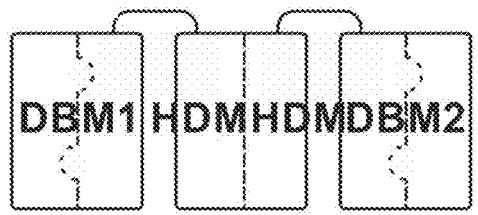
Figure 1A:
Figure 1A:
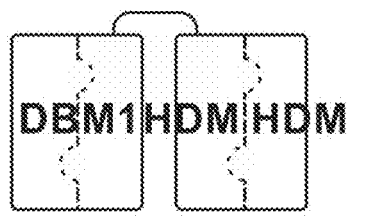
Figure 1A:
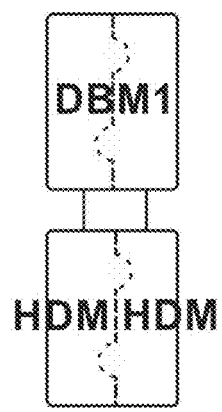

Specification includes a Sequence Listing.

or or or

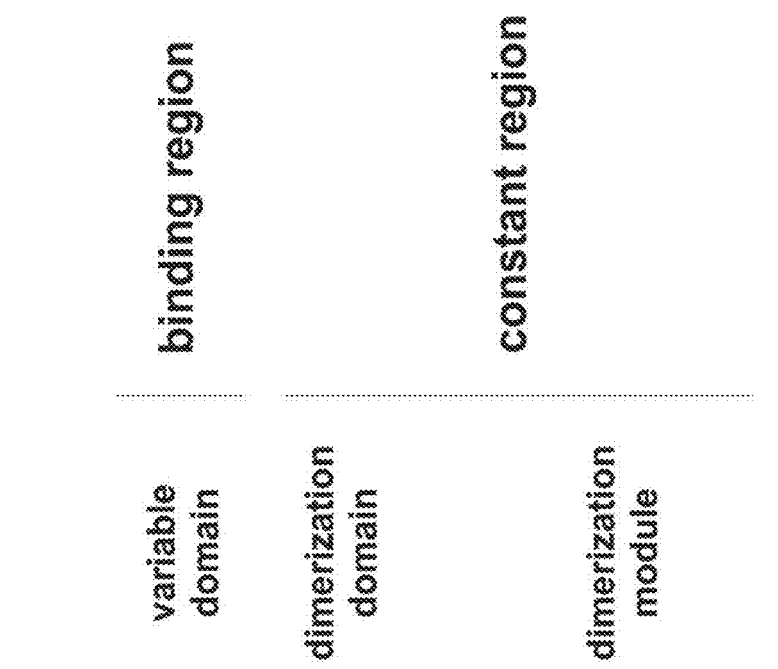
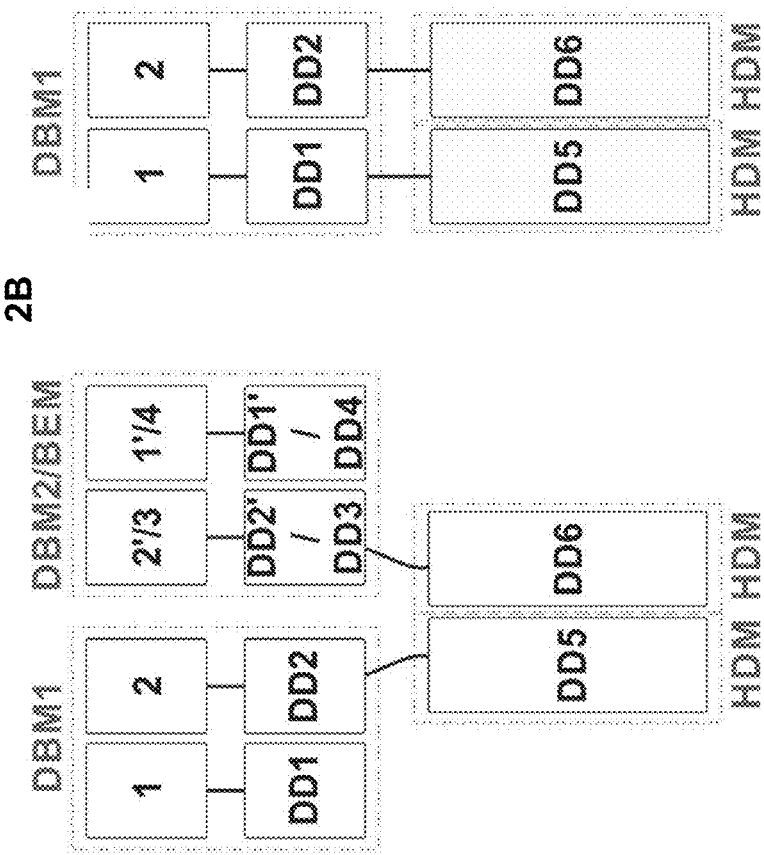
Figure 2A
Figure 2B

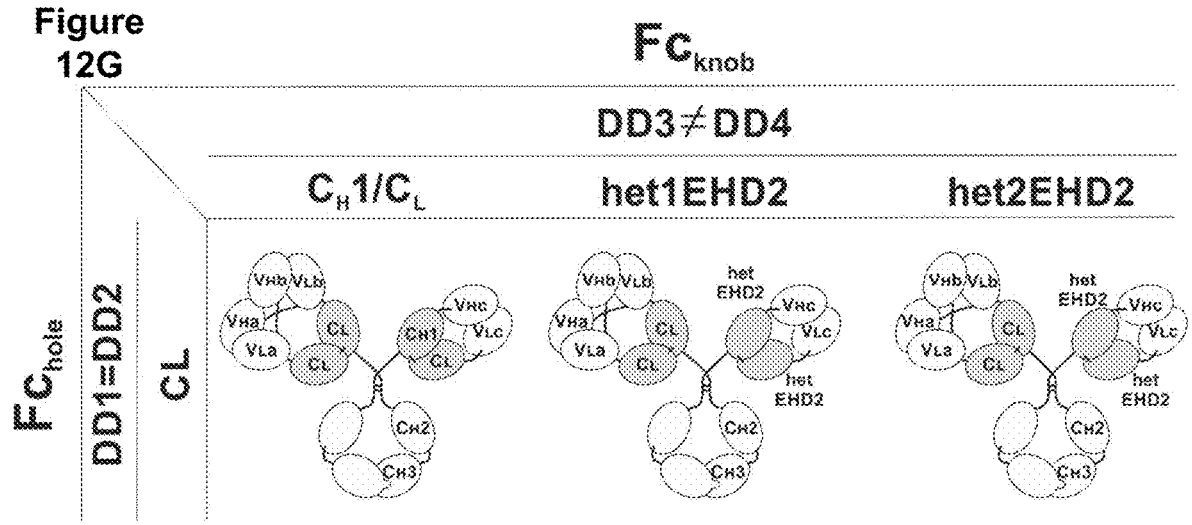

Figure
28A
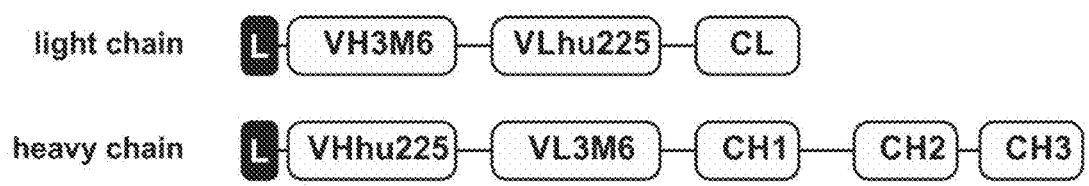
Figure
28B
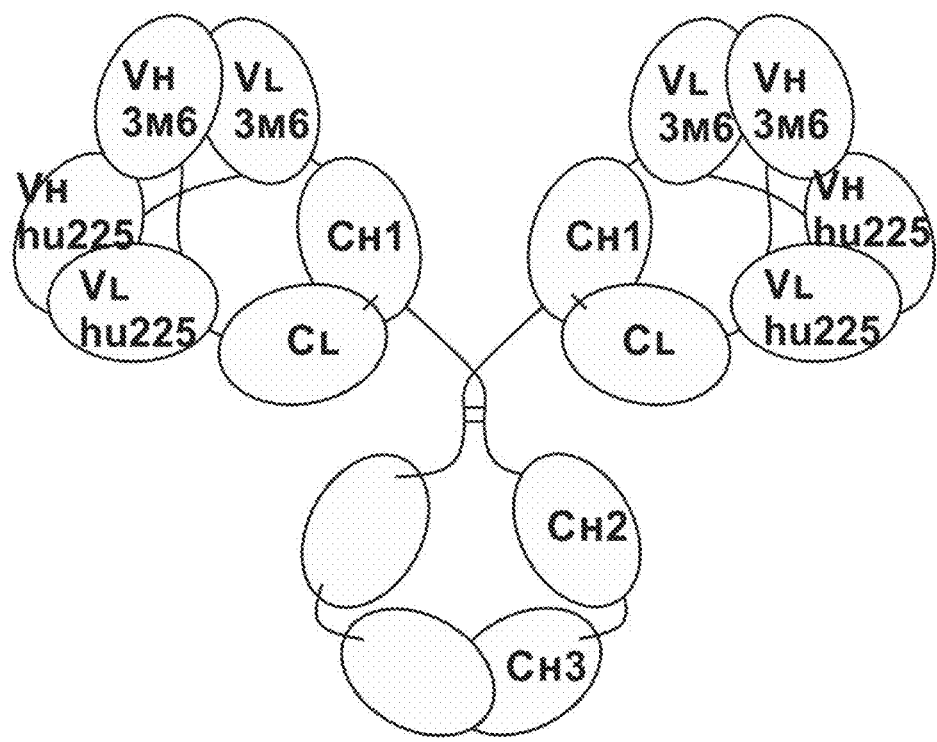

diabody moiety scFv moiety

MULTIVALENT BINDING MOLECULES

CROSS REFERENCE TO RELATED APPLICATION

This application is a continuation of U.S. patent application Ser. No. 16/982,714, filed Sep. 21, 2020, now U.S. Pat. No. 11,780,926, which is a U.S. National Phase of International Application No. PCT/EP2018/057331, filed Mar. 22, 2018, which is incorporated by reference herein in its entirety.

The present invention relates to a modular multivalent antigen-binding protein complex use of the antigen-binding protein complex in medicine and use of the antigen-binding protein complex in the prophylaxis, treatment or diagnosis of a disorder or disease.

SEQUENCE LISTING STATEMENT

The instant application contains a Sequence Listing which has been submitted electronically and is hereby incorporated by reference in its entirety. The Sequence Listing is contained in the file created on Aug. 7, 2023, having the file name "20-1476-WO-US-CON.xml" and is 41,146 bytes in size.

BACKGROUND OF THE INVENTION

Monoclonal antibodies have become an established treatment modality for a variety of diseases. Antibody engineering is routinely applied to adapt the composition and activity for therapeutic applications in humans, including a reduction of immunogenicity generating chimeric, humanized or fully human antibodies and the modification of Fc-mediated effector functions, e.g. increasing or abrogating ADCC (Presta, L G. 2008, Molecular engineering and design of therapeutic antibodies. Curr Opin. Immunol. 20, 460-470). Monoclonal antibodies possess a defined specificity for a single epitope of an antigen, thus can address only a singular target. However, complex diseases such as cancer or inflammatory disorders are usually multifactorial in nature. This is reflected by a redundancy of disease-mediating ligands and receptors as well as crosstalk between signal cascades. For example, several proinflammatory cytokines such as TNF, IL-1 and IL-6 have been identified as key players in inflammatory diseases. In cancer, tumor cells often upregulate different growth-promoting receptors, which can act either independently or crosstalk intracellulary through signaling networks. Of note, an acquisition of resistance to therapy is often associated with upregulation of alternative receptors as well as pathway switching between two receptors. Consequently, therapy with monoclonal antibodies targeting only a singular antigen has its limitations.

Bi- and multispecific antibodies find increasing interest for diagnostic and therapeutic applications (Kontermann, 2012. Dual targeting strategies with bispecific antibodies, mAbs 4, 182-197). Bispecific and multispecific antibodies recognize two or more different epitopes either on the same or on different antigens (Garber K. Bispecific antibodies rise again. Nat. Rev. Drug Discov. 2014; 13:799-801: Brinkmann & Kontermann, 2017, The making of bispecific antibodies, mAbs 9, 182-212).

Applications of bispecific antibodies cover a broad spectrum from diagnosis, imaging and therapy. Therapeutic applications include effector cell retargeting for cancer therapy, such as T-cells, which cannot be recruited to tumor cells by normal antibodies. Here, it is often necessary to bind monovalently to a trigger molecule on the effector cells, such as CD3 on T-cells, in order to avoid a systemic activation and induction of adverse effects (Segal et al., 1999, Bispecific antibodies in cancer therapy, Curr. Opin. Immunol. 11, 558-562). Furthermore, bispecific antibodies are used for dual targeting and pre-targeting strategies, half-life extension, and delivery through biological barriers such as the blood-brain barrier. Indications include cancer, chronic inflammatory diseases, autoimmunity, neurodegeneration, bleeding disorders, and infections (Kontermann & Brinkmann, 2015, Bispecific antibodies. Drug Discov. Today 20, 838-847).

Bispecific antibodies with defined specificities are artificial molecules, per se not found in nature. They have, therefore, to be generated by biochemical, molecular or genetic means. One approach is the chemical conjugation of two different antibodies or antibody fragments. Furthermore, fusing two antibody-producing cells, e.g. hybridomas, a hybrid cell line can be generated producing within the same cell two different heavy and two different light chains, which results besides various non-functional by-products in bispecific IgG molecules. The generation of bispecific IgG molecules faces two major problems due to the fact that the antigen-binding sites are built by the variable domains of the light and heavy chain ($V_L$, $V_H$). Firstly, a bispecific antibody requires two different heavy chains, and secondly, it requires also two different light chains. Bispecific IgG antibodies, thus exhibit asymmetry due to the presence of, at least, two different Fv regions. Promiscuous pairing of heavy and light chains of two antibodies expressed in one cell can theoretically result in 16 different combinations (10) different molecules), with only one being bispecific and the remaining pairings resulting in non-functional or monospecific molecules.

Recombinant bispecific antibodies can be classified according to format and composition. A main discrimination is the presence or absence of an Fc region. Fc-less bispecific antibodies will lack the Fc-mediated effector functions, such as ADCC, ADCP, complement fixation, and FcRn mediated recycling responsible for the long half-life of immunoglobulins. Fc-comprising bispecific antibodies can be further divided into those that exhibit a structure resembling that of an IgG molecule and those that contain additional binding sites, thus have an appended or modified Ig-like structure. The different bispecific antibodies will have either a symmetric or an asymmetric architecture. For example, the majority of bispecific IgG molecules are asymmetric, while IgG fusion proteins often are symmetric in their molecular composition. A further discriminating feature is the number of binding sites. In the simplest setting, e.g. utilized in IgG molecules, a bispecific antibody contains one binding site for each antigen (1+1), i.e. is bivalent. Adding an additional binding site to one of the chains of an IgG results in tetravalent molecules with a 2+2 stoichiometry. Other formats allow to generate 1+2 or 1+3 molecules, having one binding site for one antigen and 2 or 3 binding sites for the other antigen, respectively. This can be extended by further valencies, but also by implementing further specificities, e.g. to make tri- or tetraspecific molecules. Furthermore, the number of chains needed to produce the bispecific antibody can vary. Thus, most bispecific IgGs require normally four different polypeptide chains to be expressed. In some formats, a lower number of chains can be applied, requiring 3, 2 or only a single polypeptide chain. The different formats to generate bispecific antibodies has recently been summarized (Spiess et al., 2015, Alternative molecular formats and therapeutic applications for bispecific antibodies, Mol.

Immunol. 67, 95-106: Brinkmann & Kontermann, 2017, The making of bispecific antibodies, mAbs 9, 182-212).

The available multivalent bi- or multispecific antibody formats face one or more of the following problems:
1) being small in size and are therefore rapidly cleared from circulation,
2) lack of a Fc region and therefore immune effector functions and FcRn-mediated recycling responsible for an extended plasma half-life,
3) require the use of peptide linker(s) of substantial lengths (>12 aa) for fusion of the antigen binding sites and their variable domains,
4) difficulties of one or more of the antigen-binding sites to access antigen for efficient binding,
5) require engineering to identify the best arrangement of the antigen-binding site for unaffected antigen-binding,
6) require engineering to identify the best length(s) and composition of the peptide linker sequences connecting the antigen-binding sites and variable domains within,
7) exceed a molecular mass of 200 kDa which might affect tissue penetration and biodistribution,
8) low stability and a tendency to form aggregates,
9) require a complex purification procedure to obtain a homogenous preparation,
10) lack of flexibility in varying valency and specificity,
11) potential immunogenicity of artificially introduced peptide linkers of substantial length,
12) post-translational modifications of the peptide linkers (e.g. glycosylation, phosphorylation) affecting homogeneity of therapeutic molecules.

The present invention provides a modular system composed of a dual-binding module (DBM) and a (hetero- or homo) dimerization module (HDM), which can further comprise a second DBM or one or more binding or effector modules (BEM), to generate multivalent bi- or multispecific antibodies with (i) only a minimal lengths of the peptide linker connecting the variable domains of the antigen-binding sites within the DBM (<12 aa, e.g. 10 or less, such as 5), (ii) providing unhindered access of the antigen-binding sites within an DBM to antigens without the need for identifying correct orientation and position of the antigen-binding sites, (iii) increased stability of the antigen-binding sites by use of homo- or heterodimerization domains in the DBM, (iv) further provides homo- or heterodimer formation through a dimerization module, (v) generation of novel multivalent antibodies from the variable domains of the parental antibodies without optimization of arrangement, (vi) allows the generation of various multivalent and multispecific antibodies, and (vii) allows the generation of symmetric and asymmetric molecule with a defined position of the respective antigen-binding site within the molecule.

SUMMARY OF THE INVENTION

In a first aspect, the present invention provides an antigen-binding protein complex comprising at least one dual binding module (DBM), and one homo- or hetero-dimerization module (HDM) and optionally a binding or effector module (BEM), wherein
  a. a first DBM module (DBM1) comprises two polypeptides, wherein the first polypeptide (P1) comprises a first dimerization domain (DD1) and a first variable heavy chain ($V_H1$) and a first variable light chain ($V_L1$), wherein said $V_H1$ and $V_L1$ are connected by a peptide linker (L1), with a length preventing binding of $V_H1$ and $V_L1$ to each other, and the second polypeptide (P2) comprises a second dimerization domain (DD2) and a second variable heavy chain ($V_H2$) and a second variable light chain ($V_L2$), wherein said $V_H2$ and $V_L2$ are connected by a peptide linker (L2), with a length preventing binding of $V_H2$ and $V_L2$, to each other and wherein $V_H1$ binds to $V_L2$ and $V_L1$ binds to $V_H2$ and each variable domain pair forms a binding site, and wherein DD1 specifically binds to DD2;
  b. a second DBM module (DBM2), when present comprises two polypeptides, wherein the first polypeptide (P1') comprises a first dimerization domain (DD1') and a first variable heavy chain ($V_H1'$) and a first variable light chain ($V_L1'$), wherein said $V_H1'$ and $V_L1'$ are connected by a peptide linker (L1'), with a length preventing binding of $V_H1'$ and $V_L1'$ to each other, and the second polypeptide (P2') comprises a second dimerization domain (DD2') and a second variable heavy chain ($V_H2'$) and a second variable light chain ($V_L2'$), wherein said $V_H2'$ and $V_L2'$ are connected by a peptide linker (L2'), with a length preventing binding of $V_H2'$ and $V_L2'$ to each other, and wherein $V_H1'$ binds to $V_L2'$ and $V_L1'$ binds to $V_H2'$ and each variable domain pair forms a binding site, wherein DD1' specifically binds to DD2';
  c. the BEM module, when present, comprises two polypeptides, wherein the third polypeptide (P3) comprises a third dimerization domain (DD3) and a third variable heavy chain domain ($V_H3$) and the fourth polypeptide (P4) comprises a fourth dimerization domain (DD4) and a third variable light chain ($V_L3$) domain, wherein $V_H3$ binds $V_L3$ and forms a binding site, wherein DD3 specifically binds to DD4;
  d. at least one HDM module comprises two polypeptides, wherein:
    (i) in case no DBM2 or BEM are present:
      (a) the fifth polypeptide (P5) is covalently linked to P1 of DBM1 and comprises a fifth dimerization domain (DD5) and the sixth polypeptide (P6) comprises a sixth dimerization domain (DD6), which specifically binds to DD5; or
      (b) fifth polypeptide (P5) is covalently linked to P1 of DBM1 and comprises a fifth dimerization domain (DD5) and the sixth polypeptide (P6) is covalently linked to P2 of DBM1 and comprises a sixth dimerization domain (DD6), which specifically binds to DD5; or
    (ii) in case DBM2 or BEM are present the fifth polypeptide (P5) is covalently linked to P1 or P2 of DBM1 and comprises a fifth dimerization domain (DD5) and the sixth polypeptide (P6) is covalently linked to either P1' or P2' of DBM2 or either to P3 or P4 of the BEM and comprises a sixth dimerization domain (DD6), which specifically binds to DD5.

In a second aspect, the present invention relates to the antigen-binding protein complex of the first aspect for use in medicine.

LIST OF FIGURES

In the following, the content of the figures comprised in this specification is described. In this context please also refer to the detailed description of the invention above and/or below.

Figure 1B:

FIG. 1A-1B: Schematic illustration of the modules used for the generation of multivalent and multispecific binding molecules. 1A: Fusion protein of DBM+HDM modules resulting in homodimer and heterodimer. 1B: Heterodimer of DBM+HDM module and HDM+BEM module.

FIG. 2A-2B: Schematic overview of construction of the heavy and light chain of the Db-Ig platform. Heavy chain consists of variable domains 2 (2'/3), the dimerization domain DD2 (DD2'/DD3), and the Fc part DD5 (DD6). Light chain consist of the variable domain 1 (1'/4) and the dimerization domain DD1 (DD1'/DD4). Modules (DBM. HDM, BEM) described herein are encircled with a dotted line. 2A: Schematic construction of Db-Ig molecules comprising two heavy chains and two light chains. 2B: Schematic construction of Db-Ig molecules comprising two heavy chains.

Figure 3:
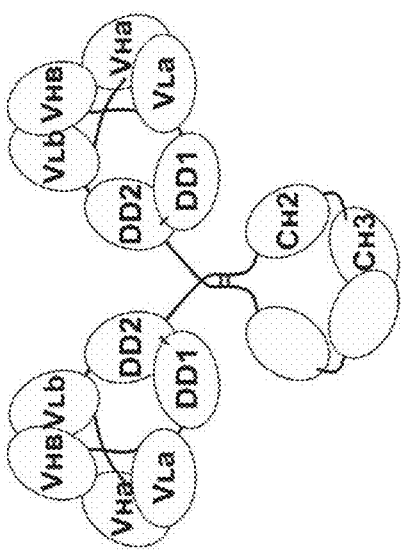
Figure 3:
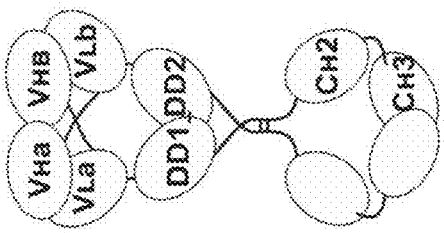
Figure 3:
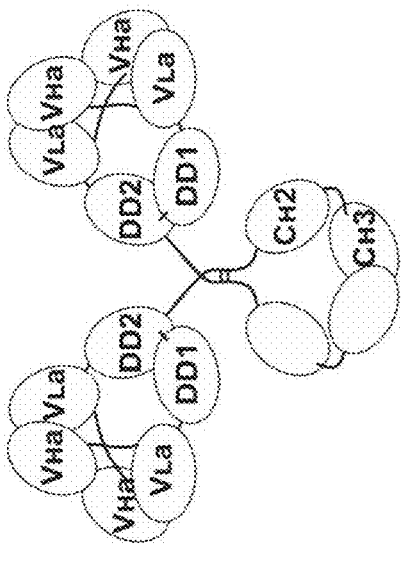
Figure 3:
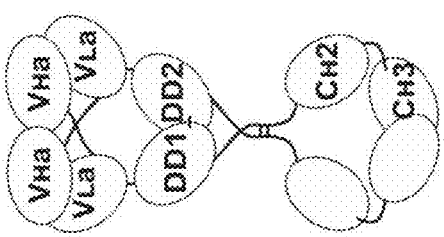

FIG. 3: Schematic overview of tetravalent, mono- and bispecific, and of bivalent, mono- and bispecific, Db-Ig molecules using homodimeric Fc part. Schematic illustration of the heavy and light chain of tetravalent, monospecific (4+0) or tetravalent, bispecific (2+2), and of the two heavy chain of a bivalent, monospecific (2+0) or bivalent, bispecific (1+1) Db-Ig molecules.

Figure 4:
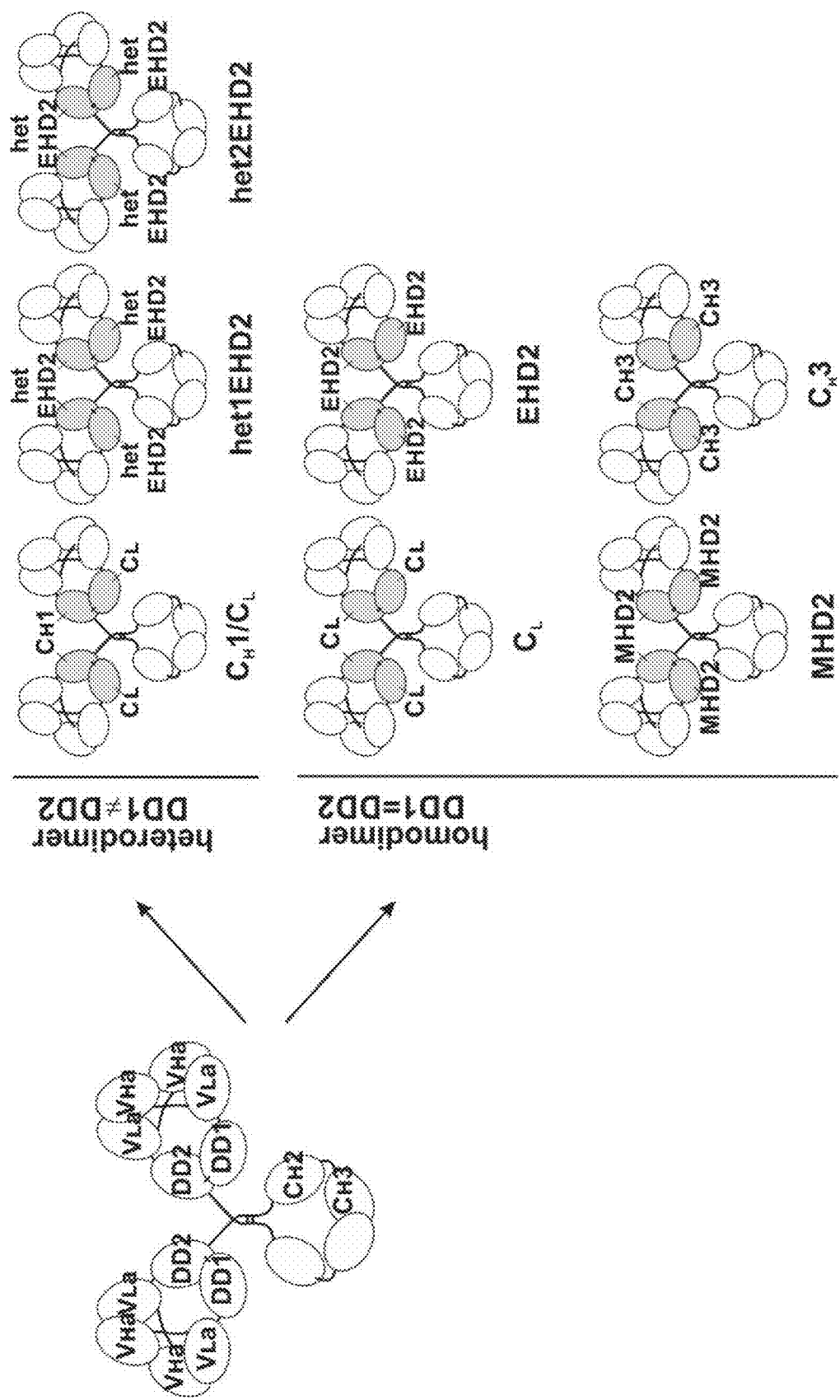

FIG. 4: Schematic overview of dimerization domains used for the generation of tetravalent, mono- and bispecific Db-Ig molecules using homodimeric Fc part. Dimerization modules are grouped according to heterodimer or homodimer. het1EHD2 contains a C247S mutation in the light chain and C337S mutation in the heavy chain, het2EHD2 contains a C337S in the light chain and C247S mutation in the heavy chain.

Figure 5:
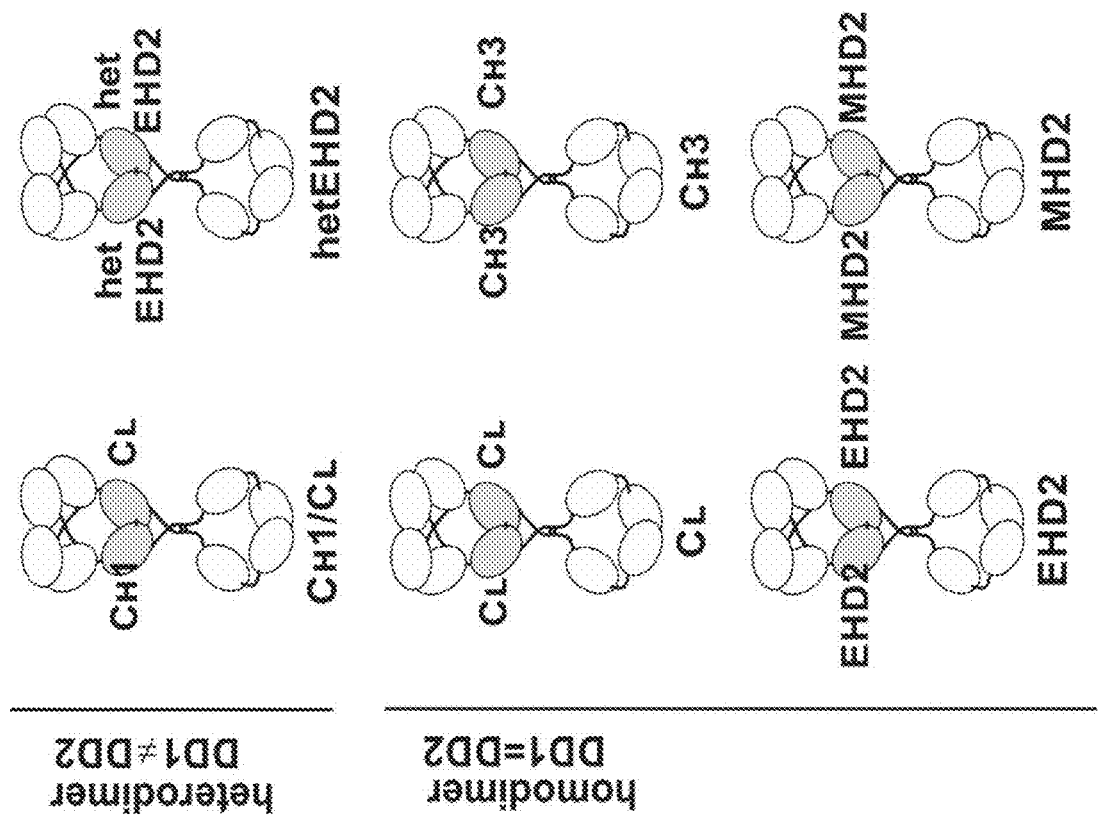
Figure 5:
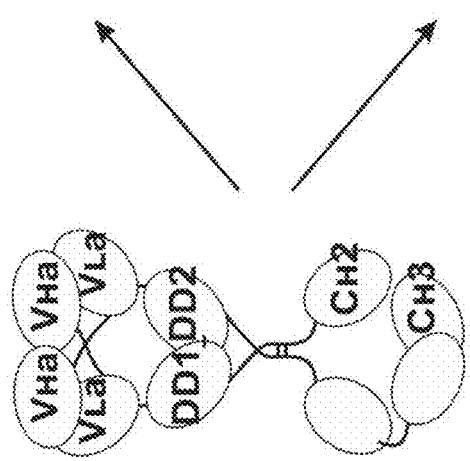

FIG. 5: Schematic overview of dimerization domains used for the generation of bivalent, monospecific Db-Ig molecules using homodimeric Fc part. Dimerization modules are grouped according to heterodimer or homodimer.

Figure 6:
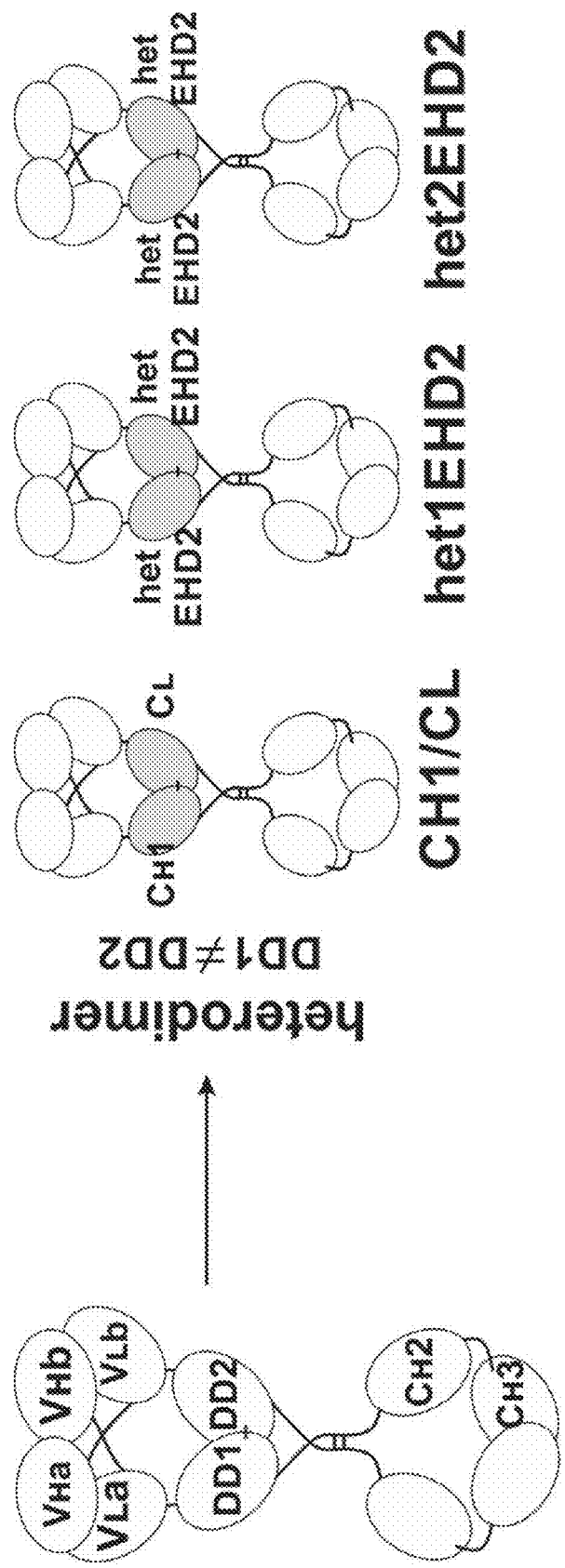

FIG. 6: Schematic overview of dimerization domains used for the generation of bivalent, bispecific Db-Ig molecules using homodimeric Fc part. Only dimerization domains, which form a heterodimer were used for the generation of bivalent, bispecific binding molecules. het1 EHD2 contains a C247S mutation in the first heavy chain and C337S mutation in the second heavy chain, het2EHD2 contains C337S in the first heavy chain and C247S mutation in the second heavy chain.

Figure 7A:
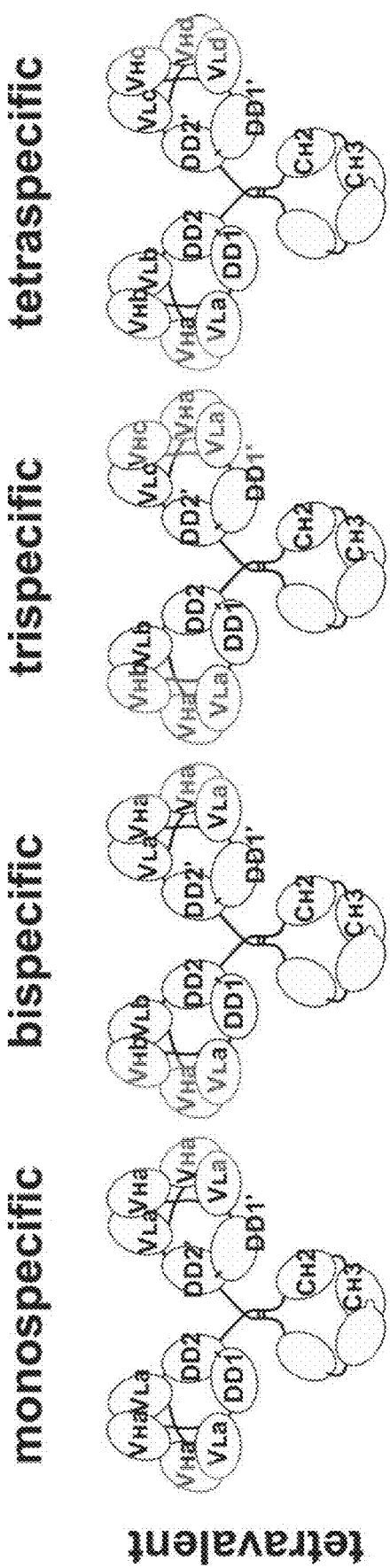
Figure 7B:
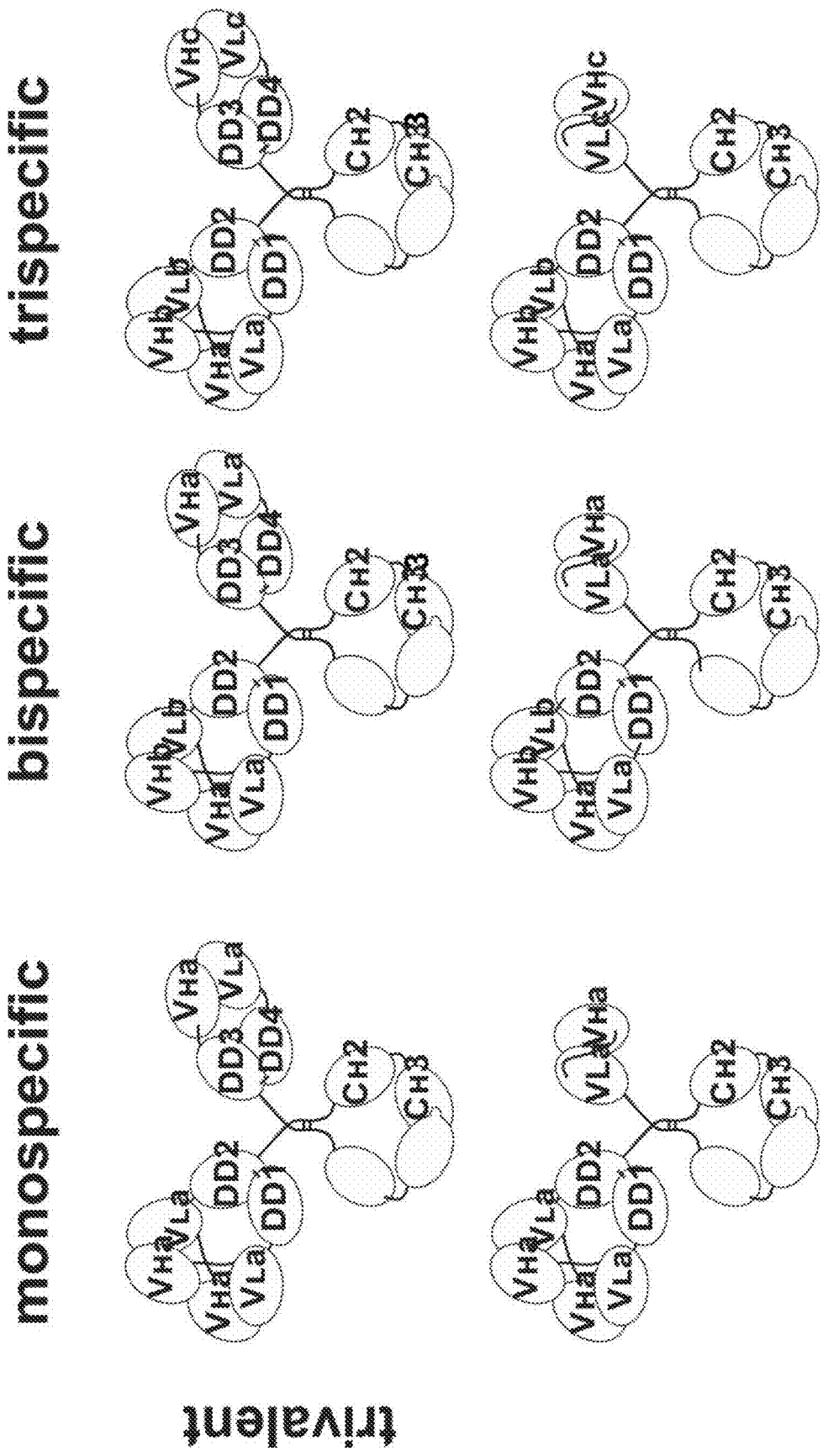
Figure 7C:
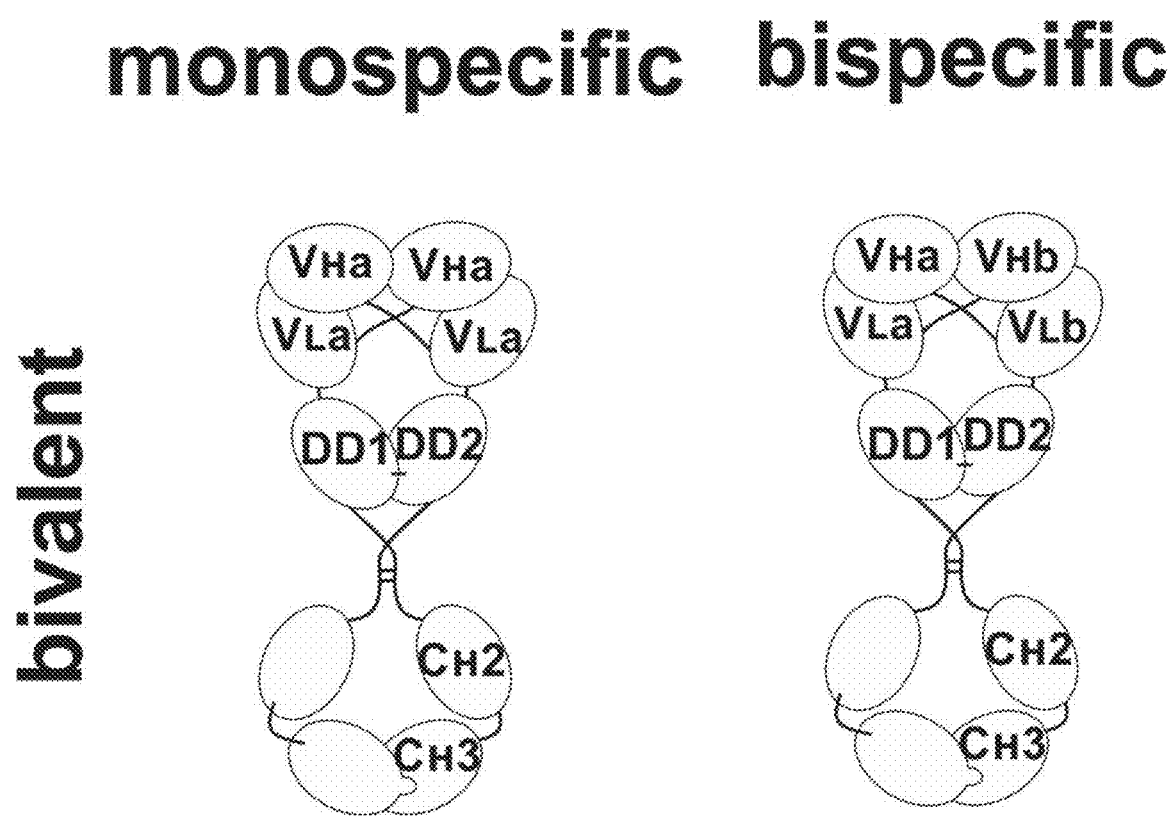

FIG. 7A-7C: Schematic overview of tetra-, tri-, bivalent Db-Ig molecules using heterodimeric Fc part. Schematic illustration of the light and/or heavy chain of tetravalent (mono- (4+0), bi- (2+2, 3+1), tri- (2+1+1), and tetraspecific (1+1+1+1)), trivalent (mono-(3+0), bi- (2+1), and trispecific (1+1+1)), bivalent (mono- (2+0)), and bispecific (1+1)) Db-Ig molecules.

Figure 8:
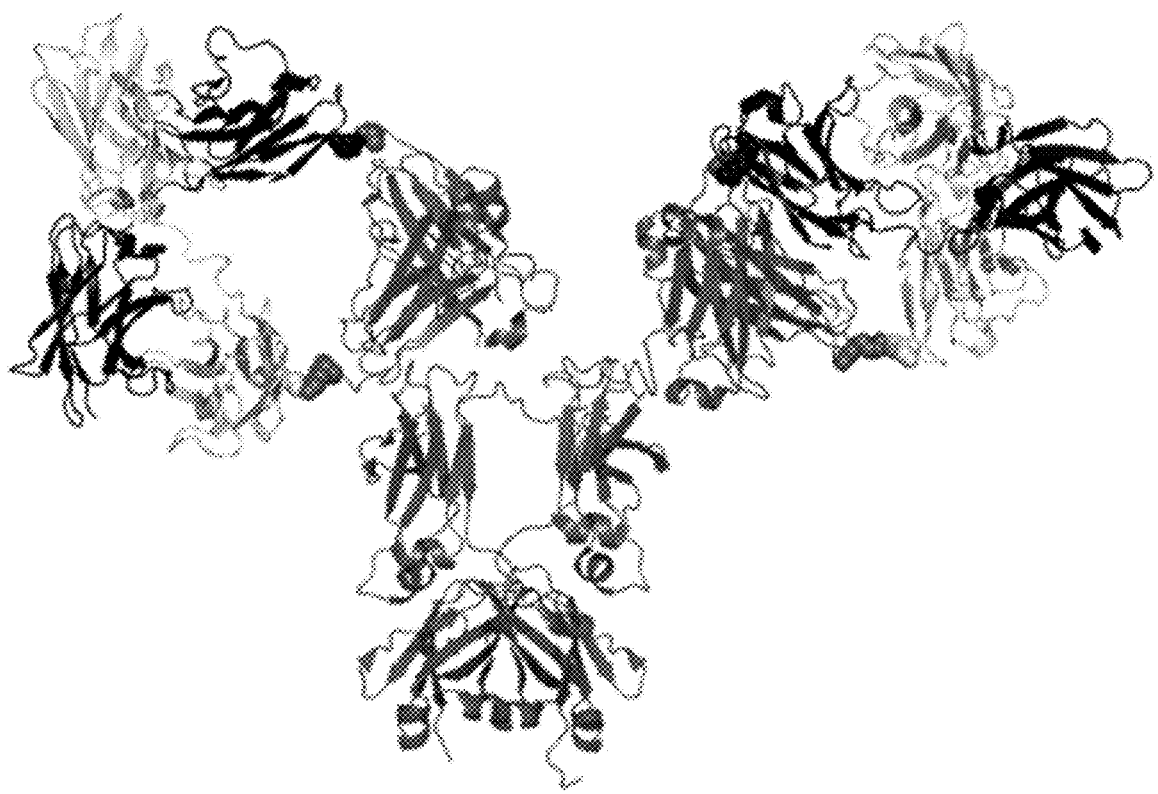

FIG. 8: Computational modeling of a diabody moiety and the constant domains of IgG. Both chains of the diabody are colored in black and light grey, whereas the constant domains of IgG are colored dark gray. Interface of diabody and constant domains are shown as spheres. Modeling was performed using PyMol (IHZH; human IgG; ILMK; bivalent diabody).

Figure 9:
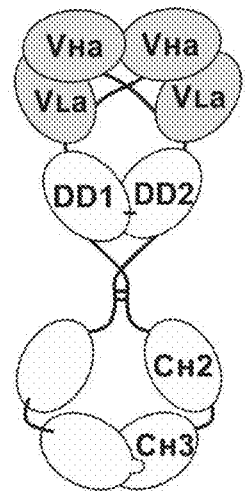
Figure 9:
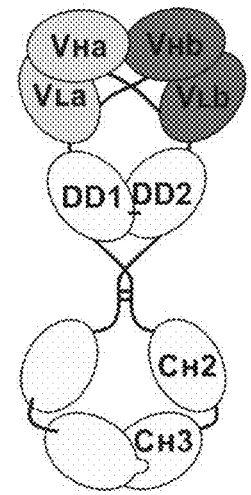
Figure 9:
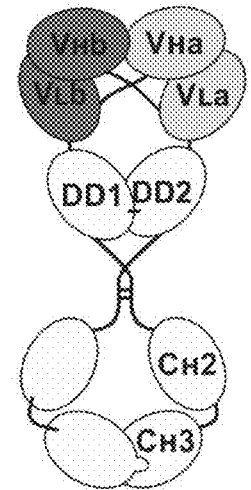

FIG. 9: Schematic overview of antigen-binding sites of bivalent Db-Ig molecules using a heterodimeric Fc part. Schematic illustration of the heavy chains of bivalent (mono-(2+0), and bispecific (1+1)) Db-Ig molecules. Specificities of the antigen-binding sites are colored as dark and light grey.

Figure 10:
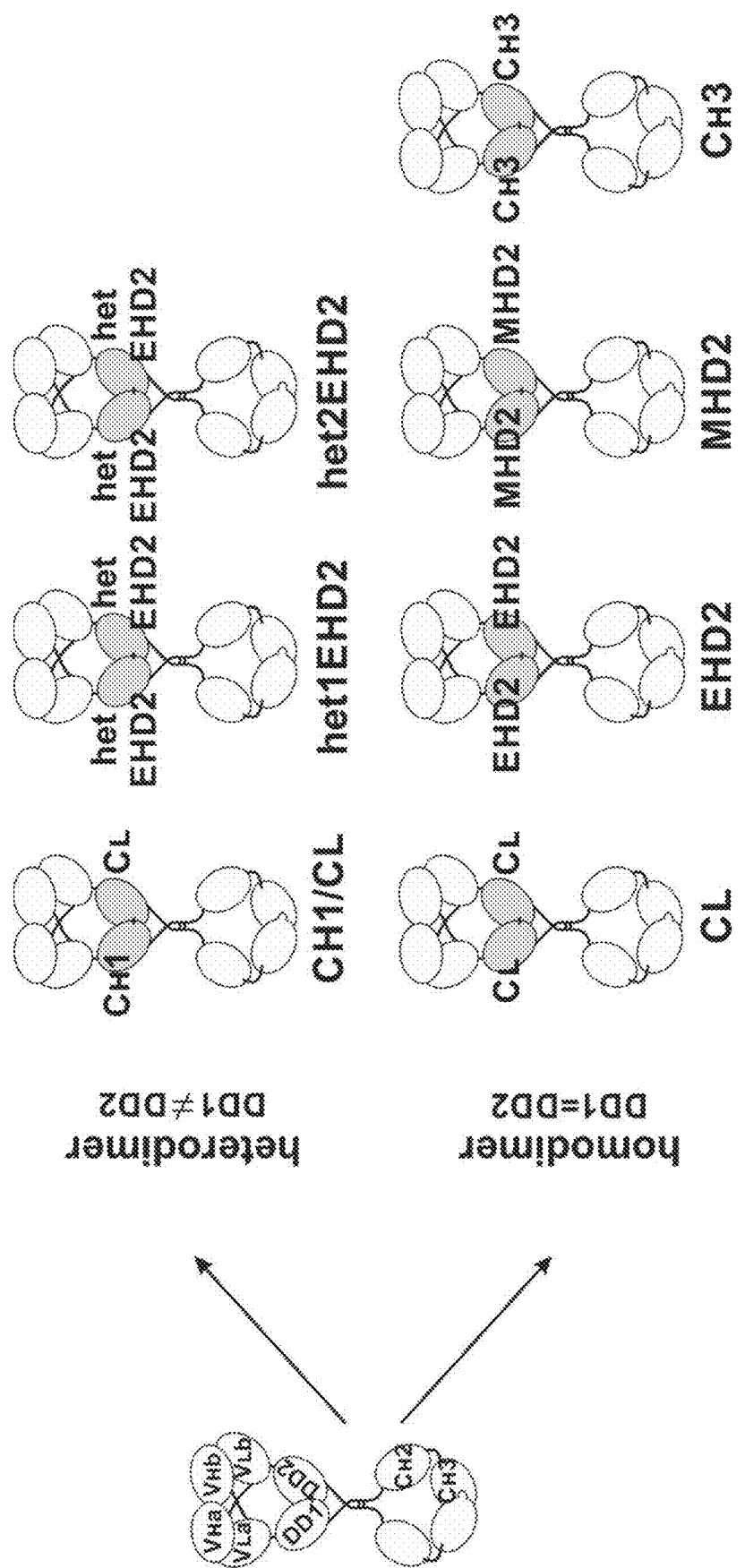

FIG. 10: Schematic overview of the different dimerization modules used for the generation of bivalent Db-Ig molecules using a heterodimeric Fc part. Dimerization modules are grouped according to heterodimer or homodimer.

Figure 11A:
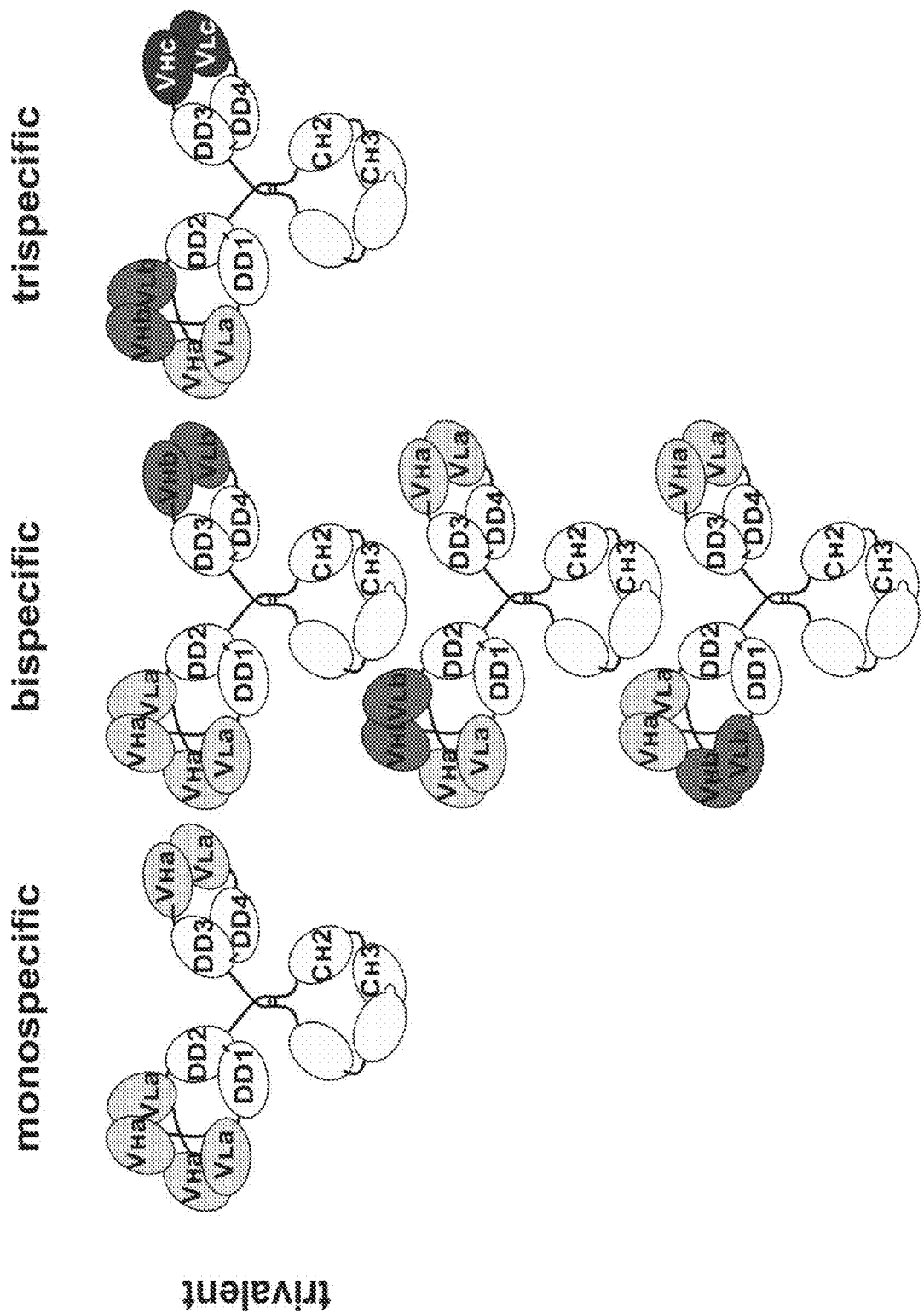
Figure 11B:
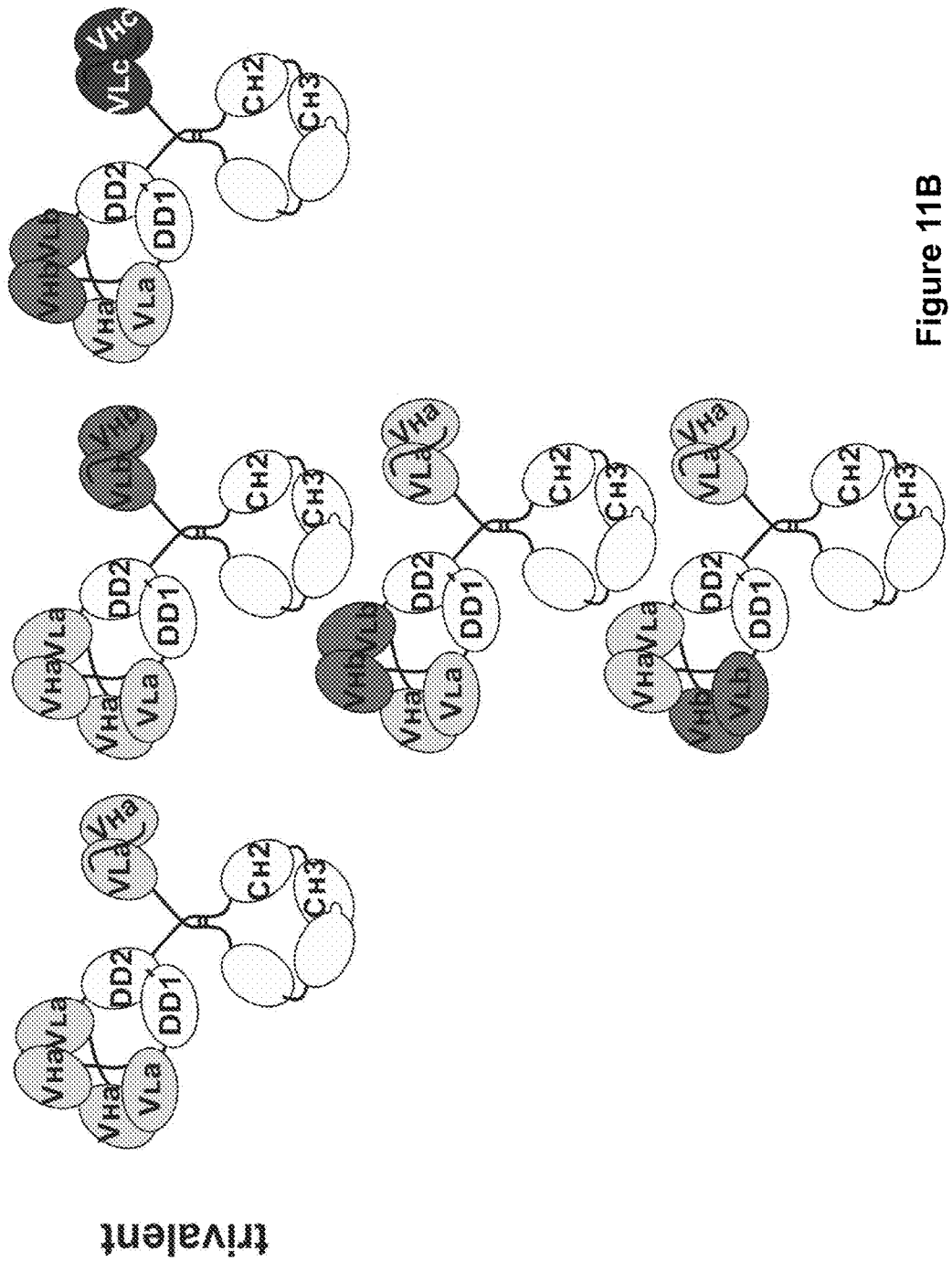
Figure 12A:
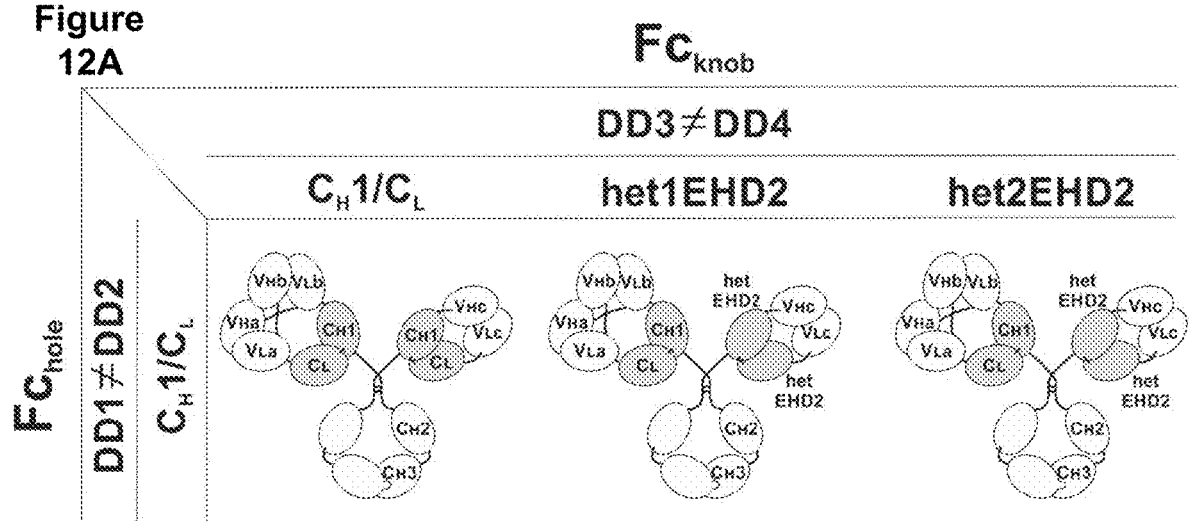
Figure 12B:
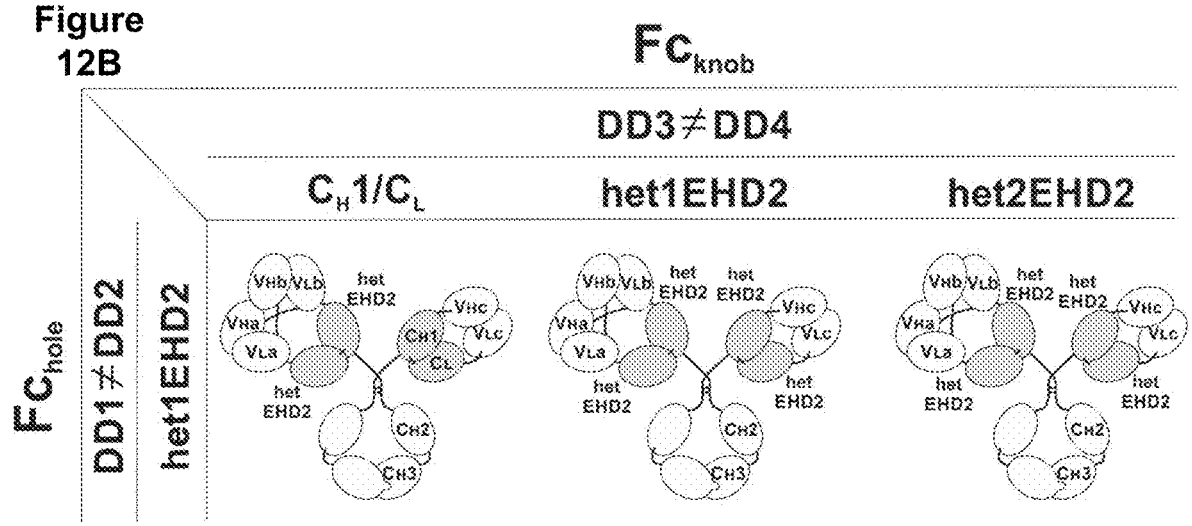
Figure 12C:
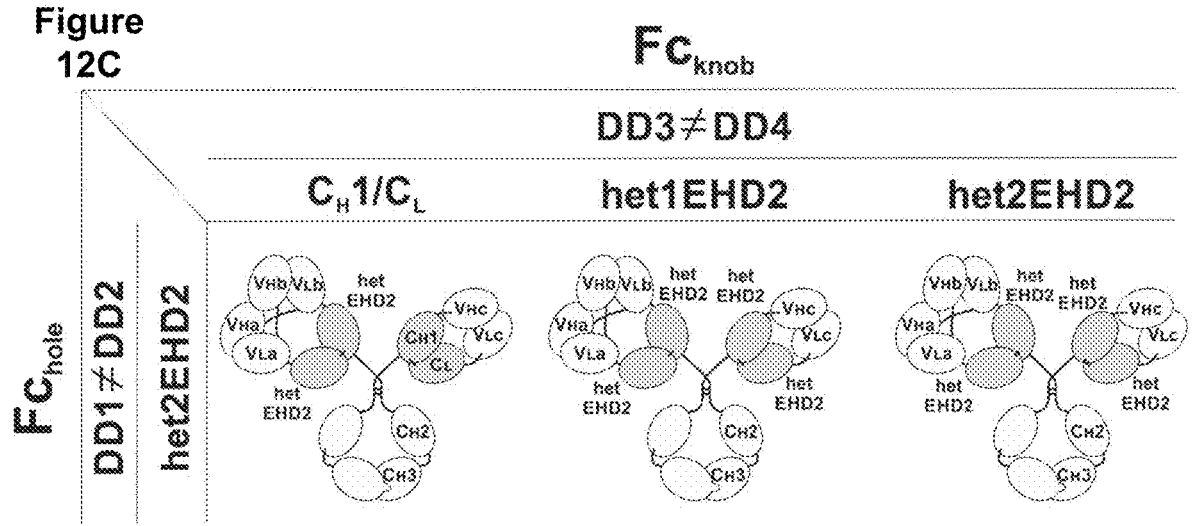
Figure 12D:
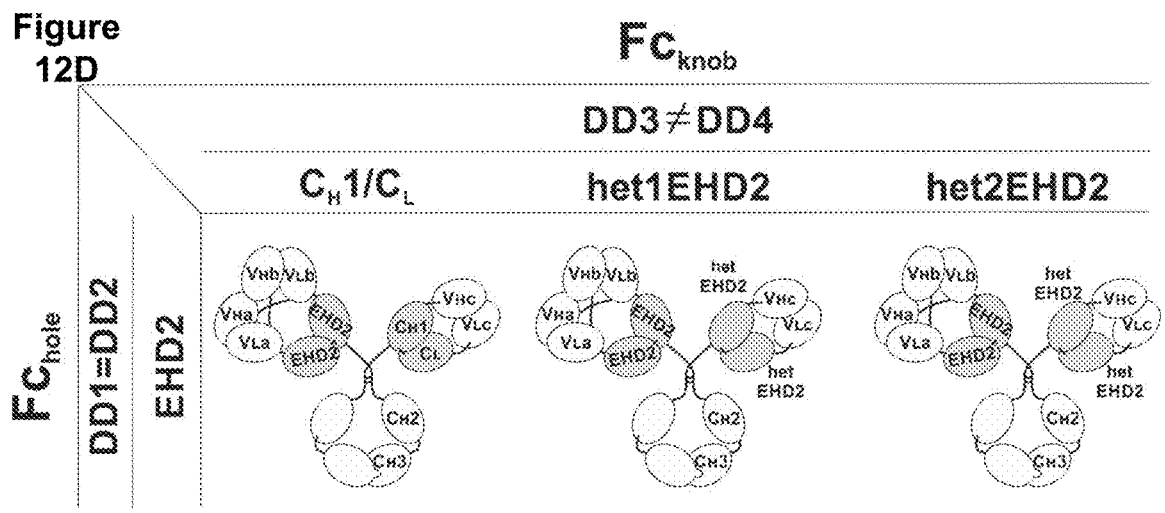
Figure 12E:
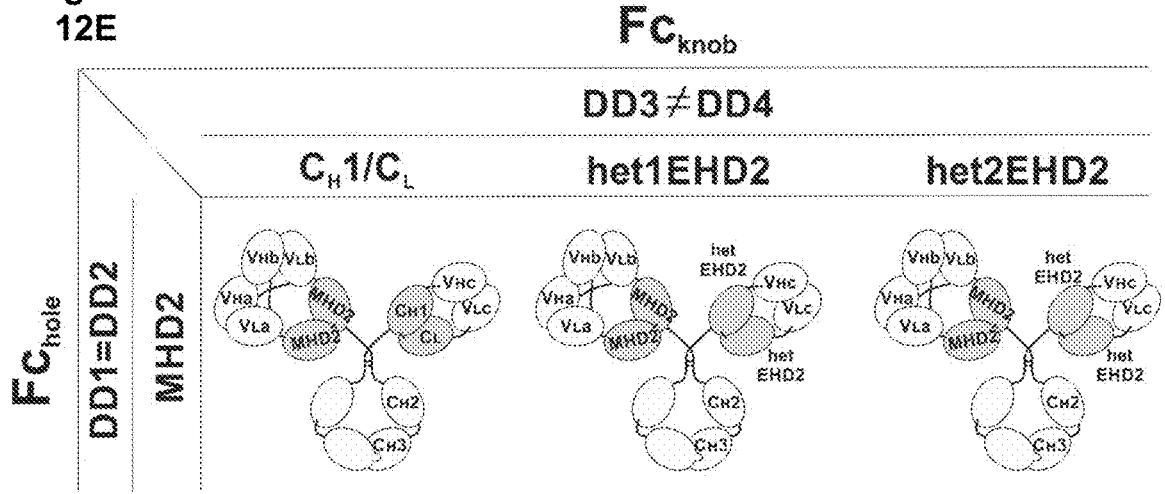
Figure 12F:
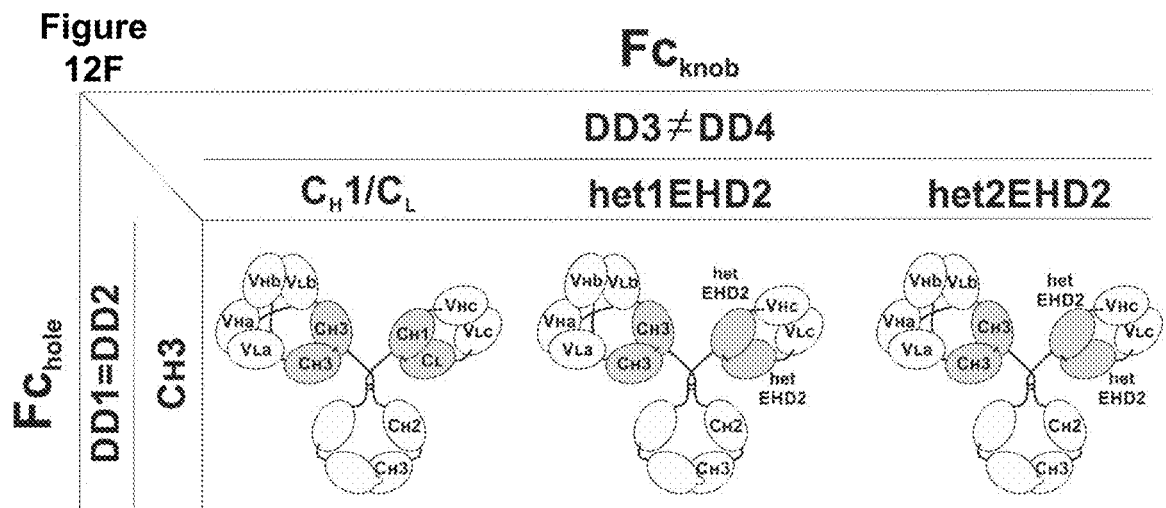
Figure 13A:
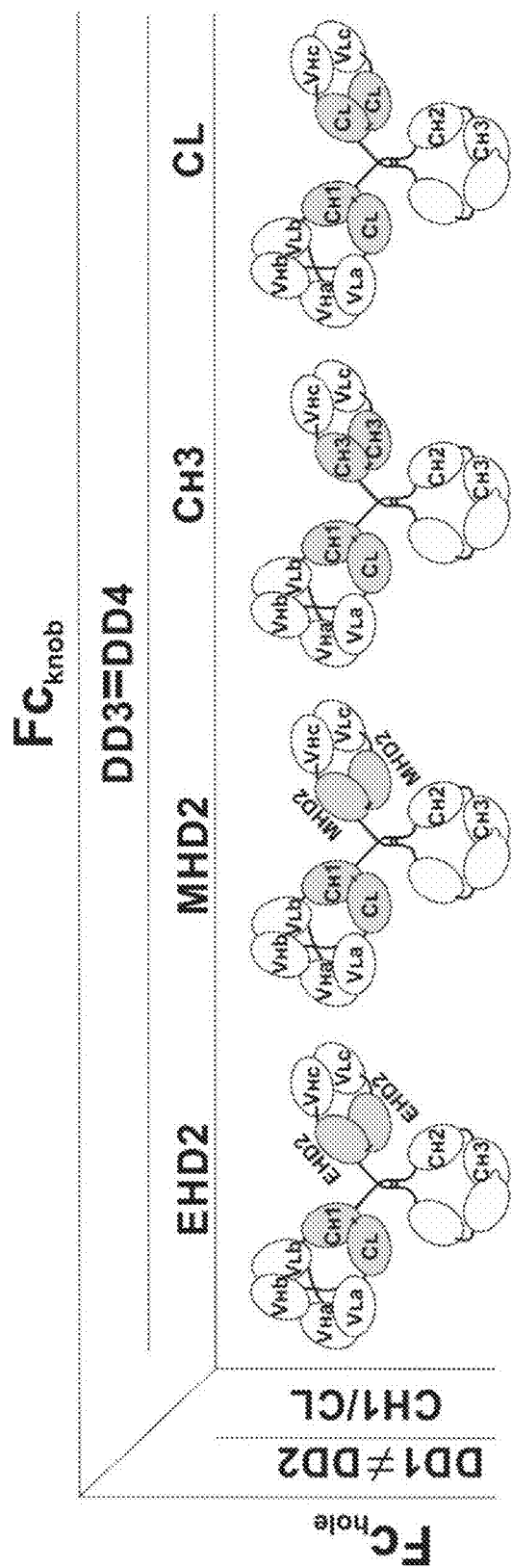
Figure 13B:
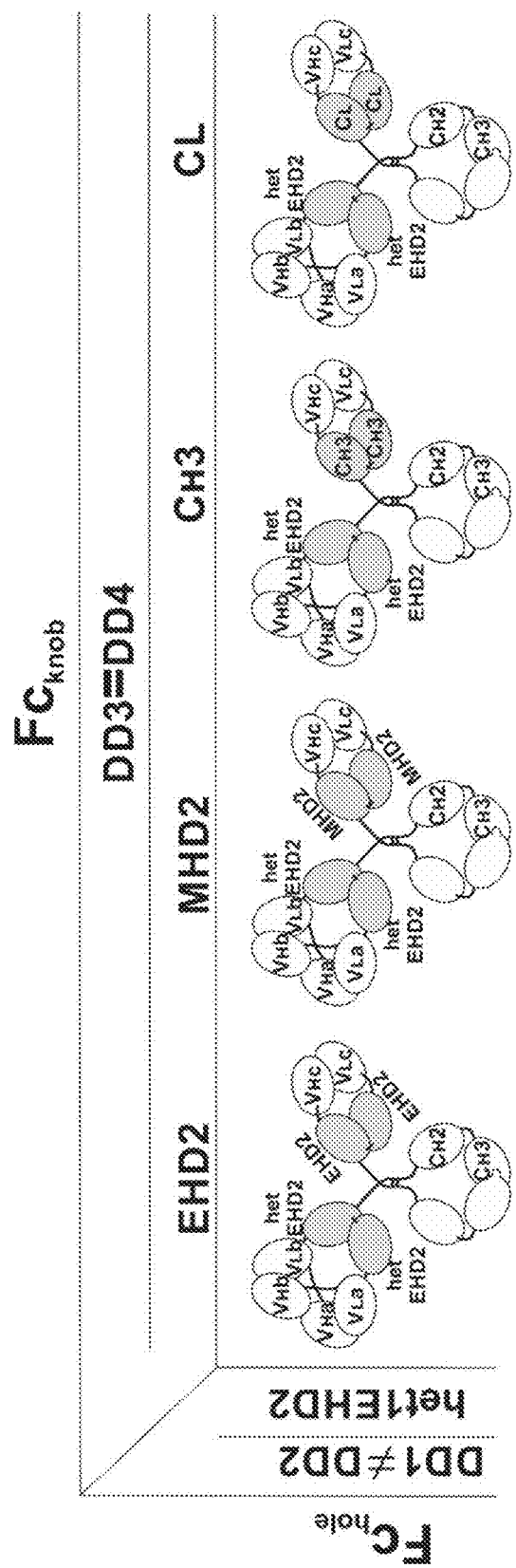
Figure 13C:
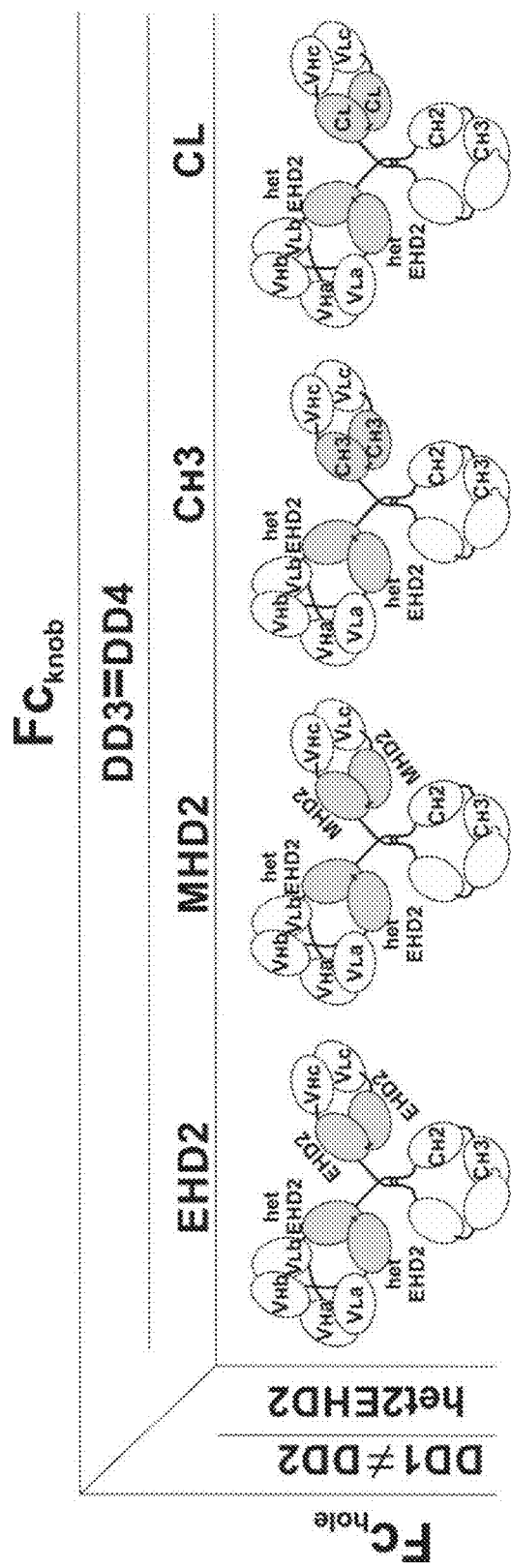
Figure 13D:
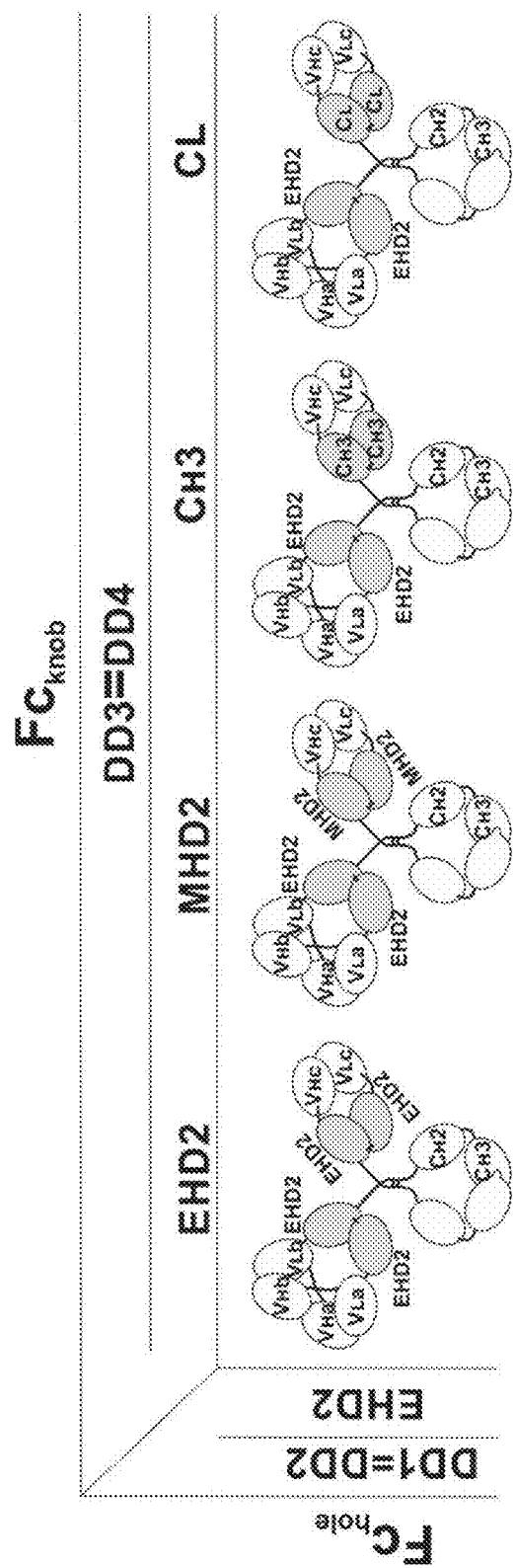
Figure 13E:
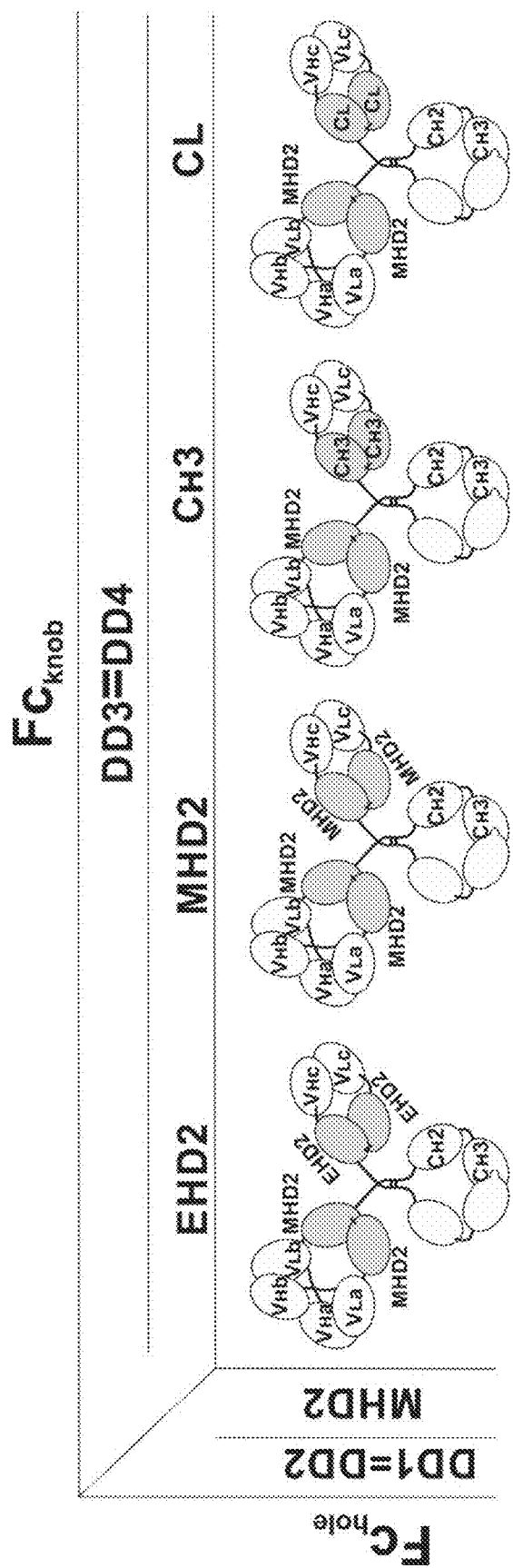
Figure 13F:
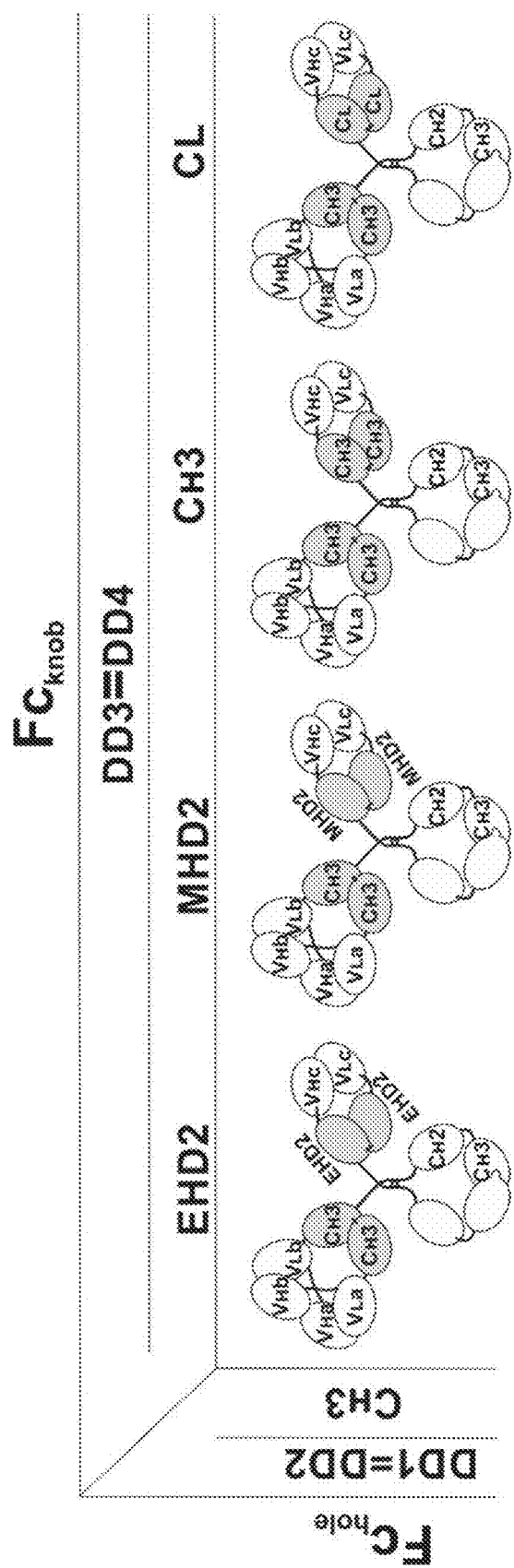
Figure 13G:
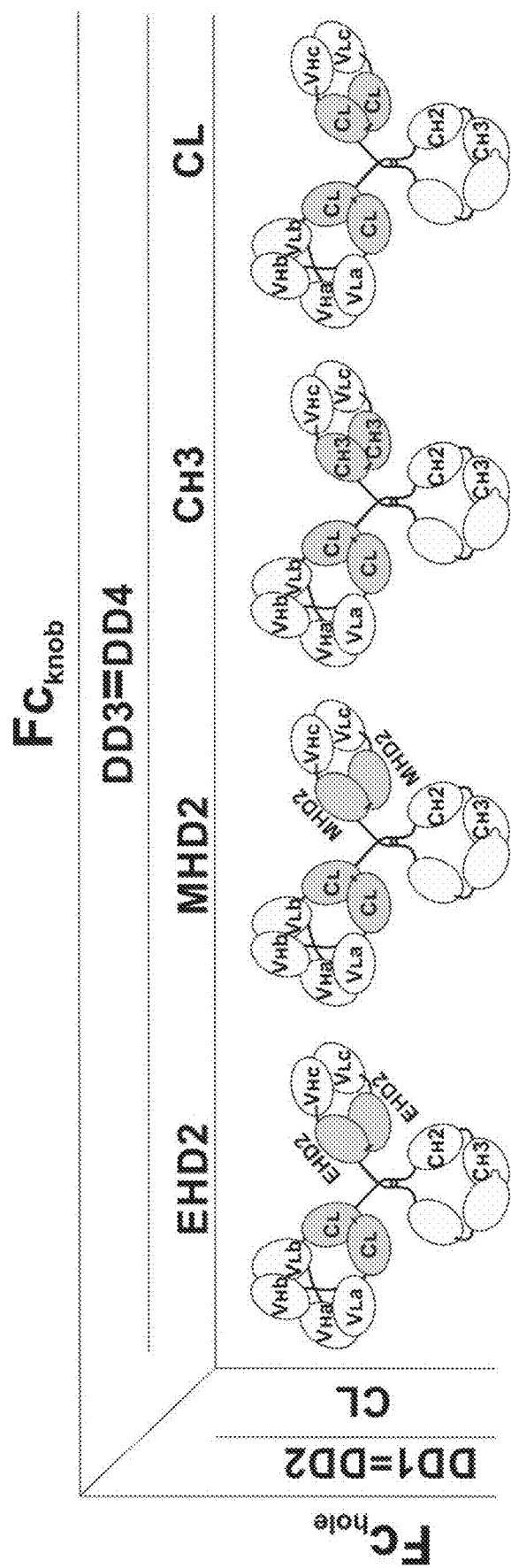

FIG. 11A-11B: Schematic overview of the antigen-binding sites of trivalent Db-Ig molecules using a heterodimeric Fc part. Schematic illustration of the trivalent (mono- (3+0), bispecific (2+1), and trispecific (1+1+1)) Db-Ig molecules combining the diabody moiety either with a Fab fragment or a single-chain Fv (scFv). Specificities of the antigen-binding sites are colored with black, dark and light grey.

FIG. 12A-12G: Schematic overview of hetero-dimerization modules ($Fc_{knob}$) used for the generation of trivalent Db-Fab molecules using a heterodimeric Fc part. Combinatorial overview of dimerization modules used for the generation of trivalent Db-Fab molecules using the example of a monospecific molecule. This is also true for trivalent, bi- or trispecific molecules, het1EHD2 contains a C247S mutation in the light chain and C337S mutation in the heavy chain, het2EHD2 contains a C337S in the light chain and C247S mutation in the heavy chain.

FIG. 13A-13G: Schematic overview of homo-dimerization modules ($Fc_{knob}$) used for the generation of trivalent Db-Fab molecules using a heterodimeric Fc part. Combinatorial overview of dimerization modules used for the generation of trivalent Db-Fab molecules using the example of a monospecific molecule. This is also true for trivalent, bi- or trispecific molecules.

Figure 14:
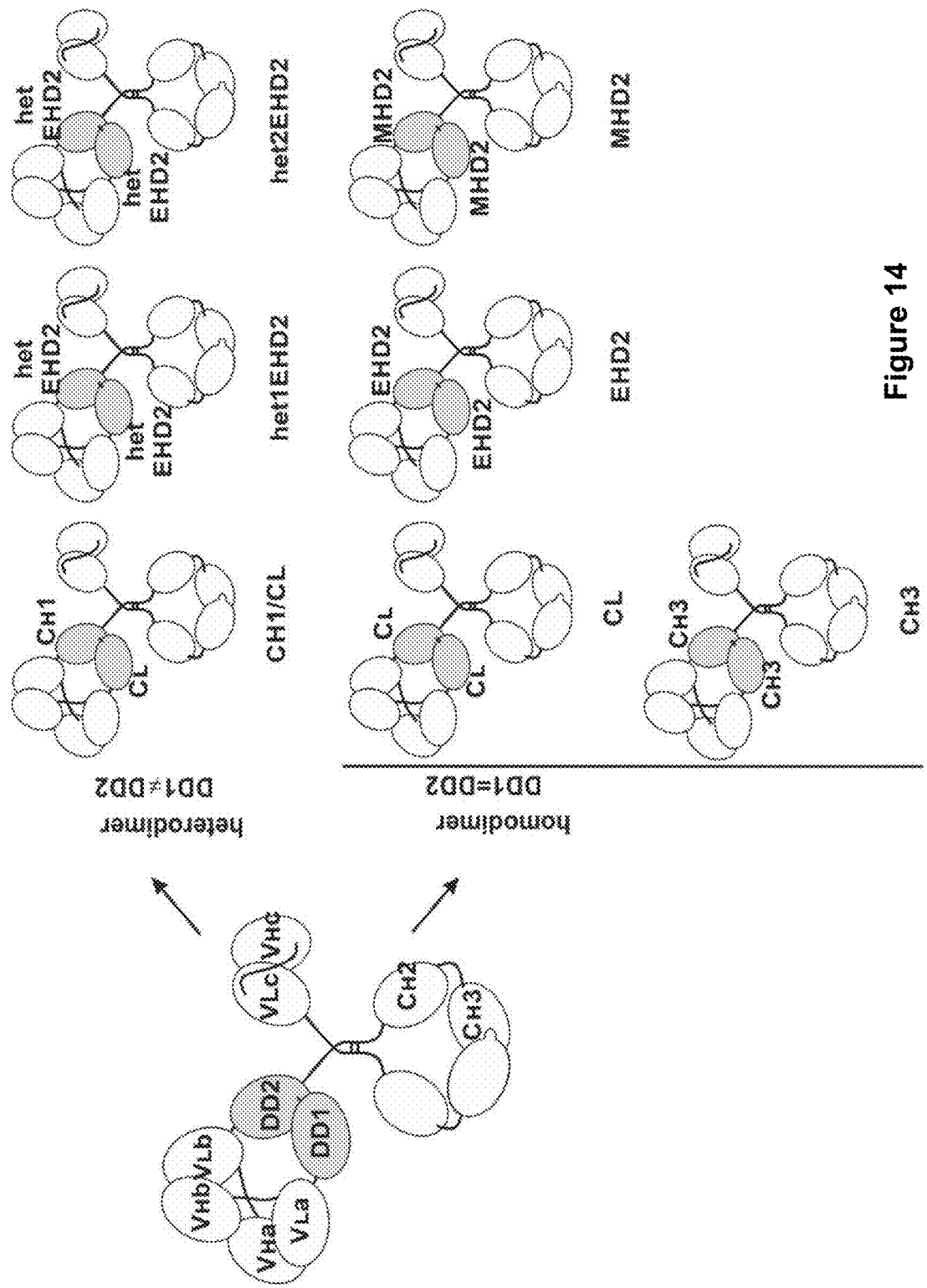
Figure 15A:
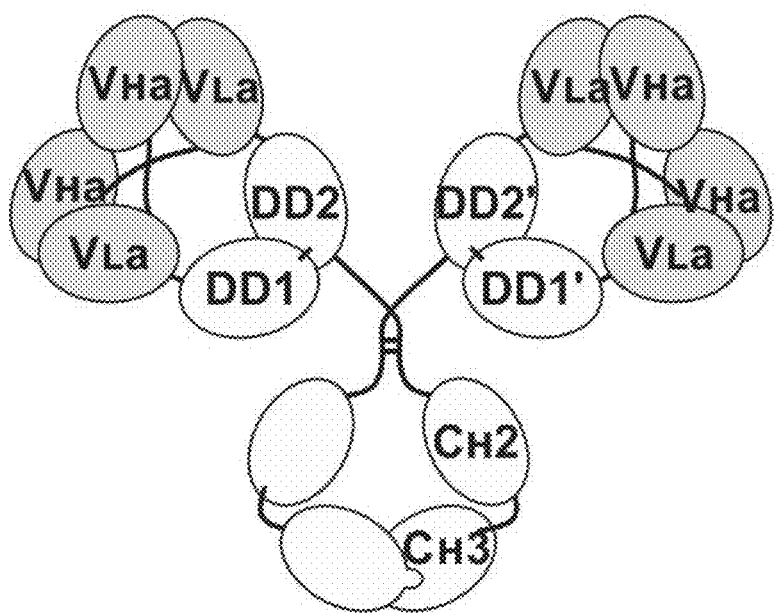
Figure 15B:
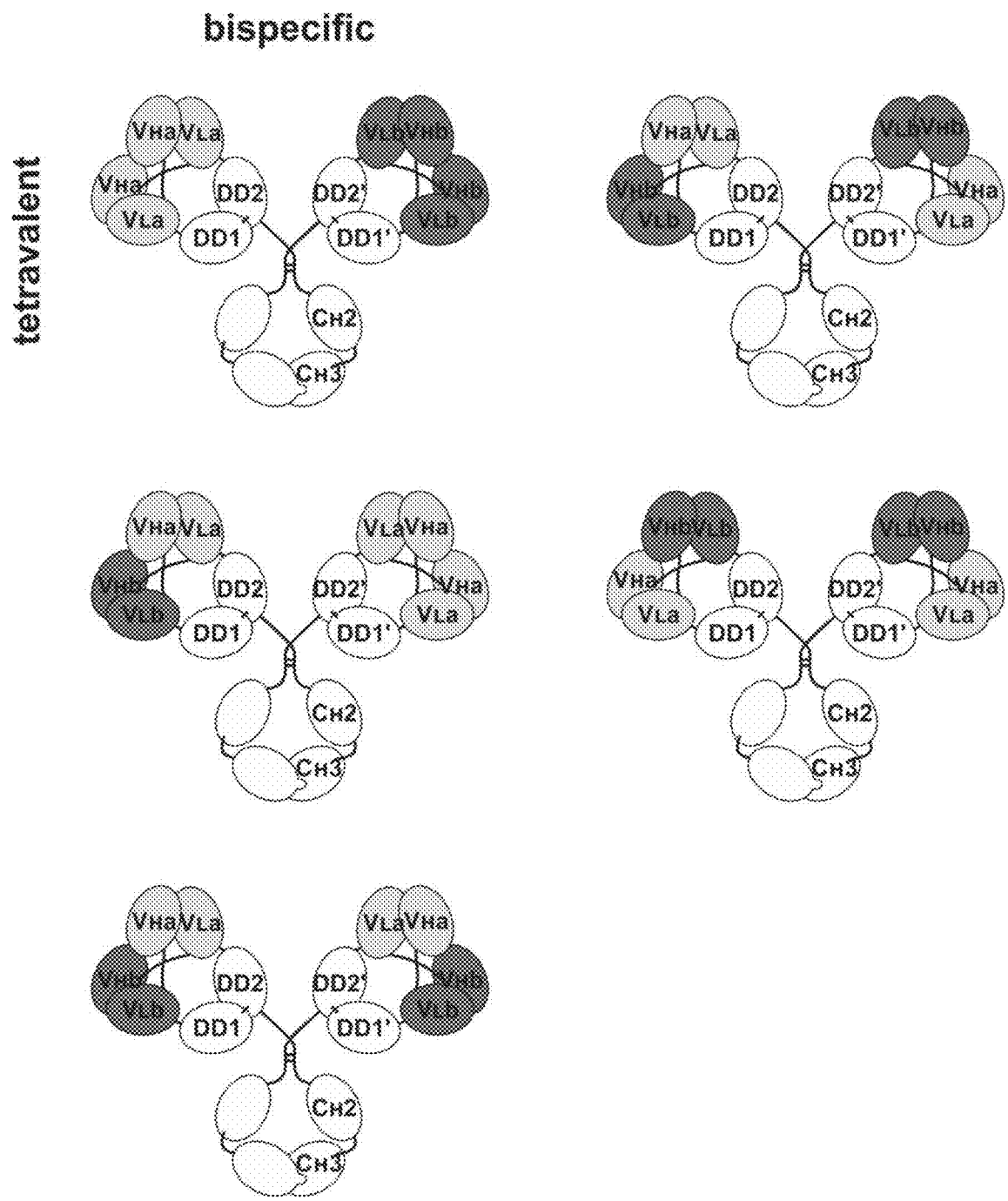
Figure 15C:
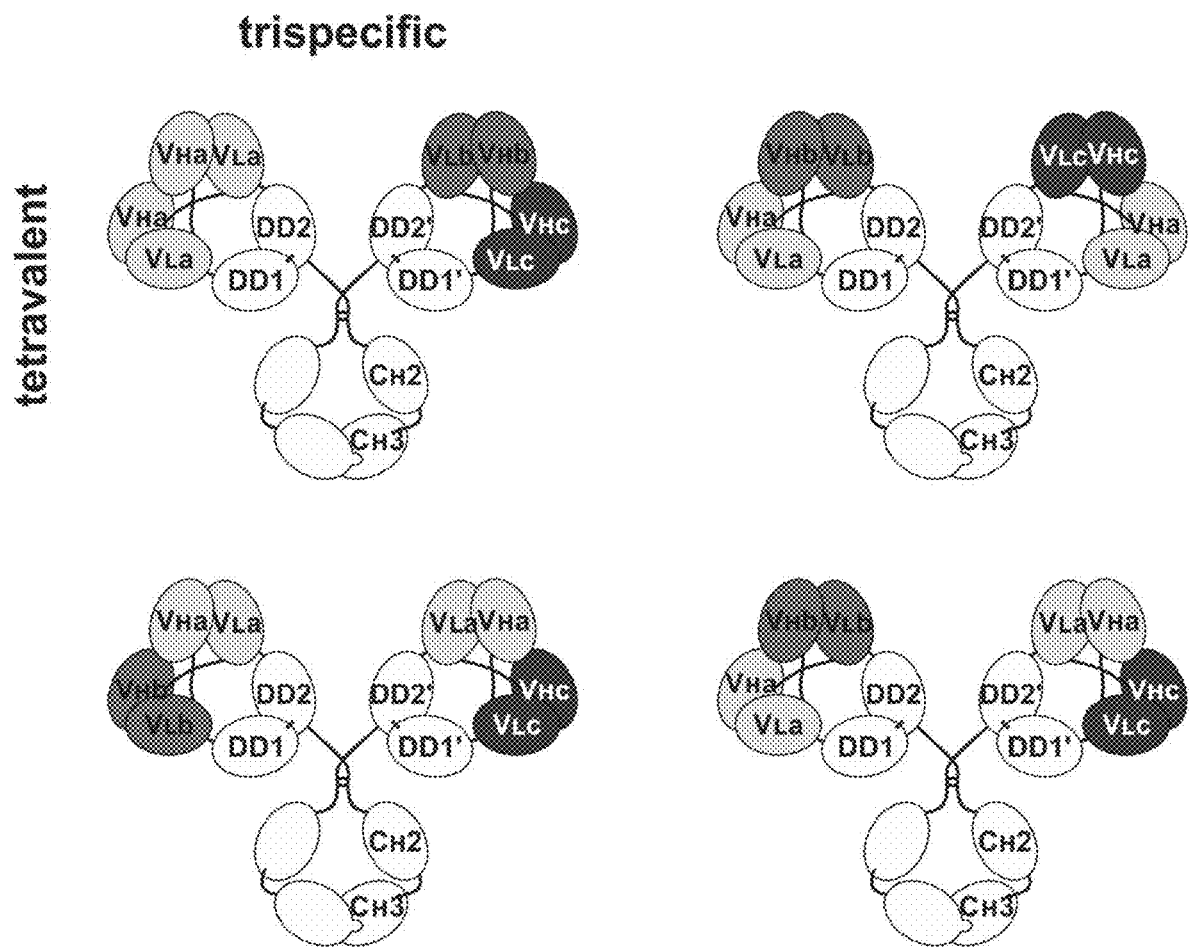
Figure 15D:
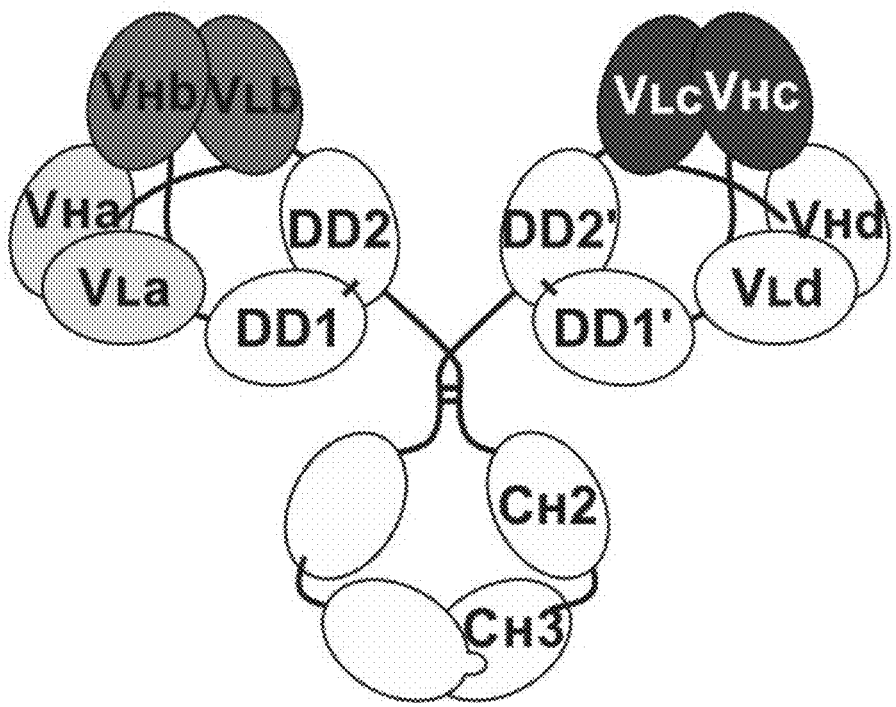
Figure 16A:
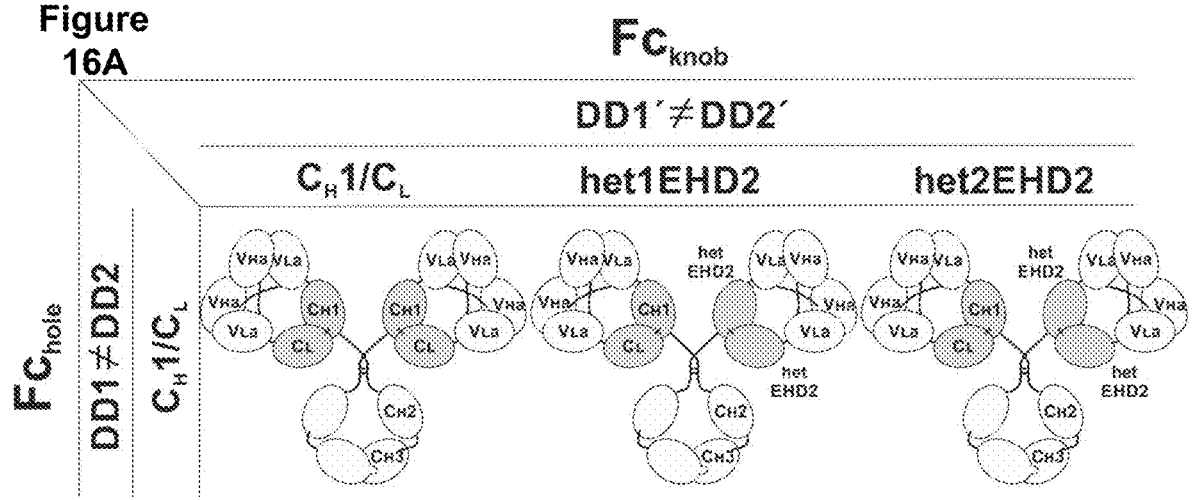
Figure 16B:
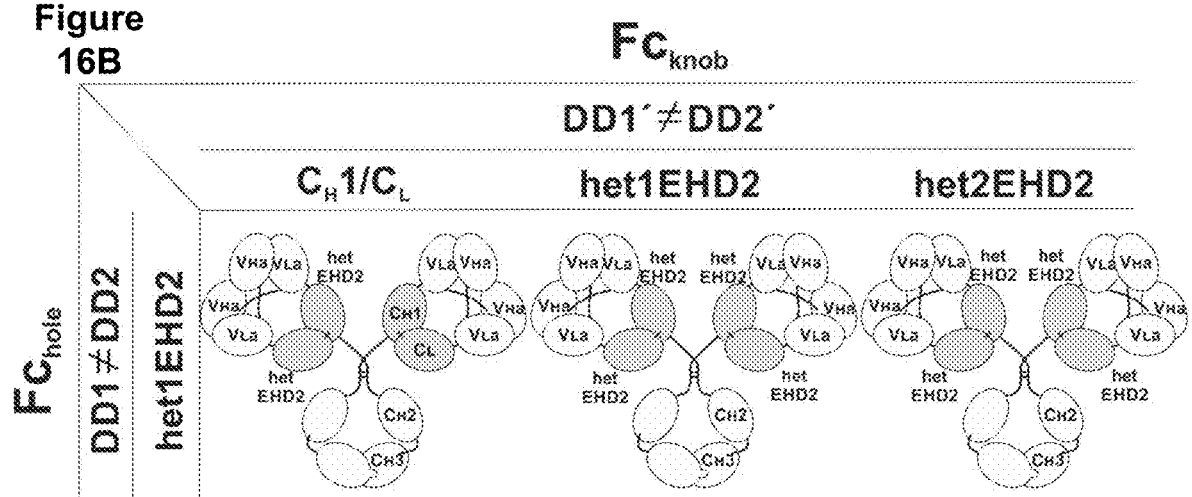
Figure 16C:
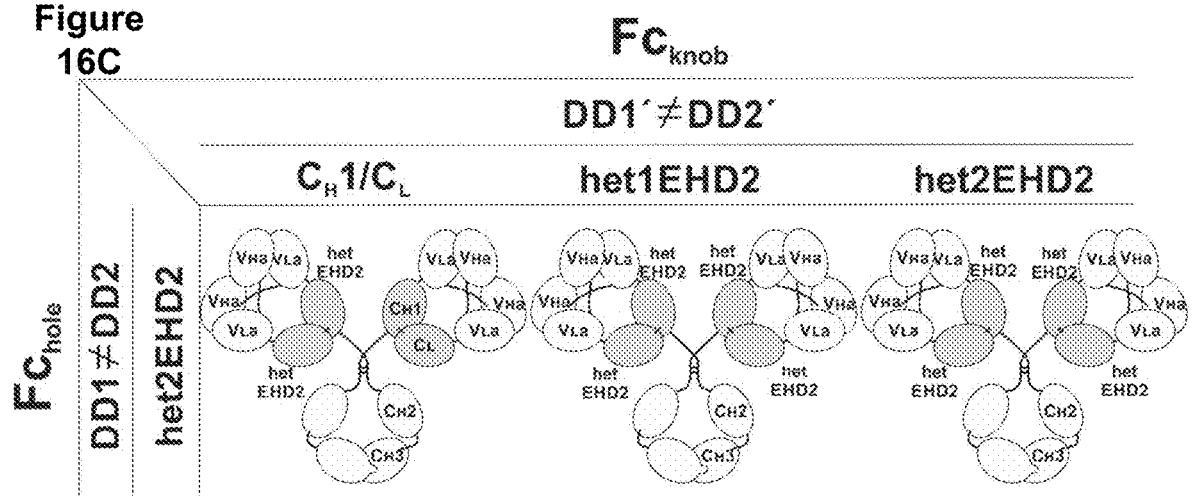
Figure 16D:
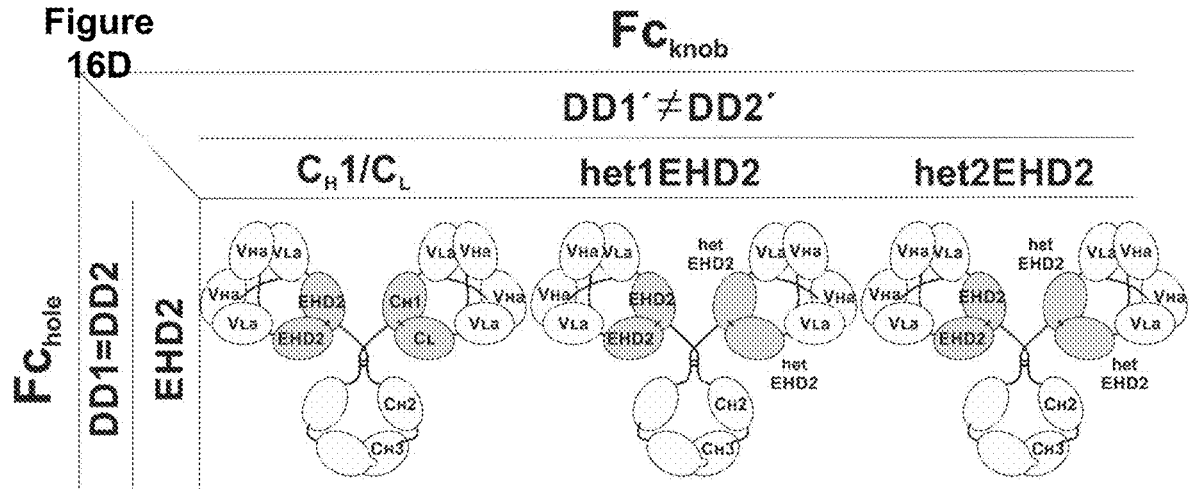
Figure 16E:
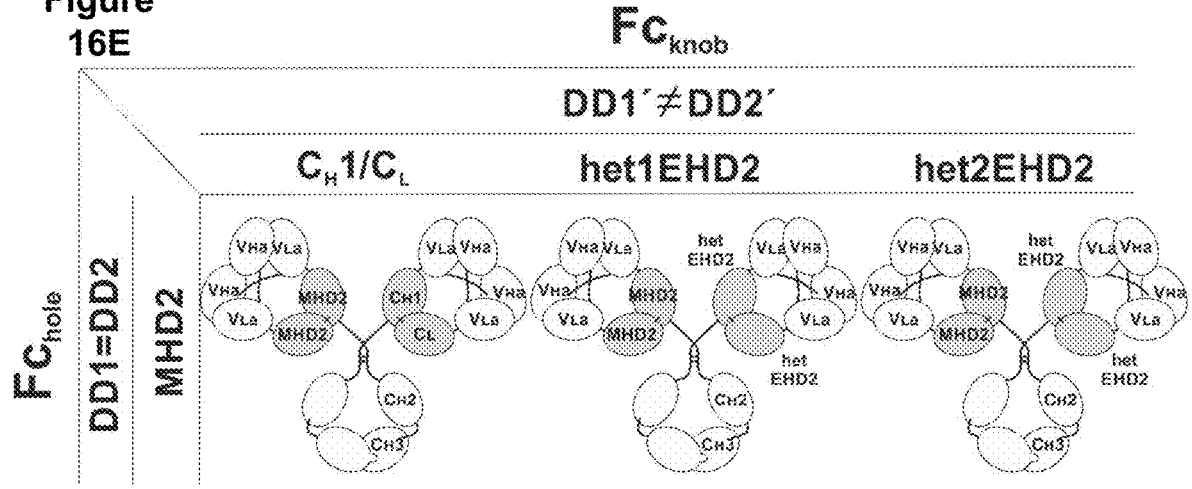
Figure 16F:
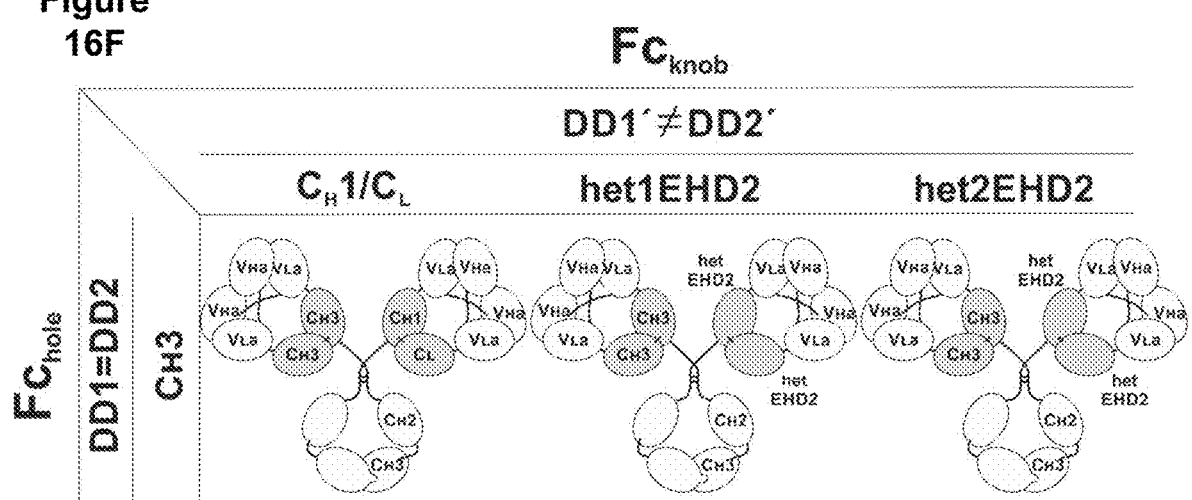
Figure 16G:
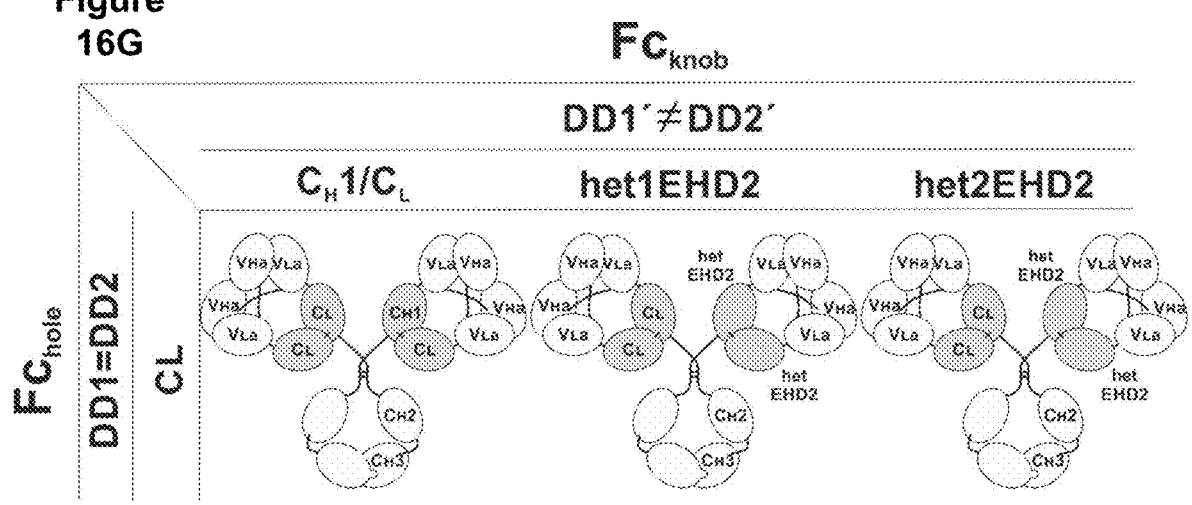
Figure 17A:
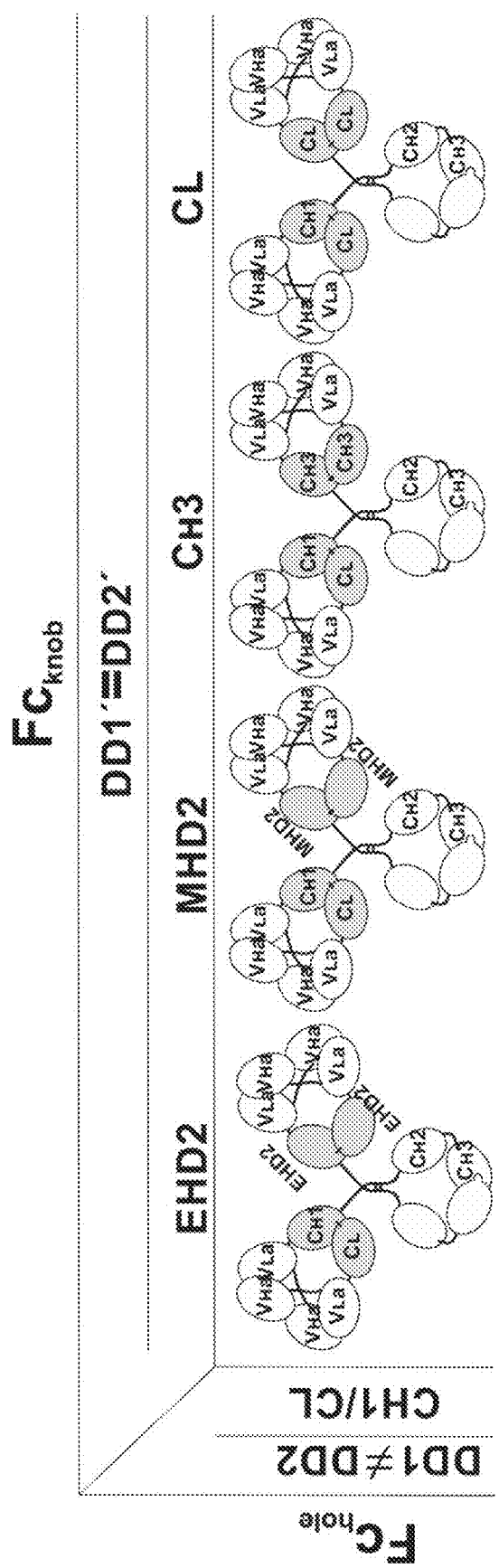
Figure 17B:
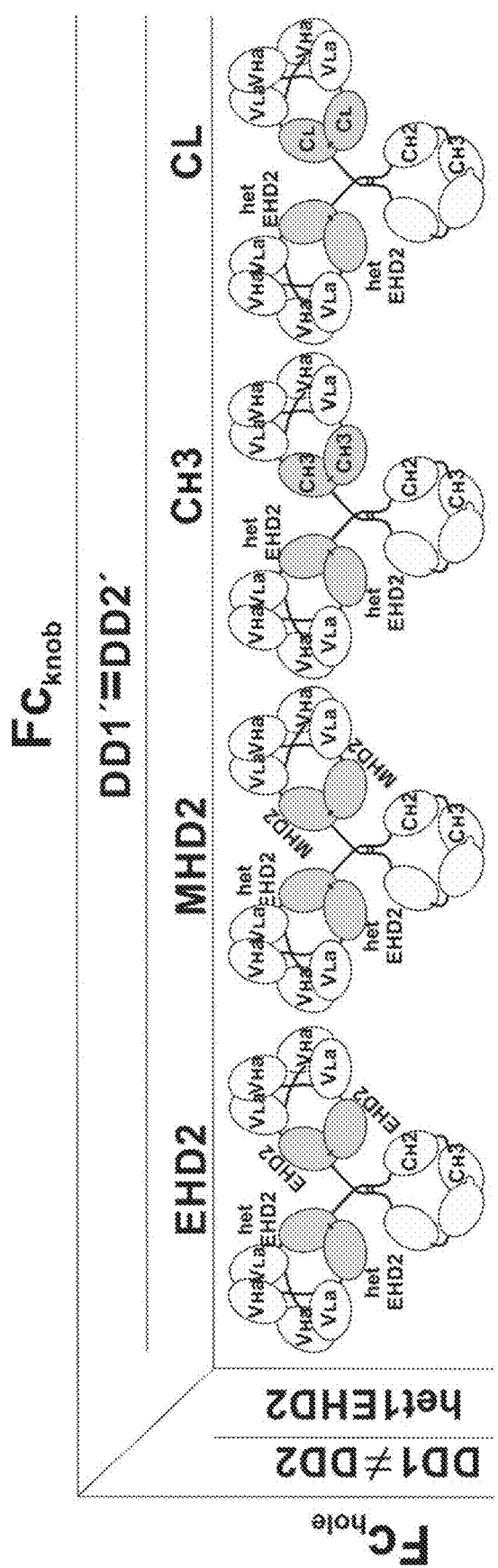
Figure 17C:
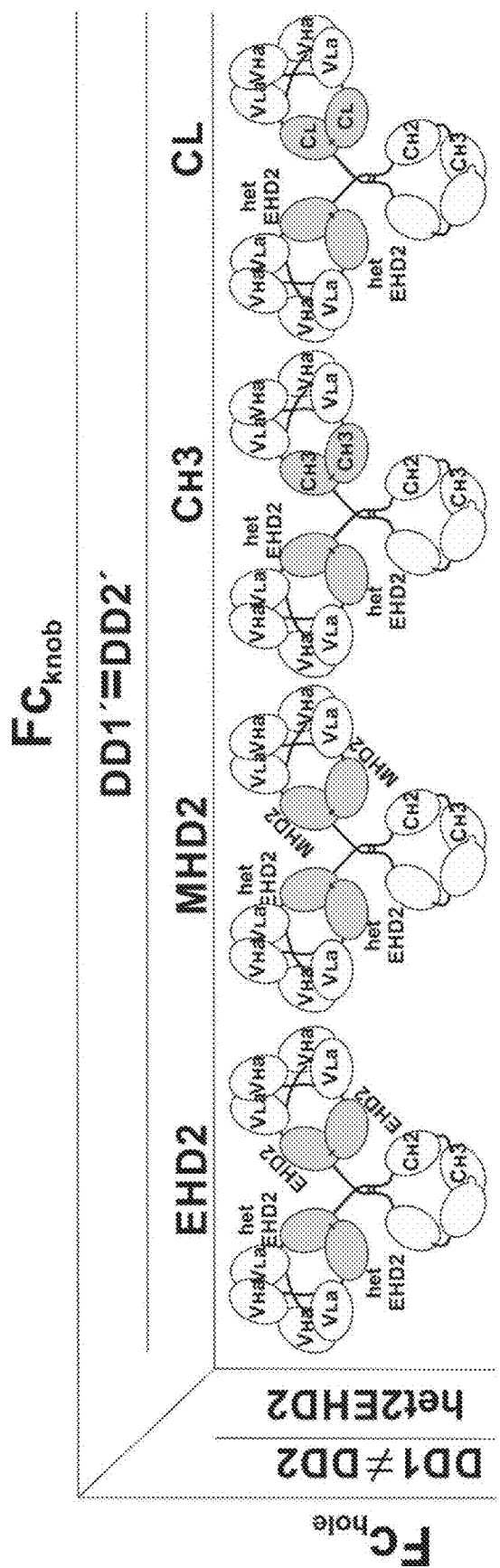
Figure 17D:
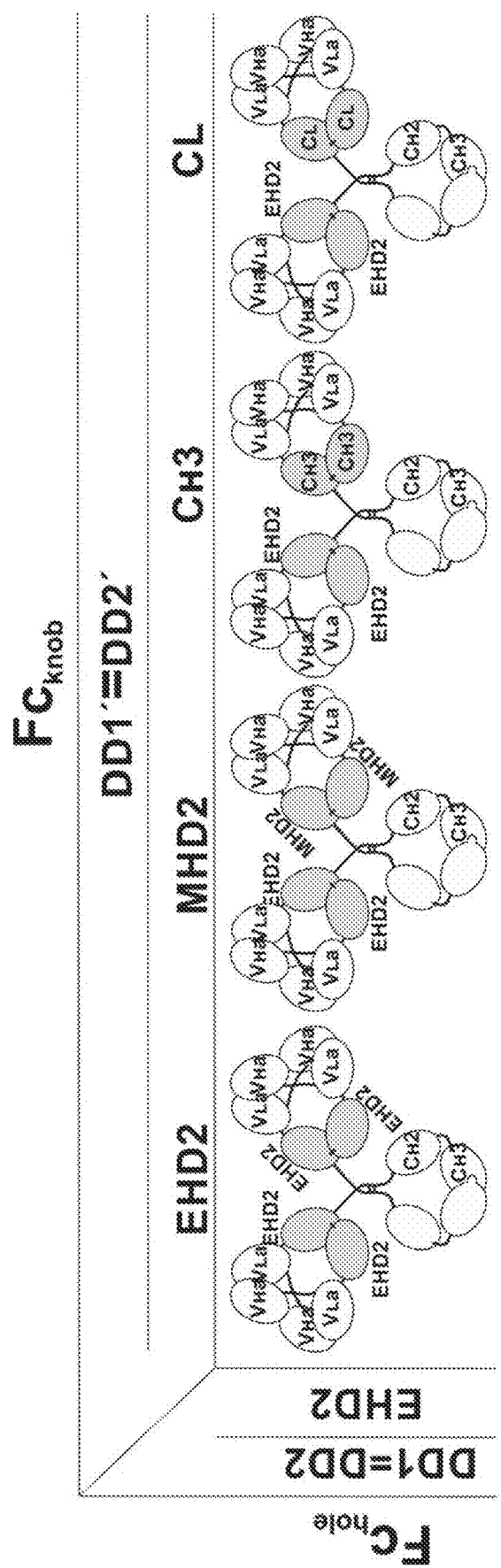
Figure 17E:
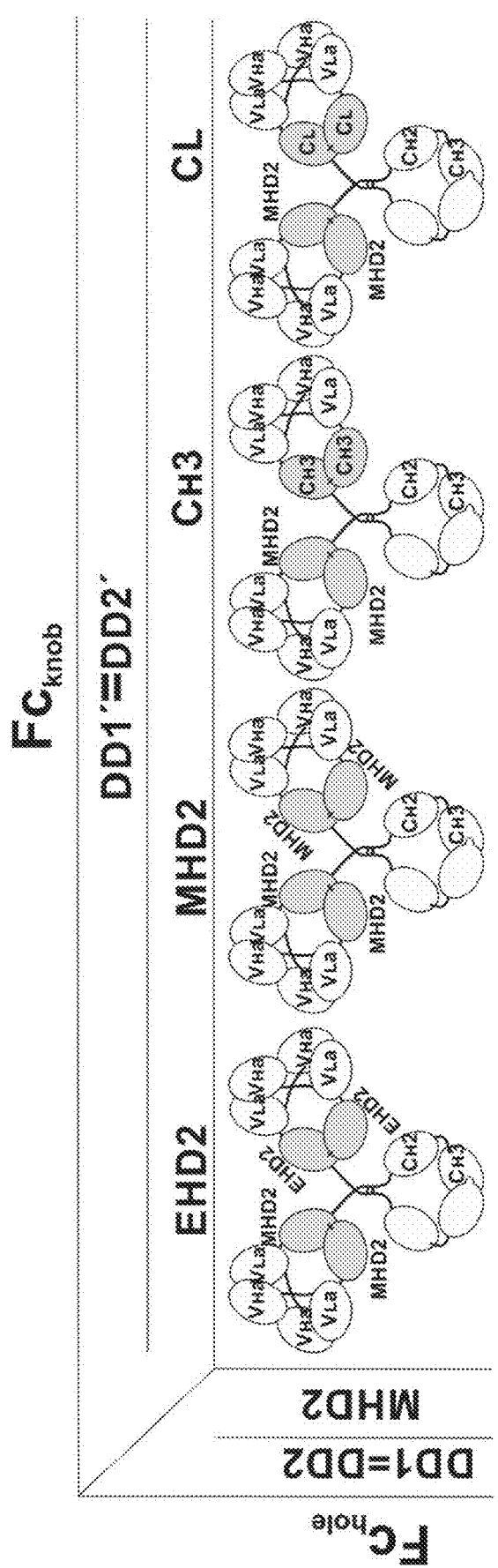
Figure 17F:
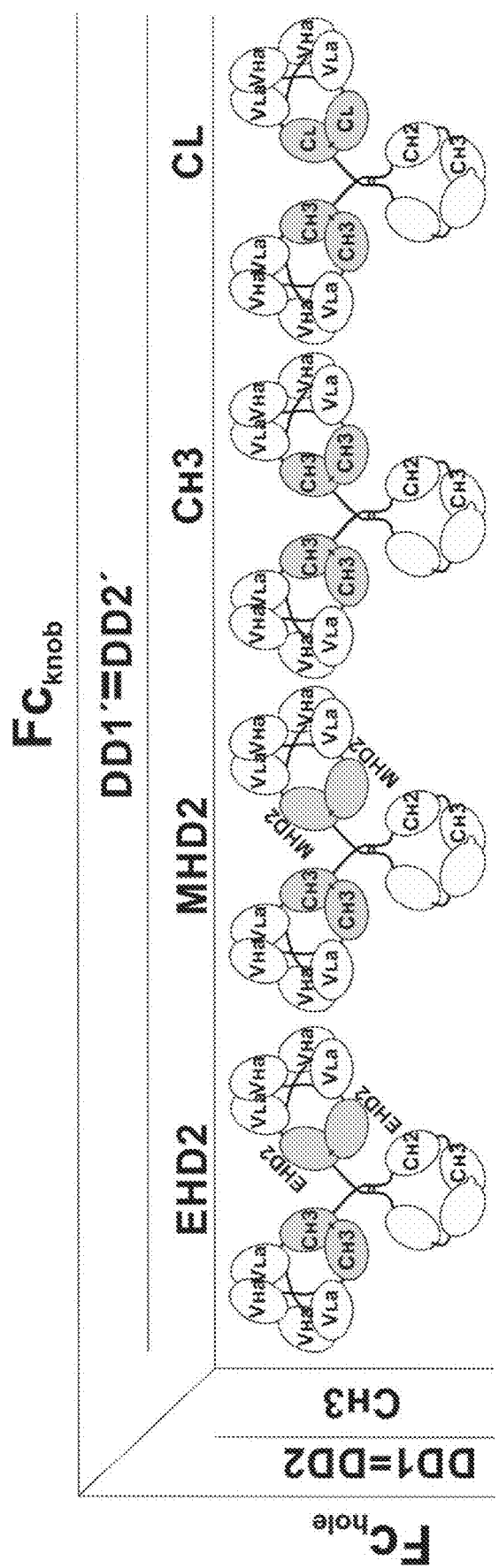
Figure 17G:
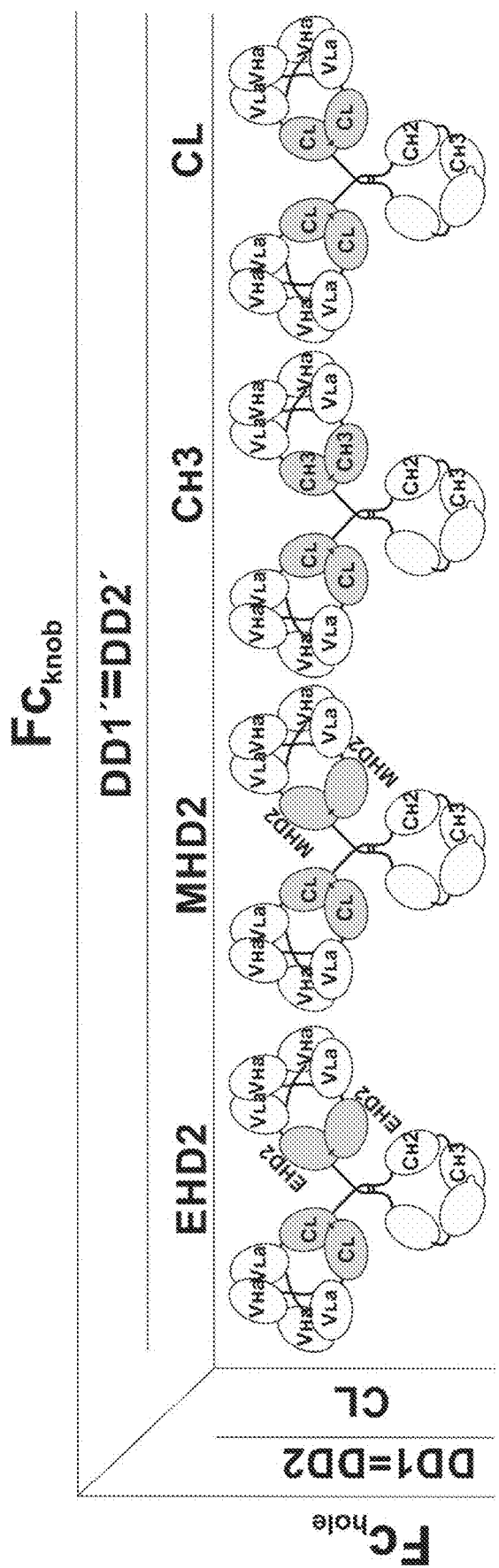
Figure 18A:
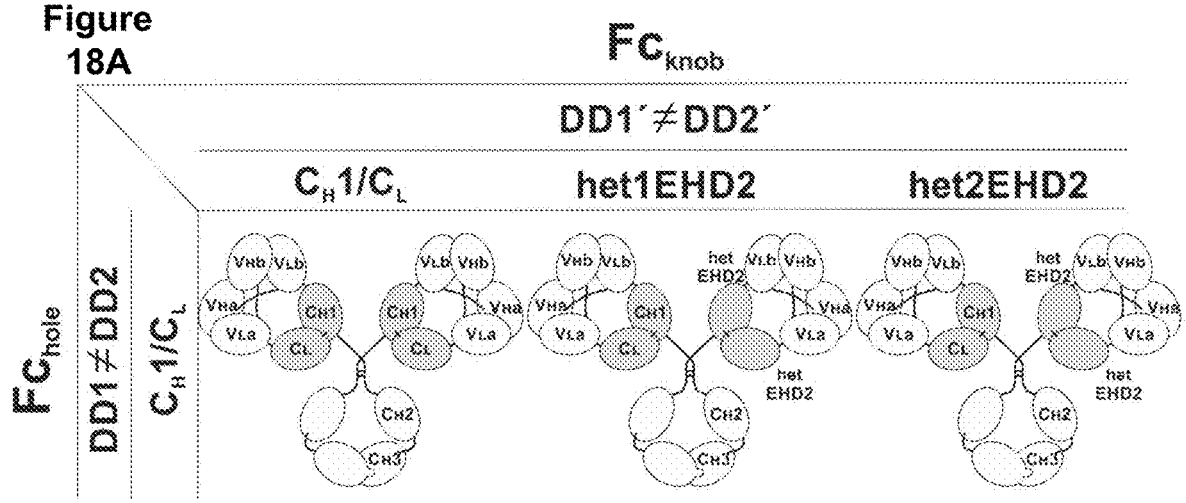
Figure 18B:
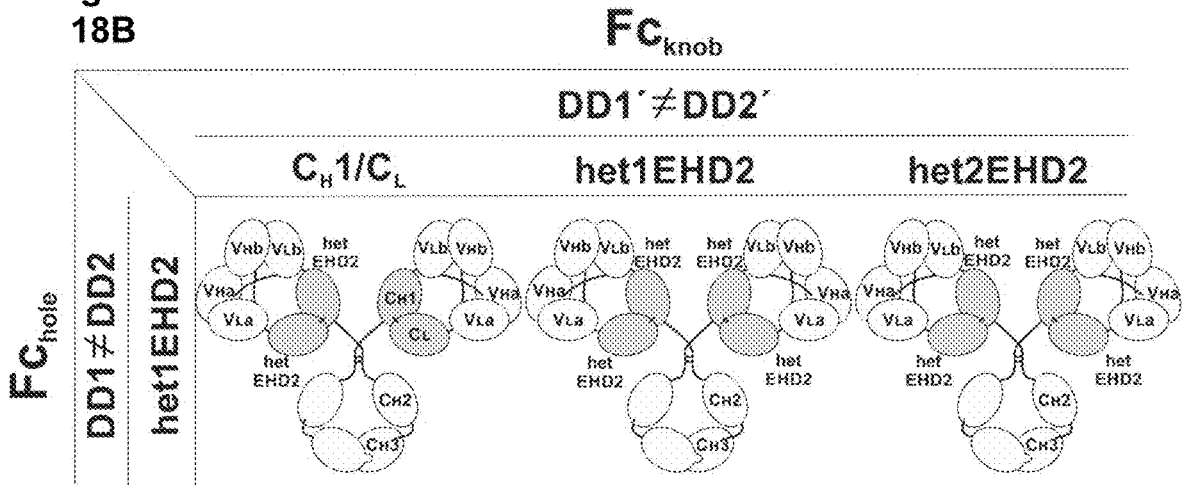
Figure 18C:
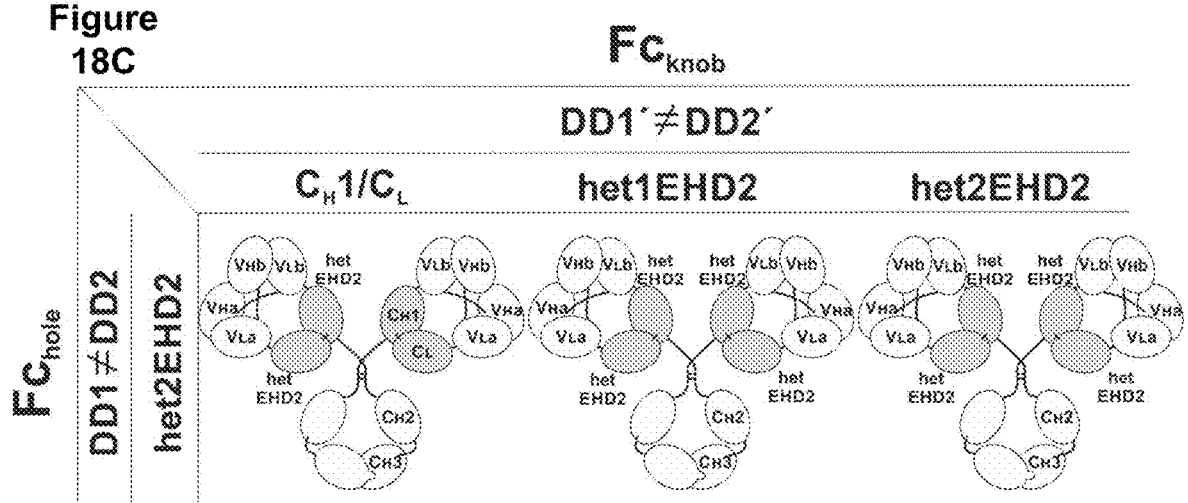
Figure 18D:
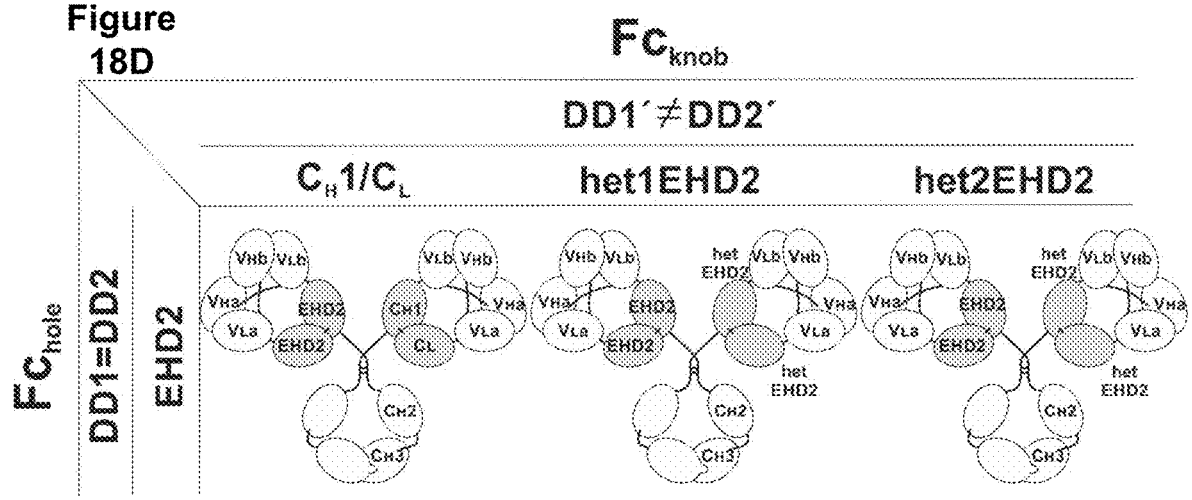
Figure 18E:
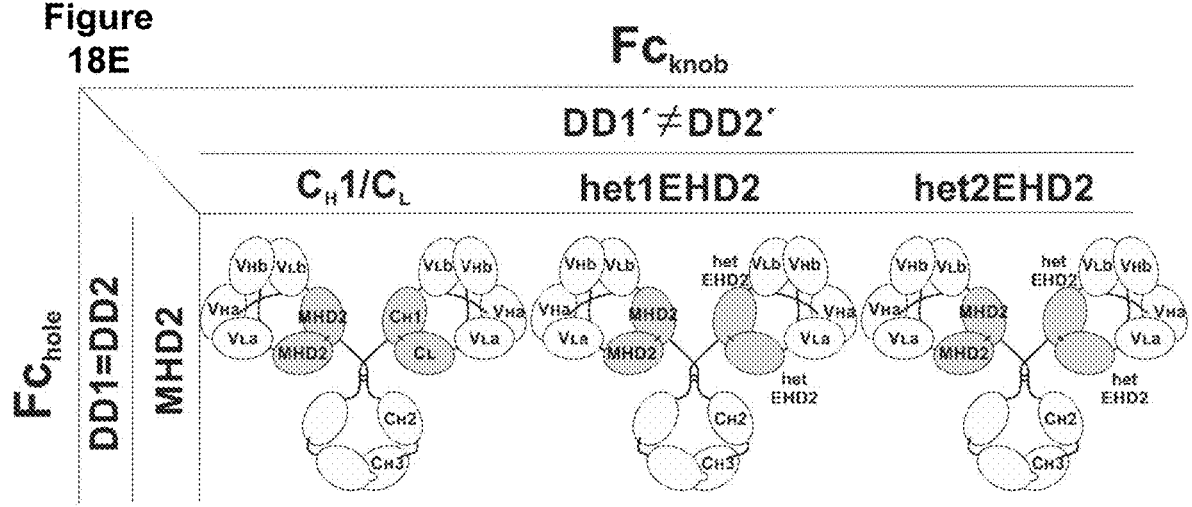
Figure 18F:
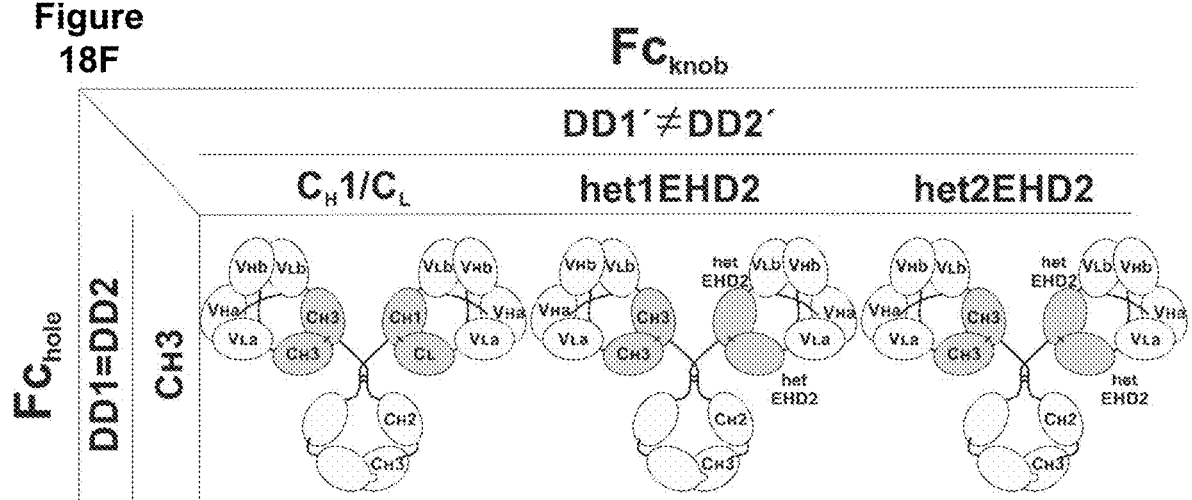
Figure 18G:
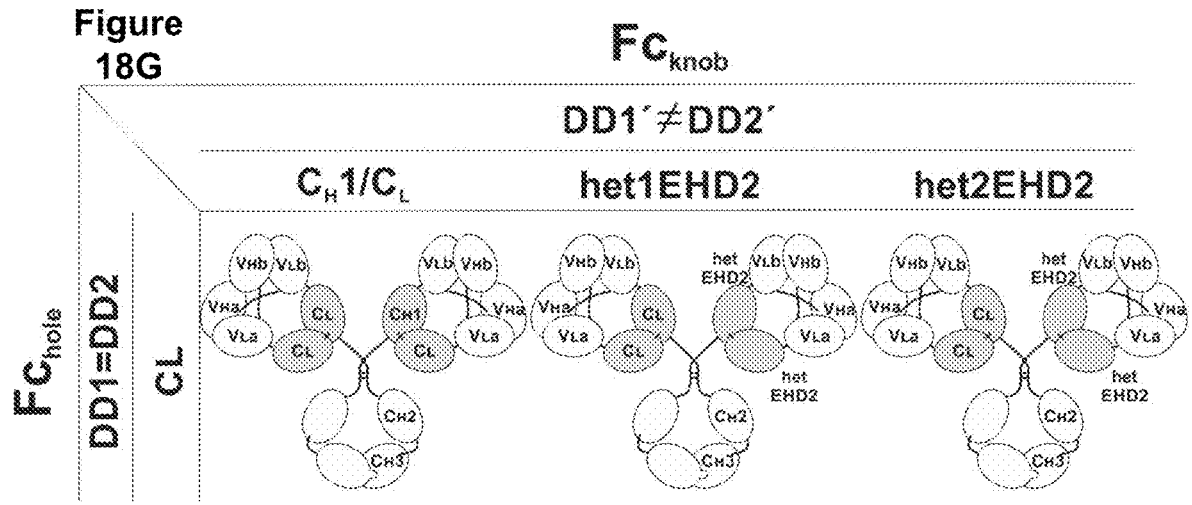
Figure 19A:
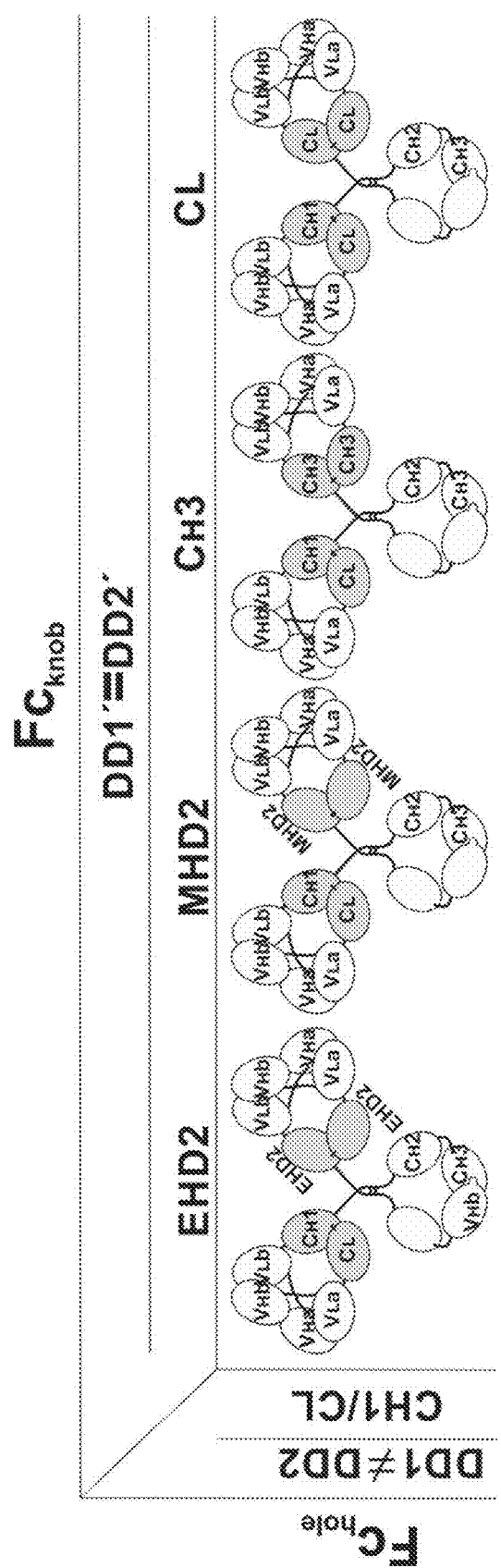
Figure 19B:
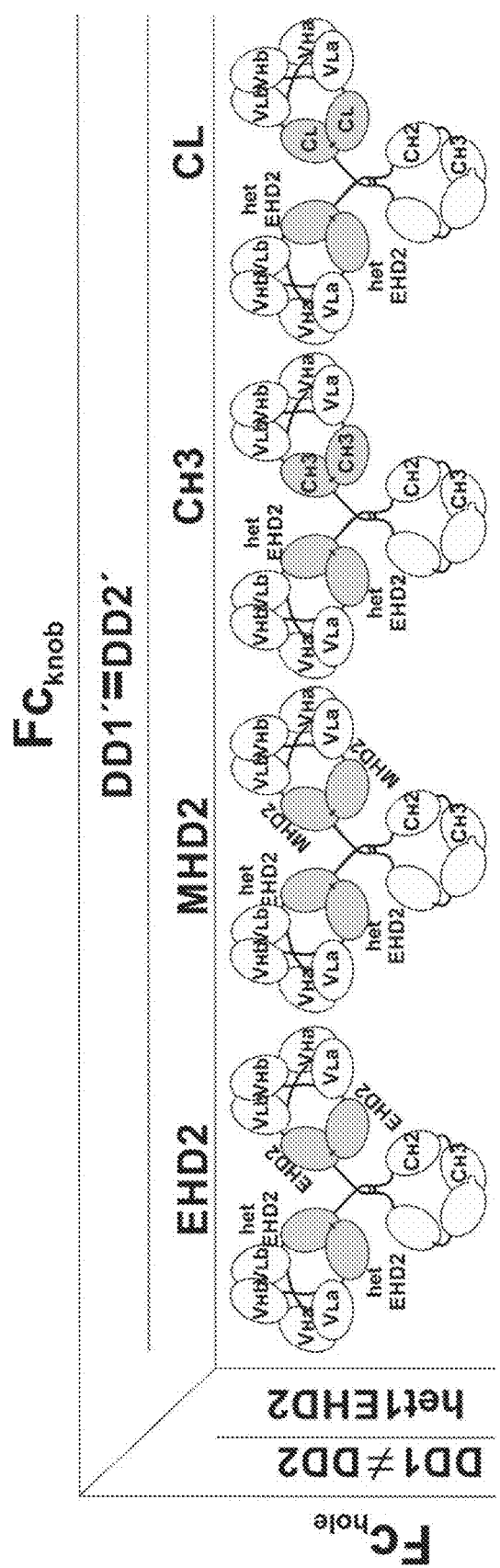
Figure 19C:
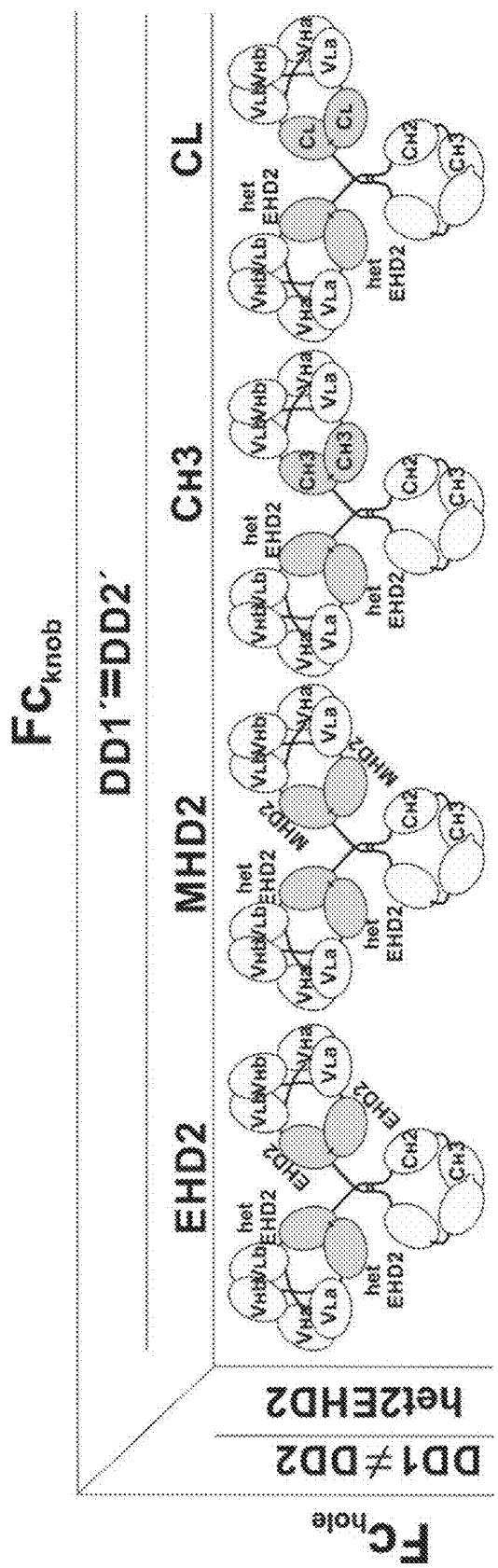
Figure 19D:
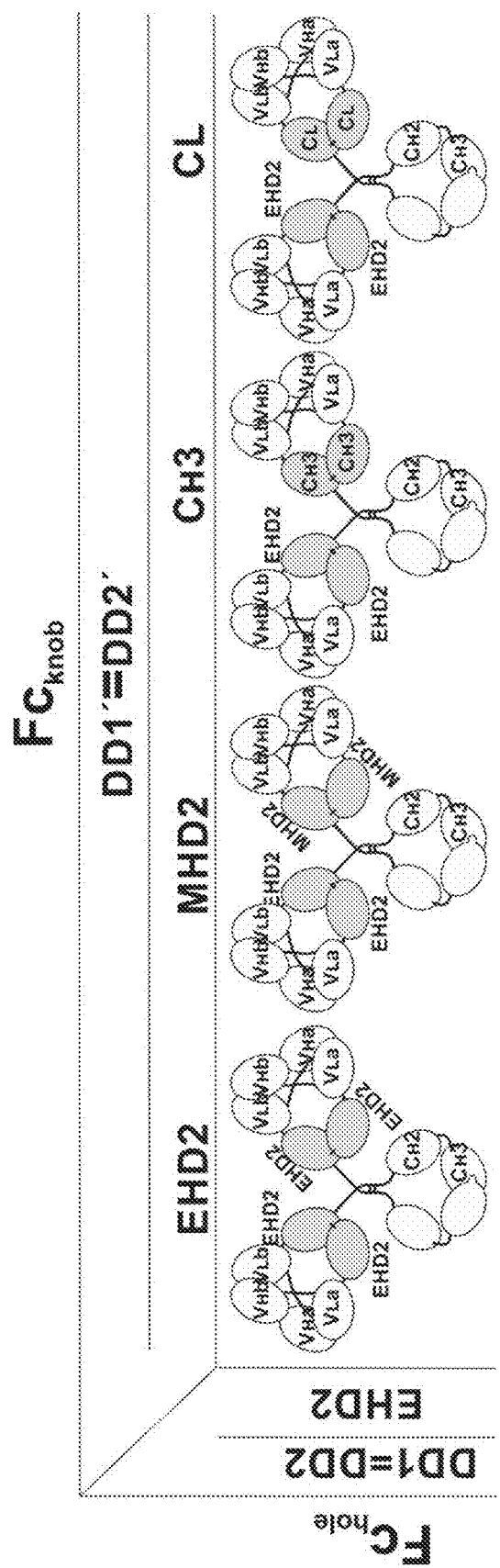
Figure 19E:
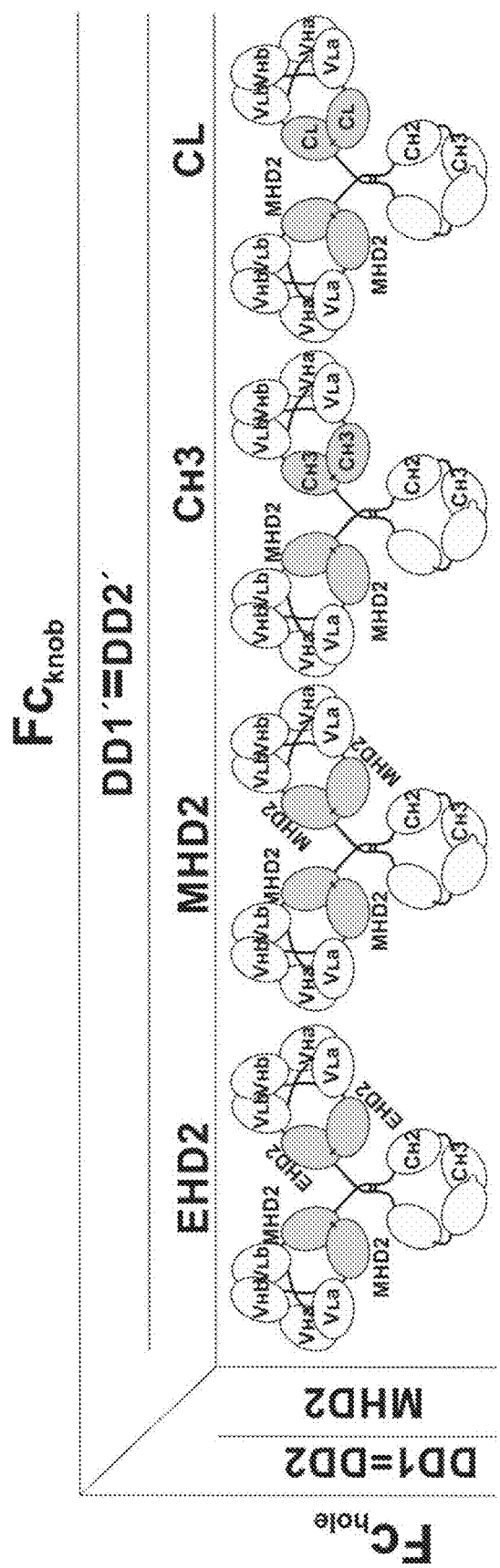
Figure 19F:
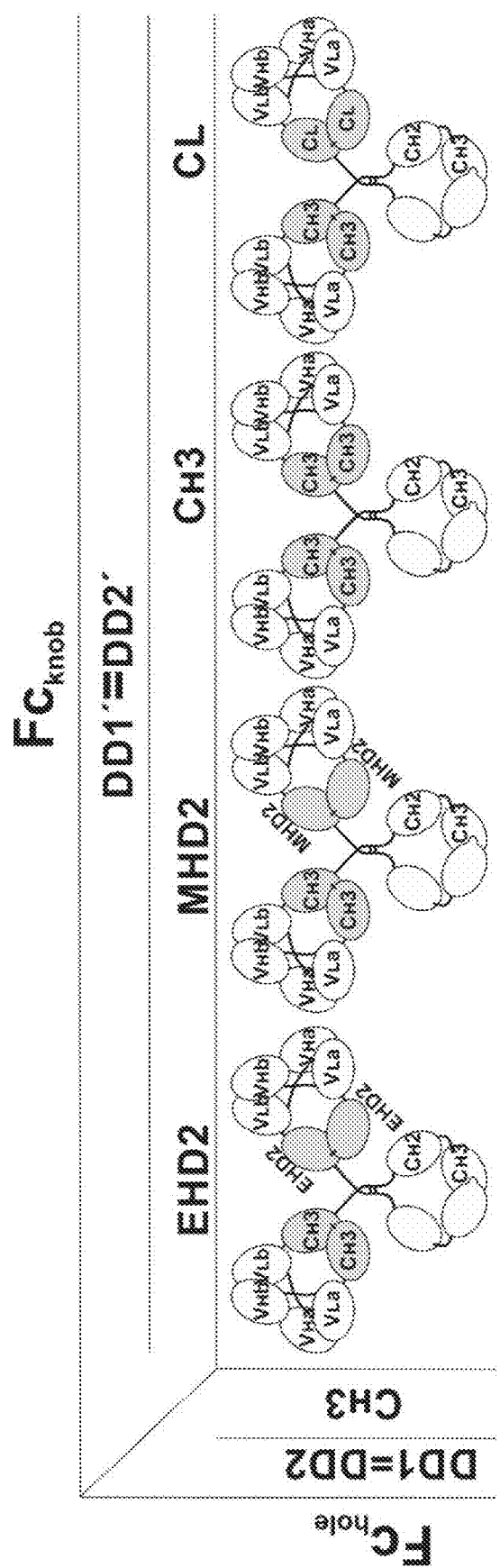
Figure 19G:
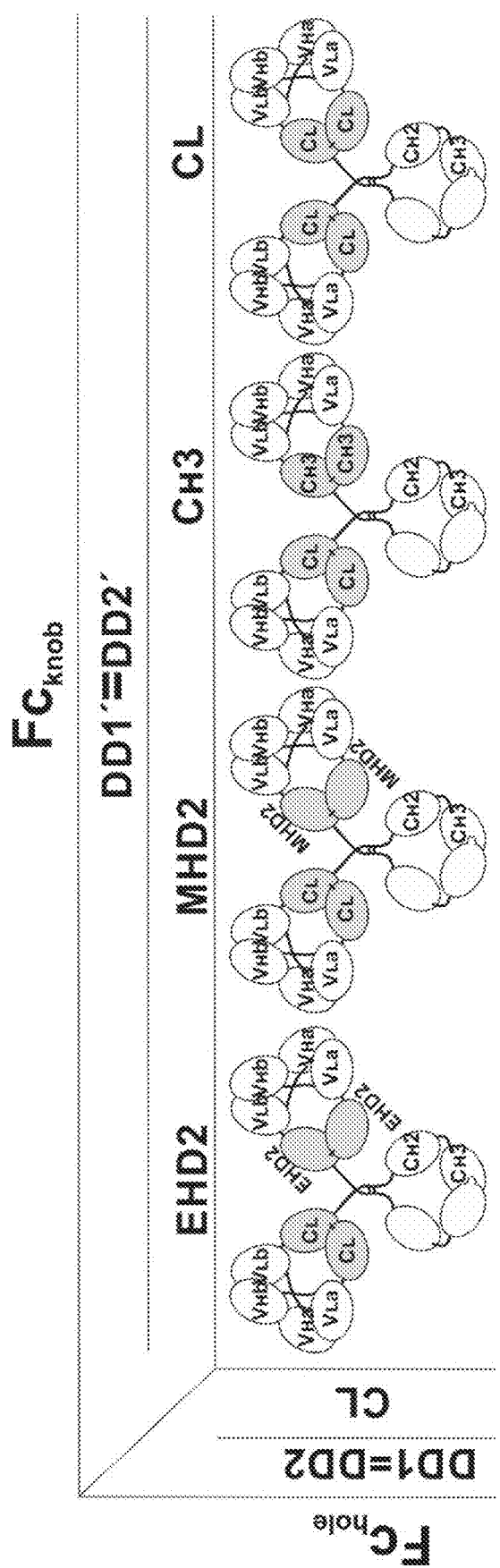
Figure 20A:
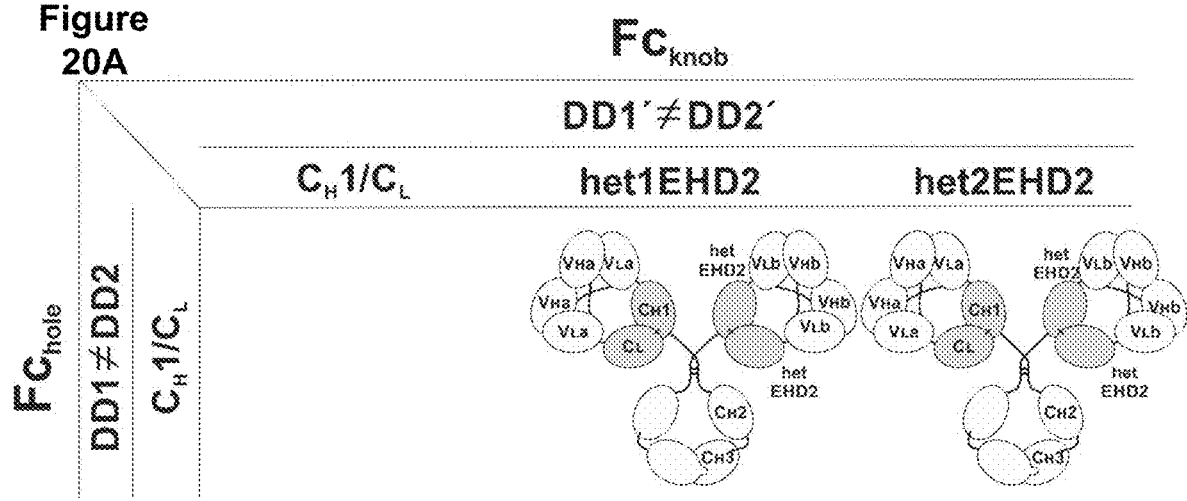
Figure 20B:
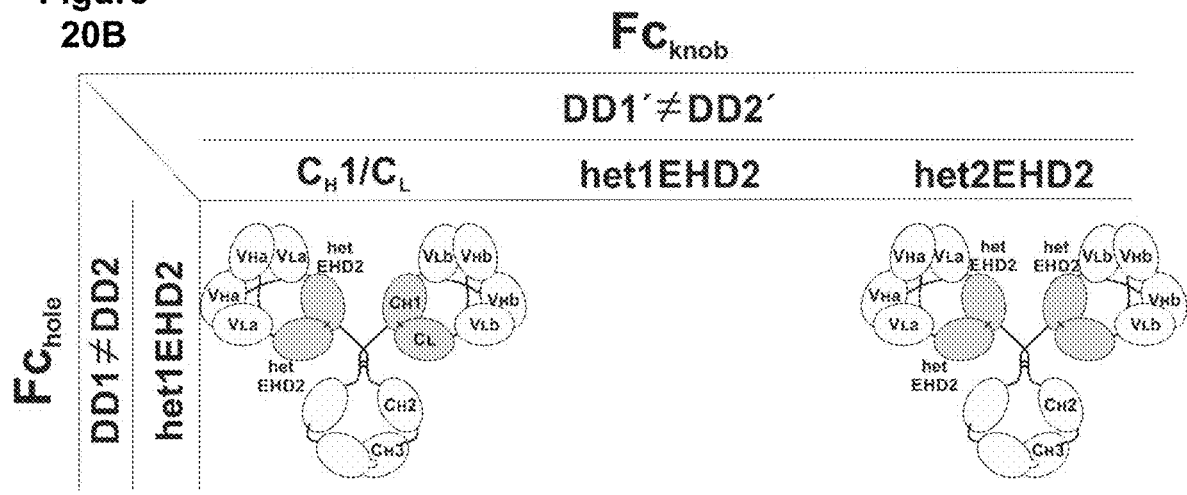
Figure 20C:
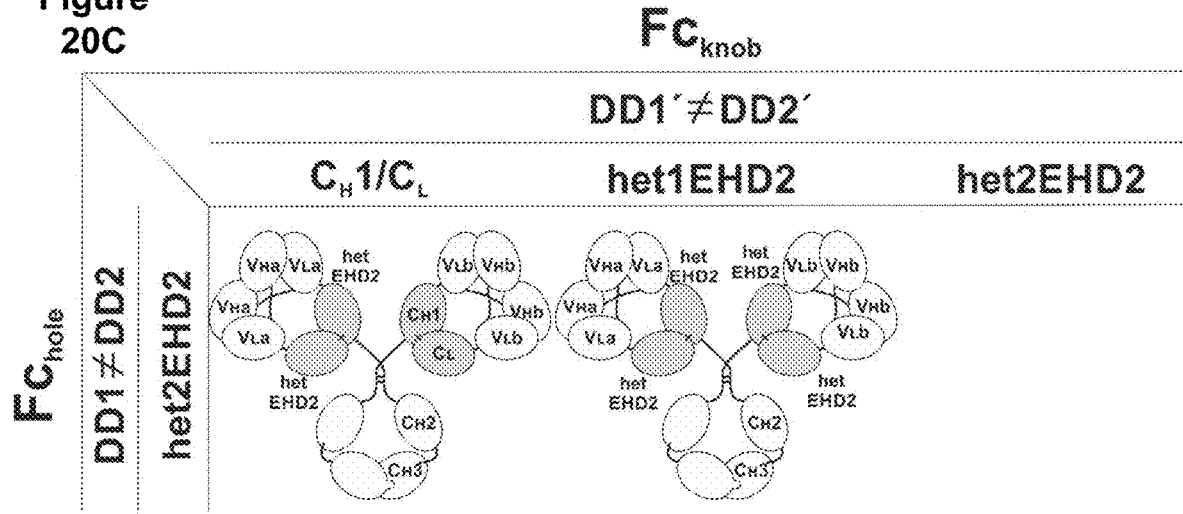
Figure 20D:
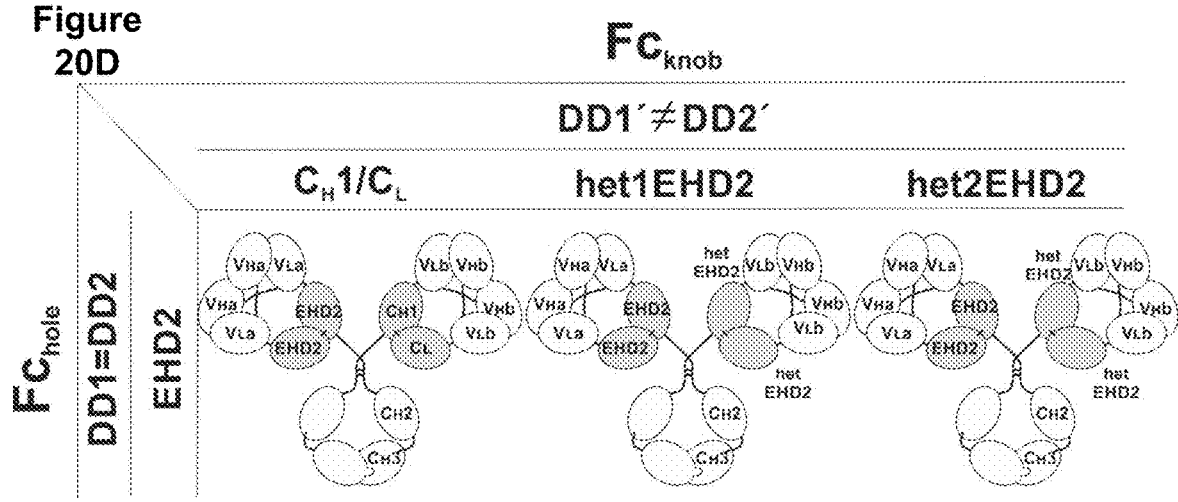
Figure 20E:
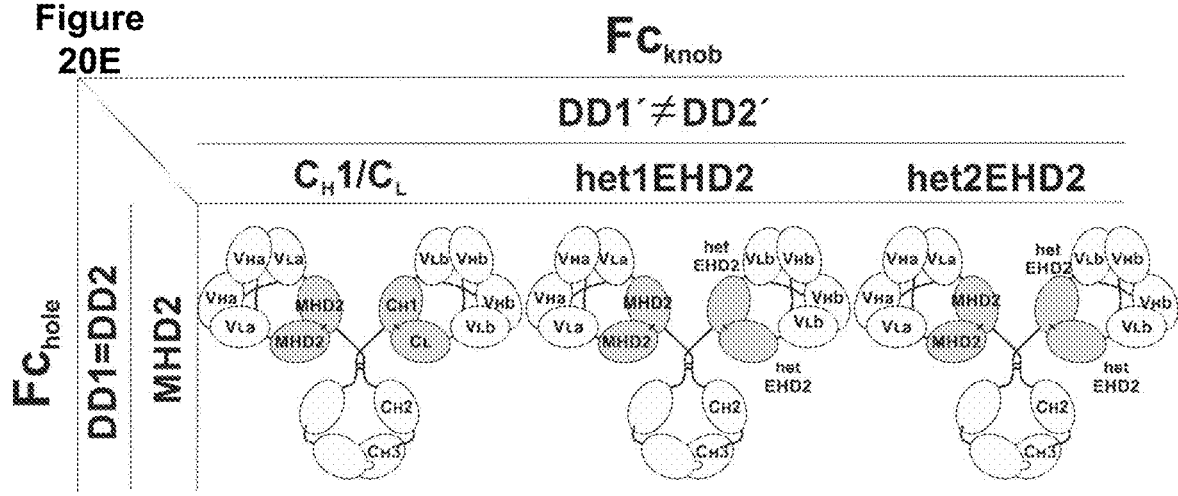
Figure 20F:
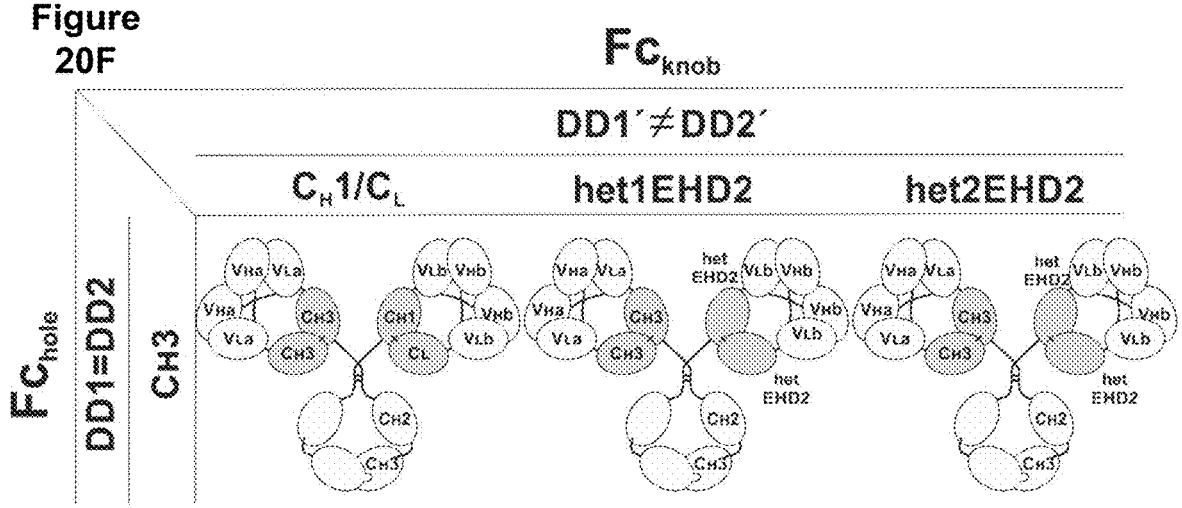
Figure 20G:
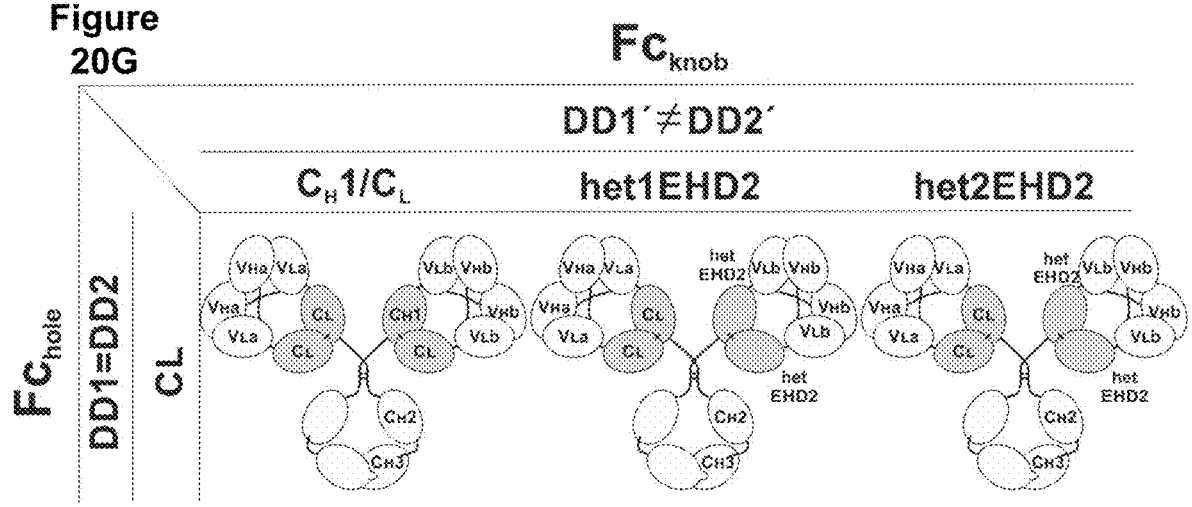
Figure 21A:
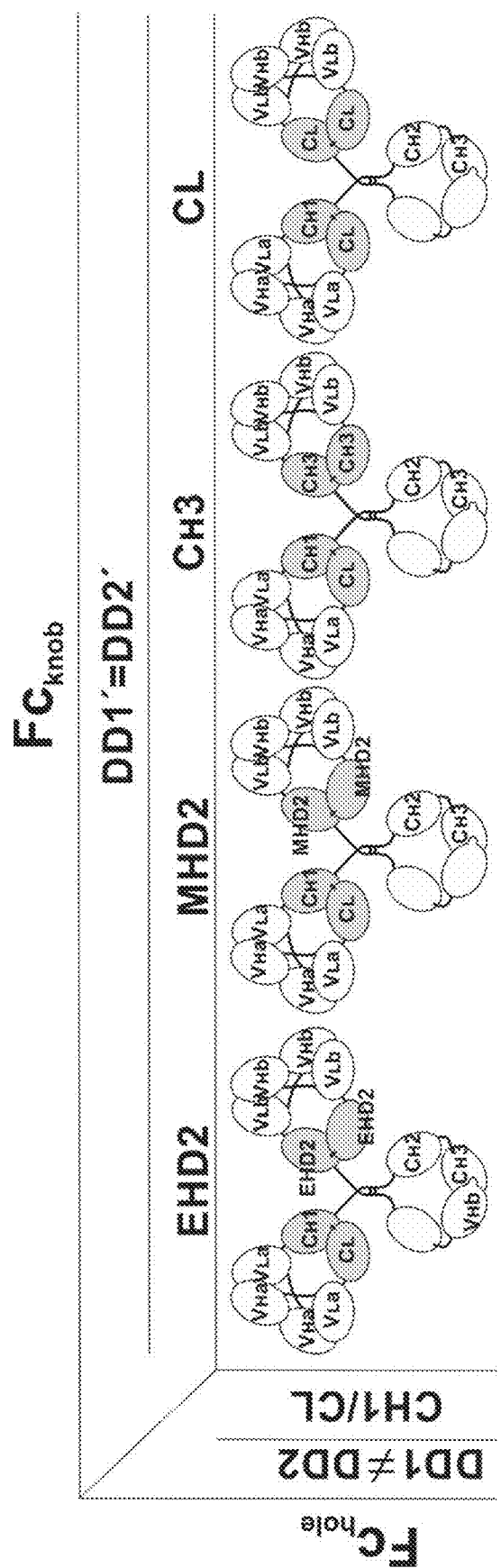
Figure 21B:
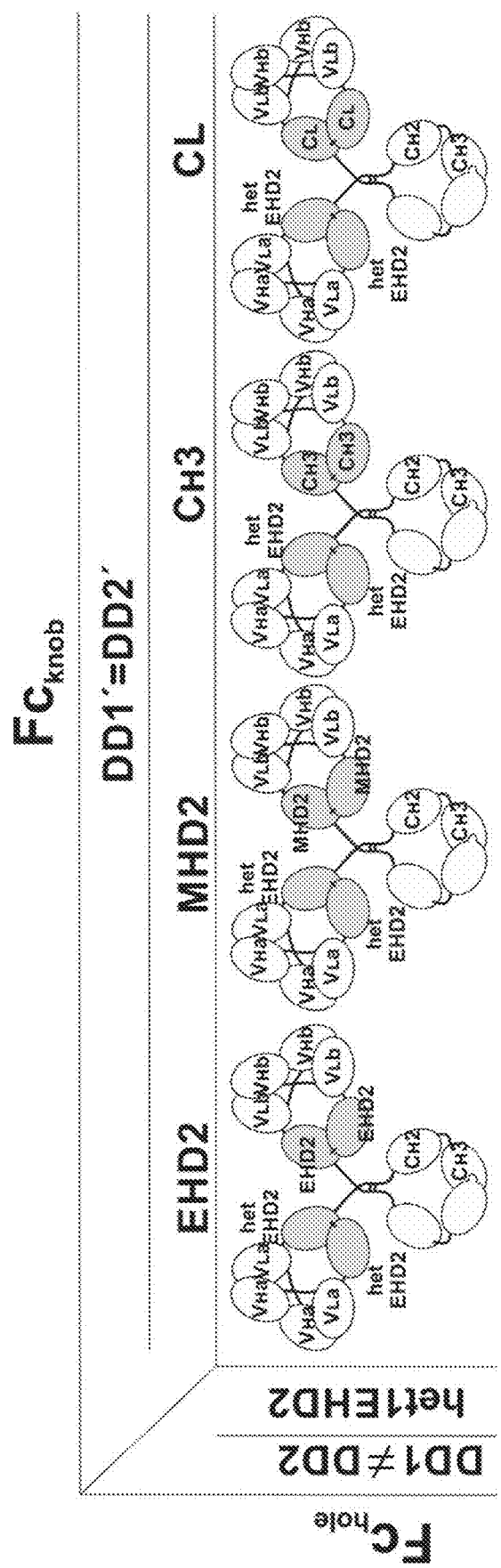
Figure 21C:
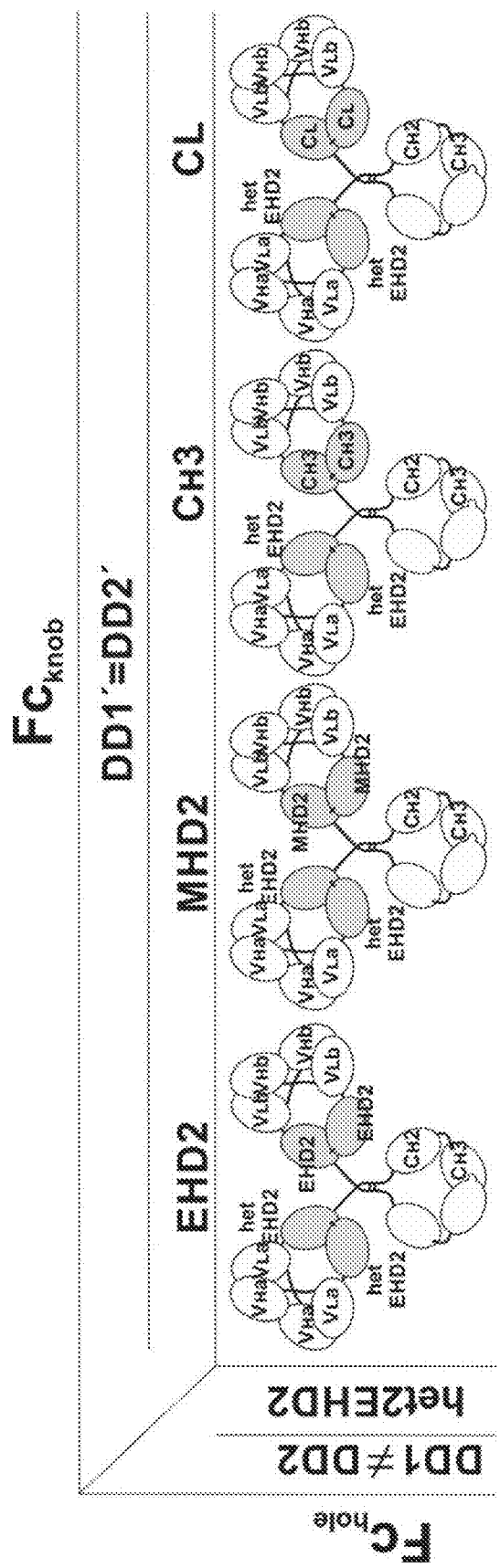
Figure 21D:
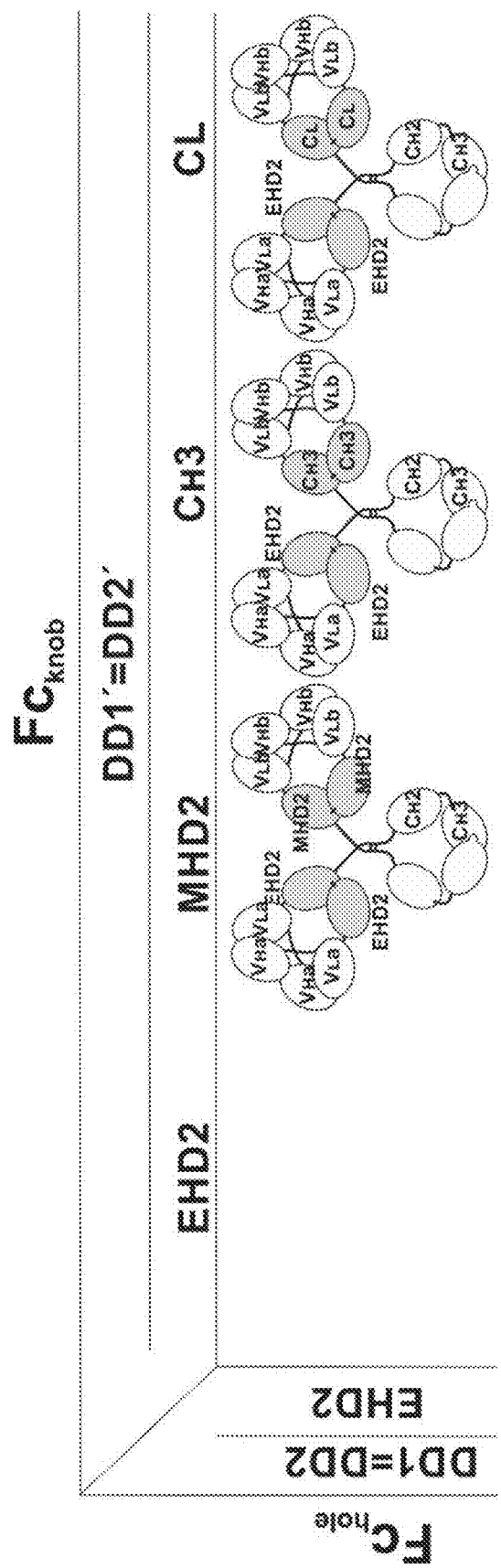
Figure 21E:
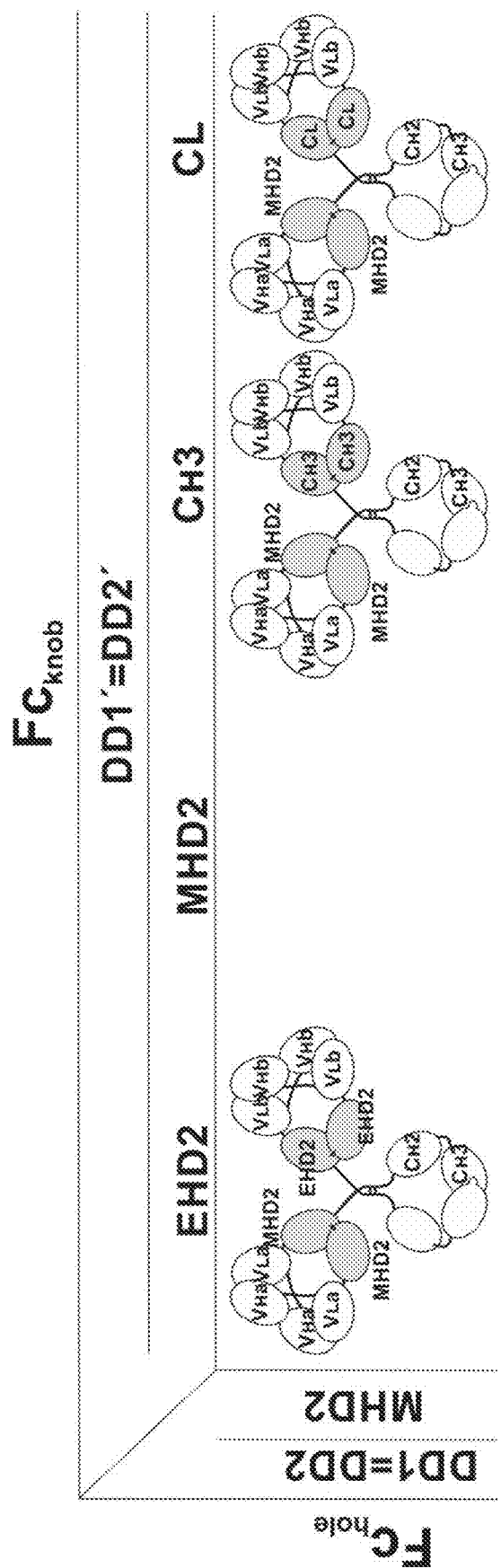
Figure 21F:
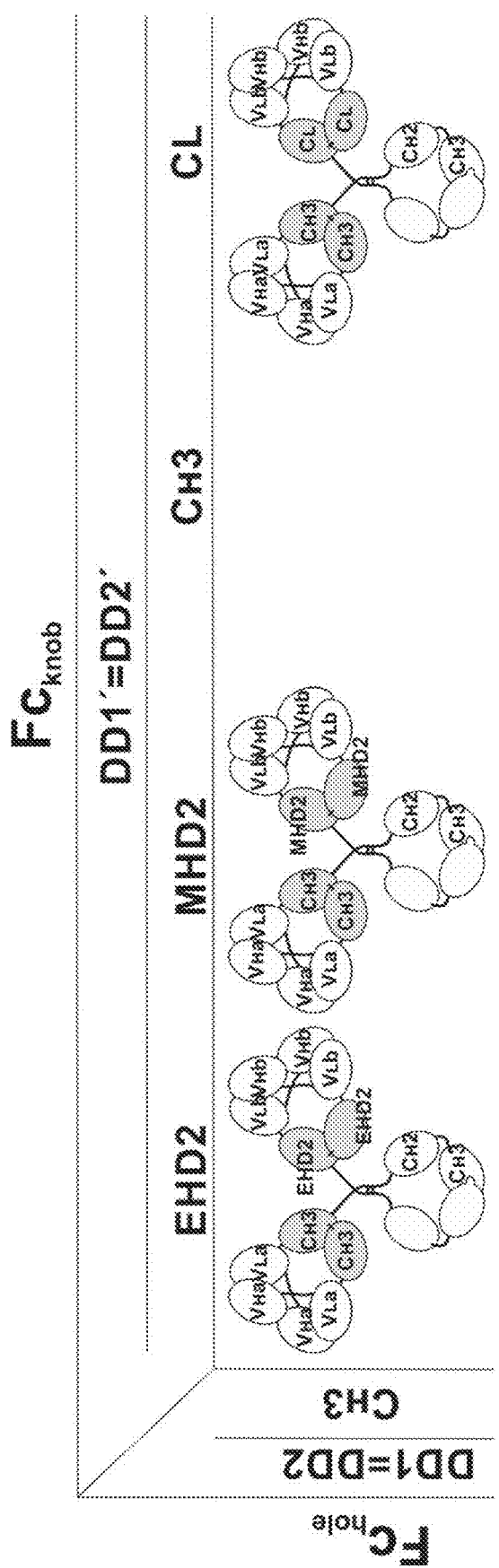
Figure 21G:
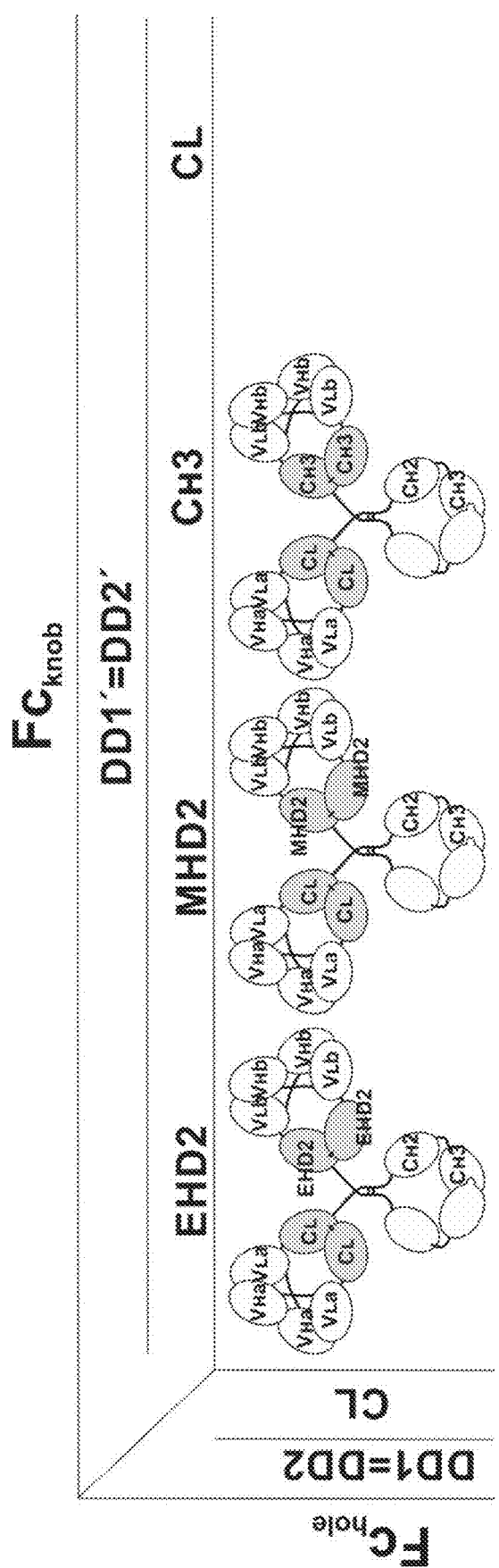
Figure 22A:
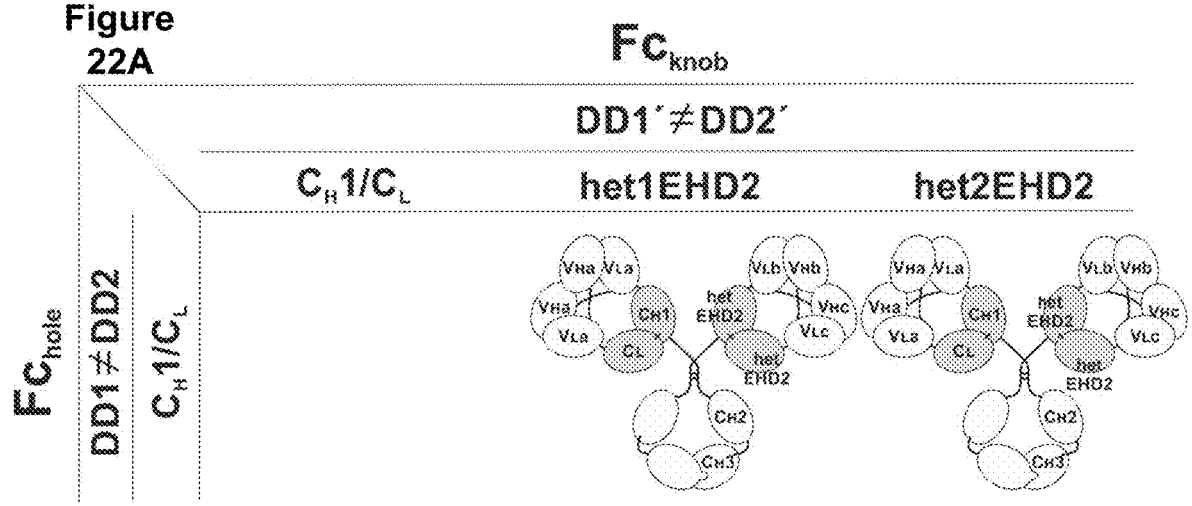
Figure 22B:
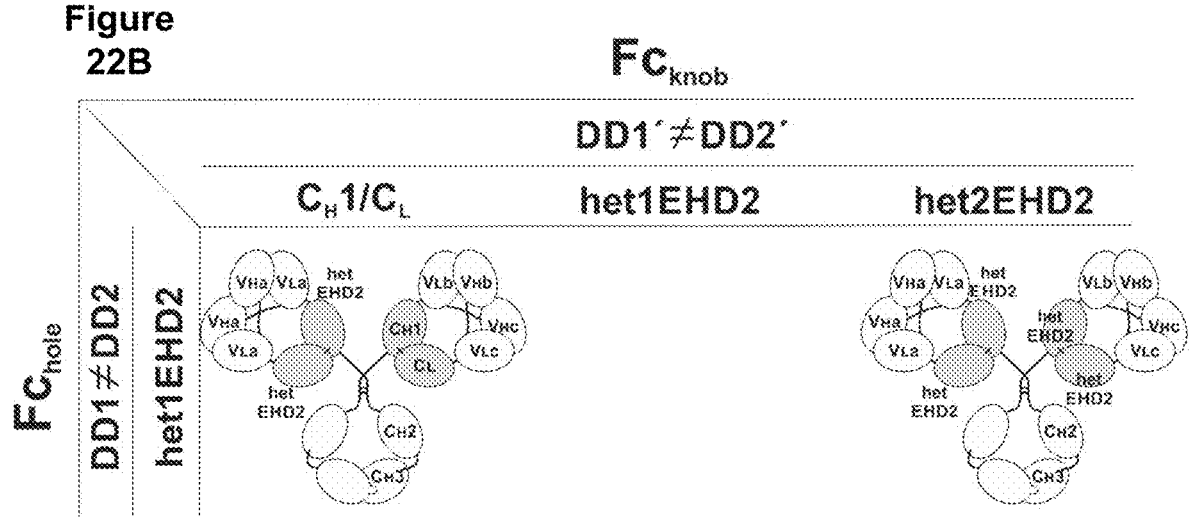
Figure 22C:
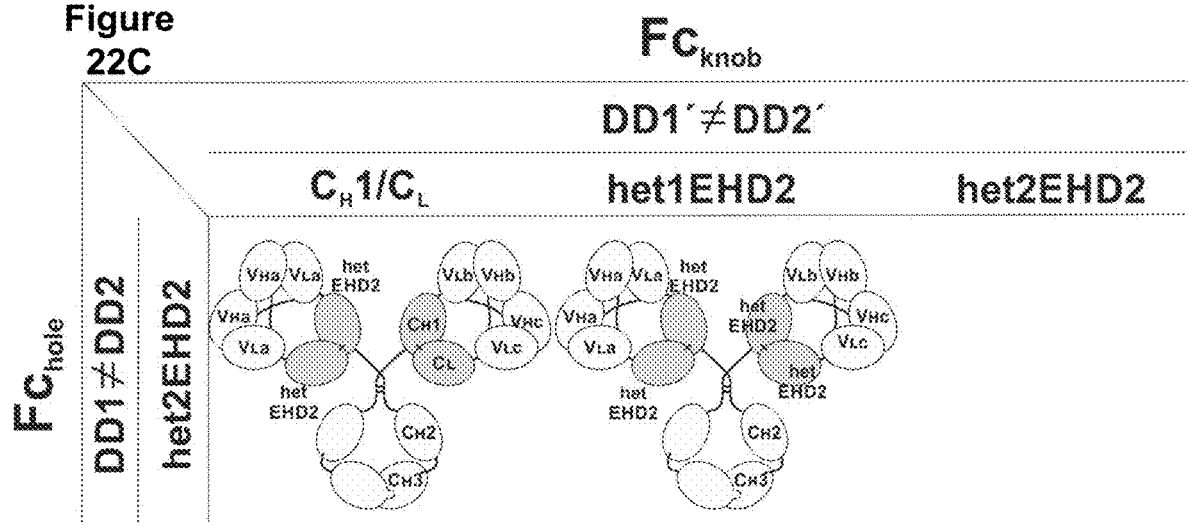
Figure 22D:
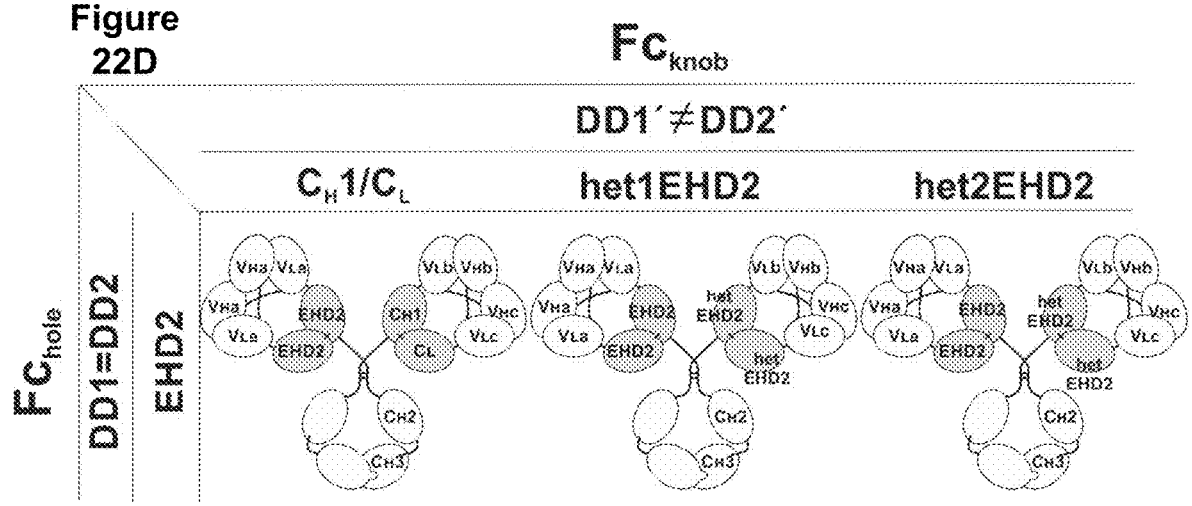
Figure 22E:
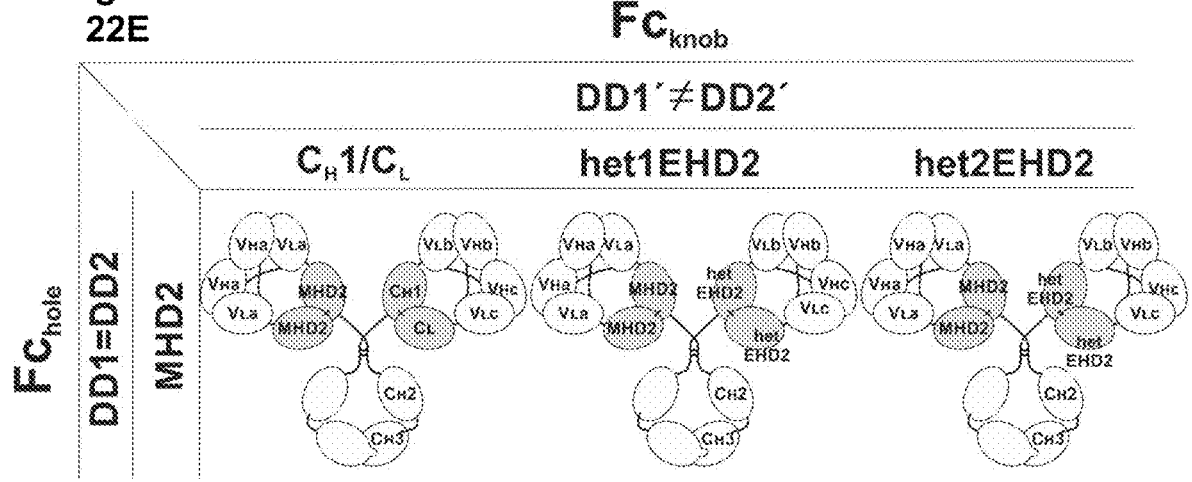
Figure 22F:
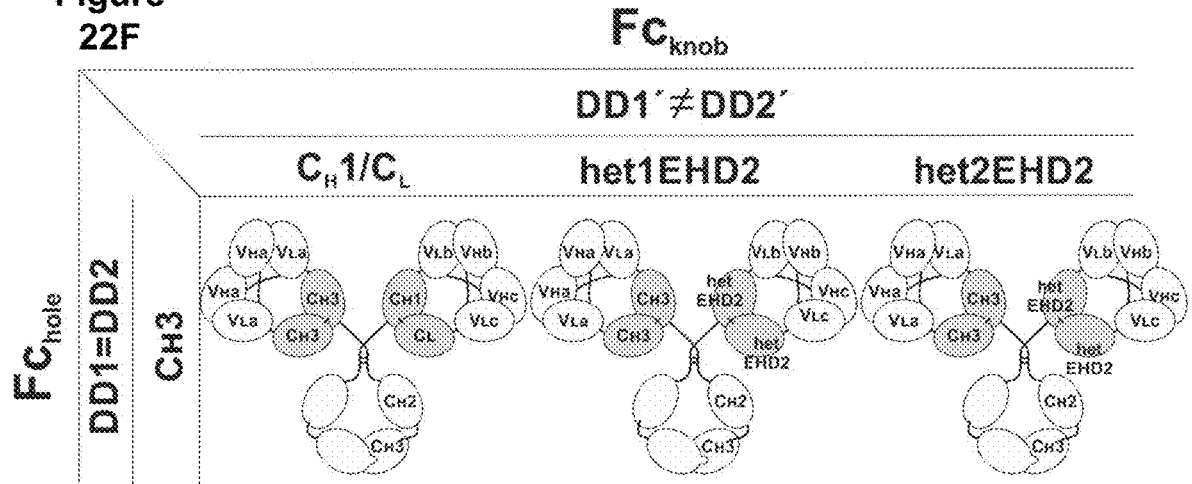
Figure 22G:
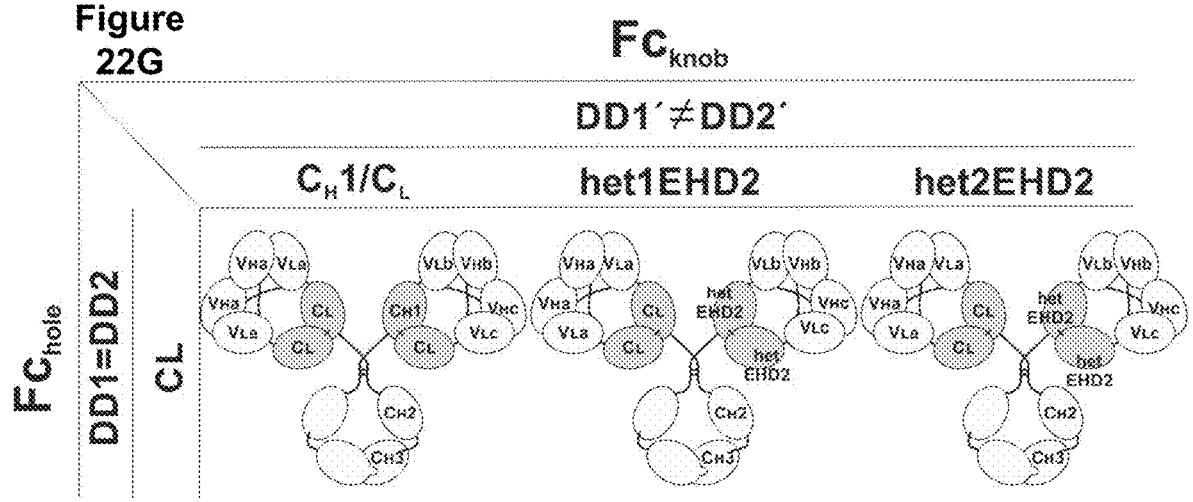
Figure 23A:
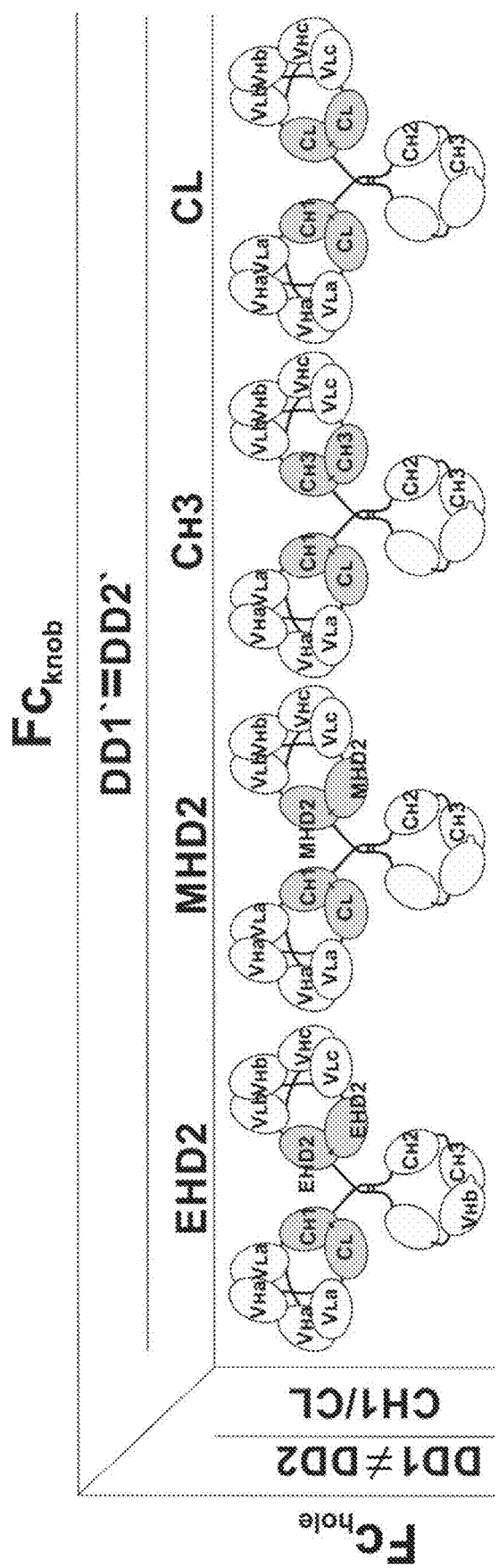
Figure 23B:
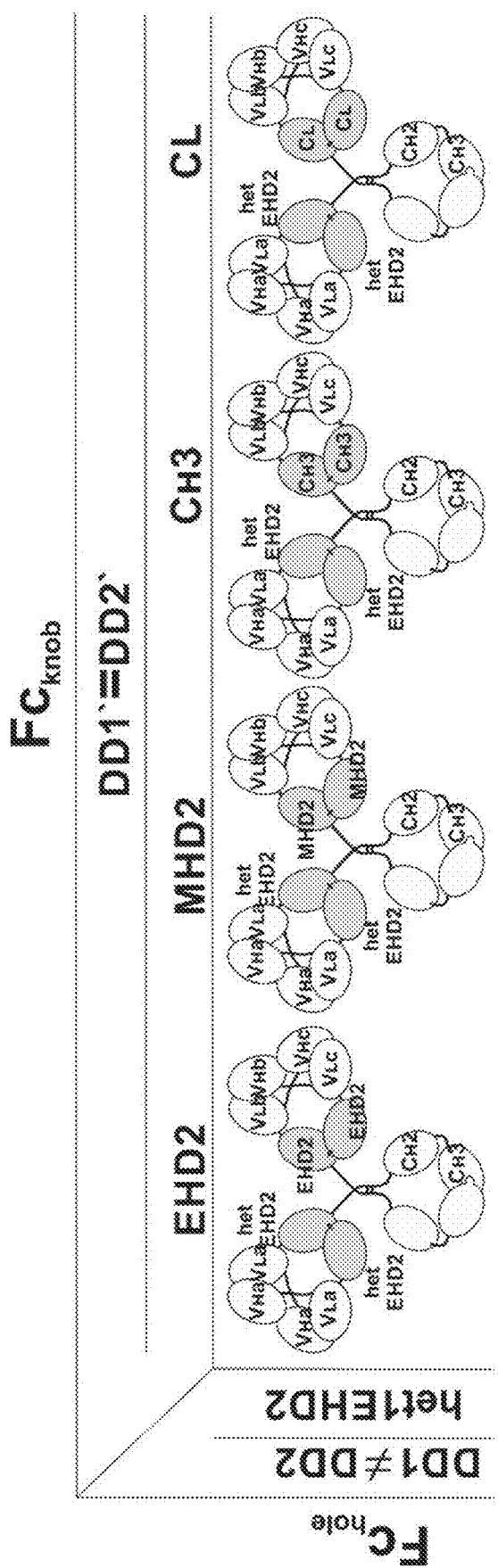
Figure 23C:
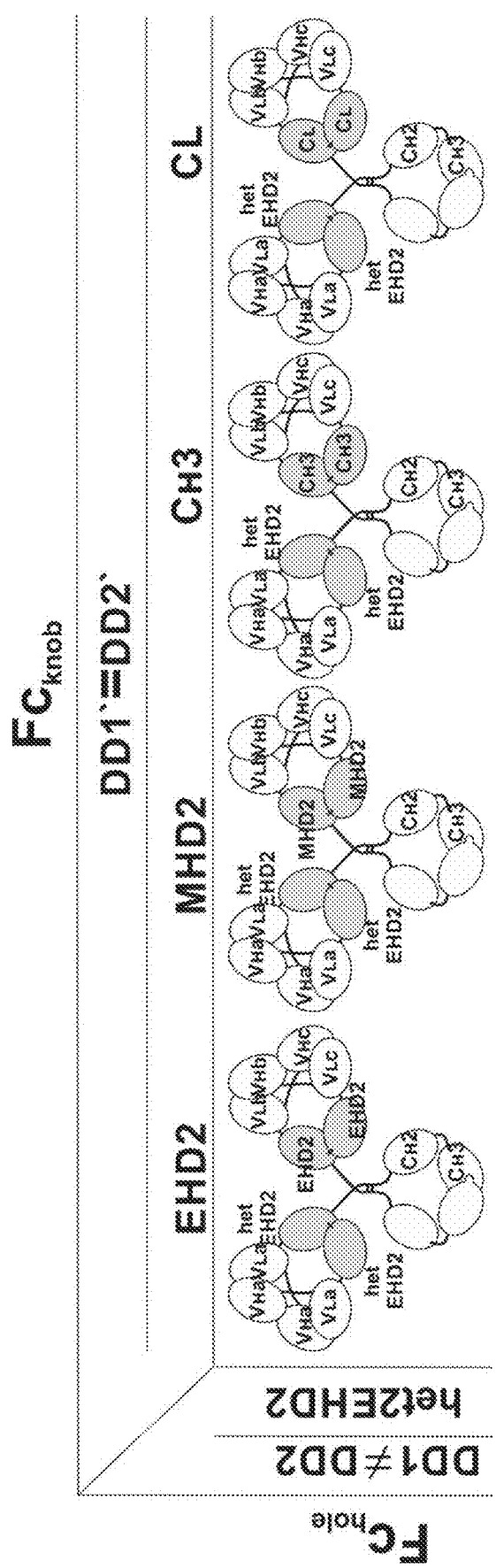
Figure 23D:
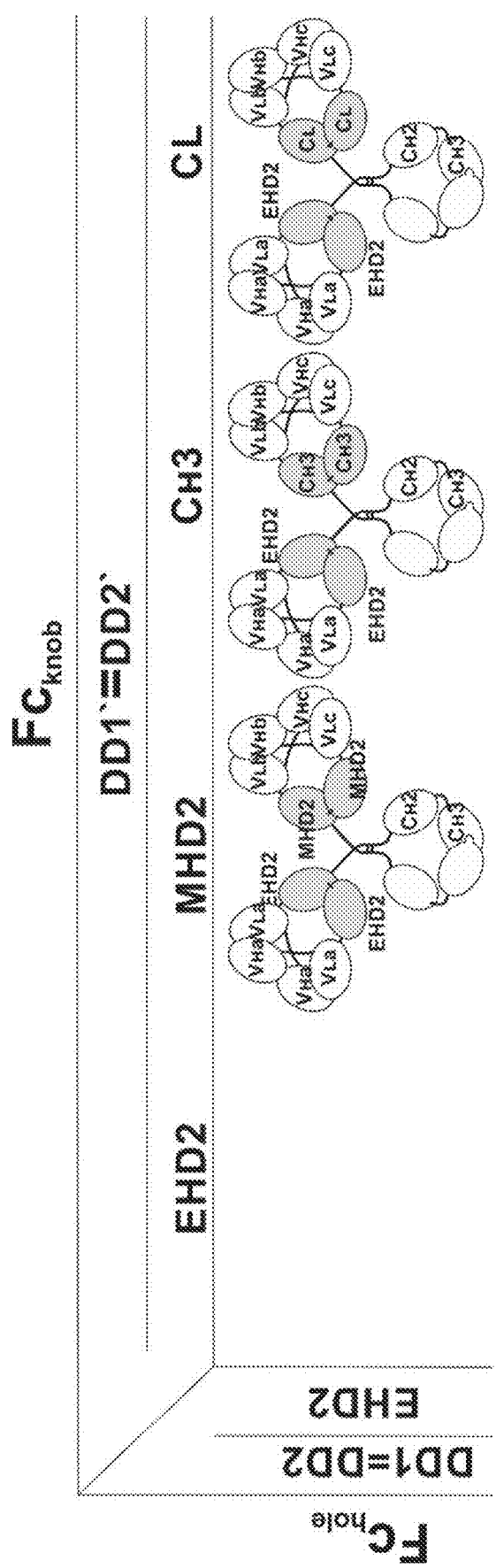
Figure 23E:
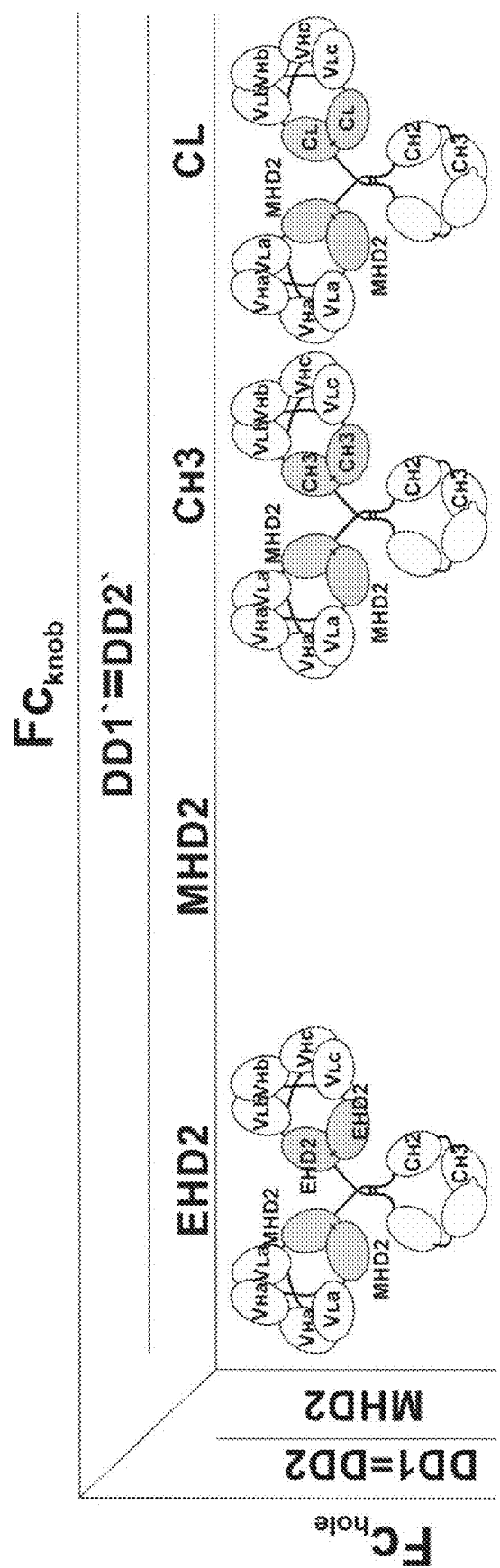
Figure 23F:
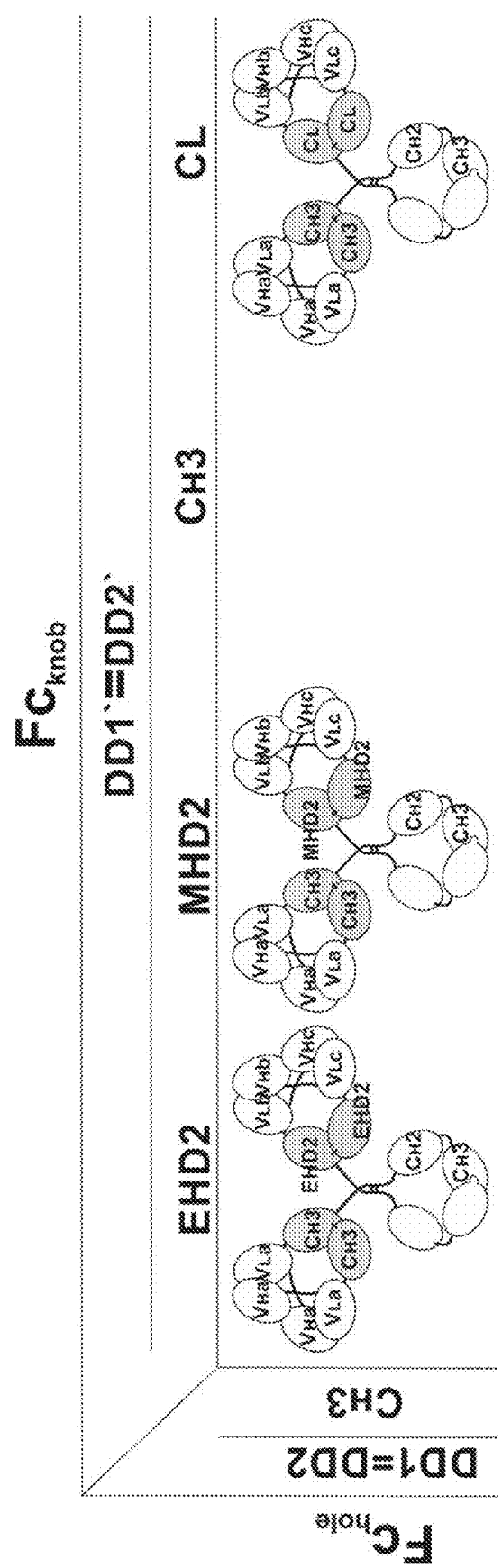
Figure 23G:
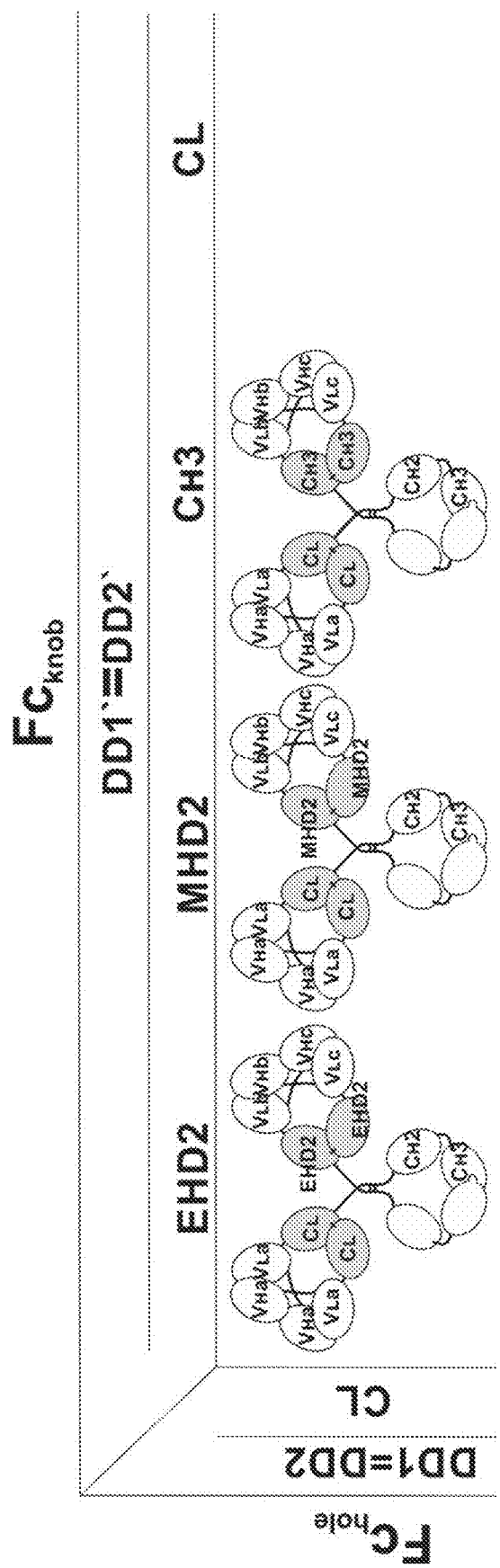
Figure 24A:
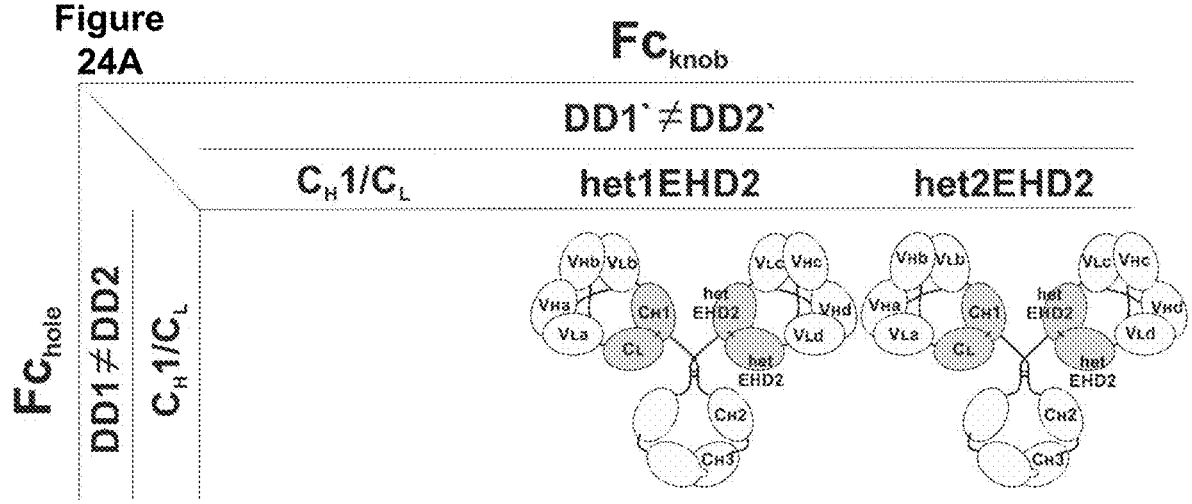
Figure 24B:
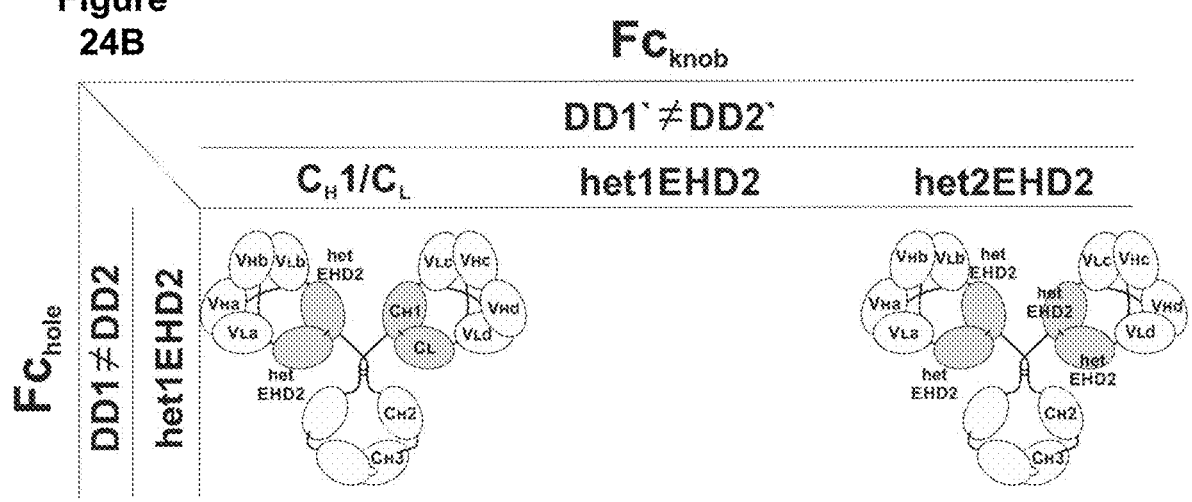
Figure 24C:
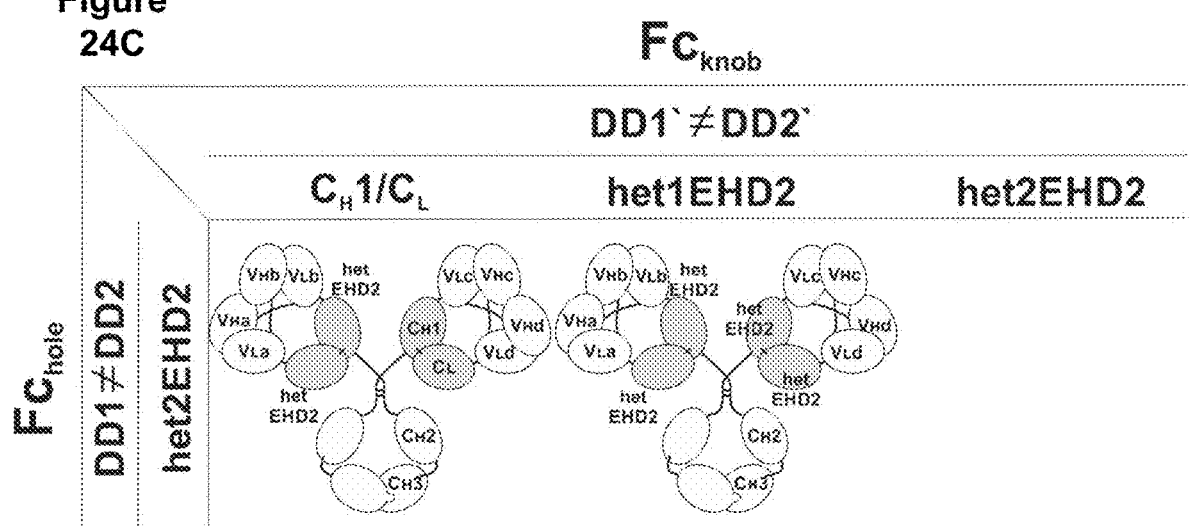
Figure 24D:
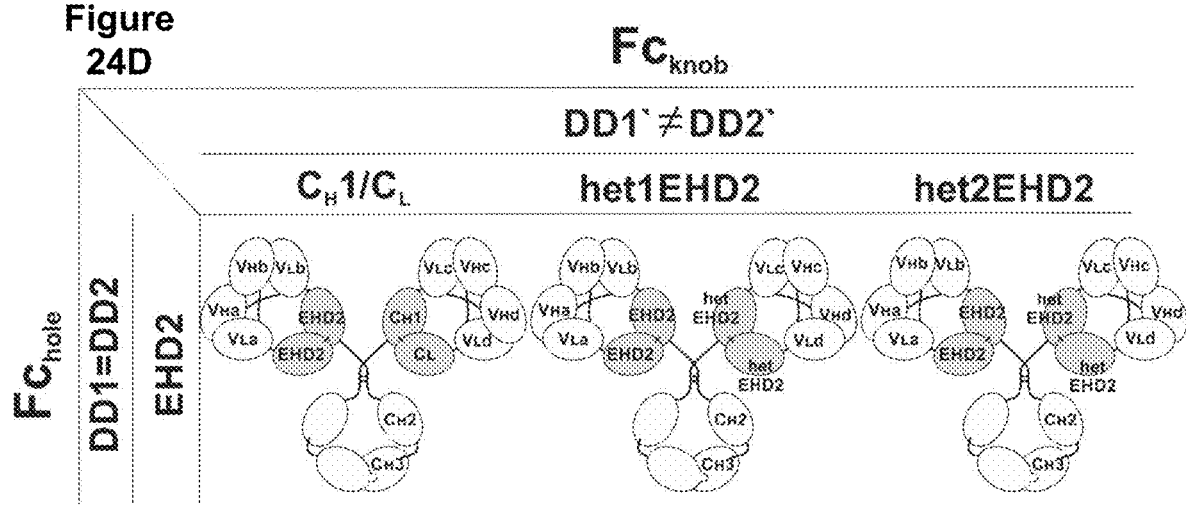
Figure 24E:
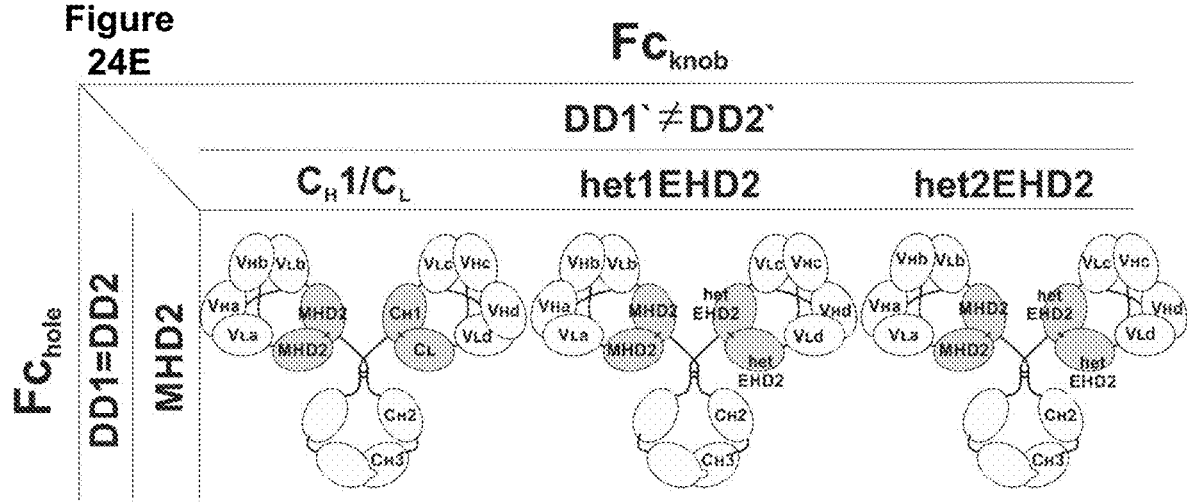
Figure 24F:
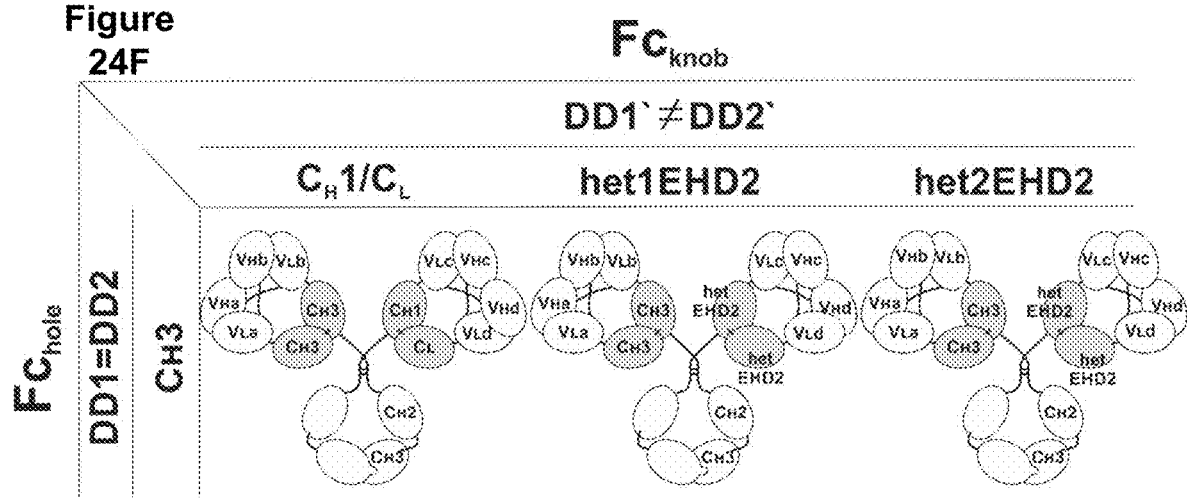
Figure 24G:
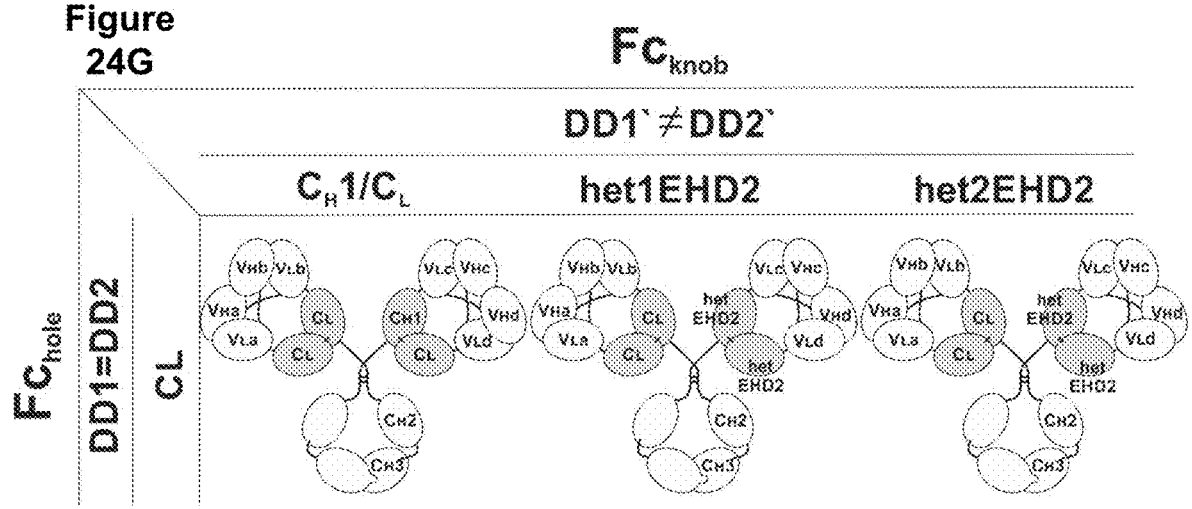
Figure 25A:
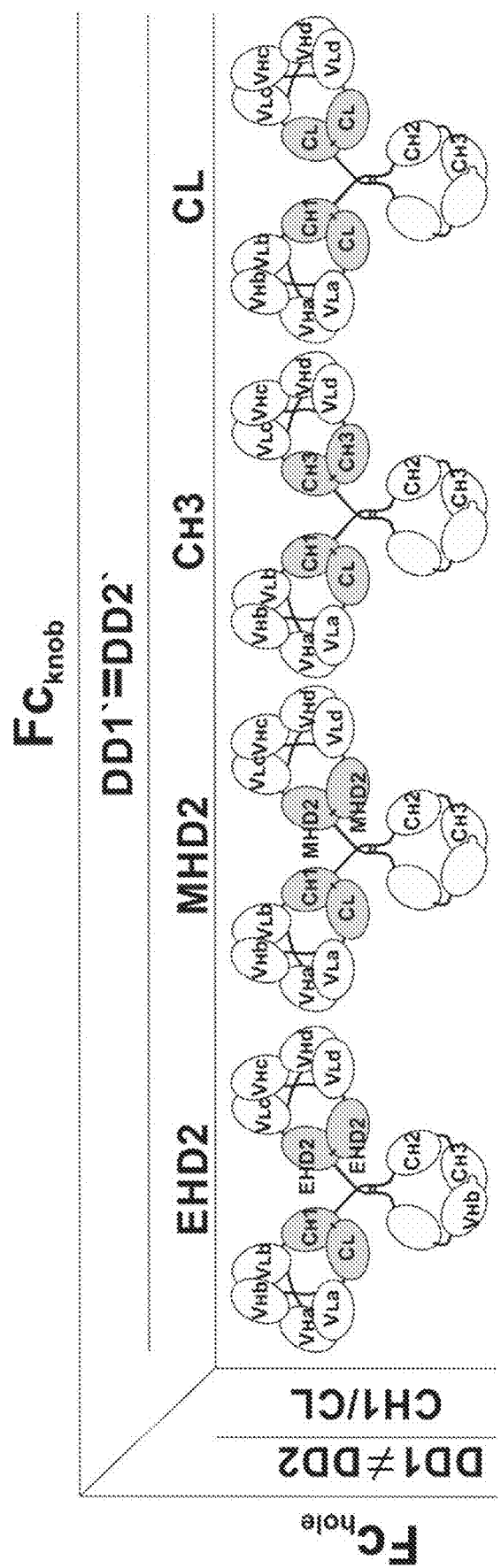
Figure 25B:
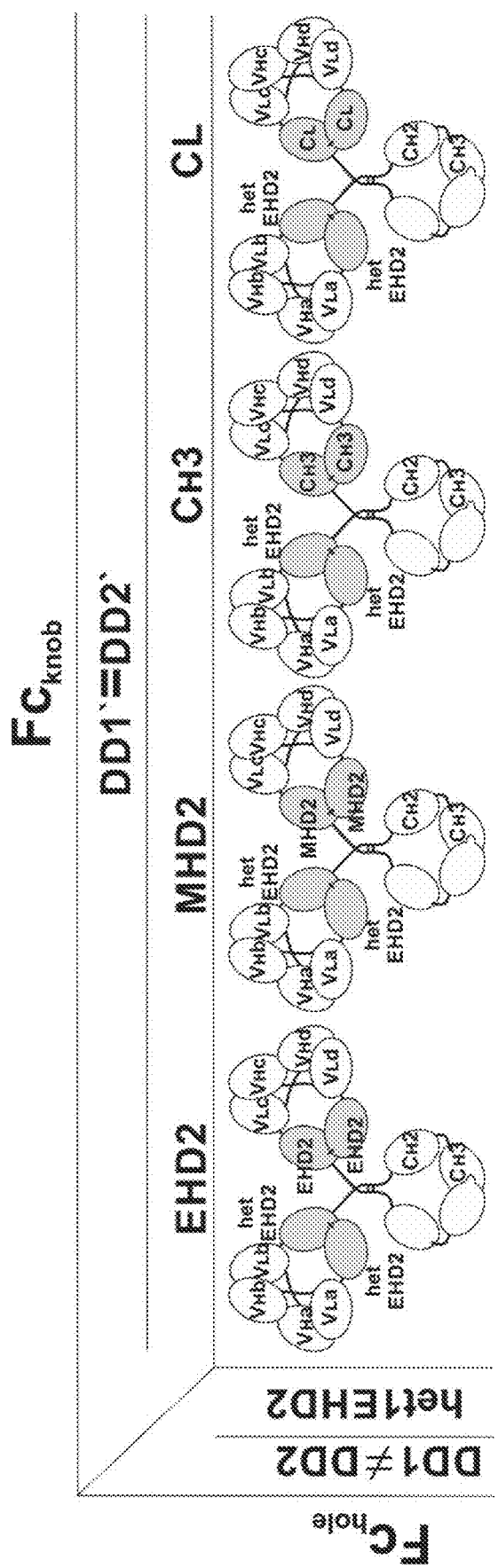
Figure 25C:
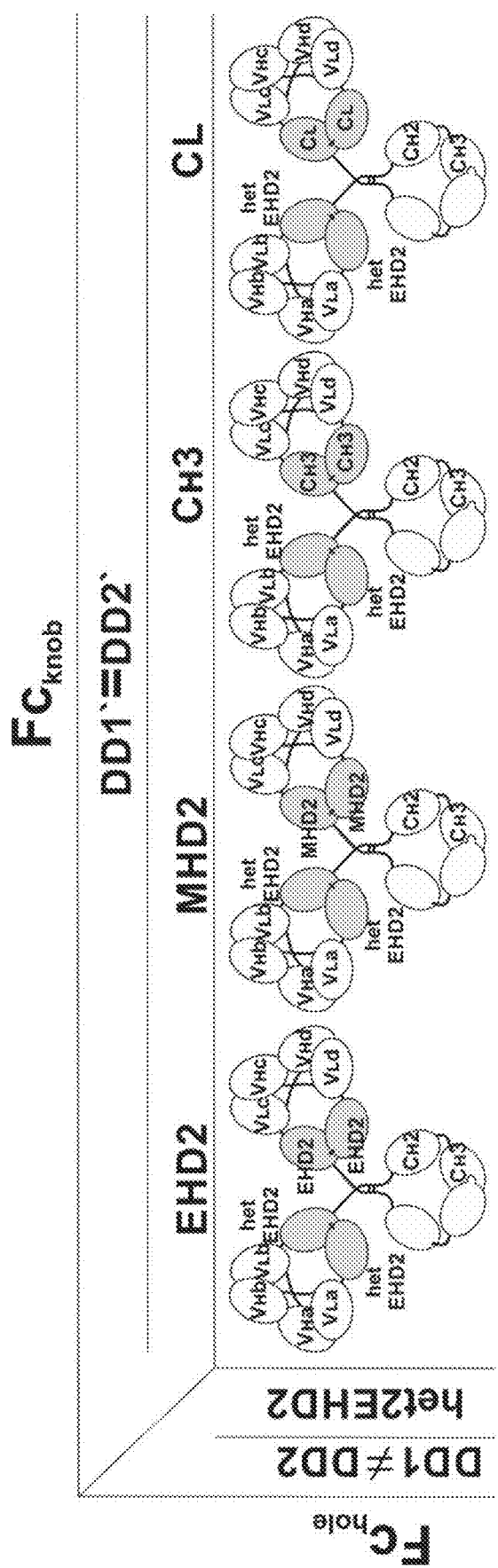
Figure 25D:
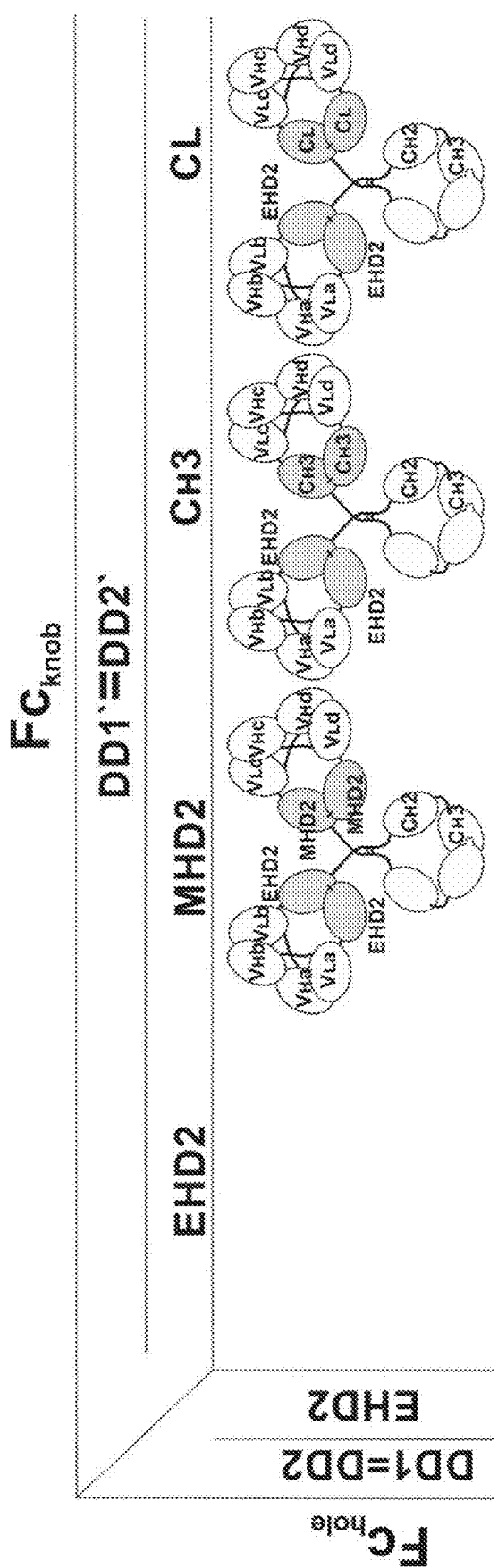
Figure 25E:
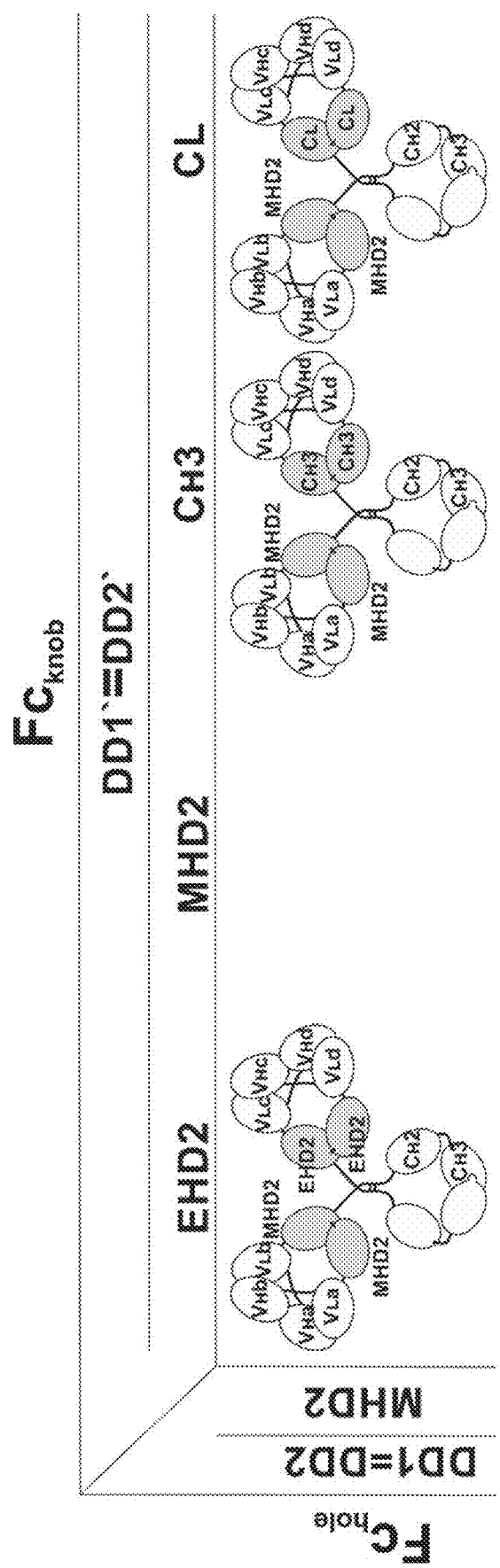
Figure 25F:
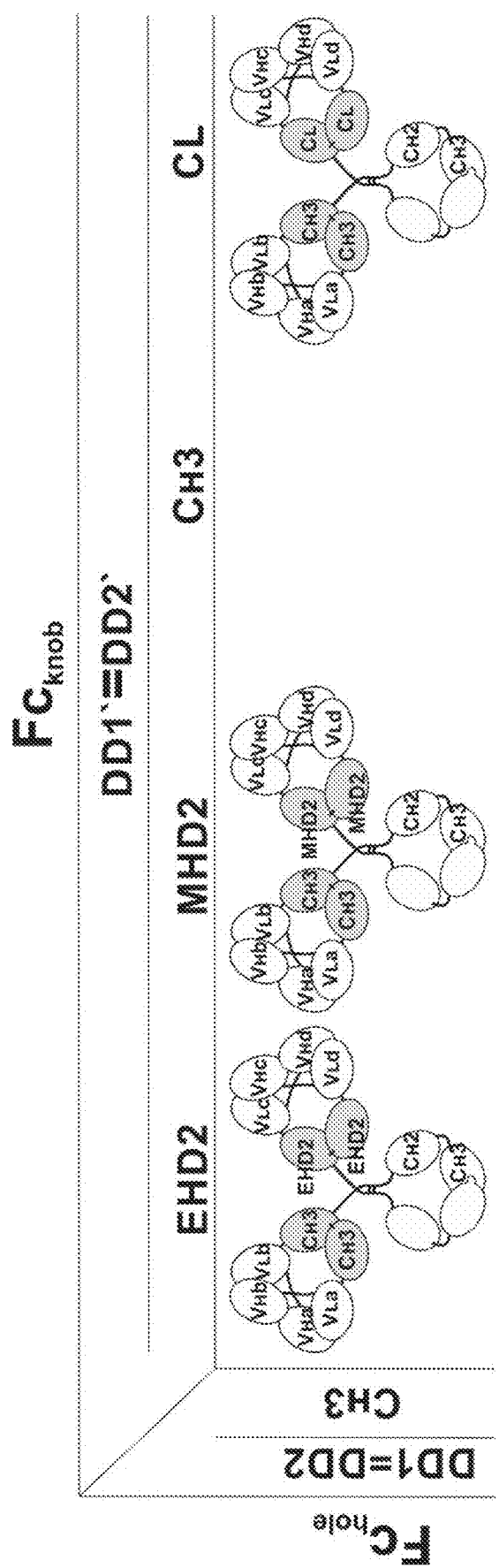
Figure 25G:
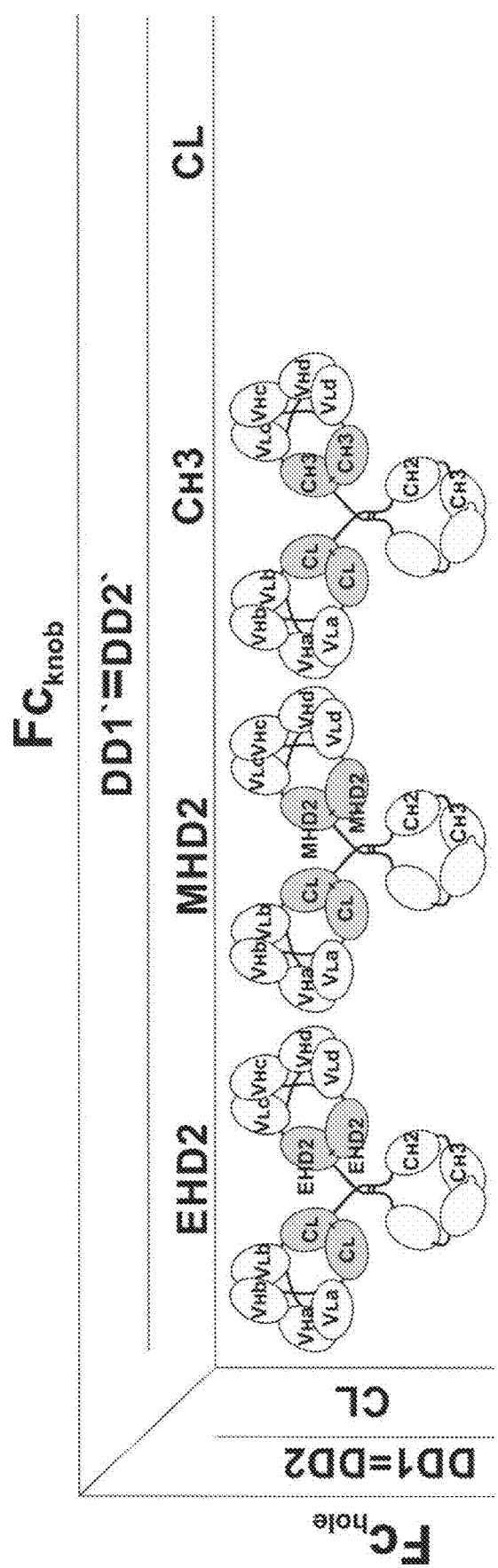

FIG. 14: Schematic overview of dimerization modules used for the generation of trivalent Db-scFv molecules using heterodimeric Fc part. Dimerization modules are split into heterodimer and homodimer using the example of a trispecific Db-scFv molecule. het1 EHD2 contains a C247S mutation in the light chain and C337S mutation in the heavy chain, het2EHD2 contains a C337S in the light chain and C247S mutation in the heavy chain.

FIG. 15A-15D: Schematic overview of the antigen-binding sites of tetravalent Db-Ig molecules using heterodimeric Fc part. Schematic illustration of the tetravalent (mono-(4+0)), bi- (2+2, 3+1), tri- (2+1+1), and tetraspecific (1+1+1+1)) Db-Ig molecules combining two diabody moieties. Specificities of the antigen-binding sites are colored with white, black, dark and light grey.

FIG. 16A-16G: Schematic overview of hetero-dimerization modules ($Fc_{knob}$) used for the generation of tetravalent, monospecific Db-Ig molecules using a heterodimeric Fc part. Combinatorial overview of dimerization modules used for the generation tetravalent, monospecific Db-Ig molecules. het1EHD2 contains a C247S mutation in the light chain and C337S mutation in the heavy chain, het2EHD2 contains a C337S in the light chain and C247S mutation in the heavy chain.

FIG. 17A-17G: Schematic overview of homo-dimerization modules ($Fc_{knob}$) used for the generation of tetravalent, monospecific Db-Ig molecules using a heterodimeric Fc part. Combinatorial overview of dimerization modules used for the generation tetravalent, monospecific Db-Ig molecules.

FIG. 18A-18G: Schematic overview of hetero-dimerization modules ($Fc_{knob}$) used for the generation of tetravalent, bispecific Db-Ig molecules with a symmetric architecture using a heterodimeric Fc part. Combinatorial overview of dimerization modules used for the generation tetravalent, bispecific Db-Ig molecules. het1EHD2 contains a C247S mutation in the light chain and C337S mutation in the heavy chain, het2EHD2 contains a C337S in the light chain and C247S mutation in the heavy chain.

FIG. 19A-19G: Schematic overview of homo-dimerization modules ($Fc_{knob}$) used for the generation of tetravalent, bispecific Db-Ig molecules with a symmetric architecture using a heterodimeric Fc part. Combinatorial overview of dimerization modules used for the generation tetravalent, bispecific Db-Ig molecules.

FIG. 20A-20G: Schematic overview of hetero-dimerization modules ($Fc_{knob}$) used for the generation of tetravalent, bispecific Db-Ig molecules with an asymmetric architecture using a heterodimeric Fc part. Combinatorial overview of dimerization modules used for the generation tetravalent, bispecific Db-Ig molecules, het1 EHD2 contains a C247S mutation in the light chain and C337S mutation in the heavy chain, het2EHD2 contains a C337S in the light chain and C247S mutation in the heavy chain.

FIG. 21A-21G: Schematic overview of homo-dimerization modules ($Fc_{knob}$) used for the generation of tetravalent, bispecific Db-Ig molecules with an asymmetric architecture using a heterodimeric Fc part. Combinatorial overview of dimerization modules used for the generation tetravalent, bispecific Db-Ig molecules.

FIG. 22A-22G: Schematic overview of hetero-dimerization modules ($Fc_{knob}$) used for the generation of tetravalent, trispecific Db-Ig molecules using a heterodimeric Fc part. Combinatorial overview of dimerization modules used for the generation tetravalent, trispecific Db-Ig molecules, het1 EHD2 contains a C247S mutation in the light chain and C337S mutation in the heavy chain, het2EHD2 contains a C337S in the light chain and C247S mutation in the heavy chain.

FIG. 23A-23G: Schematic overview of homo-dimerization modules ($Fc_{knob}$) used for the generation of tetravalent, trispecific Db-Ig molecules using a heterodimeric Fc part. Combinatorial overview of dimerization modules used for the generation tetravalent, trispecific Db-Ig molecules.

FIG. 24A-24G: Schematic overview of hetero-dimerization modules ($Fc_{knob}$) used for the generation of tetravalent, tetraspecific Db-Ig molecules using a heterodimeric Fc part. Combinatorial overview of dimerization modules used for the generation tetravalent, tetraspecific Db-Ig molecules. het1EHD2 contains a C247S mutation in the light chain, het2EHD2 contains a C337S in the heavy chain.

FIG. 25A-25G: Schematic overview of homo-dimerization modules ($Fc_{knob}$) used for the generation of tetravalent, tetraspecifc Db-Ig molecules using a heterodimeric Fc part. Combinatorial overview of dimerization modules used for the generation tetravalent, tetraspecific Db-Ig molecules.

FIG. 26A-26D: Biochemical characterization and binding studies of DbDR5xDR5-Ig. 26A) Schematic illustration of the light and the heavy chain of the DbDR5xDR5-Ig fusion protein. 26B) Schematic structure of the domains in the DbDR5xDR5-Ig fusion protein. 26C) SDS-PAGE analysis (10 or 12% PAA; Coomassie stained) of scFvDR5. Drozitumab, and DbDR5xDR5-Ig fusion protein under reducing (1) and non-reducing (2) conditions (M: marker). 26D) Binding of the tetravalent DbDR5xDR5-Ig was analyzed by ELISA using a Fc fusion protein of the extracellular domain of DR5 as antigen. Bound protein was detected with an HRP-conjugated anti-human Fab antibody. Parenteral antibody (Drozitumab; detected with HRP-conjugated anti-huFab antibody) and the monovalent scFvDR5 (detected with an HRP-conjugated anti-His antibody) were used as control. Optical density was measured at 450 nm.

FIG. 27A-27F: Biochemical characterization, binding studies and bioactivity of DbTNFR2xTNFR2-Ig. 27A) Schematic illustration of the light and the heavy chain of the DbTNFR2xTNFR2-Ig fusion protein. 27B) Schematic structure of the domains in the DbTNFR2xTNFR2-Ig fusion protein. 27C) SDS-PAGE analysis (12% PAA; Coomassie stained) of DbTNFR2xTNFR2-Ig fusion protein under reducing (R) and non-reducing (NR) conditions (M: marker). 27D) Size exclusion chromatography of DbTNFR2xTNFR2-Ig and anti-TNFR2 IgG. 27E) Binding of the tetravalent DbTNFR2xTNFR2-Ig was analyzed by ELISA using a Fc fusion protein of the extracellular domain of TNFR1 and TNFR2 (Enbrel) as antigen. Bound protein was detected with an HRP-conjugated anti-human Fab antibody. Parenteral antibody (anti-TNFR2 IgG; detected with HRP-conjugated anti-huFab antibody) was included as control. Optical density was measured at 450 nm. 27F) Cell death induction assay using Kym-1 cells (10,000 cells/well). Titration of antibodies (anti-TNFR2 IgG and DbTNFR2xTNFR2-Ig) was incubated with cells for 24 hours. Cell viability was analyzed using MTT assay.

FIG. 28A-28F: Biochemical characterization and binding of Db3M6xhu225-Ig. 28A) Schematic illustration of the light and the heavy chain of the Db3M6xhu225-Ig fusion protein. 28B) Schematic structure of the domains in the Db3M6xhu225-Ig fusion protein. 28C) SDS-PAGE analysis (10) % PAA; Coomassie stained) of the Db3M6xhu225-Ig fusion protein under reducing (1) and non-reducing (2) conditions (M: marker). 28D) Size exclusion chromatography of Db3M6xhu225-Ig fusion protein. 28E) Binding of the bispecific, tetravalent Db3M6xhu225-Ig was analyzed by ELISA using a Fc fusion protein of the extracellular domain of EGFR or HER3 as antigen. Bound protein was detected with an HRP-conjugated anti-human Fab antibody. Parenteral antibodies (Cetuximab and 3M6-IgG) were used as control. Optical density was measured at 450 nm. 28F) Simultaneous binding of the bispecific Db3M6xhu25-Ig fusion protein was analyzed via ELISA using a Fc fusion protein of the extracellular domain of EGFR as first antigen. Serial dilution of Db3M6xhu225-Ig was added to the wells. Finally, the second antigen. HER3-His, was added to the wells. Bound HER3-His was detected using a HRP-conjugated anti-His antibody. Optical density was measured at 450 nm.

FIG. 29A-29F: Biochemical characterization and binding of Db3-43xhu225-Ig. 29A) Schematic illustration of the light and the heavy chain of the Db3-43xhu225-Ig fusion protein. 29B) Schematic structure of the domains in the Db3-43xhu225-Ig fusion protein. 29C) SDS-PAGE analysis (10) % PAA; Coomassie stained) of the Db3-43xhu225-Ig fusion protein under reducing (1) and non-reducing (2) conditions (M: marker). 29D) Size exclusion chromatography of Db3-43xhu225-Ig fusion protein. 29E) Binding of the bispecific, tetravalent Db3-43xhu225-Ig was analyzed by ELISA using a Fc fusion protein of the extracellular domain of EGFR or HER3 as antigen. Bound protein was detected with an HRP-conjugated anti-human Fab antibody. Parenteral antibodies (Cetuximab and 3-43-IgG) were used as control. Optical density was measured at 450 nm. 29F) Simultaneous binding of the bispecific Db3-43xhu25-Ig fusion protein was analyzed via ELISA using a Fc fusion protein of the extracellular domain of EGFR as first antigen. Serial dilution of Db3-43xhu225-Ig was added to the wells. Finally, the second antigen. HER3-His, was added to the wells. Bound HER3-His was detected using a HRP-conjugated anti-His antibody. Optical density was measured at 450) nm.

Figure 30:
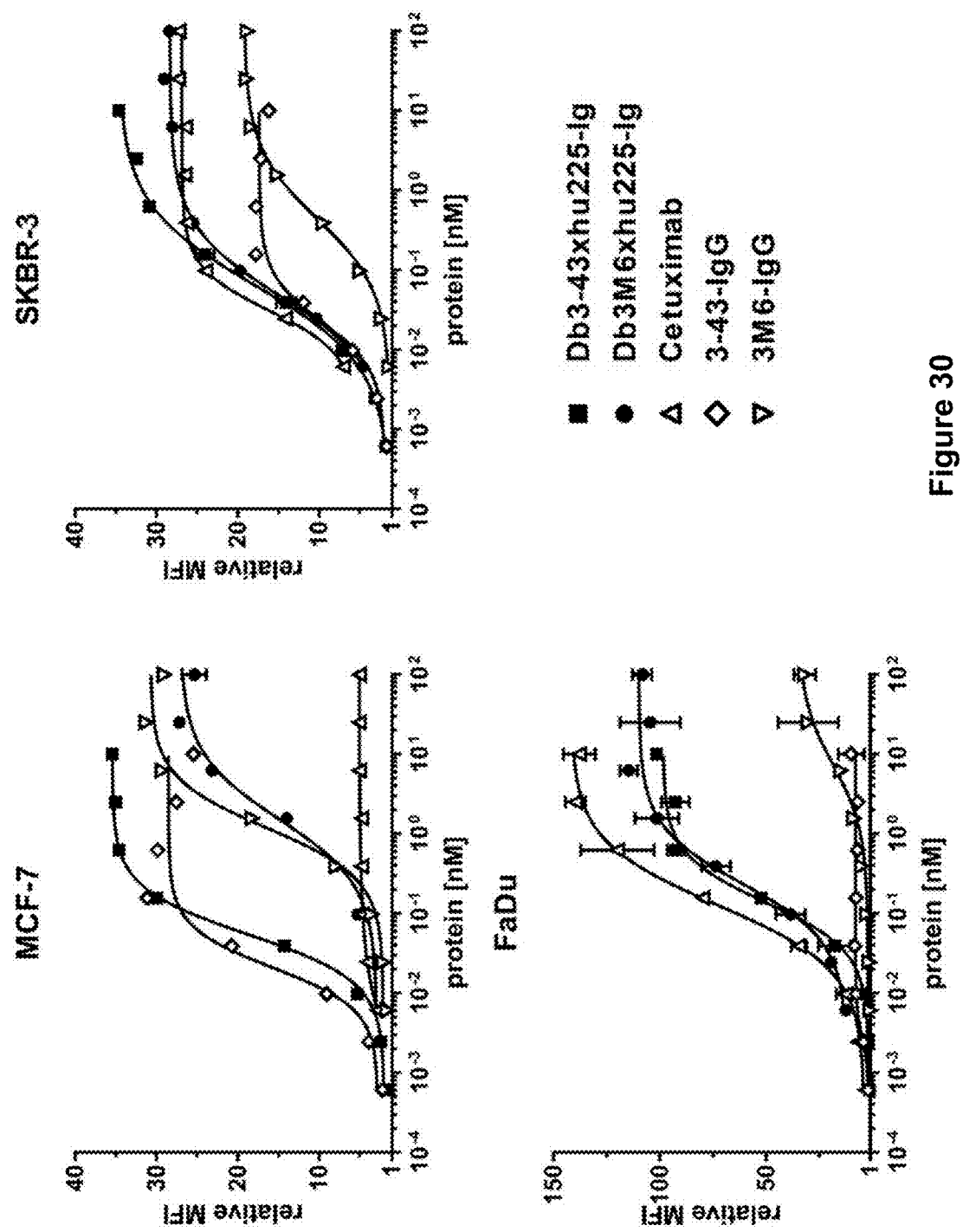

FIG. 30: Binding of bispecific DbEGFRxHER3-Ig to EGFR- and/or HER3-expressing tumor cell lines. Different tumor cell lines (MCF-7. SKBR-3, and FaDu) were incubated with a serial dilution of bispecific, tetravalent DbEGFRxHER3-Ig (Db3M6xhu225-Ig and Db3-43xhu225-Ig) or the parental monoclonal antibodies (Cetuximab. 3M6-IgG, and 3-43-IgG). Bound antibody was detected via PE-labeled anti-human Fc secondary antibody. Cells were analyzed using a Miltenyi MACSquant.

FIG. 31A-31F: Biochemical characterization and binding of Db3-43xhu225-EHD2-Fc. 31A) Schematic illustration of the light and the heavy chain of the Db3-43xhu225-EHD2-

Fc fusion protein. 31B) Schematic structure of the domains in the Db3-43xhu225-EHD2-Fc fusion protein. 31C) SDS-PAGE analysis (10) % PAA; Coomassie stained) of the Db3-43xhu225-EHD2-Fc fusion protein under reducing (1) and non-reducing (2) conditions (M: marker). 31D) Size exclusion chromatography of Db3-43xhu225-EHD2-Fc fusion protein. 31E) Binding of the bispecific, tetravalent Db3-43xhu225-EHD2-Fc was analyzed by ELISA using His-tagged protein of the extracellular domain of EGFR or HER3 as antigen. Bound protein was detected with an HRP-conjugated anti-human Fc antibody. Parenteral antibodies (hu225-IgG and 3-43-IgG) were used as control. Optical density was measured at 450 nm. 31F) Simultaneous binding of the bispecific Db3-43xhu25-EHD2-Fc fusion protein was analyzed via ELISA using a Fc fusion protein of the extracellular domain of EGFR as first antigen. Serial dilution of Db3-43xhu225-EHD2-Fc was added to the wells. Finally, the second antigen. HER3-His, was added to the wells. Bound HER3-His was detected using a HRP-conjugated anti-His antibody. Optical density was measured at 450) nm.

FIG. 32A-32F: Biochemical characterization and binding of Db3-43xhu225-het1EHD2-Fc. 32A) Schematic illustration of the light and the heavy chain of the Db3-43xhu225-het1EHD2-Fc fusion protein (C247S in first EHD2 of the light chain. C337S in second EHD2 of the heavy chain). 32B) Schematic structure of the domains in the Db3-43xhu225-het1EHD2-Fc fusion protein. 32C) SDS-PAGE analysis (10% PAA; Coomassie stained) of the Db3-43xhu225-het1EHD2-Fc fusion protein under reducing (1) and non-reducing (2) conditions (M: marker). 32D) Size exclusion chromatography of Db3-43xhu225-het1EHD2-Fc fusion protein. 32E) Binding of the bispecific, tetravalent Db3-43xhu225-het1EHD2-Fc was analyzed by ELISA using His-tagged protein of the extracellular domain of EGFR or HER3 as antigen. Bound protein was detected with an HRP-conjugated anti-human Fc antibody. Parenteral antibodies (hu225-IgG and 3-43-IgG) were used as control. Optical density was measured at 450 nm. 32F) Simultaneous binding of the bispecific Db3-43xhu25-hetEHD2-Fc fusion protein was analyzed via ELISA using a Fc fusion protein of the extracellular domain of EGFR as first antigen. Serial dilution of Db3-43xhu225-hetEHD2-Fc was added to the wells. Finally, the second antigen. HER3-His, was added to the wells. Bound HER3-His was detected using a HRP-conjugated anti-His antibody. Optical density was measured at 450) nm.

FIG. 33A-33F: Biochemical characterization and binding of Db3-43xhu225-MHD2-Fc. 33A) Schematic illustration of the light and the heavy chain of the Db3-43xhu225-MHD2-Fc fusion protein. 33B) Schematic structure of the domains in the Db3-43xhu225-MHD2-Fc fusion protein. 33C) SDS-PAGE analysis (10% PAA; Coomassie stained) of the Db3-43xhu225-MHD2-Fc fusion protein under reducing (1) and non-reducing (2) conditions (M: marker). 33D) Size exclusion chromatography of Db3-43xhu225-MHD2-Fc fusion protein. 33E) Binding of the bispecific, tetravalent Db3-43xhu225-MHD2-Fc was analyzed by ELISA using His-tagged protein of the extracellular domain of EGFR or HER3 as antigen. Bound protein was detected with an HRP-conjugated anti-human Fc antibody. Parenteral antibodies (hu225-IgG and 3-43-IgG) were used as control. Optical density was measured at 450 nm. 33F) Simultaneous binding of the bispecific Db3-43xhu225-MHD2-Fc fusion protein was analyzed via ELISA using a Fc fusion protein of the extracellular domain of EGFR as first antigen. Serial dilution of Db3-43xhu225-MHD2-Fc was added to the wells. Finally, the second antigen. HER3-His, was added to the wells. Bound HER3-His was detected using a HRP-conjugated anti-His antibody. Optical density was measured at 450 nm.

Figure 34A:
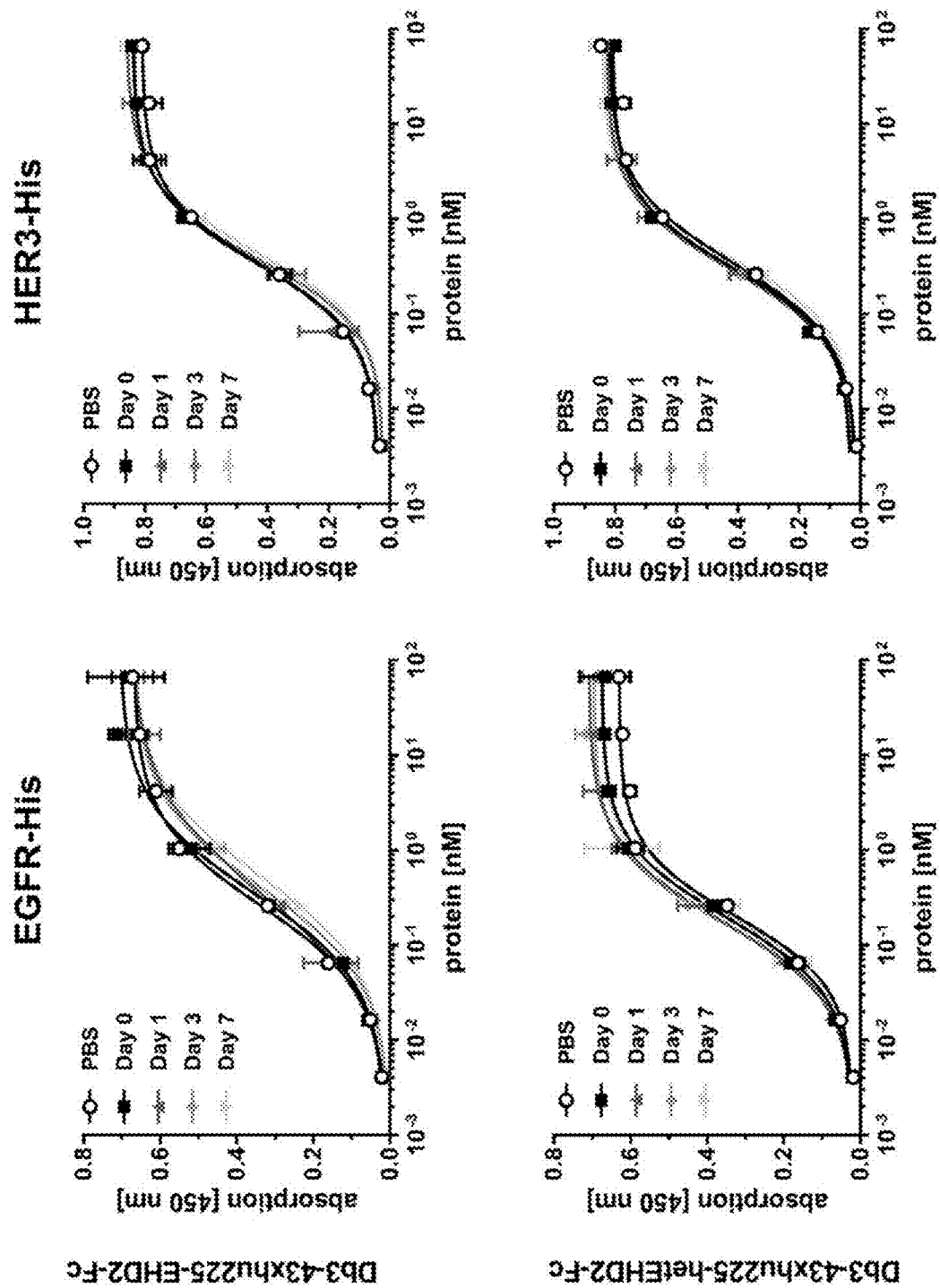
Figure 34B:
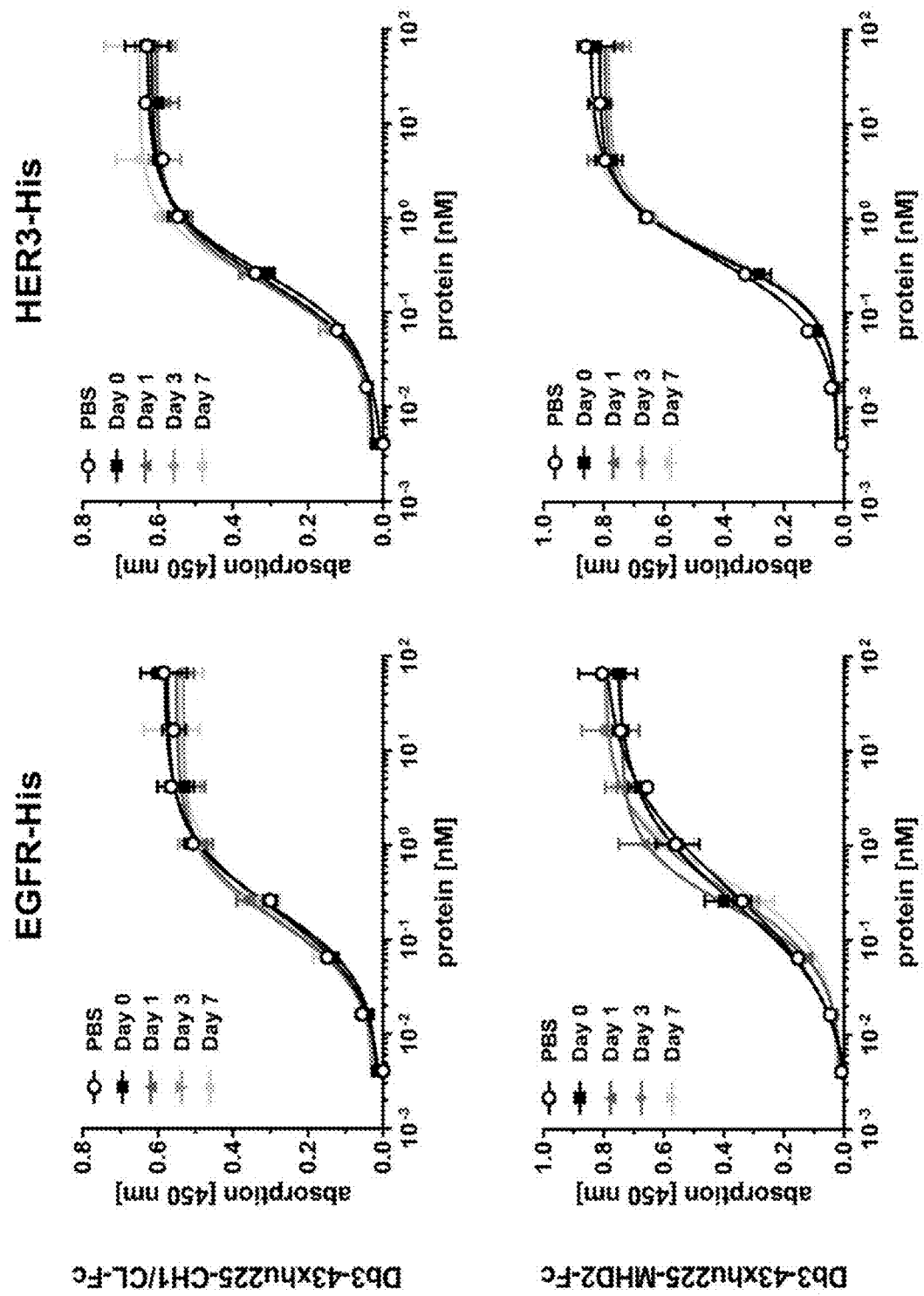

FIG. 34A-34B: Stability of bispecific, tetravalent binding molecules in human plasma. The bispecific, tetravalent molecules (Db3-43xhu225-Ig. Db3-43xhu225-EHD2-Fc. Db3-43xhu225-hetEHD2-Fc, and Db3-43xhu225-MHD2-Fc) were diluted in 50) % human plasma and incubated at 37° C. for 1, 3, 5, or 7 days. Finally, binding of the bispecific molecules to both His-tagged antigens. EGFR-His or HER3-His, was analyzed via ELISA. Bound protein was detected with a HRP-conjugated anti-human Fc antibody. Bispecific molecules, which were diluted in PBS and stored at 4° C. were included as control. Optical density was measured at 450 nm.

Figure 35:
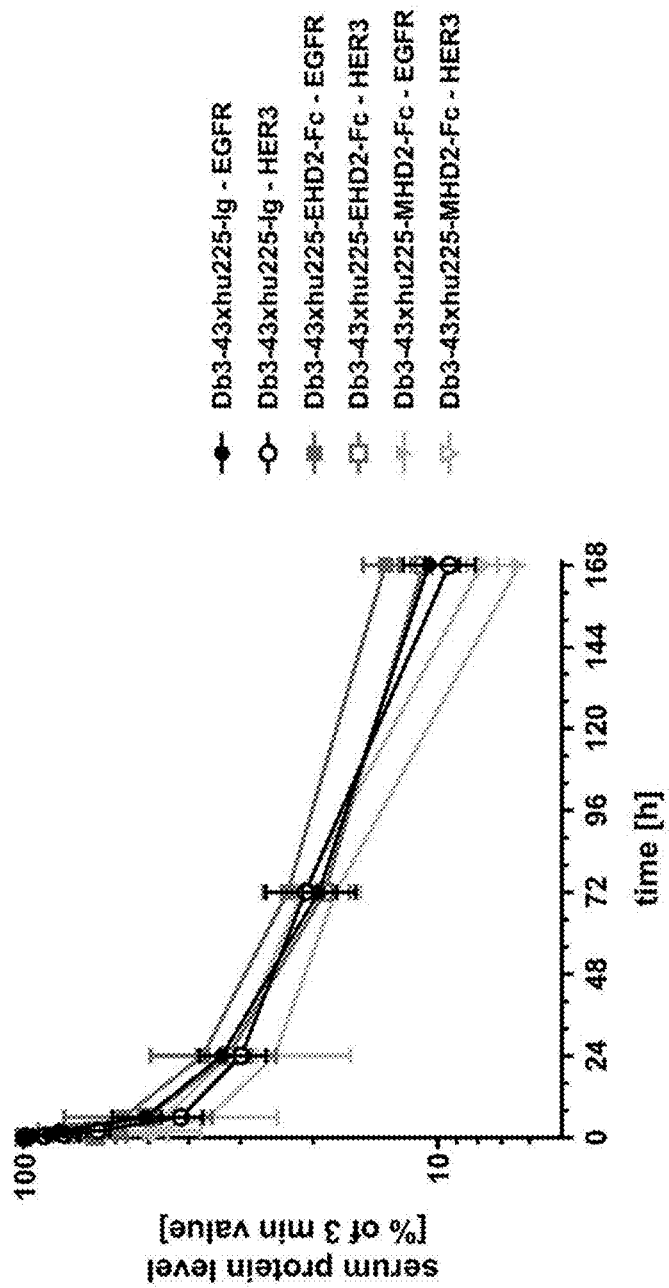

FIG. 35: Pharmacokinetic of bispecific, tetravalent binding molecules in SWISS mice. Pharmacokinetic profile of Db3-43xhu225-Ig. Db3-43xhu225-EHD2-Fc, and Db3-43xhu225-MHD2-Fc was determined in female SWISS mice (3 mice). 25 µg protein were injected intravenously into the tail vein. Concentrations of serum samples collected after indicated time intervals were determined via ELISA using either EGFR-Fc and HER3-Fc fusion protein (for detection of Db3-43xhu225-Ig) or His-tagged EGFR and HER3 (for analysis of Db3-43xhu225-EHD2-Fc and Db3-43xhu225-MHD2-Fc) as coated antigen. Bound Db3-43xhu225-Ig molecules were detected using a HRP-conjugated anti-human Fab secondary antibody, whereas bound Db3-43xhu225-EHD2-Fc, and Db3-43xhu225-MHD2-Fc was detected using a HRP-conjugated anti-human Fc secondary antibody. Serum protein levels are represented as relative (% of 3 min value) values. 25 FIG. 36A-36F: Biochemical characterization and binding of Db3-43xhuU3-EHD2-Fab3-43-Fc$_{kih}$. 36A) Schematic illustration of the light and the heavy chains of the diabody and Fab moiety of the Db3-43xhuU3-EHD2-Fab3-43-Fc$_{kih}$ fusion protein. 36B) Schematic structure of the domains in the Db3-43xhuU3-EHD2-Fab3-43-Fc$_{kih}$ fusion protein. 36C) SDS-PAGE analysis (12% PAA; Coomassie stained) of the Db3-43xhuU3-EHD2-Fab3-43-Fc$_{kih}$ fusion protein under reducing (1) and non-reducing (2) conditions (M: marker). 36D) Size exclusion chromatography of Db3-43xhuU3-EHD2-Fab3-43-Fc$_{kih}$ fusion protein. 36E) Binding of the bispecific, trivalent Db3-43xhuU3-EHD2-Fab3-43-Fc$_{kih}$ was analyzed by flow cytometry using HER3-positive SKBR3 cells or CD3-positive Jurkat cells. Bound protein was detected with a PE-labeled anti-human Fc antibody. 36F) Simultaneous binding of the bispecific Db3-43xhuU3-EHD2-Fab3-43-Fc$_{kih}$ fusion protein was analyzed via flow cytometry using CD3-positive Jurkat cells and His-tagged HER3. Serial dilution of Db3-43xhuU3-EHD2-Fab3-43-Fc$_{kih}$ was incubated with the cells. Finally, the second antigen. HER3-His, was added to the cells. Bound HER3-His was detected using a PE-labeled anti-His antibody.

FIG. 37A-37F: Biochemical characterization and binding of Db3-43xhuU3-EHD2-scFv3-43-Fc$_{kih}$. A) Schematic illustration of the light and the heavy chain of the diabody and the scFv moiety of the Db3-43xhuU3-EHD2-scFv3-43-Fc$_{kih}$ fusion protein. 37B) Schematic structure of the domains in the Db3-43xhuU3-EHD2-scFv3-43-Fc$_{kih}$ fusion protein. C) SDS-PAGE analysis (12% PAA; Coomassie stained) of the Db3-43xhuU3-EHD2-scFv3-43-Fc$_{kih}$ fusion protein under reducing (1) and non-reducing (2) conditions (M: marker). 37D) Size exclusion chromatography of Db3-43xhuU3-EHD2-scFv3-43-Fc$_{kih}$ fusion protein. 37E) Binding of the bispecific, trivalent Db3-43xhuU3-EHD2-scFv3-

43-Fc$_{kih}$ was analyzed by flow cytometry using HER3-positive SKBR3 cells or CD3-positive Jurkat cells. Bound protein was detected with a PE-labeled anti-human Fc antibody. 37F) Simultaneous binding of the bispecific Db3-43xhuU3-EHD2-scFv3-43-Fc$_{kih}$ fusion protein was analyzed via flow cytometry using CD3-positive Jurkat cells and His-tagged HER3. Serial dilution of Db3-43xhuU3-EHD2-scFv3-43-Fc$_{kih}$ was incubated with the cells. Finally, the second antigen, HER3-His, was added to the cells. Bound HER3-His was detected using a PE-labeled anti-His antibody.

FIG. 38A-38E: Biochemical characterization and binding of Db3-43x4D5-Fab-Fc$_{kih}$. 38A) Schematic illustration of both heavy chains of the Db3-43x4D5-Fab-Fc$_{kih}$ fusion protein. 38B) Schematic structure of the domains in the Db3-43x4D5-Fab-Fc$_{kih}$ fusion protein. 38C) SDS-PAGE analysis (gradient PAA; Coomassie stained) of the Db3-43x4D5-Fab-Fc$_{kih}$ fusion protein under reducing (1) and non-reducing (2) conditions (M: marker). 38D) Size exclusion chromatography of Db3-43x4D5-Fab-Fc$_{kih}$ fusion protein. 38E) Binding of the bispecific, bivalent Db3-43x4D5-Fab-Fc$_{kih}$ was analyzed by ELISA using Fc fusion proteins of the extracellular domain of HER2 or HER3 as antigen. Bound protein was detected with an HRP-conjugated anti-human Fab antibody. Parenteral antibodies (Trastuzumab and IgG 3-43) were used as control. Optical density was measured at 450 nm.

LIST OF SEQUENCES

SEQ ID NO: 1 Amino acid sequence of peptide linker: GGGGS
SEQ ID NO: 2 Amino acid sequence of TCR α
SEQ ID NO: 3 Amino acid sequence of TCR β
SEQ ID NO: 4 Amino acid sequence of FcRn alpha 3
SEQ ID NO: 5 Amino acid sequence of β2 microglobulin
SEQ ID NO: 6 Amino acid sequence of HLA-A
SEQ ID NO: 7 Amino acid sequence of HLA-B α3
SEQ ID NO: 8 Amino acid sequence of HLA-D α2
SEQ ID NO: 9 Amino acid sequence of HLA-D β2
SEQ ID NO: 10 Amino acid sequence of the C-terminal end of $V_H$: TVSS
SEQ ID NO: 11 Amino acid sequence of the C-terminal end of $V_L$-λ: TVL
SEQ ID NO: 12 Amino acid sequence of the C-terminal end of $V_L$-κ: IK
SEQ ID NO: 13 Amino acid sequence of $V_H$DR5-$V_L$DR5-$C_H$1-$C_H$2-$C_H$3
SEQ ID NO: 14 Amino acid sequence of $V_H$DR5-$V_L$DR5-$C_L$
SEQ ID NO: 15 Amino acid sequence of $V_H$TNFR2-$V_L$TNFR2-$C_H$1-$C_H$2-$C_H$3
SEQ ID NO: 16 Amino acid sequence of $V_H$TNFR2-$V_L$TNFR2-$C_L$
SEQ ID NO: 17 Amino acid sequence of $V_H$225-$V_L$3M6-$C_H$1-$C_H$2-$C_H$3
SEQ ID NO: 18 Amino acid sequence of $V_H$3M6-$V_L$225-$C_L$
SEQ ID NO: 19 Amino acid sequence of $V_H$225-$V_L$3-43-$C_H$1-$C_H$2-$C_H$3
SEQ ID NO: 20 Amino acid sequence of $V_H$3-43-$V_L$225-$C_L$
SEQ ID NO: 21 Amino acid sequence of $V_H$225-$V_L$3-43-EHD2-$C_H$2-$C_H$3
SEQ ID NO: 22 Amino acid sequence of $V_H$3-43-$V_L$225-EHD2
SEQ ID NO: 23 Amino acid sequence of $V_H$225-$V_L$3-43-hetEHD2-$C_H$2-$C_H$3
SEQ ID NO: 24 Amino acid sequence of $V_H$3-43-$V_L$225-hetEHD2
SEQ ID NO: 25 Amino acid sequence of $V_H$225-$V_L$3-43-MHD2-$C_H$2-$C_H$3
SEQ ID NO: 26 Amino acid sequence of $V_H$3-43-$V_L$225-MHD2
SEQ ID NO: 27 Amino acid sequence of $V_H$huU3-$V_L$3-43-EHD2-$C_H$2-$C_H$3
SEQ ID NO: 28 Amino acid sequence of $V_H$3-43-$V_L$huU3-EHD2
SEQ ID NO: 29 Amino acid sequence of $V_H$3-43-$C_H$1-$C_H$2-$C_H$3$_{knob}$
SEQ ID NO: 30 Amino acid sequence of $V_L$3-43-$C_L$
SEQ ID NO: 31 Amino acid sequence of $V_H$3-43-$V_L$3-43-$C_H$2-$C_H$3$_{knob}$
SEQ ID NO: 32 Amino acid sequence of $V_H$4D5-$V_L$3-43-$C_H$1-$C_H$2-$C_H$3$_{hole}$
SEQ ID NO: 33 Amino acid sequence of $V_H$3-43-$V_L$4D5-$C_L$-$C_H$2-$C_H$3$_{knob}$
SEQ ID NO: 34 Amino acid sequence of Human EHD2
SEQ ID NO: 35 Amino acid sequence of Human MHD2
SEQ ID NO: 36 Amino acid sequence of Fc-Δab (incl. hinge)

DETAILED DESCRIPTIONS OF THE INVENTION

Before the present invention is described in detail below, it is to be understood that this invention is not limited to the particular methodology, protocols and reagents described herein as these may vary. It is also to be understood that the terminology used herein is for the purpose of describing particular embodiments only, and is not intended to limit the scope of the present invention which will be limited only by the appended claims. Unless defined otherwise, all technical and scientific terms used herein have the same meanings as commonly understood by one of ordinary skill in the art.

Preferably, the terms used herein are defined as described in "A multilingual glossary of biotechnological terms: (IUPAC Recommendations)", Leuenberger, H. G. W, Nagel, B. and Klbl, H. eds. (1995), Helvetica Chimica Acta, $C_H$-4010 Basel, Switzerland).

Throughout this specification and the claims which follow, unless the context requires otherwise, the word "comprise", and variations such as "comprises" and "comprising", will be understood to imply the inclusion of a stated integer or step or group of integers or steps but not the exclusion of any other integer or step or group of integers or steps. In the following passages, different aspects of the invention are defined in more detail. Each aspect so defined may be combined with any other aspect or aspects unless clearly indicated to the contrary. In particular, any feature indicated as being optional, preferred or advantageous may be combined with any other feature or features indicated as being optional, preferred or advantageous.

Several documents are cited throughout the text of this specification. Each of the documents cited herein (including all patents, patent applications, scientific publications, manufacturer's specifications, instructions etc.), whether supra or infra, is hereby incorporated by reference in its entirety. Nothing herein is to be construed as an admission that the invention is not entitled to antedate such disclosure by virtue of prior invention. Some of the documents cited herein are characterized as being "incorporated by reference". In the event of a conflict between the definitions or teachings of such incorporated references and definitions or teachings recited in the present specification, the text of the present specification takes precedence.

In the following, the elements of the present invention will be described. These elements are listed with specific embodiments; however, it should be understood that they may be combined in any manner and in any number to create additional embodiments. The variously described examples and preferred embodiments should not be construed to limit the present invention to only the explicitly described embodiments. This description should be understood to support and encompass embodiments which combine the explicitly described embodiments with any number of the disclosed and/or preferred elements. Furthermore, any permutations and combinations of all described elements in this application should be considered disclosed by the description of the present application unless the context indicates otherwise.

Definitions

In the following, some definitions of terms frequently used in this specification are provided. These terms will, in each instance of its use, in the remainder of the specification have the respectively defined meaning and preferred meanings.

As used in this specification and the appended claims, the singular forms "a", "an", and "the" include plural referents, unless the content clearly dictates otherwise.

The term "antigen binding protein", as used herein, refers to any molecule or part of a molecule that can specifically bind to a target molecule or target epitope. Preferred binding proteins in the context of the present application are (a) antibodies or antigen-binding fragments thereof; (b) oligonucleotides; (c) antibody-like proteins; or (d) peptidomimetics.

The term "binding" according to the invention preferably relates to a specific binding. "Specific binding" means that a binding protein (e.g. an antibody) binds stronger to a target such as an epitope for which it is specific compared to the binding to another target. A binding protein binds stronger to a first target compared to a second target if it binds to the first target with a dissociation constant ($K_d$) which is lower than the dissociation constant for the second target. Preferably the dissociation constant ($K_d$) for the target to which the binding protein binds specifically is more than 10-fold, preferably more than 20-fold, more preferably more than 50-fold, even more preferably more than 100-fold, 200-fold, 500-fold or 1000-fold lower than the dissociation constant ($K_d$) for the target to which the binding protein does not bind specifically.

As used herein, the term "$K_d$" (measured in "mol/L", sometimes abbreviated as "M") is intended to refer to the dissociation equilibrium constant of the particular interaction between a binding protein (e.g. an antibody or fragment thereof) and a target molecule (e.g. an antigen or epitope thereof). Methods for determining binding affinities of compounds, i.e. for determining the dissociation constant $K_D$, are known to a person of ordinary skill in the art and can be selected for instance from the following methods known in the art; Surface Plasmon Resonance (SPR) based technology, Bio-layer interferometry (BLI), quartz crystal microbalance (QCM), enzyme-linked immunosorbent assay (ELISA), flow cytometry, isothermal titration calorimetry (ITC), analytical ultracentrifugation, radioimmunoassay (RIA or IRMA) and enhanced chemiluminescence (ECL). In the context of the present application, the "$K_d$" value is determined by surface plasmon resonance spectroscopy (Biacore™) or by quartz crystal microbalance (QCM) at room temperature (25° C.).

The term "antigen-binding fragment" of an antibody (or simply "binding portion"), as used herein, refers to one or more fragments of an antibody that retain the ability to specifically bind to an antigen. It has been shown that the antigen-binding function of an antibody can be performed by fragments of a full-length antibody. Examples of binding fragments encompassed within the term "antigen-binding portion" of an antibody include (i) Fab fragments, monovalent fragments consisting of the $V_L$, $V_H$, CL and $C_H$ domains; (ii) F(ab')$_2$ fragments, bivalent fragments comprising two Fab fragments linked by a disulfide bridge at the hinge region; (iii) Fd fragments consisting of the $V_H$ and $C_H$ domains; (iv) Fv fragments consisting of the $V_L$ and $V_H$ domains of a single arm of an antibody, (v) dAb fragments (Ward et al., (1989) Nature 341:544-546), which consist of a $V_H$ domain or a $V_L$ domain, a VHH, a Nanobody, or a variable domain of an IgNAR; (vi) isolated complementarity determining regions (CDR), and (vii) combinations of two or more isolated CDRs which may optionally be joined by a synthetic peptide linker. Furthermore, although the two domains of the Fv fragment, $V_L$ and $V_H$, are coded for by separate genes, they can be joined, using recombinant methods, by a synthetic peptide linker that enables them to be made as a single protein chain in which the $V_L$ and $V_H$ regions pair to form monovalent molecules (known as single chain Fv (scFv); see e.g., Bird et al. (1988) Science 242: 423-426; and Huston et al. (1988) Proc. Natl. Acad. Sci. USA 85:5879-5883). Such single chain antibodies are also intended to be encompassed within the term "antigen-binding fragment" of an antibody. A further example is a binding-domain immunoglobulin fusion protein comprising (i) a binding domain polypeptide that is fused to an immunoglobulin hinge region polypeptide. (ii) an immunoglobulin heavy chain CH2 constant region fused to the hinge region, and (iii) an immunoglobulin heavy chain CH3 constant region fused to the CH2 constant region. The binding domain polypeptide can be a heavy chain variable region or a light chain variable region. The binding-domain immunoglobulin fusion proteins are further disclosed in US 2003/0118592 and US 2003/0133939. These antibody fragments are obtained using conventional techniques known to those with skill in the art, and the fragments are screened for utility in the same manner as are intact antibodies. Further examples of "antigen-binding fragments" are so-called microantibodies, which are derived from single CDRs. For example, Heap et al., 2005, describe a 17 amino acid residue microantibody derived from the heavy chain CDR3 of an antibody directed against the gp120 envelope glycoprotein of HIV-1. Other examples include small antibody mimetics comprising two or more CDR regions that are fused to each other, preferably by cognate framework regions. Such a small antibody mimetic comprising $V_H$ CDR1 and $V_L$ CDR3 linked by the cognate $V_H$ FR2 has been described by Qiu et al., 2007.

The dimerization domains of the invention that are based immunoglobulins can be of any class (e.g., IgG, IgE, IgM, IgD, IgA and IgY), or subclass of immunoglobulin molecule (e.g., IgG1, IgG2, IgG3, IgG4, IgA1 and IgA2). Similarly, antibodies that may be non-covalently or covalently attached to the antigen-binding protein complex of the present invention, may be of any of the above indicated immunoglobulin type.

Antibodies and antigen-binding fragments thereof usable in the invention may be from any animal origin including birds and mammals. Preferably, the antibodies or fragments are from human, chimpanzee, rodent (e.g. mouse, rat, guinea pig, or rabbit), chicken, turkey, pig, sheep, goat, camel, cow, horse, donkey, cat, or dog origin. It is particularly preferred that the antibodies are of human or murine origin. Antibodies of the invention also include chimeric molecules in which an antibody constant region derived from one species, preferably human, is combined with the antigen binding site derived from another species, e.g. mouse. Moreover antibodies of the invention include humanized molecules in which the antigen binding sites of an antibody derived from a non-human species (e.g. from mouse) are combined with constant and framework regions of human origin.

As exemplified herein, antibodies of the invention can be obtained directly from hybridomas which express the antibody, or can be cloned and recombinantly expressed in a host cell (e.g., a CHO cell, or a lymphocytic cell). Further examples of host cells are microorganisms, such as E. coli, and fungi, such as yeast. Alternatively, they can be produced recombinantly in a transgenic non-human animal or plant.

The term "monoclonal antibody" as used herein refers to a preparation of antibody molecules of single molecular composition. A monoclonal antibody displays a single binding specificity and affinity for a particular epitope. In one embodiment, the monoclonal antibodies are produced by a hybridoma which includes a B cell obtained from a non-human animal, e.g. mouse, fused to an immortalized cell.

The term "recombinant antibody", as used herein, includes all antibodies that are prepared, expressed, created or isolated by recombinant means, such as (a) antibodies isolated from an animal (e.g., a mouse) that is transgenic or transchromosomal with respect to the immunoglobulin genes or a hybridoma prepared therefrom. (b) antibodies isolated from a host cell transformed to express the antibody, e.g. from a transfectoma. (c) antibodies isolated from a recombinant, combinatorial antibody library, and (d) antibodies prepared, expressed, created or isolated by any other means that involve splicing of immunoglobulin gene sequences to other DNA sequences.

Thus. "antibodies and antigen-binding fragments thereof" suitable for use in the present invention include, but are not limited to, polyclonal, monoclonal, monovalent, bispecific, heteroconjugate, multispecific, recombinant, heterologous, heterohybrid, chimeric, humanized (in particular CDR-grafted), deimmunized, or human antibodies. Fab fragments. Fab' fragments. F(ab')$_2$ fragments, fragments produced by a Fab expression library, Fd, Fv, disulfide-linked Fvs (dsFv), single chain antibodies (e.g. scFv), diabodies or tetrabodies (Holliger P. et al. (1993) Proc. Natl. Acad. Sci. U.S.A. 90(14), 6444-6448), nanobodies (also known as single domain antibodies), anti-idiotypic (anti-Id) antibodies (including, e.g., anti-Id antibodies to antibodies of the invention), and epitope-binding fragments of any of the above.

The term "naturally occurring", as used herein, as applied to an object refers to the fact that an object can be found in nature. For example, a polypeptide or polynucleotide sequence that is present in an organism (including viruses) that can be isolated from a source in nature and which has not been intentionally modified by man in the laboratory is naturally occurring.

As used herein, the term "nucleic acid aptamer" refers to a nucleic acid molecule that has been engineered through repeated rounds of in vitro selection or SELEX (systematic evolution of ligands by exponential enrichment) to bind to a target molecule (for a review see: Brody E. N. and Gold L. (2000). Aptamers as therapeutic and diagnostic agents. J. Biotechnol. 74(1):5-13). The nucleic acid aptamer may be a DNA or RNA molecule. The aptamers may contain modifications, e.g. modified nucleotides such as 2-fluorine-substituted pyrimidines.

As used herein, the term "antibody-like protein" refers to a protein that has been engineered (e.g. by mutagenesis of loops) to specifically bind to a target molecule. Typically, such an antibody-like protein comprises at least one variable peptide loop attached at both ends to a protein scaffold. This double structural constraint greatly increases the binding affinity of the antibody-like protein to levels comparable to that of an antibody. The length of the variable peptide loop typically consists of 10 to 20 amino acids. The scaffold protein may be any protein having good solubility properties. Preferably, the scaffold protein is a small globular protein. Antibody-like proteins include without limitation affibodies, anticalins, and designed ankyrin repeat proteins (for review see: Binz. H. K. et al. (2005) Engineering novel binding proteins from nonimmunoglobulin domains. Nat. Biotechnol. 23(10):1257-1268). Antibody-like proteins can be derived from large libraries of mutants, e.g. be panned from large phage display libraries and can be isolated in analogy to regular antibodies. Also, antibody-like binding proteins can be obtained by combinatorial mutagenesis of surface-exposed residues in globular proteins. Antibody-like proteins are sometimes referred to as "peptide aptamers".

As used herein, a "peptidomimetic" is a small protein-like chain designed to mimic a peptide. Peptidomimetics typically arise from modification of an existing peptide in order to alter the molecule's properties. For example, they may arise from modifications to change the molecule's stability or biological activity. This can have a role in the development of drug-like compounds from existing peptides. These modifications involve changes to the peptide that will not occur naturally (such as altered backbones and the incorporation of nonnatural amino acids).

The "percentage of sequences identity" is determined by comparing two optimally aligned sequences over a comparison window, wherein the portion of the sequence in the comparison window can comprise additions or deletions (i.e. gaps) as compared to the reference sequence (which does not comprise additions or deletions) for optimal alignment of the two sequences. The percentage is calculated by determining the number of positions at which the identical nucleic acid base or amino acid residue occurs in both sequences to yield the number of matched positions, dividing the number of matched positions by the total number of positions in the window of comparison and multiplying the result by 100 to yield the percentage of sequence identity.

The term "identical" is used herein in the context of two or more nucleic acids or polypeptide sequences, to refer to two or more sequences or subsequences that are the same, i.e. comprise the same sequence of nucleotides or amino acids. Sequences are "substantially identical" to each other if they have a specified percentage of nucleotides or amino acid residues that are the same (e.g., at least 70%, at least 75%, at least 80, at least 81%, at least 82%, at least 83%, at least 84%, at least 85%, at least 86%, at least 87%, at least 88%, at least 89%, at least 90%, at least 91%, at least 92%, at least 93%, at least 94%, at least 95%, at least 96%, at least 97%, at least 98%, or at least 99% identity over a specified region), when compared and aligned for maximum correspondence over a comparison window, or designated region as measured using one of the following sequence comparison algorithms or by manual alignment and visual inspection. These definitions also refer to the complement of a test sequence. Accordingly, the term "at least 80% sequence identity" is used throughout the specification with regard to polypeptide and polynucleotide sequence comparisons. This expression preferably refers to a sequence identity of at least 80%, at least 81%, at least 82%, at least 83%, at least 84%, at least 85%, at least 86%, at least 87%, at least 88%, at least 89%, at least 90%, at least 91%, at least 92%, at least 93%, at least 94%, at least 95%, at least 96%, at least 97%, at least 98%, or at least 99% to the respective reference polypeptide or to the respective reference polynucleotide.

The term "sequence comparison" is used herein to refer to the process wherein one sequence acts as a reference sequence, to which test sequences are compared. When using a sequence comparison algorithm, test and reference sequences are entered into a computer, if necessary subsequence coordinates are designated, and sequence algorithm program parameters are designated. Default program parameters are commonly used, or alternative parameters can be designated. The sequence comparison algorithm then calculates the percent sequence identities or similarities for the test sequences relative to the reference sequence, based on the program parameters. In case where two sequences are compared and the reference sequence is not specified in comparison to which the sequence identity percentage is to be calculated, the sequence identity is to be calculated with reference to the longer of the two sequences to be compared, if not specifically indicated otherwise. If the reference sequence is indicated, the sequence identity is determined on the basis of the full length of the reference sequence indicated by SEQ ID, if not specifically indicated otherwise.

In a sequence alignment, the term "comparison window" refers to those stretches of contiguous positions of a sequence which are compared to a reference stretch of contiguous positions of a sequence having the same number of positions. The number of contiguous positions selected may range from 4 to 1000, i.e. may comprise 4, 5, 10, 20, 30, 40, 50, 60, 70, 80, 90, 100, 150, 200, 250, 300, 350, 400, 450, 500, 550, 600, 650, 700, 750, 800, 850, 900, 950, or 1000 contiguous positions. Typically, the number of contiguous positions ranges from about 20 to 800 contiguous positions, from about 20 to 600 contiguous positions, from about 50 to 400 contiguous positions, from about 50 to about 200 contiguous positions, from about 100 to about 150 contiguous positions.

Methods of alignment of sequences for comparison are well known in the art. Optimal alignment of sequences for comparison can be conducted, for example, by the local homology algorithm of Smith and Waterman (Adv. Appl. Math. 2:482, 1970), by the homology alignment algorithm of Needleman and Wunsch (J. Mol. Biol. 48:443, 1970), by the search for similarity method of Pearson and Lipman (Proc. Natl. Acad. Sci. USA 85:2444, 1988), by computerized implementations of these algorithms (e.g., GAP, BESTFIT, FASTA, and TFASTA in the Wisconsin Genetics Software Package. Genetics Computer Group. 575 Science Dr., Madison. Wis.), or by manual alignment and visual inspection (see, e.g., Ausubel et al., Current Protocols in Molecular Biology (1995 supplement)). Algorithms suitable for determining percent sequence identity and sequence similarity are the BLAST and BLAST 2.0 algorithms, which are described in Altschul et al. (Nuc. Acids Res. 25:3389-402, 1977), and Altschul et al. (J. Mol. Biol. 215:403-10, 1990), respectively. Software for performing BLAST analyses is publicly available through the National Center for Biotechnology Information (http://www.ncbi.nlm.nih.gov/). This algorithm involves first identifying high scoring sequence pairs (HSPs) by identifying short words of length W in the query sequence, which either match or satisfy some positive-valued threshold score T when aligned with a word of the same length in a database sequence. T is referred to as the neighborhood word score threshold (Altschul et al., supra). These initial neighborhood word hits act as seeds for initiating searches to find longer HSPs containing them. The word hits are extended in both directions along each sequence for as far as the cumulative alignment score can be increased. Cumulative scores are calculated using, for nucleotide sequences, the parameters M (reward score for a pair of matching residues; always >0)) and N (penalty score for mismatching residues; always <0)). For amino acid sequences, a scoring matrix is used to calculate the cumulative score. Extension of the word hits in each direction are halted when: the cumulative alignment score falls off by the quantity X from its maximum achieved value; the cumulative score goes to zero or below, due to the accumulation of one or more negative-scoring residue alignments; or the end of either sequence is reached. The BLAST algorithm parameters W, T, and X determine the sensitivity and speed of the alignment. The BLASTN program (for nucleotide sequences) uses as defaults a wordlength (W) of 11, an expectation (E) of 10, M=5, N=−4 and a comparison of both strands. For amino acid sequences, the BLASTP program uses as defaults a wordlength of 3, and expectation (E) of 10, and the BLOSUM62 scoring matrix (see Henikoff and Henikoff. Proc. Natl. Acad. Sci. USA 89:10915, 1989) alignments (B) of 50, expectation (E) of 10, M=5. N=−4, and a comparison of both strands. The BLAST algorithm also performs a statistical analysis of the similarity between two sequences (see, e.g., Karlin and Altschul. Proc. Natl. Acad. Sci. USA 90:5873-87, 1993). One measure of similarity provided by the BLAST algorithm is the smallest sum probability (P(N)), which provides an indication of the probability by which a match between two nucleotide or amino acid sequences would occur by chance. For example, a nucleic acid is considered similar to a reference sequence if the smallest sum probability in a comparison of the test nucleic acid to the reference nucleic acid is less than about 0.2, typically less than about 0.01, and more typically less than about 0.001.

"Conservative substitutions" may be made, for instance, on the basis of similarity in polarity, charge, size, solubility, hydrophobicity, hydrophilicity, and/or the amphipathic nature of the amino acid residues involved. Amino acids can be grouped into the following six standard amino acid groups:

(1) hydrophobic: Met, Ala, Val, Leu, Ile;
(2) neutral hydrophilic: Cys, Ser, Thr, Asn, Gln;
(3) acidic: Asp, Glu;
(4) basic: His, Lys, Arg;
(5) residues that influence chain orientation: Gly, Pro; and
(6) aromatic: Trp, Tyr, Phe.

As used herein, "conservative substitutions" are defined as exchanges of an amino acid by another amino acid listed within the same group of the six standard amino acid groups shown above. For example, the exchange of Asp by Glu retains one negative charge in the so modified polypeptide. In addition, glycine and proline may be substituted for one another based on their ability to disrupt α-helices. Some preferred conservative substitutions within the above six groups are exchanges within the following sub-groups: (i) Ala, Val, Leu and Ile; (ii) Ser and Thr; (ii) Asn and Gln; (iv) Lys and Arg; and (v) Tyr and Phe. Given the known genetic code, and recombinant and synthetic DNA techniques, the skilled scientist readily can construct DNAs encoding the conservative amino acid variants.

As used herein, "non-conservative substitutions" or "non-conservative amino acid exchanges" are defined as exchanges of an amino acid by another amino acid listed in a different group of the six standard amino acid groups (1) to (6) shown above.

The term "nucleic acid" and "nucleic acid molecule" are used synonymously herein and are understood as single or double-stranded oligo- or polymers of deoxyribonucleotide or ribonucleotide bases or both. Nucleotide monomers are composed of a nucleobase, a five-carbon sugar (such as but not limited to ribose or 2'-deoxyribose), and one to three phosphate groups. Typically, a nucleic acid is formed through phosphodiester bonds between the individual nucleotide monomers, In the context of the present invention, the term nucleic acid includes but is not limited to ribonucleic acid (RNA) and deoxyribonucleic acid (DNA) molecules but also includes synthetic forms of nucleic acids comprising other linkages (e.g., peptide nucleic acids as described in Nielsen et al. (Science 254:1497-1500, 1991). Typically, nucleic acids are single- or double-stranded molecules and are composed of naturally occurring nucleotides. The depiction of a single strand of a nucleic acid also defines (at least partially) the sequence of the complementary strand. The nucleic acid may be single or double stranded, or may contain portions of both double and single stranded sequences. Exemplified, double-stranded nucleic acid molecules can have 3' or 5° overhangs and as such are not required or assumed to be completely double-stranded over their entire length. The nucleic acid may be obtained by biological, biochemical or chemical synthesis methods or any of the methods known in the art, including but not limited to methods of amplification, and reverse transcription of RNA. The term nucleic acid comprises chromosomes or chromosomal segments, vectors (e.g., expression vectors), expression cassettes, naked DNA or RNA polymer, primers, probes, cDNA, genomic DNA, recombinant DNA, cRNA, mRNA, tRNA, microRNA (miRNA) or small interfering RNA (siRNA). A nucleic acid can be, e.g., single-stranded, double-stranded, or triple-stranded and is not limited to any particular length. Unless otherwise indicated, a particular nucleic acid sequence comprises or encodes complementary sequences, in addition to any sequence explicitly indicated.

Nucleic acids may be degraded by endonucleases or exonucleases, in particular by DNases and RNases which can be found in the cell. It may, therefore, be advantageous to modify the nucleic acids of the invention in order to stabilize them against degradation, thereby ensuring that a high concentration of the nucleic acid is maintained in the cell over a long period of time. Typically, such stabilization can be obtained by introducing one or more internucleotide phosphorus groups or by introducing one or more non-phosphorus internucleotides. Accordingly, nucleic acids can be composed of non-naturally occurring nucleotides and/or modifications to naturally occurring nucleotides, and/or changes to the back bone of the molecule. Modified internucleotide phosphate radicals and/or non-phosphorus bridges in a nucleic acid include but are not limited to methyl phosphonate, phosphorothioate, phosphoramidate, phosphorodithioate and/or phosphate esters, whereas non-phosphorus internucleotide analogues include but are not limited to, siloxane bridges, carbonate bridges, carboxymethyl esters, acetamidate bridges and/or thioether bridges. Further examples of nucleotide modifications include but are not limited to: phosphorylation of 5 or 3° nucleotides to allow for ligation or prevention of exonuclease degradation/polymerase extension, respectively; amino, thiol, alkyne, or biotinyl modifications for covalent and near covalent attachments: fluorphores and quenchers; and modified bases such as deoxyInosine (dI), 5-Bromo-deoxyuridine (5-Bromo-dU), deoxy Uridine, 2-Aminopurine. 2,6-Diaminopurine, inverted dT, inverted Dideoxy-T, dideoxy Cytidine (ddC 5-Methyl deoxy Cytidine (5-Methyl dC), locked nucleic acids (LNA's), 5-Nitroindole, Iso-dC and -dG bases, 2-O-Methyl RNA bases, Hydroxmethyl dC, 5-hydroxy butynl-2'-deoxyuridine, 8-aza-7-deazaguanosineand Fluorine Modified Bases. Thus, the nucleic acid can also be an artificial nucleic acid which includes but is not limited to polyamide or peptide nucleic acid (PNA), morpholino and locked nucleic acid (LNA), as well as glycol nucleic acid (GNA) and threose nucleic acid (TNA).

The term "C-terminus" (also known as the carboxyl-terminus, carboxy-terminus, C-terminal tail, C-terminal end, or COOH-terminus) as referred to within the context of the present invention is the end of an amino acid chain (protein or polypeptide), terminated by a free carboxyl group (—COOH). When the protein is translated from messenger RNA, it is created from N-terminus to C-terminus- The term "N-terminus" (also known as the amino-terminus, $NH_2$-terminus, N-terminal end or amine-terminus) refers to the start of a protein or polypeptide terminated by an amino acid with a free amine group ($-NH_2$). The convention for writing peptide sequences is to put the N-terminus on the left and write the sequence from N- to C-terminus.

A "peptide linker" in the context of the present invention refers to an amino acid sequence, i.e. polypeptide, which sterically separates two parts within the engineered polypeptides of the present invention. Typically such peptide linker consists of between 1 and 100, preferably 3 to 50 more preferably 5 to 20 amino acids. Thus, such peptide linkers have a minimum length of at least 1, 2, 3, 4, 5, 6, 7, 8, 9, 10, 11, 12, 13, 14, 15, 16, 17, 18, 19, 20, 21, 22, 23, 24, 25, 26, 27, 28, 29, or 30 amino acids, and a maximum length of at least 100, 95, 90, 85, 80, 75, 70, 65, 60, 55, 50, 45, 40, 35, 34, 33, 32, 31, 30, 29, 28, 27, 26, 25, 24, 23, 22, 21, 20, 19, 18, 17, 16, or 15 amino acids or less. Peptide linkers may also provide flexibility among the two parts that are linked together. Such flexibility is generally increased, if the amino acids are small. Accordingly, flexible peptide linkers comprise an increased content of small amino acids, in particular of glycins and/or alanines, and/or hydrophilic amino acids such as serines, threonines, asparagines and glutamines. Preferably, more than 20%, 30%, 40%, 50%, 60% or more of the amino acids of the peptide linker are small amino acids.

The term "Fc part with increased or reduced effector function" refers to a Fc part, which can form a homodimer or heterodimer, and binds to the respective effector molecules either with increased or reduced affinity, thus altering the effector function, e.g. ADCC, CMC, or FcRn-mediated recycling. There are different IgG variants with altered interaction for human FcγRIIIa (CD16) described in literature (Presta et al., 2008), e.g. IgG1-DE (S239D, 1332E) resulting in 10-fold increased ADCC, or IgG1-DEL (S239D, 1332E, A330L) resulting in 100-fold increased ADCC. Besides increasing the effector function, there also Fc parts with reduced effector function described in the literature. For the IgG1-P329G LALA variant (L234S, L235A, P329G) almost complete abolished interaction with the whole Fcγ receptor family was reported, resulting in effector silent molecules (Schlothauer et al., 2016). In addition, reduced binding to FcγRI, which was described for the IgG-Aab variant (E233P, L234V, L235A, A236G, A327G, A330S. P331S) also resulted in reduced effector function (Armour et al., 1999) (also described in Strohl et al., 2009). Besides altering binding to receptors of immune cells (e.g.

human FcγRIIIa), also binding to FcRn can be altered by introducing substitutions in the Fc part. Due to increased (or reduced) binding to the FcRn molecule, half-life of the Fc-containing molecule is affected, e.g. IgG1-YTE (M252Y, S254T, T256E) resulting in 3-4 fold increased terminal half-life of the protein, or IgG1-QL (T250Q, M428L) resulting in 2.5-fold increased terminal half-life (Presto et al., 2008; Strohl et al., 2009).

The term "heterodimerizing Fc" part relates to variants of a Fc part, which are able to form heterodimers. Besides the knob-into-hole technology (chain 1: T366S, L368A, Y407V; chain 2: T366W) there are other variants of the Fc part described in literature for the generation of heterodimeric Fc parts (Krah et al., 2007; Ha et al., 2016; Mimoto et al., 2016; Brinkmann & Kontermann, 2017).

Embodiments

In the following different aspects of the invention are defined in more detail. Each aspect so defined may be combined with any other aspect or aspects unless clearly indicated to the contrary. In particular, any feature indicated as being preferred or advantageous may be combined with any other feature or features indicated as being preferred or advantageous.

In a first aspect, the present invention provides an antigen-binding protein complex comprising at least one dual binding module (DBM), and one homo- or hetero-dimerization module (HDM) and optionally a binding or effector module (BEM), wherein a. a first DBM module (DBM1) comprises two polypeptides, wherein the first polypeptide (P1) comprises a first dimerization domain (DD1) and a first variable heavy chain ($V_H1$) and a first variable light chain ($V_L1$), wherein said $V_H1$ and $V_L1$ are connected by a peptide linker (L1), with a length preventing binding of $V_H1$ and $V_L1$ to each other, and the second polypeptide (P2) comprises a second dimerization domain (DD2) and a second variable heavy chain ($V_H2$) and a second variable light chain ($V_L2$), wherein said $V_H2$ and $V_L2$ are connected by a peptide linker (L2), with a length preventing binding of $V_H2$ and $V_L2$, to each other and wherein VHI binds to $V_L2$ and $V_L1$ binds to $V_H2$ and each variable domain pair forms a binding site, and wherein DD1 specifically binds to DD2;

b. a second DBM module (DBM2), when present comprises two polypeptides, wherein the first polypeptide (P1') comprises a first dimerization domain (DD1') and a first variable heavy chain ($V_H1'$) and a first variable light chain ($V_L1'$), wherein said $V_H1'$ and $V_L1'$ are connected by a peptide linker (L1'), with a length preventing binding of $V_H1'$ and $V_L1'$ to each other, and the second polypeptide (P2') comprises a second dimerization domain (DD2') and a second variable heavy chain ($V_H2'$) and a second variable light chain ($V_L2'$), wherein said $V_H2'$ and $V_L2'$ are connected by a peptide linker (L2'), with a length preventing binding of $V_H2'$ and $V_L2'$ to each other, and wherein $V_H1'$ binds to $V_L2'$ and $V_L1'$ binds to $V_H2'$ and each variable domain pair forms a binding site, wherein DD1' specifically binds to DD2';

c. the BEM module, when present, comprises two polypeptides, wherein the third polypeptide (P3) comprises a third dimerization domain (DD3) and a third variable heavy chain domain ($V_H3$) and the fourth polypeptide (P4) comprises a fourth dimerization domain (DD4) and a third variable light chain ($V_L3$) domain, wherein $V_H3$ binds $V_L3$ and forms a binding site, wherein DD3 specifically binds to DD4;

d. at least one HDM module comprises two polypeptides, wherein:
  (i) in case no DBM2 or BEM are present:
    (a) the fifth polypeptide (P5) is covalently linked to P1 of DBM1 and comprises a fifth dimerization domain (DD5) and the sixth polypeptide (P6) comprises a sixth dimerization domain (DD6), which specifically binds to DD5; or
    (b) fifth polypeptide (P5) is covalently linked to P1 of DBM1 and comprises a fifth dimerization domain (DD5) and the sixth polypeptide (P6) is covalently linked to P2 of DBM1 and comprises a sixth dimerization domain (DD6), which specifically binds to DD5; or
  (ii) in case DBM2 or BEM are present the fifth polypeptide (P5) is covalently linked to P1 or P2 of DBM1 and comprises a fifth dimerization domain (DD5) and the sixth polypeptide (P6) is covalently linked to either P1' or P2' of DBM2 or either to P3 or P4 of the BEM and comprises a sixth dimerization domain (DD6), which specifically binds to DD5.

It is preferred that in each case the various polypeptides which are indicated to be linked to each other are linked by a peptide bond, i.e. form one polypeptide chain.

In a preferred embodiment, P5 essentially consists or consists of DD5.

In a preferred embodiment, P6 essentially consists or consists of DD6.

Given the various arrangements of the polypeptide outlined above it is preferred that from N- to C-terminus the polypeptide chain comprising the elements of the antigen binding protein complex are linked as follows:

(i) P1-P5, and P2 and P6 are not linked to each other;
(ii) P5-P1, and P2 and P6 are not linked to each other;
(iii) P1-P5, and P2-P6;
(iv) P5-P1, and P6-P2;
(v) P1-P5, and P3-P6;
(vi) P2-P5, and P3-P6;
(vii) P1-P5, and P4-P6;
(viii) P2-P5, and P4-P6;
(ix) P5-P1, and P6-P3;
(x) P5-P2, and P6-P3;
(xi) P5-P1, and P6-P4;
(xii) P5-P2, and P6-P4;
(xiii) P1-P5; and P1'-P6, and P2 and P2' are not linked to P5 or P6;
P2-P5; and P1'-P6, and P1 and P2' are not linked to P5 or P6: (xiv)
(xv) P1-P5; and P2'-P6, and P2 and P1' are not linked to P5 or P6;
(xvi) P2-P5; and P2'-P6, and P1 and P1' are not linked to P5 or P6;
(xvii) P5-P1; and P6-P1', and P2 and P2' are not linked to P5 or P6;
(xviii) P5-P2; and P6-P1', and P1 and P2' are not linked to P5 or P6;
(xix) P5-P1; and P6-P2', and P2 and P1' are not linked to P5 or P6;
(xx) P5-P1; and P6-P2', and P2 and P1' are not linked to P5 or P6;
(xxi) P1-P5, and P6-P2;
(xxii) P5-P1, and P2-P6;
(xxiii) P1-P5, and P6-P3;
(xxiv) P2-P5, and P6-P3;
(XXV) P1-P5, and P6-P4;
(xxvi) P2-P5, and P6-P4;

(xxvii) P5-P1, and P3-P6;
(xxviii) P5-P2, and P3-P6;
(xxix) P5-P1, and P4-P6;
(XXX) P5-P2, and P4-P6;
(xxxi) P1-P5; and P6-P1', and P2 and P2' are not linked to P5 or P6;
(xxxii) P2-P5; and P6-P1', and P1 and P2' are not linked to P5 or P6;
(xxxiii) P1-P5; and P6-P2', and P2 and P1' are not linked to P5 or P6;
(xxxiv) P2-P5; and P6-P2', and P1 and P1' are not linked to P5 or P6;
(xxxv) P5-P1; and P1'-P6, and P2 and P2' are not linked to P5 or P6;
(xxxvi) P5-P2; and P1'-P6, and P1 and P2' are not linked to P5 or P6;
(xxxvii) P5-P1; and P2'-P6, and P2 and P1' are not linked to P5 or P6; or
(xxxviii) P5-P1; and P2'-P6, and P2 and P1' are not linked to P5 or P6.

In a particular embodiment of the first aspect of the invention it is preferred that P1 and P2 and if present also P1', P2', P3 or P4 are located at the N-terminus of the linked polypeptide chains.

Thus in a particular embodiment of the first aspect of the invention, the antigen-binding protein complex comprises only one DBM, i.e. DBM1, and one HDM. In this embodiment P5 is covalently linked to P1 of DBM1 and comprises DD5 and P6 comprises, essentially consists of or consists of DD6, which specifically binds to DD5. P2 may be non-covalently associated with P1 through the interaction of DD1 and DD2 or additionally stabilized by Cys-Cys bonds, e.g. are in the arrangement as outlined above under (i) and (ii). It is preferred that further functional groups, in particular a pharmaceutical active moiety and/or an imaging molecule is coupled to the N- and/or C-terminus of DD6.

In another particular embodiment of the first aspect of the invention, the antigen-binding protein complex comprises only one DBM, i.e. DBM1, and one HDM. In this embodiment P5 is covalently linked to P1 of DBM1 and P6 is covalently linked to P2 of DBM1. If P1 and P2 are located N-terminally, e.g. are in the arrangement as outlined above under (iii), it is preferred that further functional groups, in particular to a pharmaceutical active moiety and/or an imaging molecule are coupled to the C-terminus of DD5 and/or DD6. This is the preferred arrangement. If P1 and P2 are located C-terminally, e.g. are in the arrangement as outlined above under (iv), it is preferred that further functional groups, in particular to a pharmaceutical active moiety and/or an imaging molecule are coupled to the N-terminus of DD5 and DD6.

In another particular embodiment of the first aspect of the invention, the antigen-binding protein complex comprises only one DBM, i.e. DBM1, one BEM and one HDM. In this embodiment polypeptides P1, P2, P3, P4, P5 and P6 can be positioned with the polypeptide chains as indicated in alternatives (v) to (xii). As noted above, it is preferred that P1, or P2 (depending on whether P1 or P2 is covalently linked to P5) and P3 or P4 (depending on whether P3 or P4 is covalently linked to P6) are all located at the N-terminus of the polypeptide chain. The respective polypeptide not mentioned above in alternatives (v) to (xii) may bind to the antigen-binding protein complex through its respective dimerization domain solely by non-covalent bonds linked or may additionally be stabilized by Cys-Cys bonds. If P1 or P2 and P3 or P4 are located N-terminally, e.g. are in the arrangement as outlined above under (v) to (viii), it is preferred that further functional groups, in particular to a pharmaceutical active moiety and/or an imaging molecule are coupled to the C-terminus of DD5 and DD6. This is the preferred arrangement. If P1 or P2 and P3 or P4 are located C-terminally, e.g. are in the arrangement as outlined above under (ix) to (xii), it is preferred that further functional groups, in particular to a pharmaceutical active moiety and/or an imaging molecule are coupled to the N-terminus of DD5 and DD6.

In another particular embodiment of the first aspect of the invention, the antigen-binding protein complex comprises two DBM, i.e. DBM1 and DBM2 and one HDM. In this embodiment polypeptides P1, P2, P1', P2', P5 and P6 can be positioned with the polypeptide chains as indicated in alternatives (xiii) to (xx). As noted above, it is preferred that P1, or P2 (depending on whether P1 or P2 is covalently linked to P5) and P1' or P2' (depending on whether P1' or P2' is covalently linked to P6) are all located at the N-terminus of the polypeptide chain. The respective polypeptide not mentioned above in alternatives (xiii) to (xvi) is non-covalently linked to the antigen-binding protein complex through its respective dimerization domain. If P1 or P2 and P1' or P2' are located N-terminally, e.g. are in the arrangement as outlined above under (xiii) to (xvi), it is preferred that further functional groups, in particular to a pharmaceutical active moiety and/or an imaging molecule are coupled to the N-terminus of DD5 and DD6. This is the preferred arrangement. If P1 or P2 and P1' or P2' are located C-terminally, e.g. are in the arrangement as outlined above under (xvii) to (xx), it is preferred that further functional groups, in particular to a pharmaceutical active moiety and/or an imaging molecule are coupled to the N-terminus of DD5 and DD6.

It should be understood that in any of above outlined basic arrangements of the antigen-binding protein complex there are free N-terminal and/or C-terminal ends of the polypeptide chains which are available for the attachment of further functional groups. Alternatively, or additionally functional groups, in particular pharmaceutical active moieties and/or an imaging molecules may be coupled to side chains of amino acids within the polypeptide chains such as Lys, Arg. Glu or Asp. Such functional groups include, for example DBMs and BEMs. Thus, even if it is indicated above that the antigen-binding protein complex comprises one or two DBMs this does not exclude that it comprises one or more further DBMs and/or BEMs coupled to the N- and/or C-terminal and/or the side chain of an internal amino acid.

Each DBM comprises two variable light and variable heavy chains, wherein the Vu chain of P1, and if present P1' interacts with a $V_L$ chain of P2, and if present P2' and a $V_L$ chain of P1, and if present P1' interacts with a $V_H$ chain of P2, and if present P2' to form a bivalent binding complex. Thus, the respective $V_L$ and $V_H$ chains are arranged in P1, and if present in P1' to interact with the respective $V_H$ and $V_L$ in P2, and if present in P2'. To ascertain that the $V_L$ and $V_H$ within one polypeptide, e.g. the $V_L$ and $V_H$ chains of P1 do not fold to interact with each other the $V_L$ and $V_H$ chains are connected by a peptide linker "L" that has a length that disfavor or prevents the intrachain interaction of $V_L$ and $V_H$ and, thus favors the interchain interaction between $V_L$ and $V_H$ chains on, e.g. P1 and P2 or P1' and P2'. The skilled person can easily determine suitable lengths of L that disfavors or prevents intrachain interaction of $V_L$ and $V_H$ within one polypeptide chain.

In a preferred embodiment of the first aspect of the invention, L1, L2 and optionally L1', and/or L2' has a length of between 4 to 12 amino acids, i.e. 4, 5, 6, 7, 8, 9, 10, 11, or 12, preferably of 4 to 10, more preferably 4 to 8, most preferably 5. It is preferred that the length of L1 and L2 and/or L1' and L2' are identical. In a particular embodiment L1, L1', L2 and/or L2' are GGGGS (SEQ ID NO: 1).

The C-terminal end of each $V_H$ specified herein, is in each case defined by the C-terminal sequence TVSS (SEQ ID NO: 10). The C-terminal end of each $V_L$-λ specified herein, is in each case defined by the C-terminal sequence TVL (SEQ ID NO: 11). The C-terminal end of each $V_L$-κ specified herein, is in each case defined by the C-terminal sequence IK (SEQ ID NO: 12). Preferably, the N-terminus of each $V_H$, $V_L$-λ and $V_L$-κ is EVQ, QVQ, SEL, SQS, DIQ or QAG, On the basis of the above defined C-terminal and N-terminal sequences of the various $V_H$, $V_L$-λ and $V_L$-κ the skilled person can determine the exact length of a peptide linker connecting $V_H$, $V_L$-λ and $V_L$-λ, respectively.

In a preferred embodiment of the first aspect of the invention, the variable domains of P1 and P2 of DBM1 (referred to as VHI, $V_L$1 for P1 and $V_L$2, $V_H$2 for P2) and optionally the variable domains of DBM2 are arranged as follows from N- to C-terminus:

(i) $V_H$1-L1-$V_L$1 and $V_L$2-L2-$V_H$2; or
(ii) $V_L$1-L1-VHI and $V_H$2-L2-$V_L$2; or
(iii) $V_H$1-L1-$V_L$1 and $V_H$2-L2-$V_L$2; or
(iv) $V_L$1-L1-VHI and $V_L$2-L2-$V_H$2 and optionally, if present
(v) $V_H$1'-L1'-$V_L$1' and $V_L$2'-L2'-$V_H$2'; or
(vi) $V_L$1'-L1'-$V_H$1' and $V_H$2'-L2'-$V_L$2'; or
(vii) $V_H$1'-L1'-$V_L$1' and $V_H$2'-L2'-$V_L$2'; or
(ix) $V_L$1'-L1'-$V_H$1' and $V_L$2'-L2'-$V_H$2'.

In another preferred embodiment of the first aspect of the invention, the variable domains of DBM1 are arranged as follows from N- to C-terminus: $V_H$1-L1-$V_L$1 and $V_H$2-L2-$V_L$2.

In another preferred embodiment of the first aspect of the invention, the variable domains of DBM1 and DBM2 are arranged as follows from N- to C-terminus: $V_H$1-L1-$V_L$1 and $V_H$2-L2-$V_L$ and $V_H$1'-L1'-$V_L$1' and $V_H$2'-L2'-$V_L$2'. Within P1 and P2, and if present P1' and P2', respectively, it is preferred if the variable domains are located at the N-terminus and DD1, DD2, and if present DD1' and DD2' at the C-terminus.

In any of above outlined arrangements it is possible that DD1 and DD2, and if present DD1', DD2' are located at the C-terminus of the two variable domains or at the N-terminus of the two variable domains. The former is preferred, when P5 and P6 are located at the C-terminus of P1, P2, P1' and/or P2' as the case may be (see, e.g. above arrangements (i), (iii), (v) to (viii) and (xiii) to (xvi)). If DD1 and DD2 are located at the N-terminus of the two variable domains, it is preferred that P5 and P6 are located at the N-terminus of P1, P2, P1' and/or P2' as the case may be (see, e.g. above arrangements (ii), (iv), (ix) to (xii) and (xvii) to (xx)). Out of those two the arrangements (i), (iii), (v) to (viii) and (xiii) to (xvi) are particularly preferred in which DD1 and DD2 are located at the C-terminus of the two variable domains.

It is particularly preferred, that in any of above outlined arrangements (i) to (iv), (xiii) to (xxii) and (xxxi) to (xxxviii), DD1 and DD2 are located at the C-terminus of the two variable domains irrespective of whether P5 and P6 are located at the N-terminus of P1, P2, P1' or P2' or whether P5 and P6 are located at the C-terminus of P1, P2, P1' and/or P2'.

If the antigen-binding complex of the present invention comprises BEM and, thus P3 and P4, it is possible that DD3 and DD4 are located at the C-terminus of the variable domain or at the N-terminus of the variable domain. The former is preferred, when P6 is located at the C-terminus of P3 or P4 as the case may be (see, e.g. above arrangements (v) to (viii)). If DD3 and DD4 are located at the N-terminus of the variable domain, it is preferred that P6 is located at the N-terminus of P3 or P4 as the case may be (see, e.g. above arrangements (ix) to (xii)). Out of those two the arrangements (v) to (viii) are particularly in which DD3 and DD4 are located at the C-terminus of the respective variable domain.

It is particularly preferred, that in any of above outlined arrangements (v) to (xii) and (xxiii) to (xxx), DD3 and DD4 are located at the C-terminus of the variable domain irrespective of whether P6 is located at the N-terminus of P3 or P4 or whether P6 is located at the C-terminus of P3 or P4.

In one embodiment, within P1 and P2, and if present P1' and P2' an additional peptide linker connects the variable domain to the DD1 and DD2, and if present DD1' and DD2'. If present such a peptide linker can have a length between 1 to 15 amino acids, preferably between 1 to 10 amino acids, more preferably 1 to 5 amino acids, most preferably such a peptide linker has a length of 1, 2 or 3 amino acids.

However, the present inventors have found that within P1 and P2, and if present P1' and P2' no additional peptide linker is required to connect the variable domains, which each comprise a linker between the light and heavy chain, to the DD1 and DD2, and if present DD1' and DD2'. This is advantageous because any peptide linker or peptide linker junction with a variable domain or dimerization domain may create a new epitope that can create a detrimental immune response. Additionally, the omission of a peptide linker between the dimerization domain and the variable domains facilitates the rapid exchange of the variable domains in different constructs without the need for optimization of peptide linker length. To determine whether P1 comprises no peptide linker between DD1 and the variable domain ($V_H$1 or $V_L$1 depending on the orientation of $V_H$1 and $V_L$1 within P1) it is necessary to determine the respective N- and C-terminal sequence. Of the variable domain and the dimerization domain. The N- and C-terminal end of $V_H$ and $V_L$ are well known in the art and have been outlined above. Depending on the respective dimerization domain the C-terminus and N-terminus of the dimerization domain may vary. If the dimerization domain is derived from a naturally occurring protein, e.g. an immunoglobulin, the dimerization domain is, preferably, directly linked to the variable domain in the sense of the present invention, i.e. linked without a peptide linker, if there are no non-naturally occurring amino acids at its C- or N-terminus.

Accordingly, in a particular embodiment of the first aspect of the invention. $V_H$1 or $V_L$1 is linked to DD1 and optionally $V_H$1' and $V_L$1' is directly linked to DD1' and/or $V_H$2 or $V_L$2 is directly linked to DD2 and optionally $V_H$2' and $V_L$2' is linked to DD2'. Preferably. $V_H$1 or $V_L$1 is linked to DD1 and $V_H$1' and $V_L$1' is directly linked to DD1' and/or $V_H$2 or $V_L$2 is directly linked to DD2 and optionally $V_H$2' and $V_L$2' is linked to DD2'. Preferably. $V_H$1 or $V_L$1 is linked to DD1 and optionally $V_H$1' and $V_L$1' is directly linked to DD1' and/or $V_H$2 or $V_L$2 is directly linked to DD2 and $V_H$2' and $V_L$2' is linked to DD2'. Preferably. $V_H$1 or $V_L$1 is linked to DD1 and optionally $V_H$1' and $V_L$1' is directly linked to DD1' and $V_H$2 or $V_L$2 is directly linked to DD2 and optionally $V_H$2' and $V_L$' is linked to DD2'. Preferably. $V_H$1 or $V_L$1 is linked to DD1 and optionally $V_H$1' and $V_L$1' is directly linked to DD1' or $V_L$2 or $V_L$2 is directly linked to DD2 and optionally $V_H$2' and $V_L$2' is linked to DD2'. Preferably. $V_H$1 or $V_L$1 is linked to DD1 and $V_H$1' and $V_L$1' is directly linked to DD1' and $V_H$2 or $V_L$2 is directly linked to DD2 and optionally $V_H$2' and $V_L$2' is linked to DD2'. Preferably. $V_H$1 or $V_L$1 is linked to DD1 and V$_H$1' and V$_L$1' is directly linked to DD1' or V$_H$2 or V$_L$2 is directly linked to DD2 and optionally V$_H$2' and V$_L$2' is linked to DD2'. Preferably. V$_H$1 or V$_L$1 is linked to DD1 and optionally V$_H$1' and V$_L$1' is directly linked to DD1' and V$_H$2 or V$_L$2 is directly linked to DD2 and V$_H$2' and V$_L$2' is linked to DD2'. Preferably. V$_H$1 or V$_L$1 is linked to DD1 and optionally V$_H$1' and V$_L$1' is directly linked to DD1' or V$_H$2 or V$_L$2 is directly linked to DD2 and V$_H$2' and V$_L$2' is linked to DD2'. Preferably. V$_H$1 or V$_L$1 is linked to DD1 and V$_H$1' and V$_L$1' is directly linked to DD1' and V$_H$2 or V$_L$2 is directly linked to DD2 and V$_H$2' and V$_L$2' is linked to DD2'. Preferably. V$_H$1 or V$_L$1 is linked to DD1 and V$_H$1' and V$_L$1' is directly linked to DD1' or V$_H$2 or V$_L$2 is directly linked to DD2 and V$_H$2' and V$_L$2' is linked to DD2''.

The omission of a peptide linker is particularly preferred, if the dimerization domains DD1 and DD2, and if present DD1' and DD2' are CH1/CL, EHD2, hetEHD2. MHD. It is noted that in the example section when EHD2, hetEHD2, or MHD is used as DD1 and DD2, and if present DD1' and DD2' there is 2 amino acid long peptide linker between V$_L$ and DD, which is a cloning artifact.

In a preferred embodiment of the first aspect of the invention, the pair of DD1 and DD2 of DBM1 and optionally the pair of DD1' and DD2' of DBM2 or DD3 and DD4 of BEM are homodimers or heterodimers. Preferably, the homodimers or heterodimers are in each case independently selected from:
  a. CH2 domains of IgE (EHD2);
  b. CH2 domains of IgM (MHD2);
  c. CH3 domains of IgG, IgA or IgD;
  d. CH4 domains of IgE or IgM;
  e. CL and CH1;
  f. heterodimerizing variants of EHD2 or MHD2, in particular het1EHD2(EHD2(C247S)/EHD2(C337S)) or het2EHD2(EHD2(C337S)/EHD2(C247S));
  g. heterodimerizing variants of CH3 grafted with C$_H$1/C$_L$, FcRnα3 (SEQ ID NO: 4)/β2-microglobulin (SEQ ID NO: 5), HLA-A (SEQ ID NO: 6)/β2-microglobulin (SEQ ID NO: 5), HLA-Bα3 (SEQ ID NO: 7)/β2-microglobulin (SEQ ID NO: 5), or HLA-Dα2 (SEQ ID NO: 8)/HLA-DB2 (SEQ ID NO: 9);
  h. heterodimerizing variants of C$_H$1/C$_L$ grafted with TCRα (SEQ ID NO: 2)/TCRβ (SEQ ID NO: 3);
  i. T-cell receptor α (TCRα) and T-cell receptor β (TCRβ); or
  j. heterodimerizing variants of C$_H$1/C$_L$, in particular CR3 (C$_H$1 substituted with T192E; CL substituted with N137K), MUT4 (C$_H$1 substituted with L143Q and S188V; CL substituted with V133T and S176V), or DuetMab (C$_H$1 substituted with F126C; C$_L$ substituted with S121C).

In another preferred embodiment of the first aspect of the invention, the pair of DD1 and DD2 of DBM1 and optionally the pair of DD1' and DD2' of DBM2 or DD3 and DD4 of BEM are homodimers. Preferably, the homodimers are in each case independently selected from:
  a. CH2 domains of IgE (EHD2);
  b. CH2 domains of IgM (MHD2);
  c. CH3 domains of IgG, IgA or IgD; or
  d. CH4 domains of IgE or IgM.

In another preferred embodiment of the first aspect of the invention, the pair of DD1 and DD2 of DBM1 and the pair of DD1' and DD2' of DBM2 are homodimers. Preferably, the homodimers are in each case independently selected from:
  a. CH2 domains of IgE (EHD2);
  b. CH2 domains of IgM (MHD2);
  c. CH3 domains of IgG, IgA or IgD; or
  d. CH4 domains of IgE or IgM.

In another preferred embodiment of the first aspect of the invention, the pair of DD1 and DD2 of DBM1 and the pair of DD3 and DD4 of BEM are homodimers. Preferably, the homodimers are in each case independently selected from:
  a. CH2 domains of IgE (EHD2);
  b. CH2 domains of IgM (MHD2);
  c. CH3 domains of IgG, IgA or IgD; or
  d. CH4 domains of IgE or IgM.

In another preferred embodiment of the first aspect of the invention, the pair of DD1 and DD2 of DBM1 and optionally the pair of DD1' and DD2' of DBM2 or DD3 and DD4 of BEM are heterodimers. Preferably, the heterodimers are in each case independently selected from:
  a. CL and CH1;
  b. heterodimerizing variants of EHD2 or MHD2, in particular het1EHD2(EHD2(C247S)/EHD2 (C337S)) or het2EHD2(EHD2(C337S)/EHD2(C247S));
  c. heterodimerizing variants of C$_H$3 grafted with C$_H$1/C$_L$, FcRnα3 (SEQ ID NO: 4)/β2-microglobulin (SEQ ID NO: 5), HLA-A (SEQ ID NO: 6)/β2-microglobulin (SEQ ID NO: 5), HLA-Bα3 (SEQ ID NO: 7)/β2-microglobulin (SEQ ID NO: 5), or HLA-Dα2 (SEQ ID NO: 8)/HLA-DB2 (SEQ ID NO: 9);
  d. heterodimerizing variants of C$_H$1/C$_L$ grafted with TCRα (SEQ ID NO: 2)/TCRβ (SEQ ID NO: 3);
  e. T-cell receptor α (TCRα) and T-cell receptor β (TCRβ); or
  f. heterodimerizing variants of C$_H$1/C$_L$, in particular CR3 (C$_H$1 substituted with T192E; C$_L$ substituted with N137K), MUT4 (C$_H$1 substituted with L143Q and S188V; C$_L$ substituted with V133T and S176V), or DuetMab (C$_H$1 substituted with F126C; C$_L$ substituted with S121C).

In another preferred embodiment of the first aspect of the invention, the pair of DD1 and DD2 of DBM1 and the pair of DD1' and DD2' of DBM2 are heterodimers. Preferably, the heterodimers are in each case independently selected from:
  a. CL and CH1;
  b. heterodimerizing variants of EHD2 or MHD2, in particular het1EHD2(EHD2(C247S)/EHD2(C337S)) or het2EHD2 (EHD2(C337S)/EHD2(C247S));
  c. heterodimerizing variants of C$_H$3 grafted with C$_H$1/C$_L$, FcRnα3 (SEQ ID NO: 4)/2-microglobulin (SEQ ID NO: 5), HLA-A (SEQ ID NO: 6)/β2-microglobulin (SEQ ID NO: 5), HLA-Bα3 (SEQ ID NO: 7)/β2-microglobulin (SEQ ID NO: 5), or HLA-Dα2 (SEQ ID NO: 8)/HLA-DB2 (SEQ ID NO: 9);
  d. heterodimerizing variants of C$_H$1/C$_L$ grafted with TCRα (SEQ ID NO: 2)/TCRβ (SEQ ID NO: 3);
  e. T-cell receptor α (TCRα) and T-cell receptor β (TCRβ); or
  f. heterodimerizing variants of C$_H$1/C$_L$, in particular CR3 (C$_H$1 substituted with T192E; C$_L$ substituted with N137K), MUT4 (C$_H$1 substituted with L143Q and S188V; C$_L$ substituted with V133T and S176V), or DuetMab (C$_H$1 substituted with F126C; C$_L$ substituted with S121C).

In another preferred embodiment of the first aspect of the invention, the pair of DD1 and DD2 of DBM1 and the pair of DD3 and DD4 of BEM are heterodimers. Preferably, the heterodimers are in each case independently selected from:
  a. C$_L$ and CH1;
  b. heterodimerizing variants of EHD2 or MHD2, in particular het1EHD2(EHD2(C247S)/EHD2(C337S)) or het2EHD2(EHD2(C337S)/EHD2(C247S));

c. heterodimerizing variants of $C_H3$ grafted with $C_H1/C_L$, FcRnα3 (SEQ ID NO: 4)/β2-microglobulin (SEQ ID NO: 5), HLA-A (SEQ ID NO: 6)/β2-microglobulin (SEQ ID NO: 5), HLA-Bα3 (SEQ ID NO: 7)/β2-microglobulin (SEQ ID NO: 5), or HLA-Dα2 (SEQ ID NO: 8)/HLA-DB2 (SEQ ID NO: 9);

d. heterodimerizing variants of $C_H1/C_L$ grafted with TCRα (SEQ ID NO: 2)/TCRβ (SEQ ID NO: 3);

e. T-cell receptor α (TCRα) and T-cell receptor β (TCRβ); or f. heterodimerizing variants of $C_H1/C_L$, in particular CR3 ($C_H1$ substituted with T192E; $C_L$ substituted with N137K), MUT4 ($C_H1$ substituted with L143Q and S188V; $C_L$ substituted with V133T and S176V), or DuetMab ($C_H1$ substituted with F126C; $C_L$ substituted with S121C).

In a preferred embodiment of the first aspect of the invention, the pair of DD5 and DD6 are homodimers. More preferably, the homodimers are in each case independently selected from:

a. Fc-part and effector-modified variants thereof (increased or reduced effector function), in particular G1Δab variant (E233P, L234V, L235A, ΔG236, A327G, A330S, P331S) of an antibody;
b. CH2 domains of IgE (EHD2);
c. CH2 domains of IgM (MHD2);
d. CH3 domains of IgG, IgA or IgD; or e. $C_H4$ domains of IgE or IgM.

In another preferred embodiment of the first aspect of the invention, the pair of DD5 and DD6 are heterodimers. More preferably, the heterodimers are in each case independently selected from:

a. a heterodimerizing Fc-part of an antibody, in particular a knob-in-hole variant of a Fc-part; preferably variants with modified, i.e. increased or decreased effector function;

b. heterodimerizing variants of EHD2 or MHD2, in particular het1EHD2 (EHD2(C247S)/EHD2(C337S)) or het2EHD2 (EHD2(C337S)/EHD2(C247S));

c. heterodimerizing variants of $C_H3$ grafted with $C_H1/C_L$, FcRnα3 (SEQ ID NO: 4)/β2-microglobulin (SEQ ID NO: 5), HLA-A (SEQ ID NO: 6)/β2-microglobulin (SEQ ID NO: 5), HLA-Bα3 (SEQ ID NO: 7)/β2-microglobulin (SEQ ID NO: 5), or HLA-Dα2 (SEQ ID NO: 8)/HLA-DB2 (SEQ ID NO: 9);

d. heterodimerizing variants of $C_H1/C_L$ grafted with TCRα (SEQ ID NO: 2)/TCRβ (SEQ ID NO: 3);

e. T-cell receptor α (TCRα) and T-cell receptor β (TCRβ); or f. heterodimerizing variants of $C_H1/C_L$, in particular CR3 ($C_H1$ substituted with T192E; $C_L$ substituted with N137K), MUT4 ($C_H1$ substituted with L143Q and S188V; $C_L$ substituted with V133T and S176V), or DuetMab ($C_H1$ substituted with F126C; $C_L$ substituted with S121C). More preferably, the homodimers or heterodimers are Fc-part and effector-modified variants thereof (increased or reduced effector function), in particular G1Δab variant (E233P, L234V, L235A, ΔG236, A327G, A330S, P331S) of an antibody.

In a preferred embodiment of the first aspect of the invention:
a. DD1/DD2≠DD5/DD6;
b. DD1/DD2=DD1'/DD2'≠DD5/DD6;
c. DD1/DD2≠DD1'/DD2'≠DD5/DD6;
d. DD1/DD2=DD3/DD4≠DD5/DD6; or
e. DD1/DD2≠DD3/DD4≠DD5/DD6.

In a preferred embodiment, DD1/DD2≠DD5/DD6. In another preferred embodiment, DD1/DD2=DD1'/DD2'≠DD5/DD6. In another preferred embodiment, DD1/DD2≠DD1'/DD2'≠DD5/DD6. In another preferred embodiment, DD1/DD2=DD3/DD4≠DD5/DD6. In another preferred embodiment, DD1/DD2≠DD3/DD4≠DD5/DD6.

In a preferred embodiment of the first aspect of the invention, the antigen-binding protein complex is:
a. bivalent and mono- or bi-specific;
b. trivalent and mono, bi or tri-specific; or
c. tetravalent and mono-, bi-, tri- or tetra-specific.

Preferably, the antigen-binding protein complex of the invention is bivalent and monospecific. Preferably, the antigen-binding protein complex of the invention is bivalent and bispecific. The bivalent formats can be generated as monospecific and bispecific molecules using either a monospecific or a bispecific diabody moiety (FIG. 9). For the generation of these different bivalent molecules, different dimerization modules can be used (FIG. 10). Preferably, the antigen-binding protein complex of the invention is trivalent and monospecific. Preferably, the antigen-binding protein complex of the invention is trivalent and bispecific. Preferably, the antigen-binding protein complex of the invention is trivalent and trispecific. The trivalent molecules can be generated by using all three described modules (DBM+HDM and BEM+HDM). Alternatively, in the absence of a BEM the diabody moiety of DBM can be combined with a monovalent antigen-binding molecule (pharmaceutical moiety: e.g. Fab or scFv) (FIG. 11) attached to P6 to create a trivalent molecule. In case of the combination of diabody and Fab, different possibilities of the dimerization domains for DBM P6 can be used. A combinatorial overview of the dimerization domains of mono-, bi- and trispecific molecules is shown in FIG. 12 (using hetero-dimerization domain in BEM) and FIG. 13 (using homo-dimerization modules in BEM). As the combination of a diabody with a scFv results in only one dimerization domain (DBM) in the molecules, the diversity of these molecules is reduced compared to the Db-Fab molecules (FIG. 14).

Preferably, the antigen-binding protein complex of the invention is tetravalent and monospecific. Preferably, the antigen-binding protein complex of the invention is tetravalent and bispecific. Preferably, the antigen-binding protein complex of the invention is tetravalent and trispecific. Preferably, the antigen-binding protein complex of the invention is tetravalent and tetraspecific. Tetravalent molecules can be generated by using two diabody moieties, each located in the DBM1 and DBM2 module. Using a heterodimeric Fc part, mono-, bi-, tri-, and tetraspecific molecules can be generated (FIG. 15). Two dimerization modules, located in DBM1 and DBM2, are used for the generation of tetravalent molecules. The monospecific tetravalent molecules obtain a symmetric architecture, for which reason all combinations of the different dimerization domains (for DBM1 and DBM2), including the usage of the same dimerization domain in both modules, result in the correct assembly of the molecules (FIG. 16; using hetero-dimerization modules in DBM2) (FIG. 17: using homo-dimerization domains in DBM2). In addition, same possibilities of the dimerization domains can be used for the generation of symmetric tetravalent, bispecific molecules (FIG. 18: using hetero-dimerization domains in DBM2) (FIG. 19; using homo-dimerization domains in DBM2). Different dimerization domains (for DBM1 and DBM2) can be used to generate asymmetric tetravalent, bispecific molecules. The tetravalent, trispecific (FIG. 20; using hetero-dimerization domains in DBM2+FIG. 21: using homo-dimerization domains in DBM2) and tetraspecific (FIG. 22: using hetero-dimerization domains in DBM2+FIG. 23: using homo-dimerization domains in DBM2) molecules also obtain an asymmetric architecture. Thus, different dimerization modules (for DBM1 and DBM2) have to be used for the generation of correct assembled molecules.

The antigen-binding protein complex of the invention may be used to target pharmaceuticals or imaging molecules to particular tissues or cells within the body of a patient. Accordingly, in a preferred embodiment of the first aspect of the invention, the antigen-binding protein complex further comprises at least one pharmaceutical active moiety and imaging molecule. In another preferred embodiment of the first aspect of the invention, the antigen-binding protein complex further comprises at least one pharmaceutical active moiety or imaging molecule. The pharmaceutical active moiety and imaging molecule may be covalently or non-covalently coupled to the antigen-binding protein complex. Preferably, the pharmaceutically active moiety is coupled covalently to one of the polypeptide chains of the antigen binding protein complex. Preferably, it may be coupled to an amino acid side chain, e.g. of an amino acid with a free carboxy or amino group or to a free N- or C-terminus of one of the polypeptide chains of the antigen-binding protein complex.

In a preferred embodiment of the first aspect of the invention, the pharmaceutical active moiety is selected from the group consisting of ligands, and effector molecules.

In a preferred embodiment of the first aspect of the invention, the pharmaceutical active moiety is a ligand and the ligand is selected from the group consisting of antigen-binding molecules, scaffold proteins, natural ligands, ligand-binding receptor fragments, and aptamers, preferably, preferably the antigen-binding molecule is selected from the group consisting of an antibody fragment, a Fab fragment, a Fab' fragment, a heavy chain antibody, a single-domain antibody (sdAb), variable domain of a heavy chain antibody. VHH. Nanobodies, a single-chain variable fragment (scFv), a tandem scFv, a bispecific T-cell engager (BiTEs), a single-chain diabody, a DART, a triple body, a nanoantibody, an alternative scaffold protein and a fusion protein thereof. More preferably, the ligand is a scFv.

In a preferred embodiment of the first aspect of the invention, the pharmaceutical active moiety is an effector molecule and the effector molecules, i.e. small molecules, peptides or polypeptides that bind to a protein and thereby alter the activity of that protein, include but are not limited to cytokines, chemokines, immuno (co)-stimulatory molecules, immunosuppressive molecules, death ligands, apoptosis-inducing proteins, enzymes (e.g. kinases) prodrug-converting enzymes. RNases, agonistic antibody or antibody fragment, antagonistic antibody or antibody fragment, toxins, growth factors, hormone, coagulation factor, fibrinolytic protein, peptides mimicking these, and fragments, fusion proteins or derivatives thereof.

In preferred embodiments, cytokines are interleukins and/or interferons. Interleukins (IL) include but are not limited to Interleukin-1, Interleukin-2, Interleukin-3, Interleukin-4, Interleukin-5, Interleukin-6, Interleukin-7, Interleukin-8, Interleukin-9, Interleukin-10, Interleukin-11, Interleukin 12, Interleukin-13, Interleukin-14, Interleukin-15. Interleukin-16, Interleukin-17, Interleukin-18, Interleukin-19, Interleukin-20, Interleukin-21. Interleukin-22, Interleukin-23, Interleukin-24, Interleukin-25, Interleukin-26 Interleukin-27. Interleukin-28, Interleukin-29, Interleukin-30, Interleukin-31, Interleukin-32, Interleukin-33. Interleukin-34 and Interleukin-35. Interferons (IFN) include but are not limited to interferon type I (e.g. IFN-α. IFN-β and IFN-ω), interferon type II (e.g. IFN-γ), and interferon type III. In particular included are interferon α1, interferon α2, interferon α4, interferon α5, interferon α6, interferon α7, interferon α8, interferon α10), interferon α13, interferon α14, interferon α16, interferon α17, interferon α21, interferon β1. TNF. TRAIL, and FasL In preferred embodiments chemokines include but are not limited to CC chemokines. CXC chemokines. C chemokines, and CX3C chemokines. In particular chemokine include but are not limited to CCL1, CCL2, CCL3, CCL4, CCL5, CCL6, CCL7, CCL8, CCL9/CCL10, CCL11, CCL12, CCL13, CCL14, CCL15, CCL16, CCL17, CCL18, CCL19, CCL20, CCL21, CCL22, CCL23, CCL24, CCL25, CCL26, CCL27, CCL28, CXCL1, CXCL2, CXCL3, CXCL4, CXCL5, CXCL6, CXCL7, CXCL8, CXCL9, CXCL10, CXCL11, CXCL12, CXCL13, CXCL14, CXCL15, CXCL16, CXCL17, XCL1, XCL2, and CX3CL1.

In preferred embodiments, immuno-(co) stimulatory proteins include but are not limited to B7.1. B7.2, 4-1BBL, LIGHT, ICOSL, GITRL, CD27L, CD40L, OX40L, PD-L1, PD-L2 and CD70, and derivatives thereof.

Immuno-suppressive proteins preferably include but are not limited to IL1-Ra, IL-10, CTLA-4, PD-1, PD-L1, and PD-L2 and toxins preferably include but are not limited to Pseudomonas exotoxin A, Diphtheria toxin and ricin. Preferably, the toxin is not diphtheria toxin.

In preferred embodiments apoptosis-inducing proteins include but are not limited to Bid, Bik, Puma, and Bim, and proapoptotic cytokines (death ligands) such as but not limited to TNF, ScTNF, TRAIL, scTRAIL, and FasL and derivatives thereof.

In preferred embodiments enzymes include but are not limited to oxidoreductases, transferases, hydrolases, lyases, isomerases, ligases. Kinases include but are not limited to AGC kinases such as PKA, PKC and PKG, CaM kinases such as calcium/calmodulin-dependent protein kinases and serine/threonine protein kinases (e.g. DAPK2), CK1 such as the casein kinase 1 group, CMGC such as CDK, MAPK, GSK3 and CLK kinases, STE such as homologs of yeast Sterile 7, Sterile 11, and Sterile 20 kinases, tyrosine kinases (TK), the tyrosine-kinase like group of kinases (TKL), receptor-associated tyrosine kinases, MAP kinases, and histidine kinases.

Pro-drug-converting enzymes include but are not limited to esterases such as but not limited to acetylesterase, thiolester hydrolases, phosphoric monoester hydrolases, phosphoric diester hydrolases, triphosphoric monoester hydrolases, sulfuric ester hydrolases (sulfatases), diphosphoric monoester hydrolases, and phosphoric triester hydrolases: phosphatases such as but not limited to tyrosine-specific phosphatases, serine/threonine specific phosphatases, dual specificity phosphatases, histidine phosphatase, and lipid phosphatase; and reductases such as but not limited to 5-alpha reductase, dihydrofolate reductase, HMG-COA reductase, methemoglobin reductase, ribonucleotide reductase, thioredoxin reductase, *E, coli* nitroreductase, methylenetetrahydrofolate reductase, and carboxypeptidase G2, cytosine deaminase, nitroreductase, thymidine kinase and derivatives thereof.

RNAses include endoribonucleases such as but are not limited to RNase A, RNase H, RNase I, RNase III, RNase L, RNase P. RNase PhyM, RNase T1, RNase T2, RNase U2, RNase V1, and RNase V, and exoribonucleases such as but not limited to Polynucleotide Phosphorylase (PNPase), RNase PH, RNase II, RNase R, RNase D, RNase T, Oligoribonuclease Exoribonuclease I, and Exoribonuclease II and derivatives thereof.

In preferred embodiments growth factors include but are not limited to Adrenomedullin (AM). Angiopoietin (Ang). Autocrine motility factor. Bone morphogenetic proteins (BMPs). Brain-derived neurotrophic factor (BDNF). Epidermal growth factor (EGF). Erythropoietin (EPO). Fibroblast growth factor (FGF). Glial cell line-derived neurotrophic factor (GDNF). Granulocyte colony-stimulating factor (G-CSF). Granulocyte macrophage colony-stimulating factor (GM-CSF). Growth differentiation factor-9) (GDF9). Hepatocyte growth factor (HGF). Hepatoma-derived growth factor (HDGF). Insulin-like growth factor (IGF). Migration-stimulating factor Myostatin (GDF-8). Nerve growth factor (NGF) and other neurotrophins. Platelet-derived growth factor (PDGF). Thrombopoietin (TPO). Transforming growth factor alpha (TGF-α). Transforming growth factor beta (TGF-β). Vascular endothelial growth factor (VEGF). Wnt Signaling Pathway, and placental growth factor (PlGF).

In preferred embodiments, coagulation factors include but are not limited to Thrombin. Factor V, Factor VII, Factor VIII, Factor IX, Factor X, Factor XI, Factor XII and Factor XIII, and active fragments or derivatives thereof.

In preferred embodiments fibrinolytic proteins include but are not limited to plasmin. urokinase, plasminogen, α2-antiplasmin, tissue-plasminogen activator (t-PA), and plasminogen activator inhibitor-1 (PAI-1) and derivatives thereof.

In a preferred embodiment of the first aspect of the invention, targets of the antigen binding site of the binding molecule are targets that are overexpressed on tumor cells and include receptor-tyrosine-kinases, such as EGFR, HER2, HER3, HER4, ROR1, ROR2, cMET. AXL, RET, ALK, FGFR2 and IGF-IR, members of the TNF receptor-superfamily, such as DR4, DR5. Fas, TNFR1 and TNER2, or are overexpressed on cells of the tumor-microenvironment, such as FAP and CD105.

In another preferred embodiment of the first aspect of the invention, targets of the antigen binding site of the binding molecule are targets that are expressed by cells of the immune system to regulate their activity, such as CD3, CD16, 4-1BB, OX40, CD40, CD27, RANK, BCMA, GITR, TROY, RELT, HVEM, TNFR2, PD-1, CTLA-4, ICOS, B7-1 and B7-2.

In one embodiment, at least one target of the antigen binding site of the binding molecule is selected from the group consisting of ABCF1; ACVR1; ACVR1B; ACVR2; ACVR2B; ACVRL1; ADORA2A; Aggrecan; AGR2; AICDA; AIF1; AIG1; AKAP1; AKAP2; ALK; AMH; AMHR2; ANGPT1; ANGPT2; ANGPTL3; ANGPTL4; ANPEP; APC; APOC1; AR; AXL; AZGP1 (zinc-a-glycoprotein); B7.1; B7.2; BAD; BAFF; BAFF-R; BAG1; BAI1; BCL2; BCL6; BCMA; BDNF; BLNK; BLR1 (MDR15); BlyS; BMP1; BMP2; BMP3B (GDF10)); BMP4; BMP6; BMP8; BMPR1A; BMPR1BBMPR2; BPAG1 (plectin); BRCA1; B7-H3; C19orf10 (IL27w); C1s; C3; C4A; C5; C5R1; CA-125; CANT1; CASPI; CASP4; CAV1; CCBP2 (D6/JAB61); CCL1 (1-309); CCL11 (eotaxin); CCL13 (MCP-4); CCL15 (MIP-1d); CCL16 (HCC-4); CCL17 (TARC); CCL18 (PARC); CCL19 (MIP-3b); CCL2 (MCP-1); MCAF; CCL20 CMJP-3a); CCL21 (MIP-2); SLC; exodus-2; CCL22 (MDC/STC-1); CCL23 (MPIF-1); CCL24 (MPIF-2/eotaxin-2); CCL25 (TECK); CCL26 (eotaxin-3); CCL27 (CTACK/ILC); CCL28; CCL3 (MIP-1a); CCL4 (MIP-1b); CCL5 (RANTES); CCL7 (MCP-3); CCL8 (mcp-2); CCNA1; CCNA2; CCND1; CCNE1; CCNE2; CCR1 (CKR1/HM145); CCR2 (mcp-IRB/RA); CCR3 (CKR3 CMKBR3); CCR4; CCR5 (CMKBR5/ChemR13); CCR6 (CMKBR6/CKR-L3 STRL22/DRY6); CCR7 (CKR7 EB11); CCR8 (CMKBR81/TERI/CKR-L1); CCR9 (GPR-9-6); CCRL1 (VSHK1); CCRL2 (L-CCR); CD164; CD2; CD5; CD7; CD15; CD19; CD1G; CD11a; CD20; CD200; CD22; CD23; CD24; CD25; CD27; CD28; CD3; CD30; CD33; CD37; CD38; CD3E; CD3G; CD3Z; CD4; CD40; CD40L; CD41; CD44; CD44 v6; CD4SRB; CD51; CD52; CD56; CD6; CD62L; CD69; CD70; CD72; CD73; CD74; CD79A; CD79B; CDB; CD80; CD81; CD83; CD86; CD105; CD117; CD123; CD125; CD137L; CD137; CD147; CD152; CD154; CD221; CD276; CD279; CD319; CDH1 (E-cadherin); CDH10; CDH12; CDH13; CDH18; CDH19, CDH20; CDH5; CDH7; CDH8; CDH9; CDK2; CDK3; CDK4; CDK5; CDK6; CDK7; CDK9; CDKN1A (p21Wap1/Cip1); CDKN1B (p27Kip1); CDKN1C; CDKN2A (p16INK4a); CDKN2B; CDKN2C; CDKN3; CEA; CEACAM5; CEBPB; CER1; CFD; CHGA; CHGB; Chitinase; CHST10; CKLFSF2; CKLFSF3; CKLFSF4; CKLFSF5; CKLFSF6; CKLFSF7; CKLFSF8; CLDN3; CLDN7 (claudin-7); CLDN18.2; CLN3; CLU (clusterin); cMET; CMKLR1; CMKOR1 (RDC1); CNR1; COL18A1; COLIA1; COL4A3; COL6A1; CR2; CRP; CSF1 (M-CSF); CSFR1; CSF2 (GM-CSF); CSF3 (GCSF); CTLA4; CTNNB1 (b-catenin); CTSB (cathepsin B); CX3CL1 (SCYD1); CX3CR1 (V28); CXCL1 (GRO1); CXCL10 (IP-10); CXCL11 (I-TAC/IP-9); CXCL12 (SDF1); CXCL13; CXCL14; CXCL16; CXCL2 (GR02); CXCL3 (GRO3); CXCL5 (ENA-78/LIX); CXCL6 (GCP-2); CXCL9 (MIG); CXCR3 (GPR9/CKR-L2); CXCR4; CXCR6 (TYMSTR/STRL33/Bonzo); CYB5; CYC1; CYSLTR1; DAB2IP; DES; DKFZp451J0118; DNCL1; DLL3; DPP4; DR3; DR4; DR5; DR6; E2F1; ECGF1; EDA1; EDA2; EDAR; EDA2R; EDG1; EpCAMEFNA1; EFNA3; EFNB2; EGF; EGFL7; EGFR; ELAC2; ENG; ENO1; ENO2; ENO3; EPHA3; EPHB4; EPO; ERBB2 (Her-2); EREG; ERK8; ESR1; ESR2; F3 (TF); FADD; FAP; FasL; FASN; FCER1A; FCER2; FCGR3A; FGF; FGF1 (aFGF); FGF10; FGF11; FGF12; FGF12B; FGF13; FGF14; FGF16; FGF17; FGF18; FGF19; FGF2 (bFGF); FGF20; FGF21; FGF22; FGF23; FGF3 (int-2); FGF4 (HST); FGF5; FGF6 (HST-2); FGF7 (KGF); FGF8; FGF9; FGFR1; FGFR2; FGFR3; FGFR4; FIGF (VEGFD); FIL1 (EPSILON); FIL1 (ZETA); FLJ12584; FLJ25530); FLRT1 (fibronectin); FLT1; folate receptor 1; FOS; FOSL1 (FRA-1); FY (DARC); GABRP (GABAa); GAGEB1; GAGEC1; GALNAC4S-GST; GATA3; gelatinase B; GD2; GD3; GDF5; GDF8; GFI1; GGT1; GITR; GITRL; GM-CSF; GNAS1; GNRH1; GPNMB; GPR2 (CCR10)); GPR31; GPR44; GPR81 (FKSG80)); GRCC10) (C10); GRP; GSN (Gelsolin); GSTP1; HAVCR2; HDAC4; HDAC5; HDAC7A; HDAC9; HER2; HER3; HER4; HGF; HIF1A; HIP1; histamine and histamine receptors; HLA-A; HLA-DRA; HM74; HMOX1; HMW-MAA Hsp-90; HVEM; TNF-RHUMCYT2A; ICAM-1; ICEBERG; ICOSL; ID2; IFN-α; IFNA1; IFNA2; IFNA4; IFNA5; IFNA6; IFNA7; IFNB1; IFNgamma; IFNW1; IGBP1; IGF1; IGF1R; IGP1R; IGF2; IGFBP2; IGFBP3; IGFBP6; IGHE; IL-1; IL10; ILIORA; ILIORB; IL11; IL1IRA; IL-12; IL12A; IL12B; IL12RB1; IL12RB2; IL13; IL13RA1; IL13RA2; IL14; IL15; IL15RA; IL16; IL17; IL17B; IL17C; IL17R; IL18; IL18BP; IL18R1; IL18RAP; IL19; ILIA; IL1B; ILIF10; ILIF5; ILIF6; ILIF7; ILIF8; TLIF9; ILIHY1; ILIR1; ILIR2; ILLRAP; ILIRAPL1; ILI-RAPL2; ILIRL1; ILIRL2 ILIRN; IL2; IL24; IL2ORA; IL21R; IL22; IL22R; IL22RA2; IL23; IL24; IL25; IL26; IL27; IL28A; IL28B; IL29; IL2RA; IL2RB; IL2RG; IL3;

IL30; IL3RA; IL4; IL4R; IL5; IL5RA; IL6; IL6R; IL6ST (glycoprotein 130); IL7; IL7R; IL8; IL8RA; IL8RB; IL8RB; IL9; IL9R; ILK; INHA; INHBA; INSL3; INSL4; integrin $\alpha_\nu\beta_3$; integrin β7; IRAK1; IRAK2; TGA1; ITGA2; ITGA3; ITGA6 (a6 integrin); ITGAV; JTGB3; ITGB4 (b 4 integrin); JAG1; JAK1; JAK3; JUN; K6HF; KAI1; KDR; KIR2D; KITLG; KLF5 (GC Box BP); KLF6; KLK10; KLK12; KLK13; KLK14; KLK15; KLK3; KLK4; KLK5; KLK6; KLK9; KRT1; KRT19 (Keratin 19); KRT2A; KRTHB6 (hair-specific type II keratin); LAMA5; LEP (leptin); LEY; LIGHT; Lingo-p75; Lingo-Troy; LIV-1; LPS; LTA (TNF-b); LTB; LTB4R (GPR16); LTB4R2; LTBR; MACMARCKS; MAG or Omgp; MAP2K7 (c-Jun); MCAM; MCSP; MDK; MET; MER; MIB1; midkine; MIF: MIP-2; MKI67 (Ki-67); MMP2; MMP9; MSLN; MS4A1; MSMB; MT3 (metallo-thionectin-III); MTSSI; MUC1 (mucin); MUC2; MYC; MYD88; myostatin; NCA-2; NCK2; nectin-4; neurocan; NFKB1; NFKB2; NGFB (NGF); NGFR; NgR-Lingo; NOGO-A; NgR-Nogo66 (Nogo); NgR-p75; NgR-Troy; NME1 (NM23A); NOTCH-1; NOX5; NPPB; NROB1; NROB2; NRID1; NRID2; NR1H2; NR1H3; NRIH4; NR112; NR113; NR2C1; NR2C2; NR2E1; NR2E3; NR2F1; NR2F2; NR2F6; NR3C1; NR3C2; NR4A1; NR4A2; NR4A3; NR5A1; NR5A2; NR6A1; NRP1; NRP2; NT3; NT4; NT5E; NTN4; ODZ1; OPRD1; OX40; OX40L; P2RX7; PAP; PART1; PATE; PAWR; PCA3; PCDC1; PCNA; PCSK9; PD1; PD-L1; PDGFA; PDGFB; PDGR; igfPECAM1; PF4 (CXCL4); PGF; PGR; phosphacan; PIAS2; PIK3CG; PLAU (uPA); uPAR; PLG; PLXDC1; PPBP (CXCL7); PPID; PR1; PRKCQ; PRKD1; PRL; PROC; PROK2; PSAP; PSCA; PSMA; PTAFR; PTEN; PTGS2 (COX-2); PTN; PTK7; VEGFR1; VEGFR2; VEGFR3; RAC2 (p21Rac2); RANK; RANKL; RARB; RELT; RET; RGS1; RGS13; RGS3; RNF110 (ZNF144); ROBO2; RON; ROR1; ROR2; RYK; S100A2; SCGBID2 (lipophilin B); SCGB2A1 (mammaglobin 2); SCGB2A2 (mammaglobin 1); SCYE1 (endothelial Monocyte-activating cytokine); SDF2; SERPINA1; SERPINA3; SERPINB5 (maspin); SERPINE1 (PAI-1); SERPINF1; SHBG; SLA2; SLC2A2; SLC33A1; SLC43A1; SLIT2; SPAK; SPP1; SPRR1B (Spr1); SOST; ST6GAL1; STAB1; STAT6; STEAP; STEAP2; TAC1; TAG-72; tau protein; TB4R2; TBX21; TCP10; TDGF1; TEK; TGFA; TGFB1; TGPBII1; TGFB2; TGFB3; TGFB1; TGFBR1; TGFBR2; TGFBR3; TH1L; THBS1 (throrttbospondin-1); THBS2; THBS4; THPO; TIE (Tie-1); TIE-1; TIE-2; TIMP3; tissue factor; TLR10; TLR2; TLR3; TLR4; TLR5; TLR6; TLR7; TLR8; TLR9; TNF; TNF-α; TNF-b; TNFAIP2 (B94); TNFAIP3; TNFRSF11A; TNFRSF1A; TNFRSF1B; TNFRSP21; TNFRSF5; TNFRSF6 (Fas); TNFRSF7; TNFRSF8; TNFRSF9; TNFSF10) (TRAIL); TNFSF11 (TRANCE); TNFSF12 (APO3L); TNFSF13 (April); TNPSF13B; TNFSF14 (HVEM-L); TNFSF15 (VEG1); TNFSF18; TNFSF4 (OX40 ligand); TNFSF5 (CD40) ligand); TNFSF6 (FasL); TNFSF7 (CD27 ligand); TNFSF8 (CD30 ligand); TNFSF9 (4-1BB ligand); TNF-R1; TNF-R2; TOLL1P; Toll-like receptors; TOP2A (topoisomerase lia); TP53; TPM1; TPM2; TRADD; TRAF1; TRAF2; TRAF3; TRAF4; TRAF5; TRAF6; TRAIL-R1; TRAIL-R2; TRAIL-R3; TRAIL-R4; TREM1; TREM2; TRPC6; TROY; TSLP; TWEAK; TYRO3; TYRP1; VAP-1; VEGF; VEGFB; VEGFC; versican; VHL C5; vimentin; VLA-4; VWF; XCL1 (lymphotactin); XCL2 (SCM-1b); XCR1 (GPR5/CCXCR1); YY1; and ZFPM2.

Preferred embodiments of the first aspect of the invention include dual targeting strategies wherein DBM1 alone. DBM1 and DBM2. DBM1 and BEM or DBM1 and a ligand binding effector, e.g. a scFv, which is coupled to P6 bind to two different targets.

In embodiments in which the bispecific antigen-binding molecule is used for cell-cell recruitment, e.g. an immune effector cell like a T cell or macrophage is recruited to a tumor cell, it is preferred that both valences of DBM1 bind to the tumor cell, and the BEM or ligand binding effector, e.g. a scFv coupled to P6 bind to the immune effector cell. This approach provides high avidity binding to the tumor cell on one hand and prevents immune effector cell activation which may result from bivalent binding of a target on the immune effector cell.

In other embodiments of bispecific targeting, e.g. in which the specificities are directed at to two targets expressed on the surface of the same cell. DBM1 and DBM2 may be bispecific. i.e. each binds two targets. This arrangement also has the advantage that DD5 and DD6 can be homodimerizing since DBM1 and DBM2 are identical.

In preferred examples of bispecific targeting the antigen-binding complex may bind two receptors expressed by tumor cells, or cells of the tumor microenvironment by antagonistic antibodies, especially targeting combinations of EGFRxHER2, EGFRxHER3, HER2xHER3, EGFRxHER4, HER3xAXL, HER3xcMET, multivalent binding to and activation of apoptosis-inducing members of the TNF receptor superfamily, especially DR5 (TRAILR2). TNFR2, or immunostimulatory members of the TNF receptor superfamily, especially 4-1BB. CD40. OX40, CD27, and GITR, dual targeting of a TNF receptor superfamily member and a tumor-associated antigen, and effector cell retargeting to tumor cells, especially by binding to a trigger molecule on T cells (CD3) or NK cells (CD16) and a tumor-associated antigen (EGFR. HER2. HER3. HER4. FAP).

In a preferred embodiment of the first aspect of the invention, the imaging molecule is selected from the group consisting of bioluminescent reagents, chemiluminescent reagents, fluorescent imaging reagents, photosensitizers, chelating reagents, and radioactive moieties. More preferably, the imaging molecule is a bioluminescent, chemiluminescent and fluorescent imaging reagent such as but not limited to luciferase from *Renilla reniformis* and/or Metridia Longa, peroxalate, polymethines (e.g. cyanine dyes such as Cy3, Cy5, Cy5.5, Cy7) squaraine derivatives, phthalocyanine, porphhyrin derivatives, and BODIPY analogous (BODIPY FL. BODIPY R6G, BODIPY TR, BODIPY TMR, BODIPY 581/591, BODIPY 630/650, BODIPY 650/665), as well as fluorescent proteins such as but not limited to GFP, EGPF, CFP, BFP, YFP, DsRED (Chudakov et al. (2010) Physiol. Rev. 90:1103-1163).

Chelating reagents are capable of binding at least one metal ion, such as but not limited to calcium, magnesium, iron, aluminium, zinc, copper, arsenic, lead, thallium, and mercury ions, by chelation. Such chelating reagents may comprise ethylenediamine tetraacetic acid (EDTA), ethylenediamine tetraacetic acid (calcium disodium versante) (CaNa2-EDTA), dimercaprol (BAL), dimercaptosuccinic acid (DMSA), dimercapto-propane sulfonate (DMPS), ferritin, deferoxamine and deferasirox, deferiprone (1,2-dimethyl-3-hydroxyl-4-pyridinone). DOTA, DTPA, DADT, DADS, DO3A, N2S2MAMA, Triamidethiol, phosphonates, organic gadolinium complexes, penicillamine, and antibiotic drugs of the tetracycline family.

In one embodiment of the first aspect of the invention, the antigen-binding protein complex of the invention does not comprise $V_H225$-$V_L3$-43-$C_H1$-$C_H2$-$C_H3$ and $V_H3$-43-$V_L225$-$C_L$, in particular, if $V_H225$-$V_L3$-43-$C_H1$-$C_H2$-$C_H3$ has the amino acid sequence according to SEQ ID NO: 19 and $V_H$3-43-$V_L$225-$C_L$ has the amino acid sequence according to SEQ ID NO: 20.

Thus, in one embodiment of the first aspect of the invention, the antigen-binding protein complex does not comprise amino acid sequences SEQ ID NO: 19 and SEQ ID NO: 20.

In a second aspect, the present invention relates to the antigen-binding protein complex of the first aspect for use in medicine.

In a third aspect, the present invention relates to the antigen-binding protein complex of the first aspect for use in the prophylaxis, treatment or diagnosis of a disorder or disease such as but not limited to autoimmune diseases, allergic diseases, cancer type diseases, cutaneous conditions, endocrine diseases, eye diseases and disorders, genetic disorders, infectious diseases, intestinal diseases, neurological disorders, and mental illness. Exemplified, autoimmune diseases include but are not limited to Diabetes mellitus type 1, rheumatoid arthritis, psoriasis, Crohns Disease, autoimmune cardiomyopathy, autoimmune hepatitis, Hashimoto's thyroiditis, and Sjogern's syndrome. Exemplified, allergic diseases include but are not limited to allergic rhinitis, asthma, atopic eczema, anaphylaxis, insect venom allergies, drug allergies, and food allergies. Exemplified, cancer type diseases include but are not limited to Basal cell carcinoma, Bladder cancer, Bone cancer, Brain tumor, Breast cancer, Burkitt lymphoma, Cervical cancer, Colon Cancer, Cutaneous T-cell lymphoma, Esophageal cancer, Retinoblastoma, Gastric (Stomach) cancer, Gastrointestinal stromal tumor, Glioma, Hodgkin lymphoma, Kaposi sarcoma, Leukemias, Lymphomas, Melanoma, Oropharyngeal cancer, Ovarian cancer, Pancreatic cancer, Pleuropulmonary blastoma, Prostate cancer, Throat cancer, Thyroid cancer, and Urethral cancer. Exemplified, cutaneous conditions include but are not limited to Acne, Dermatitis, Eczema, conditions of the skin appendages, conditions of the subcutaneous fat, disturbances of pigmentation, epidermal nevi, epidermal neoplasms, epidermal cysts, erythemas, frostbites genodermatoses, mucinoses, neurocutaneous conditions (e.g. Wiskott-Aldrich syndrome), and psoriasis. Exemplified, endocrine diseases include but are not limited to Diabetes mellitus type 1 and type 2. Osteoporosis, and Cushing's disease. Exemplified, genetic disorders include but are not limited to color blindness, cystic fibrosis. Down syndrome. Sickle-cell disease, and Turner syndrome. Exemplified, infectious diseases include but are not limited to infections diseases caused by viruses, bacteria, worms, prions or other pathogens or parasites such as African sleeping sickness, AIDS, HIV infection, Anthrax, Borreliosis, Calicivirus infection (Norovirus and Sapovirus), Chickenpox, Chlamydia infection, Cholera, Clostridium infection. Colorado tick fever (CTF), common cold, Creutzfeldt-Jakob disease, Dengue fever (DEN-1. DEN-2. DEN-3 and DEN-4), Ebola, Enterovirus infection, infections with Human herpesvirus 6 (HHV-6) and Human herpesvirus 7 (HHV-7), Gonorrhea, Streptoccocal infections (group A and B), Hand, foot and mouth disease (HFMD), Helicobacter pylori infection, Hepatitis (A, B, C, and D), Herpes infection. Papillomavirus infection, Parainfluenza virus infection, Influenza, Lassa fever, Marburg fever, Measles, Meningitis, Mumps, Pasteurellosis, Pediculus infection, Plague, Pneumococcal infection, Respiratory syncytial virus infection, Rotavirus infection, Rubella virus infection, Salmonella food poisoning and infection, SARS, Scabies infections, Schistosomiasis, Smallpox, Staphylococcal food poisoning and infection, Syphilis, Tetanus, Trichophyton infection, Tuberculosis, Typhus, Venezuelan equine encephalitis, and Yellow fever, Exemplified, intestinal diseases include but are not limited to Gastroenteritis, Ileus, Ileitis, Colitis, Appendicitis, Coeliac disease, Irritable bowel syndrome, Diverticular disease, Diarrhea, Polyp, and Ulcerative colitis. Exemplified, neurological disorders include but are not limited to Amyotrophic Lateral Sclerosis (ALS), Alzheimer's disease. Brain damage, Creutzfeldt-Jakob disease, Cushing's syndrome, Dyslexia, Encephalitis, Epilepsy, Headache, Huntington's disease, Migraine, Multiple sclerosis, Parkinson's disease, Polio, Rabies, Schizophrenia, and Stroke, Exemplified, mental illness include but are not limited to Acute stress disorder, attention-deficit hyperactivity disorder (ADHD), Autistic disorder, Borderline personality disorder, Bulimia nervosa, Burn Out, Schizophrenia, Depression, Cognitive disorder, Communication disorder, Eating disorder, Kleptomania, Learning disorders. Male erectile disorder, Melancholia, Obsessive-compulsive disorder (OCD), Paranoia Pathological gambling, Posttraumatic stress disorder (PTSD), Psychotic disorder, Hypersomnia, Insomnia, and Tourette's syndrome.

In a preferred embodiment of the third aspect, the present invention relates to the antigen-binding protein complex of the first aspect for use in the prophylaxis, treatment or diagnosis of cancer, Preferably, the cancer is selected from the group consisting of Basal cell carcinoma, Bladder cancer, Bone cancer, Brain tumor, Breast cancer, Burkitt lymphoma, Cervical cancer, Colon Cancer, Cutaneous T-cell lymphoma, Esophageal cancer, Retinoblastoma, Gastric (Stomach) cancer, Gastrointestinal stromal tumor, Glioma, Hodgkin lymphoma, Kaposi sarcoma, Leukemias, Lymphomas, Melanoma, Oropharyngeal cancer, Ovarian cancer, Pancreatic cancer, Pleuropulmonary blastoma, Prostate cancer, Throat cancer, Thyroid cancer and Urethral cancer.

EXAMPLES

Example 1: A Monospecific and Tetravalent Diabody-Ig (Db-Ig) Targeting Death Receptor 5 (DR5)

Figure 26A:
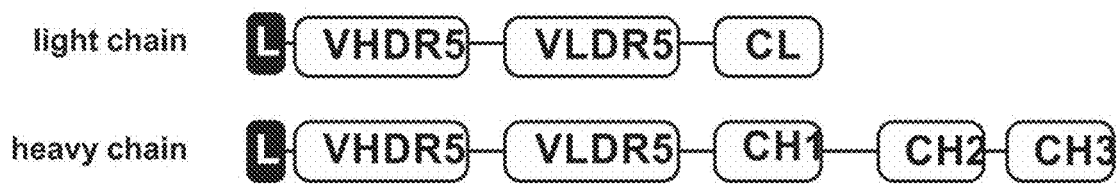
Figure 26B:
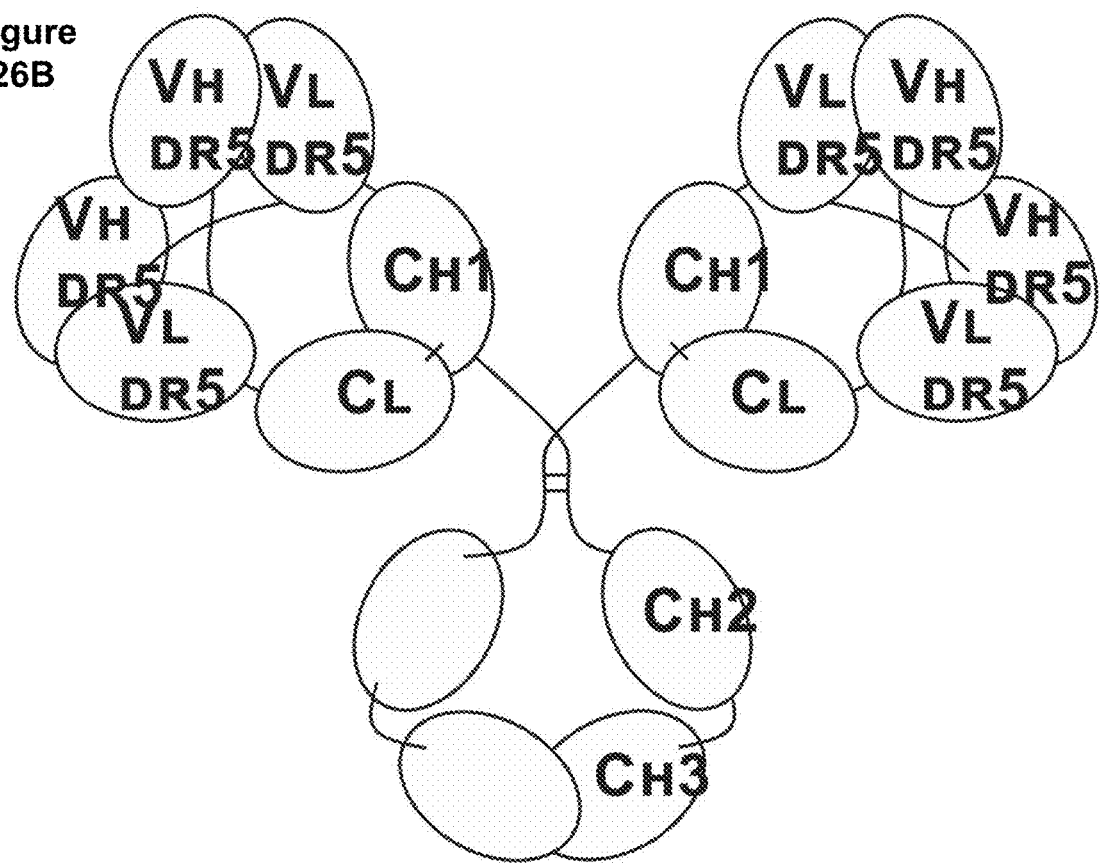

A monospecific, tetravalent DbDR5xDR5-Ig molecule was generated by combining a Db molecule, specific for DR5 (variable domains originate from Drozitumab), with the constant domains of an IgG antibody. Thus, the DbDR5xDR5-Ig molecule consists of two different polypeptides. $V_H$DR5x$V_L$DR5-$C_L$ (light chain) and $V_H$DR5x$V_L$DR5-$C_H$1-$C_H$2-$C_H$3 (heavy chain) (FIG. 26A). The monospecific, tetravalent agonistic DbDR5xDR5-Ig exhibits four antigen binding sites for DR5 (FIG. 26B).

Figure 26C:
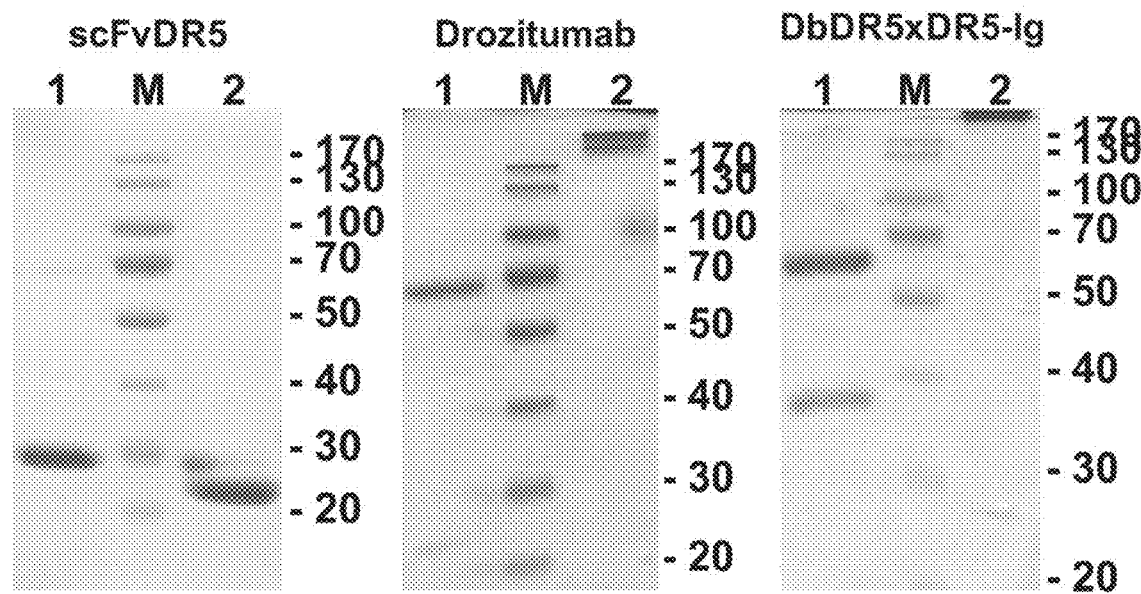
Figure 26D:
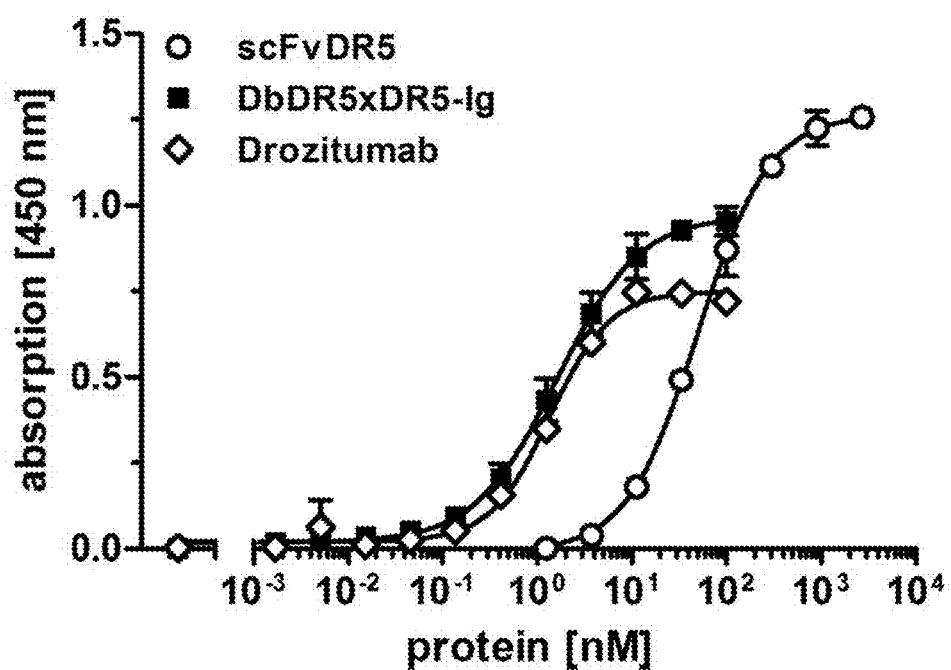

The binding molecule was expressed in transiently transfected HEK293-6E cells after co-administration of two plasmids, using polyethylenimine (PEI) as transfection reagent. The plasmids for transfection are based on pSec-TagA (Invitorgen). One day before transfection. $1 \cdot 10^6$ cells per ml were seeded in FreeStyle F17 Expression Medium supplemented with 4 mM GlutaMAX (Thermo Fisher Scientific) and 0.1% kolliphor P188, overnight shaking with 115 rpm in humidified atmosphere at 37° C., and 5% $CO_2$. For 100 ml of cells to transfect. 5 ml F15 Expression Medium was either mixed with 200 µl PEI (Polyscience. Inc.) (sample A) or with 100 µg of plasmids (50 µg plasmid of heavy chain and 50 µg plasmid of light chain) (sample B). Sample A and sample B were separately prepared and incubated for 5 minutes at RT. After combining sample A with sample B, mixture was incubated for additional 15 minutes at RT and finally added to the cells. After cultivation of cells for 24 hours, protein secretion was induced by adding 2.5 ml Tryptone N1 (0.5% (w/v); TN1; Organo Technie) per 100 ml of cell suspension. After 96 hours of cultivation, cells were removed from medium by centrifugation (1,500×g; 10 minutes) and secreted protein was purified using $C_H1$-CaptureSelect affinity chromatography (Thermo Fisher Scientific) using PBS as washing buffer and glycine buffer (100 mM; pH 3.5) as elution buffer. SDS-PAGE analysis revealed two bands under reducing conditions at approximately 65 kDa and 35 kDa corresponding to the heavy and light chain, and one major band under non-reducing conditions at approximately 220 kDa corresponding to the monospecific, tetravalent Db-Ig molecule (FIG. 26C). In addition, the monovalent scFvDR5 and the bivalent antibody Drozitumab were also analyzed via SDS-PAGE analysis. For the scFvDR5 molecule, one single band at approximately 27 kDa were observed under reducing and non-reducing conditions. The antibody Drozitumab showed two bands at approximately 25 kDa and 60 kDa under reducing conditions corresponding to the light and heavy chain of the protein. Under non-reducing conditions, one major band at approximately 200 kDa was observed. Binding of the tetravalent DbDR5xDR5-Ig, the parental bivalent antibody (Drozitumab), and the monovalent scFvDR5 to the extracellular domain (ECD) of DR5 (aa 48-212) was determined by ELISA. The DR5-Fc fusion protein was coated onto polystyrene microtiter plates at a concentration of 2 µg/ml diluted in PBS. Remaining binding sites were blocked with PBS, 2% skimmed milk (MPBS). Plates were then incubated with serial dilutions of the tetravalent DbDR5xDR5-Ig, the bivalent antibody Drozitumab, or the monovalent scFvDR5. After washing, bound antibodies were detected with an HRP-conjugated anti-human Fab antibody (DbDR5xDR5-Ig and Drozitumab) or an HRP-conjugated anti-His antibody (scFvDR5) and TMB, $H_2O_2$ as substrate. ELISA analysis revealed that binding activity of the parental antibody Drozitumab to the extracellular domain (ECD) of DR5 is retained in the Db-Ig format. The tetravalent DbDR5-Ig showed concentration-dependent binding to DR5 with an $EC_{50}$ value in the low nanomolar range (1.6 nM) (FIG. 26D). The parental antibody Drozitumab-IgG bound with a similar $EC_{50}$ values to DR5 (1.4 nM), whereas the monovalent scFv showed an $EC_{50}$ value of approximately 50 nM (Table 1).

TABLE 1

Binding properties of anti-DR5 antibodies. $EC_{50}$ values [nM] of binding to the extracellular domain (ECD) of DR5-Fc fusion proteins were determined by ELISA.

| construct | DR5 |
|---|---|
| DbDR5xDR5-Ig | 1.6 |
| Drozitumab | 1.2 |
| scFvDR5 | 50 |

Example 2: A Monospecific and Tetravalent Diabody-Ig (Db-Ig) Activating TNF-Receptor 2 (TNFR-2)

Figure 27A:
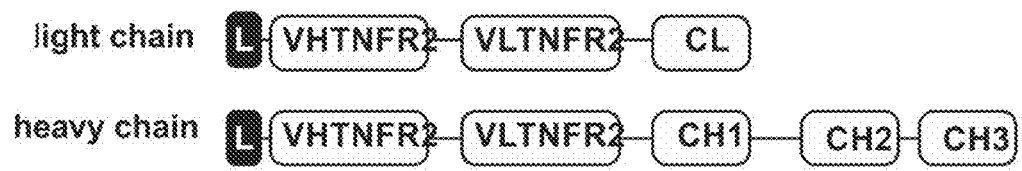
Figure 27B:
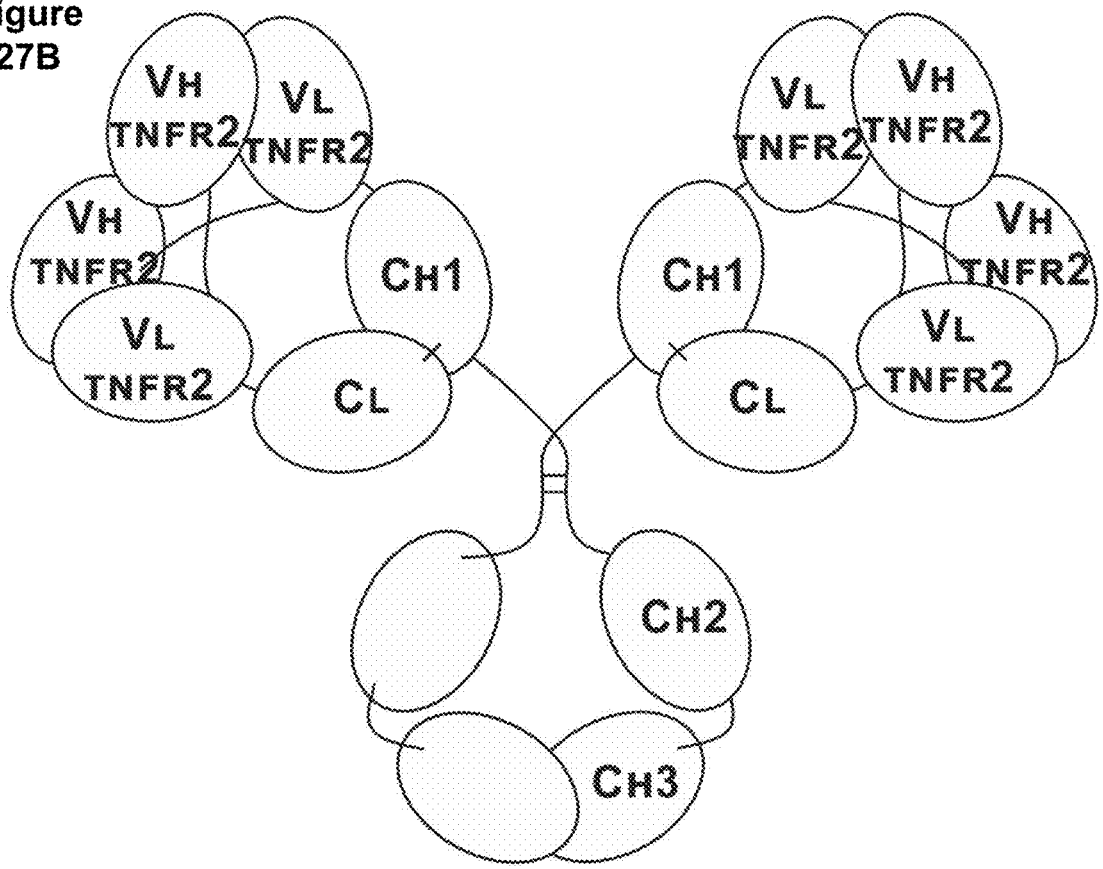
Figure 27C:
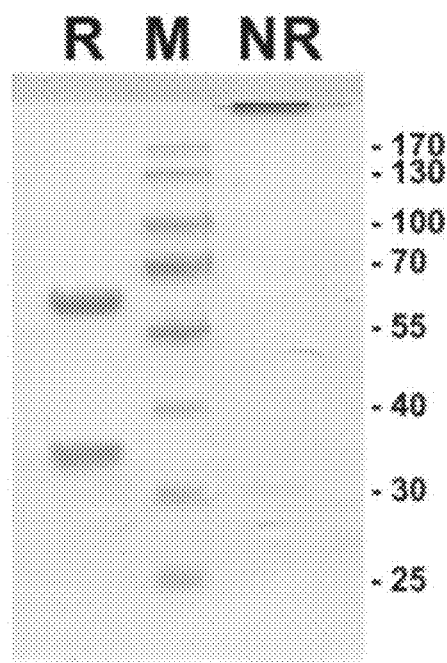
Figure 27D:
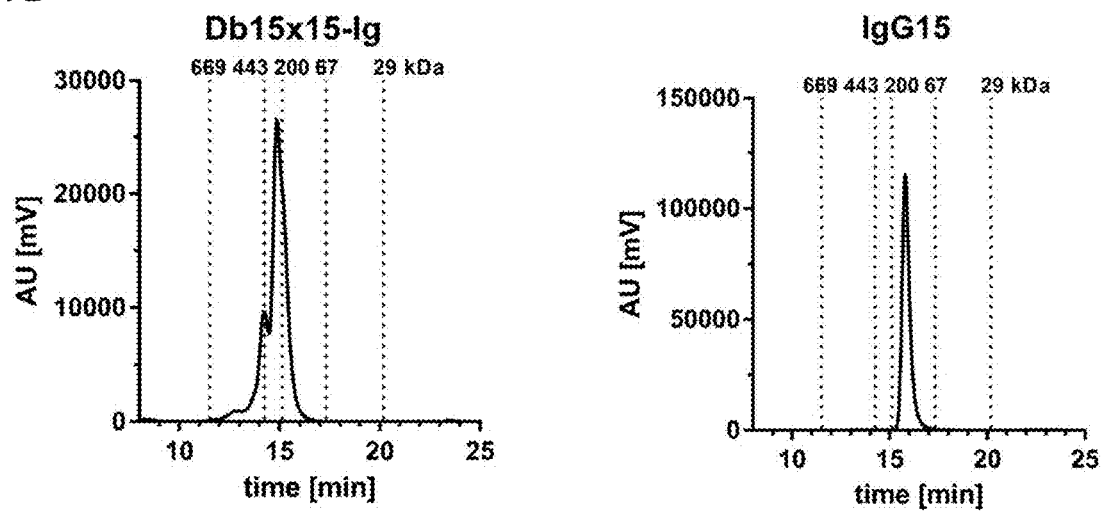
Figure 27E:
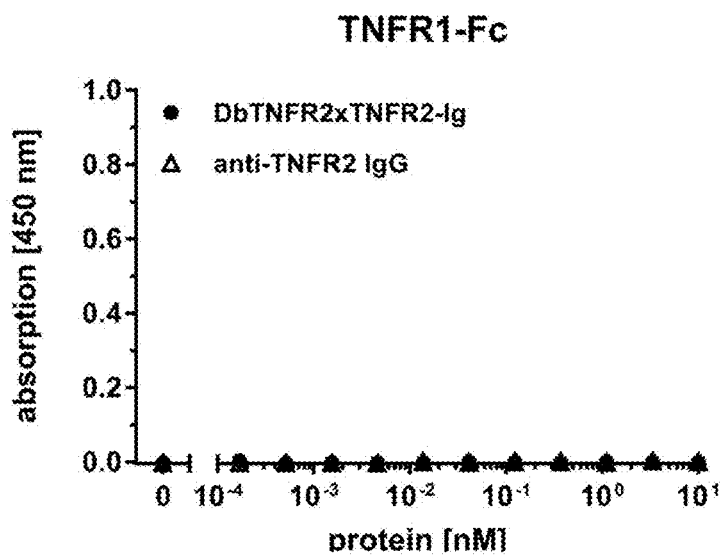
Figure 27E:
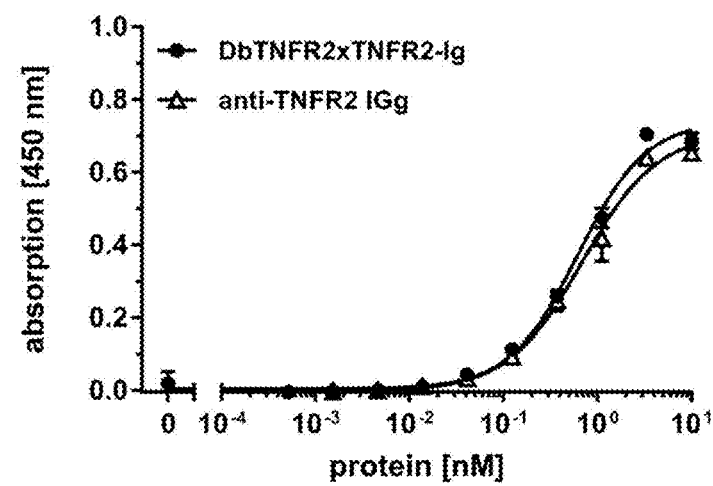
Figure 27F:
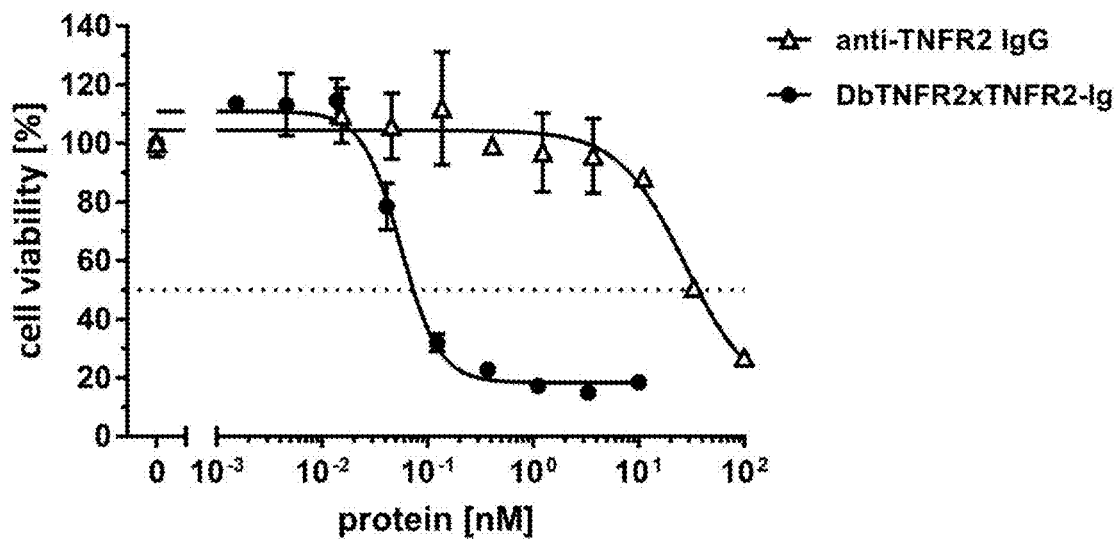

A monospecific, tetravalent DbTNFR2xTNFR2-Ig molecule was generated by combining a Db molecule, specific for TNFR2 (variable domains originate from IgG15), with the constant domains of an IgG antibody. Thus, the DbTNFR2xTNFR2-Ig molecule consists of two different polypeptides, $V_H$TNFR2x$V_L$TNFR2-$C_L$ (light chain) and $V_H$TNFR2x$V_L$TNFR2-$C_H1$-$C_H2$-$C_H3$ (heavy chain) (FIG. 27A). The monospecific, tetravalent agonistic DbTNFR2xTNFR2-Ig exhibits four antigen binding sites for TNFR2 (FIG. 27B). DbTNFR2xTNFR2-Ig was expressed in transiently transfected HEK293-6E cells after co-administration of two plasmids encoding for the light chain and the heavy chain, using polyethylenimine as transfection reagent. Protein secreted into cell culture supernatant was purified using $C_H1$-CaptureSelect affinity chromatography. SDS-PAGE analysis revealed two bands under reducing conditions at approximately 65 kDa and 35 kDa corresponding to the heavy and light chain, and one major band under non-reducing conditions at approximately 220 kDa corresponding to the intact monospecific, tetravalent Db-Ig molecule (FIG. 27C). After additional FPLC-SEC purification, HPLC-SEC confirmed purity and integrity of the DbTNFR2xTNFR2-Ig molecule. In addition, parental anti-TNFR2 IgG was also analyzed via HPLC-SEC and purity and integrity of this molecule was confirmed. Binding of the tetravalent DbTNFR2xTNFR2-Ig and the parental bivalent antibody (anti-TNFR2 IgG to the extracellular domain (ECD) of TNFR1 (aa 29-197) as well as to TNFR2 (Enbrel) was determined by ELISA. The TNFR1-Fc and TNFR2-Fc (Enbrel) fusion protein was coated onto polystyrene microtiter plates at a concentration of 2 g/ml diluted in PBS. Remaining binding sites were blocked with PBS, 2% skimmed milk (MPBS). Plates were then incubated with serial dilutions of the tetravalent DbTNFR2xTNFR2-Ig or the bivalent anti-TNFR2 IgG. After washing, bound molecules were detected with an HRP-conjugated anti-human Fab antibody and TMB, $H_2O_2$ as substrate. ELISA analysis revealed that binding activity of the parental antibody anti-TNFR2 IgG to the extracellular domain (ECD) of TNFR2 is retained in the monospecific, tetravalent DbTNFR2xTNFR2-Ig format. The monospecific, tetravalent DbTNFR2xTNFR2-Ig showed a concentration-dependent binding to TNFR2-Fc with an $EC_{50}$ value in the low sub-nanomolar range (0.7 nM), similar as the bivalent anti-TNFR2 IgG (0.7 nM) (FIG. 27D). Binding of the TNFR2-specific molecules to TNFR1-Fc was not detected (Table 2).

TABLE 2

Binding properties and bioactivity of anti-TNFR2 antibodies. $EC_{50}$ values [nM] of binding to the extracellular domain (ECD) of TNFR1-Fc and TNFR2-Fc (Enbrel) fusion proteins were determined by ELISA. $EC_{50}$ values of bioactivity were determined in cell-death induction assay using Kym-1 cells

| | ELISA | | Bioactivity |
|---|---|---|---|
| construct | TNFR1 | TNFR2 | Kym-1 |
| DbDR5xDR5-Ig | — | 0.7 | 28 nM |
| Anti-TNFR2 IgG | — | 0.7 | 56 pM |

—: no binding detected

Bioactivity of the different TNFR2-specific antibodies was tested in a cell-death induction assay using Kym-1 cells. The day before the experiment, 10,000 cells per well were seeded in a 96 well plate and incubated over night at 37° C. Titration of the different anti-TNFR2 antibodies was diluted in medium and added to the cells. After 24 hours of incubation at 37° C. cell viability was analyzed via MTT assay. Cell death was induced by both constructs in a concentration-dependent manner. The tetravalent DbTNFR2xTNFR2-Ig molecule revealed an $EC_{50}$ value of approximately 56 pM, strongly increased by the factor of approximately 50 compared to the bivalent anti-TNFR2 antibody with an $EC_{50}$ value of approximately 30 nM. Although binding to TNFR2 via ELISA revealed similar $EC_{50}$ values, for the tetravalent and bivalent TNFR2-specific molecules, bioactivity of DbTNFR2xTNFR2-Ig was increased approximately 500-fold compared to the bivalent antibody (FIG. 27F; Table 2).

Example 3: a Bispecific and Tetravalent Diabody-Ig Fusion Protein (Db-Ig) Targeting EGFR (hu225) and HER3 (3M6)

A bispecific, tetravalent Db3M6xhu225-Ig molecule was generated by combining a Db molecule, specific for EGFR (hu225; humanized version of C225 (Cetuximab. Erbitux)) and HER3 (3M6; modified variable domain of MM-121 (Merrimack)), with the constant domains of an IgG antibody. Thus, the Db3M6xhu225-Ig molecule consists of two different polypeptides. $V_H3M6xV_L225-C_L$ (light chain) and $V_H225xV_L3M6-C_H1-C_H2-C_H3$ (heavy chain) (FIG. 28A). The bispecific Db3M6xhu225-Ig exhibits two antigen binding sites for EGFR and two antigen binding sites for HER3 (FIG. 28B).

Figure 28C:
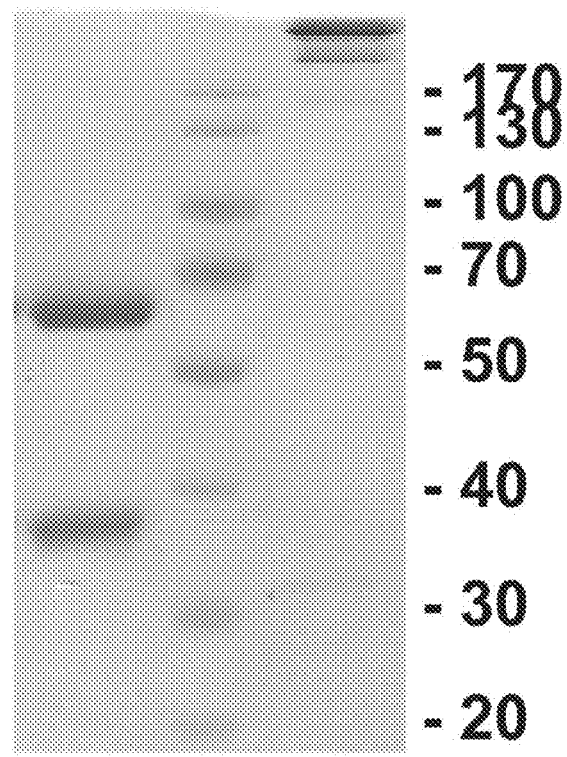
Figure 28D:
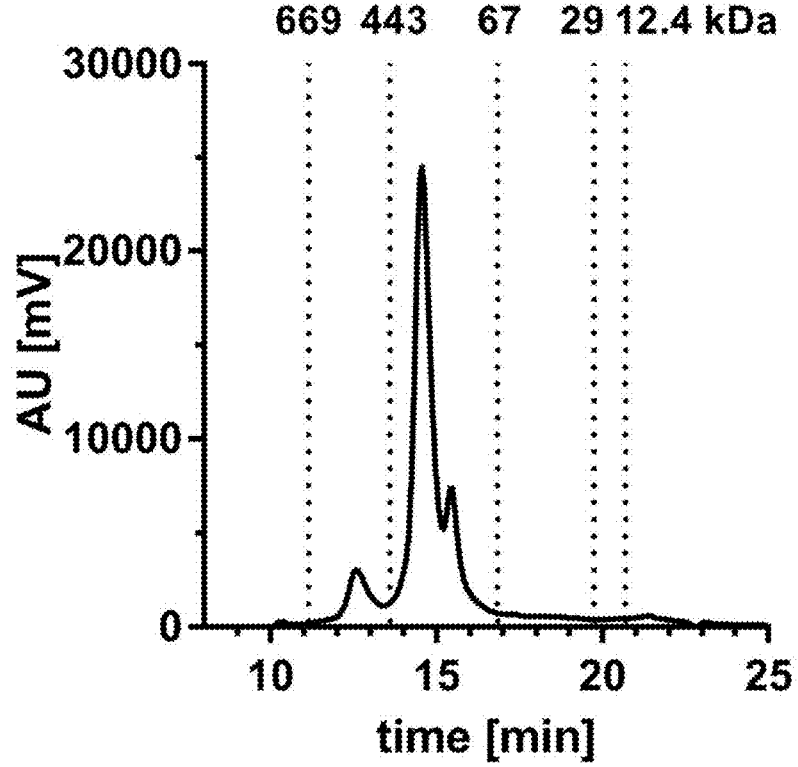
Figure 28E:
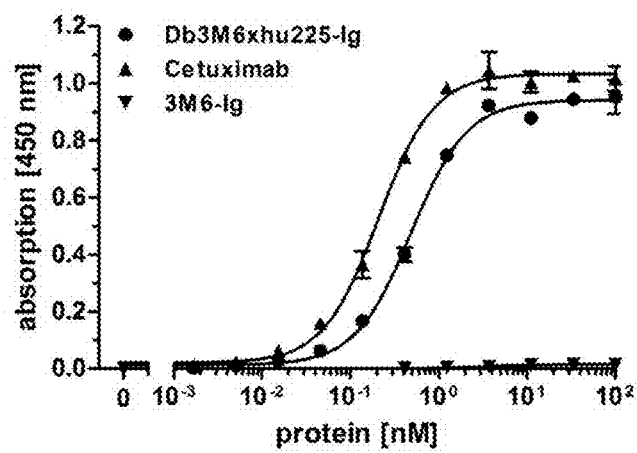
Figure 28E:
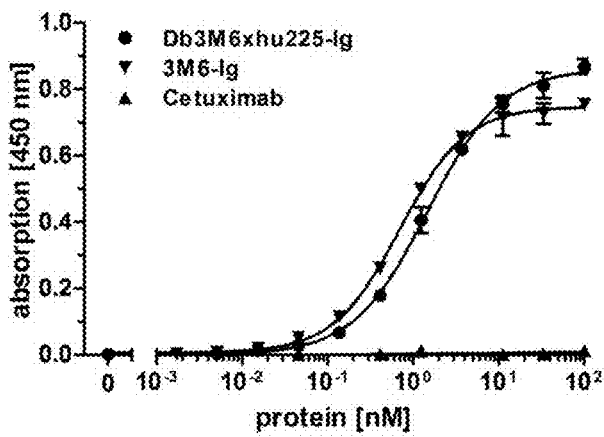
Figure 28F:
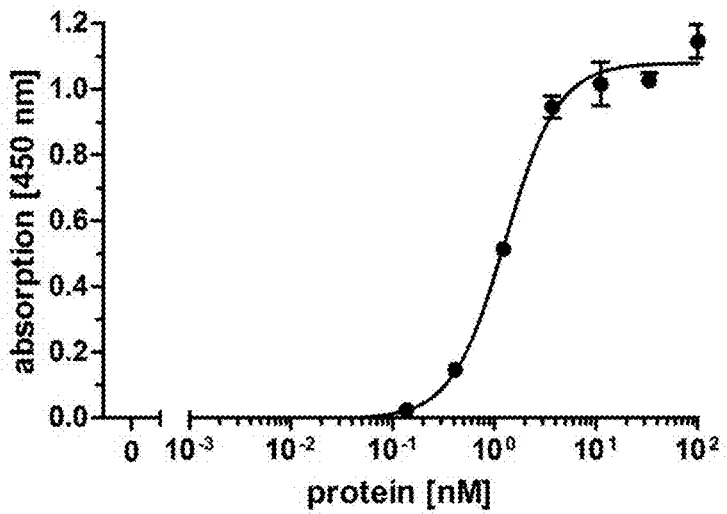

Db3M6xhu225-Ig was expressed in transiently transfected HEK293-6E cells after co-administration of two plasmids encoding for the light and the heavy chain, using polyethylenimine as transfection reagent. Protein secreted into cell culture supernatant was purified using Protein G affinity chromatography. SDS-PAGE analysis revealed two bands under reducing conditions at approximately 65 kDa and 35 kDa corresponding to the heavy and light chain, and one major band under non-reducing conditions at approximately 220 kDa corresponding to the bispecific, tetravalent Db-Ig molecule (FIG. 28C). Purity, integrity and homogeneity of the Db3M6xhu225-Ig molecule were confirmed by size exclusion chromatography (FIG. 28D). Binding of the tetravalent Db3M6xhu225-Ig and the monospecific parental antibodies (Cetuximab (anti-EGFR) and 3M6-IgG (anti-HER3)) to the extracellular domain (ECD) of EGFR (aa 25-645) and HER3 (aa 21-643) was determined by ELISA. The EGFR-Fc or the HER3-Fc fusion protein was coated onto polystyrene microtiter plates at a concentration of 2 µg/ml diluted in PBS. Remaining binding sites were blocked with PBS. 2% skimmed milk (MPBS). Plates were then incubated with serial dilution of the bispecific, tetravalent Db3M6xhu225-Ig or the monospecific parental antibodies. After washing, bound antibodies were detected with an HRP-conjugated anti-human Fab antibody and TMB, $H_2O_2$ as substrate. ELISA analysis revealed that binding activity of the parental antibodies to the extracellular domain (ECD) of EGFR and HER3 is retained in the Db-Ig format. The bispecific, tetravalent Db3M6xhu225-Ig showed a concentration-dependent binding to EGFR with an $EC_{50}$ value in the sub-nanomolar range (0.5 nM) and to HER3 in the nanomolar range (1.4 nM) (FIG. 28E). The parental antibodies bound with similar $EC_{50}$ values to their corresponding antigens (Cetuximab to EGFR with 0.21 nM; IgG 3-43 with 0.7 nM; Table 3). Simultaneous binding to both antigens, EGFR and HER3, was confirmed by a second binding ELISA analysis. As first antigen, EGFR-Fc fusion protein, was coated onto polystyrene microtiter plates at 2 µg/ml in PBS. Remaining binding sites were blocked with PBS, 2% skimmed milk (MPBS). Plates were then incubated with serial dilution of the bispecific Db3M6xhu225-Ig in MPBS. After washing, the second antigen, HER3-His (300 nM diluted in MPBS), was added to the plates. After washing, bound HER3-His (second antigen) was detected with an HRP-conjugated anti-His antibody and TMB, $H_2O_2$ as substrate. The second antigen was bound to the bispecific Db3M6xhu225-Ig in a concentration-dependent manner with an $EC_{50}$ value in the nanomolar range (1.3 nM) (FIG. 28F) similar as binding of Db3M6xhu225-Ig to coated HER3-Fc. Thus, this result demonstrates the unrestricted accessibility of both antigen binding sites within the Db-Ig molecule.

TABLE 3

Binding properties of Db3M6xhu225-Ig. $EC_{50}$ values [nM] of binding to the extracellular domain (ECD) of EGFR and HER3 fusion proteins were determined by ELISA. The $EC_{50}$ values [nM] of binding to MCF-7, SKBR-3, and FaDu cells were assessed by flow cytometry.

| | ELISA | | | Flow cytometry | | |
|---|---|---|---|---|---|---|
| construct | EGFR | HER3 | EGFR + HER3 | MCF-7 | SKBR-3 | FaDu |
| Db3M6xhu225-Ig | 0.48 | 1.4 | 1.3 | 1.54 | 0.065 | 0.24 |
| Cetuximab | 0.21 | — | n.p. | — | 0.031 | 0.13 |
| 3M6-IgG | — | 0.7 | n.p. | 1.18 | 0.44 | 7.5 |

—: no binding detected;
n.p.: not performed

Figure 29A:
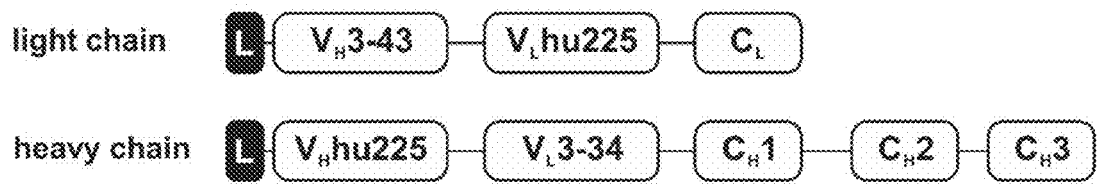
Figure 29B:
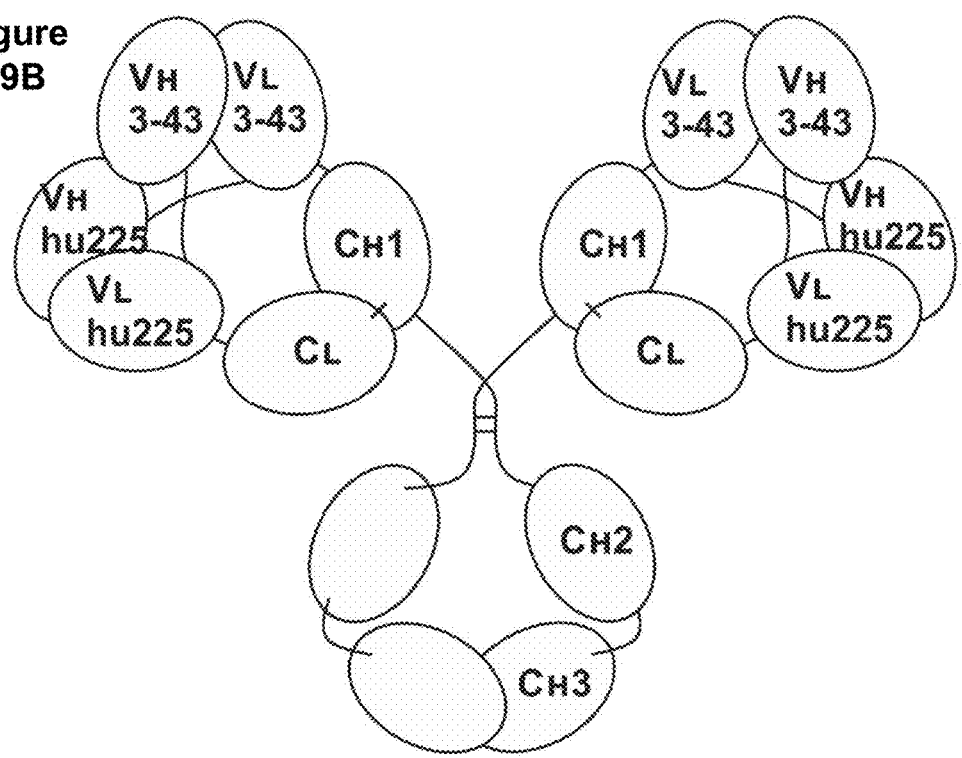

Example 4: A Bispecific and Tetravalent Diabody-Ig Fusion Protein (Db-Ig) Targeting EGFR (Hu225) and HER3 (3-43) Using $C_H1$ and $C_L$ A bispecific, tetravalent Db3-43xhu225-Ig molecule was generated by combining a Db molecule, specific for EGFR (hu225; humanized version of C225 (Cetuximab, Erbitux)) and HER3 (3-43), with the constant domains of an IgG antibody. Thus, the Db3-43xhu225-Ig molecule consists of two different polypeptides, $V_H3-43xV_L225-C_L$ (light chain) and $V_H225xV_L3-43-C_H1-C_H2-C_H3$ (heavy chain) (FIG. 29A). The bispecific Db3-43xhu225-Ig exhibits two antigen binding sites for EGFR and two antigen binding sites for HER3 (FIG. 29B).

Figure 29C:
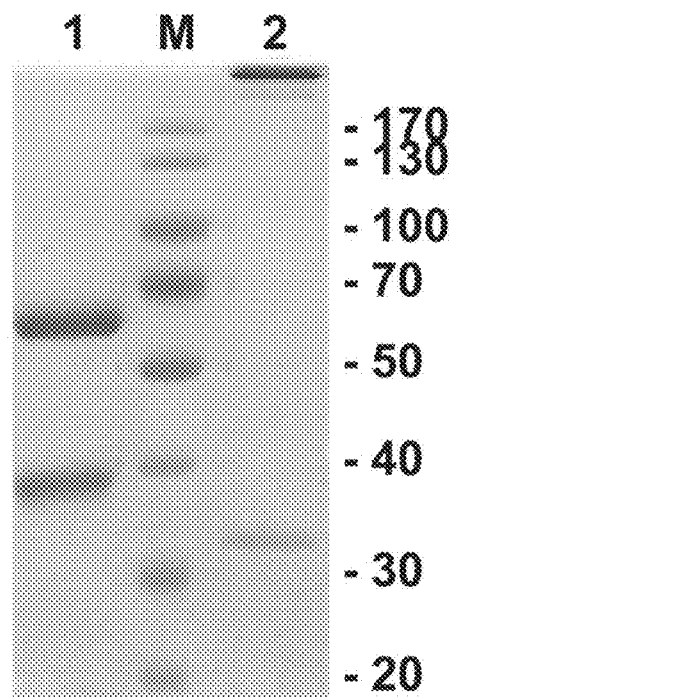
Figure 29D:
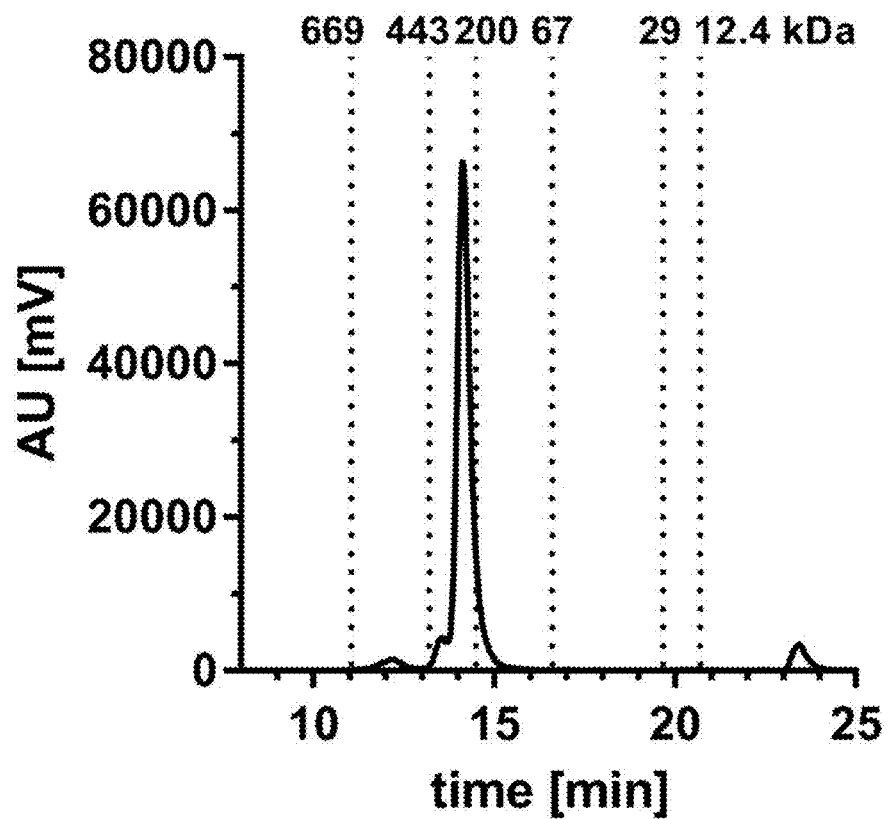
Figure 29E:
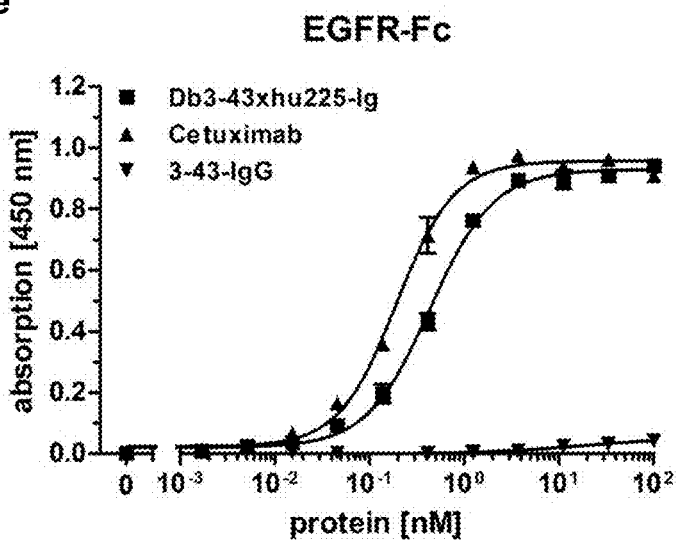
Figure 29F:
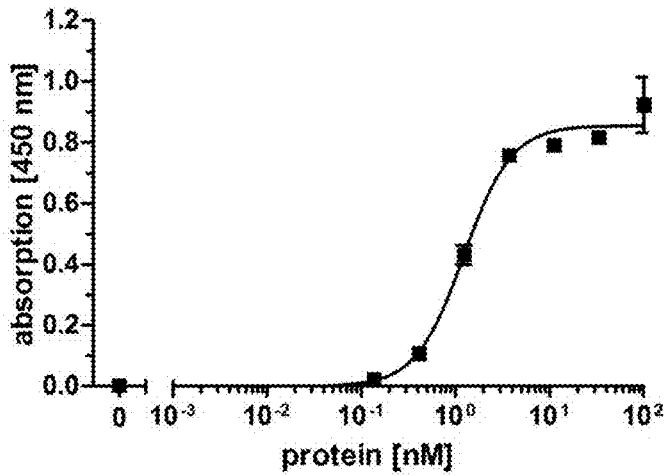

Db3-43xhu225-Ig was expressed in transiently transfected HEK293-6E cells after co-administration of two plasmids encoding for the light chain and the heavy chain, using polyethylenimine as transfection reagent. Protein secreted into cell culture supernatant was purified using $C_H1$-CaptureSelect affinity chromatography. SDS-PAGE analysis revealed two bands under reducing conditions at approximately 65 kDa and 35 kDa corresponding to the heavy and light chain, and one major band under non-reducing conditions at approximately 220 kDa corresponding to the bispecific, tetravalent Db3-43xhu225-Ig molecule (FIG. 29C). Purity, integrity and homogeneity of the Db3-43xhu225-Ig molecule were confirmed by size exclusion chromatography (FIG. 29D). Binding of the Db3-43xhu225-Ig and the monospecific parental antibodies (Cetuximab (anti-EGFR) and 3-43-IgG (anti-HER3)) to the extracellular domain (ECD) of EGFR (aa 25-645) and HER3 (aa 21-643) was determined by ELISA. The EGFR-Fc or the HER3-Fc fusion protein was coated onto polystyrene microtiter plates at a concentration of 2 µg/ml diluted in PBS. Remaining binding sites were blocked with PBS. 2% skimmed milk (MPBS). Plates were then incubated with serial dilution of the bispecific, tetravalent Db3-43xhu225-Ig or the monospecific, bivalent parental antibodies. After washing, bound antibodies were detected with an HRP-conjugated anti-human Fab antibody and TMB. $H_2O_2$ as substrate. ELISA analysis revealed that binding activity of the parental antibodies to the extracellular domain (ECD) of EGFR and HER3 is retained in the Db-Ig format. The bispecific, tetravalent Db3-43xhu225-Ig showed concentration-dependent binding to EGFR and HER3 with $EC_{50}$ values in the sub-nanomolar range (0.43 nM for EGFR; 0.34 nM for HER3) (FIG. 29E). The parental antibodies bound with similar $EC_{50}$ values to their corresponding antigens (Table 4). Simultaneous binding to both antigens. EGFR and HER3, was confirmed by a second ELISA binding analysis. As first antigen. EGFR-Fc fusion protein was coated onto polystyrene microtiter plates at 2 µg/ml in PBS. Remaining binding sites were blocked with PBS. 2% skimmed milk (MPBS). Plates were then incubated with serial dilution of the bispecific, tetravalent Db3-43xhu225-Ig in MPBS. After washing, the second antigen. HER3-His (300 nM diluted in MPBS), was added to the plates. After washing, bound HER3-His (second antigen) was detected with an HRP-conjugated anti-His antibody and TMB. $H_2O_2$ as substrate. The second antigen was bound to the bispecific, tetravalent Db3-43xhu225-Ig in a concentration-dependent manner with an $EC_{50}$ value in the sub-nanomolar range (0.85 nM) FIG. 29F) similar as binding of Db3-43xhu225-Ig to coated HER3-Fc. Thus, this result demonstrates the unrestricted accessibility of both antigen binding sites within the Db3-43xhu225-Ig molecule.

TABLE 4

Binding properties of Db3-43xhu225-Ig. $EC_{50}$ values [nM] of binding to the extracellular domain (ECD) of EGFR and HER3 fusion proteins were determined by ELISA. The $EC_{50}$ values [nM] of binding to MCF-7, SKBR-3, and FaDu cells were assessed by flow cytometry.

| | ELISA | | | Flow cytometry | | |
|---|---|---|---|---|---|---|
| | | | EGFR + | | | |
| construct | EGFR | HER3 | HER3 | MCF-7 | SKBR-3 | FaDu |
| Db3-43xhu225-Ig | 0.43 | 0.34 | 0.85 | 0.054 | 0.047 | 0.14 |
| Cetuximab | 0.19 | — | n.p. | — | 0.031 | 0.13 |
| 3-43-IgG | — | 0.20 | n.p. | 0.021 | 0.022 | 0.003 |

—: no binding detected;
n.p.: not performed

Example 5: Flow Cytometry of Bispecific, Tetravalent Db-Ig Molecules Targeting EGFR (hu225) and HER3 (3M6 or 3-43)

Binding studies of Db3M6xhu225-Ig (Example 3), Db3-43xhu225-Ig (Example 4) and parental monoclonal antibodies (Cetuximab, 3-43-IgG, and 3M6-IgG) to EGFR- and/or HER3-expressing cells (MCF-7, SKBR-3, and FaDu) (Table 5) were analyzed via flow cytometry. Adherent cells were washed with PBS and shortly trypsinized at 37° C. Trypsin was quenched with FCS containing medium and removed by centrifugation (500xg, 5 minutes). 100,000 cells per well were seeded and incubated with a serial dilution of Db3-43xhu225-Ig, Db3M6xhu225-Ig, or parental monoclonal antibodies diluted in PBA (PBS containing 2% (v/v) FCS, 0.02% (w/v) $NaN_3$) for one hour at 4° C. Cells were washed twice using PBA. Bound antibodies were detected using PE-labeled anti-human Fc secondary antibody, which was incubated for another hour at 4° C. After washing, median fluorescence intensity (MFI) was measured with a Milltenyi MACSQuant® Analyzer 10. Relative MFI (to unstained cells) were calculated by MACSQuant® software and Excel. For the HER3-positive MCF-7 cell line, binding of the bispecific, tetravalent Db3-43xhu225-Ig bound in the sub-nanomolar range with an $EC_{50}$ value of 0.054 nM. The parental anti-HER3 3-43-IgG bound with similar $EC_{50}$ values (0.021 nM) to the cells. Similar results, however with reduced $EC_{50}$ values was observed for the bispecific, tetravalent Db3M6xhu225-Ig (1.54 nM) and 3M6-IgG (1.18 nM). No binding to MCF-7 cells was observed for the anti-EGFR antibody Cetuximab.

Regarding the cell line SKBR-3, which expresses EGFR and HER3 in similar ranges, the bispecific, tetravalent Db3-43xhu225-Ig molecule bound with an $EC_{50}$ value of 0.047 nM, similar to the binding of both parental antibodies Cetuximab (0.031 nM) and 3-43-IgG (0.022 nM). The Db3M6xhu225-Ig molecule bound to SKBR-3 cells with an $EC_{50}$ value of approximately 0.065 nM, whereas the parental antibody 3M6-IgG showed reduced binding with an $EC_{50}$ value of 0.44 nM. This result underlines the advantage of a bispecific, tetravalent antibody, as its binding to cells benefits from the parental antibody with the strongest binding. Concerning binding to FaDu cells, Db3-43xhu225-Ig bound with an $EC_{50}$ value of 0.14 nM. As FaDu cells express very high amount of EGFR and comparative low amount of HER3, Db3-43xhu225-Ig bound most likely preferential with the anti-EGFR (hu225) moieties to the cells. Indeed, the parental anti-EGFR antibody Cetuximab bound to the cells with a similar $EC_{50}$ value (0.13 nM). As expected, the parental anti-HER3 3-43-IgG also bound with comparative low fluorescence signal to the cells with an $EC_{50}$ value of 0.003 nM. The $EC_{50}$ value of Db3M6xhu225-Ig was determined with a concentration of 0.24 nM, which is in the same range as obtained for Db3-43xhu225-Ig and Cetuximab. The parental antibody 3M6-IgG showed reduced binding with an $EC_{50}$ value of 7.5 nM. In general, flow cytometry binding analysis confirmed the retained binding activity of the bispecific, tetravalent antibodies (Db3-43xhu225-Ig and Db3M6xhu225-Ig) compared to the monoclonal monospecific parental antibodies (Cetuximab, 3-43-IgG, and 3M6-IgG) (FIG. 30; Table 3 and Table 4).

TABLE 5

Receptor expression of the tumor cell line MCF-7, SKBR-3, and FaDu. Receptor expression of the different cell lines was quantified using QFIT kit.

| cell line | EGFR | HER3 |
|---|---|---|
| MCF-7 | 1,000 | 17,000 |
| SKBR-3 | 30,000 | 14,000 |
| FaDu | 143,000 | 3,000 |

Figure 31A:
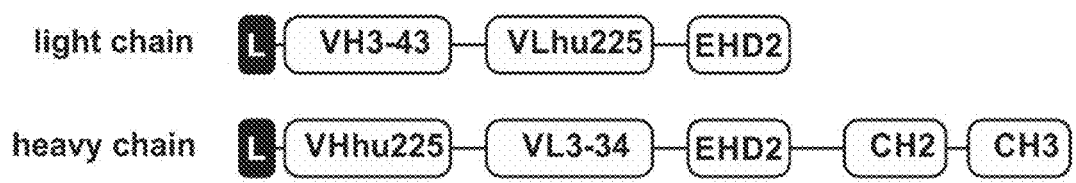
Figure 31B:
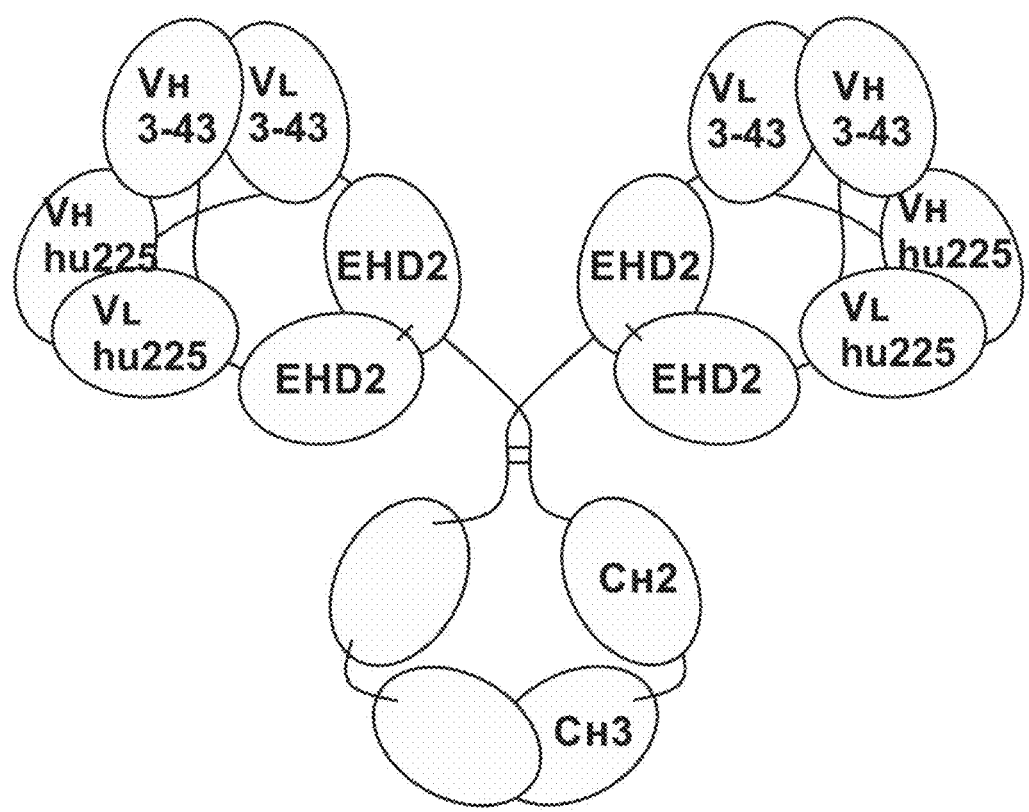

Example 6: A Bispecific and Tetravalent Diabody Fusion Protein Targeting EGFR (Hu225) and HER3 (3-43) Using EHD2 as Dimerization Domain A bispecific, tetravalent Db3-43xhu225-EHD2-Fc molecule was generated by combining a Db molecule, specific for EGFR (hu225; humanized version of C225 (Cetuximab, Erbitux)) and HER3 (3-43), with the $C_H2$ domain of IgE (EHD2) and a homodimeric Fc part. Thus, the Db3-43xhu225-EHD2-Fc molecule consists of two different polypeptides, $V_H3$-43x$V_L$225-EHD2 (light chain) and $V_H$225x$V_L$3-43-EHD2-$C_H$2-$C_H$3 (heavy chain) (FIG. 31A). The bispecific Db3-43xhu225-EHD2-Fc exhibits two antigen binding sites for EGFR and two antigen binding sites for HER3 (FIG. 31B).

Figure 31C:
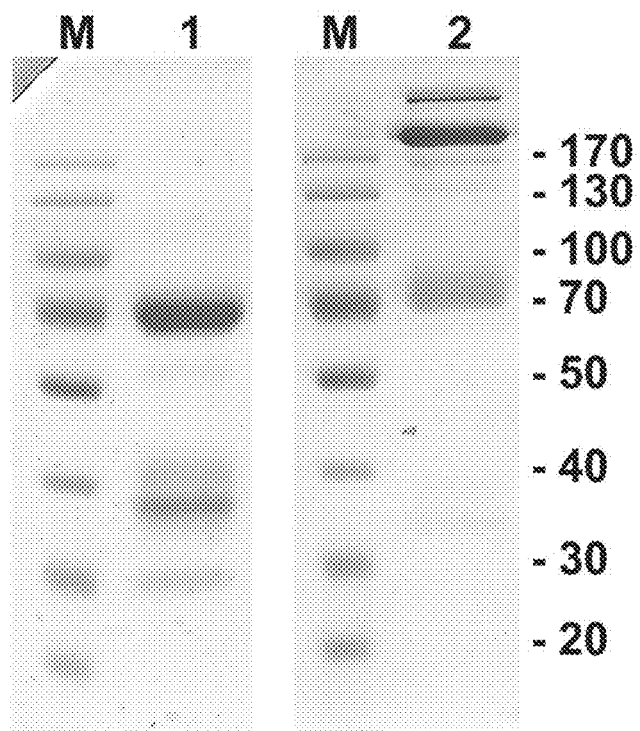
Figure 31D:
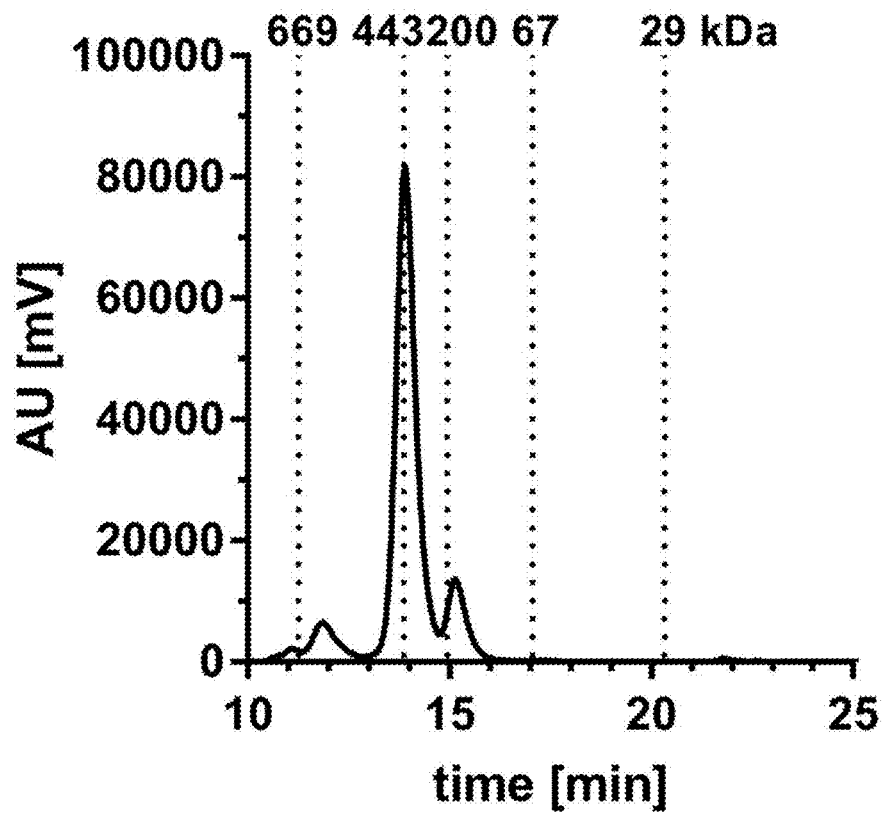
Figure 31E:
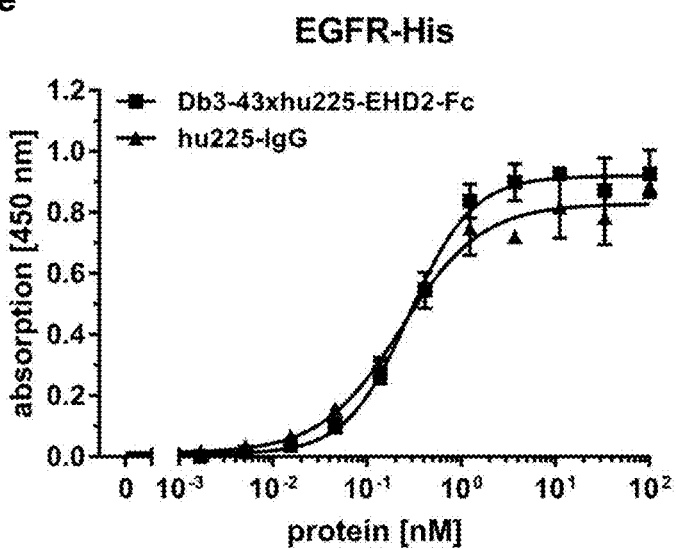
Figure 31E:
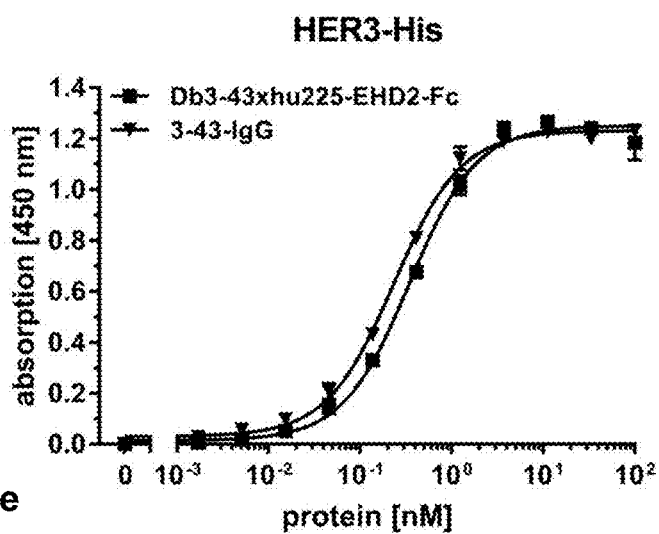
Figure 31F:
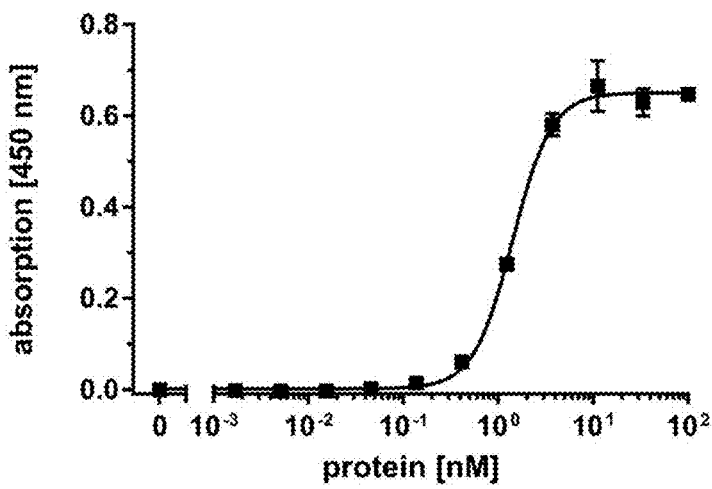

Db3-43xhu225-EHD2-Fc was expressed in transiently transfected HEK293-6E cells after co-administration of two plasmids encoding for the light and the heavy chain, using polyethylenimine as transfection reagent. Protein secreted into cell culture supernatant was purified using FcXL-CaptureSelect affinity chromatography. SDS-PAGE analysis revealed two bands under reducing conditions at approximately 70 kDa and 35 kDa corresponding to the heavy and light chain. Under non-reducing conditions, one major band was detected at approximately 200 kDa and two minor band at approximately 220 kDa and 75 kDa (FIG. 31C). Purity, integrity and homogeneity of the Db3-43xhu225-EHD2-Fc molecule were confirmed by size exclusion chromatography (FIG. 31D). Binding of the bispecific, tetravalent Db3-43xhu225-EHD2-Fc and the monospecific parental antibodies (hu225-IgG (anti-EGFR) and 3-43-IgG (anti-HER3)) to the extracellular domain (ECD) of EGFR (aa 25-645) and HER3 (aa 21-643) was determined by ELISA. The His-tagged EGFR or HER3 proteins were used as antigens and coated onto polystyrene microtiter plates at a concentration of 2 µg/ml diluted in PBS. Remaining binding sites were blocked with PBS. 2% skimmed milk (MPBS). Plates were then incubated with serial dilution of the bispecific, tetravalent Db3-43xhu225-EHD2-Fc or the monospecific parental antibodies. After washing, bound antibodies were detected with an HRP-conjugated anti-human Fc antibody and TMB. $H_2O_2$ as substrate. ELISA analysis revealed that binding activity of the parental antibodies to the extracellular domain (ECD) of EGFR and HER3 is retained in the Db3-43xhu225-EHD2-Fc molecule. The bispecific, tetravalent Db3-43xhu225-EHD2-Fc showed concentration-dependent binding to EGFR and HER3 with $EC_{50}$ values in the sub-nanomolar range (0.28 nM for EGFR: 0.35 nM for HER3) (FIG. 31E). The parental antibodies bound with similar $EC_{50}$ values to their corresponding antigens (Table 6). Simultaneous binding to both antigens. EGFR and HER3, was confirmed by a second binding ELISA analysis. As first antigen. EGFR-Fc fusion protein was coated onto polystyrene microtiter plates at 2 µg/ml in PBS. Remaining binding sites were blocked with PBS. 2% skimmed milk (MPBS). Plates were then incubated with serial dilution of the bispecific Db3-43xhu225-EHD2-Fc in MPBS. After washing, the second antigen. HER3-His (300 nM diluted in MPBS), was added to the plates. After washing, bound HER3-His (second antigen) was detected with an HRP-conjugated anti-His antibody and TMB. $H_2O_2$ as substrate. The second antigen was bound to the bispecific Db3-43xhu225-EHD2-Fc in a concentration-dependent manner with an $EC_{50}$ value in the sub-nanomolar range (1.4 nM) (FIG. 31F) similar as binding of Db3-43xhu225-EHD2-Fc to coated HER3-His. Thus, this result demonstrates the simultaneous binding of both antigen binding sites within the Db3-43xhu225-EHD2-Fc molecule.

TABLE 6

Binding properties of Db3-43xhu225-EHD2-Fc, Db3-43xhu225-hetEHD2-Fc, and Db3-34xhu225-MHD2-Fc. $EC_{50}$ values [nM] of binding to the extracellular domain (ECD) of EGFR and HER3 fusion proteins were determined by ELISA.

| construct | ELISA | | |
| --- | --- | --- | --- |
| | EGFR | HER3 | EGFR + HER3 |
| Db3-43xhu225-EHD2-Fc | 0.28 | 0.35 | 1.4 |
| Db3-43xhu225-hetEHD2-Fc | 0.24 | 0.34 | 0.56 |
| Db3-43xhu225-MHD2-Fc | 0.23 | 0.34 | 1.8 |

TABLE 6-continued

Binding properties of Db3-43xhu225-EHD2-Fc, Db3-43xhu225-hetEHD2-Fc, and Db3-34xhu225-MHD2-Fc. $EC_{50}$ values [nM] of binding to the extracellular domain (ECD) of EGFR and HER3 fusion proteins were determined by ELISA.

| construct | ELISA | | |
| --- | --- | --- | --- |
| | EGFR | HER3 | EGFR + HER3 |
| hu225-IgG | 0.23 | n.p. | n.p. |
| 3-43-IgG | n.p. | 0.23 | n.p. |

—: no binding detected;
n.p.: not performed

Figure 32A:
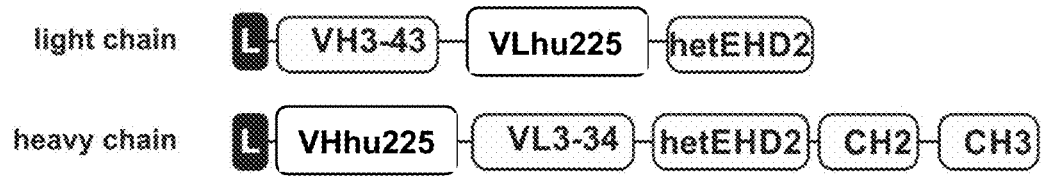
Figure 32B:
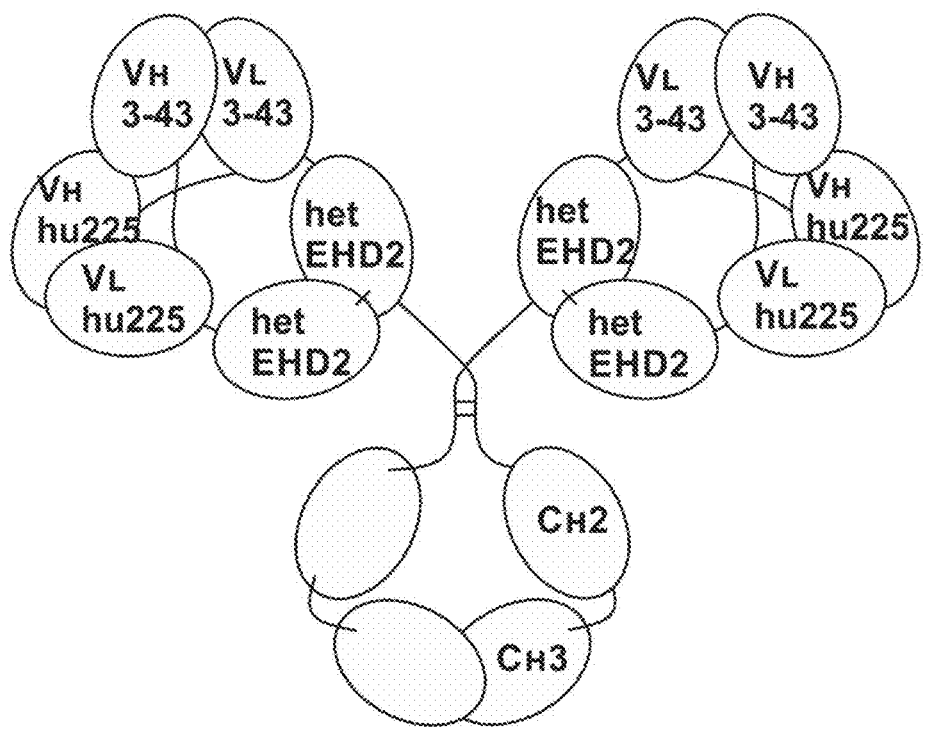

Example 7: A Bispecific and Tetravalent Diabody Fusion Protein Targeting EGFR (Hu225) and HER3 (3-43) Using Het1EHD2 as Dimerization Module A bispecific, tetravalent Db3-43xhu225-het1EHD2-Fc molecule was generated by combining a Db molecule, specific for EGFR (hu225; humanized version of C225 (Cetuximab, Erbitux)) and HER3 (3-43), with a mutated version of $C_H2$ domain of IgE (hetEHD2), which forms heterodimers of EHD2 (C247S, N275Q) (light chain) and EHD2 (C337S) (heavy chain), and a homodimeric Fc part. Thus, the Db3-43xhu225-het1EHD2-Fc molecule consists of two different polypeptides, $V_H3$-43x$V_L$225-EHD2 (C247S, N275Q) (light chain) and $V_H$225x$V_L$3-43-EHD2 (C337S)-$C_H2$-$C_H3$ (heavy chain) (FIG. 32A). The bispecific, tetravalent Db3-43xhu225-het1EHD2-Fc exhibits two antigen binding sites for EGFR and two antigen binding sites for HER3 (FIG. 32B).

Figure 32C:
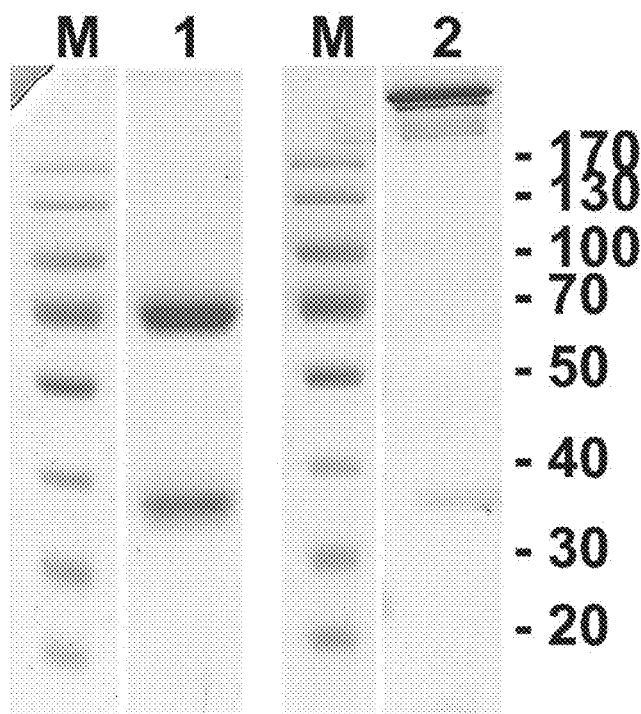
Figure 32D:
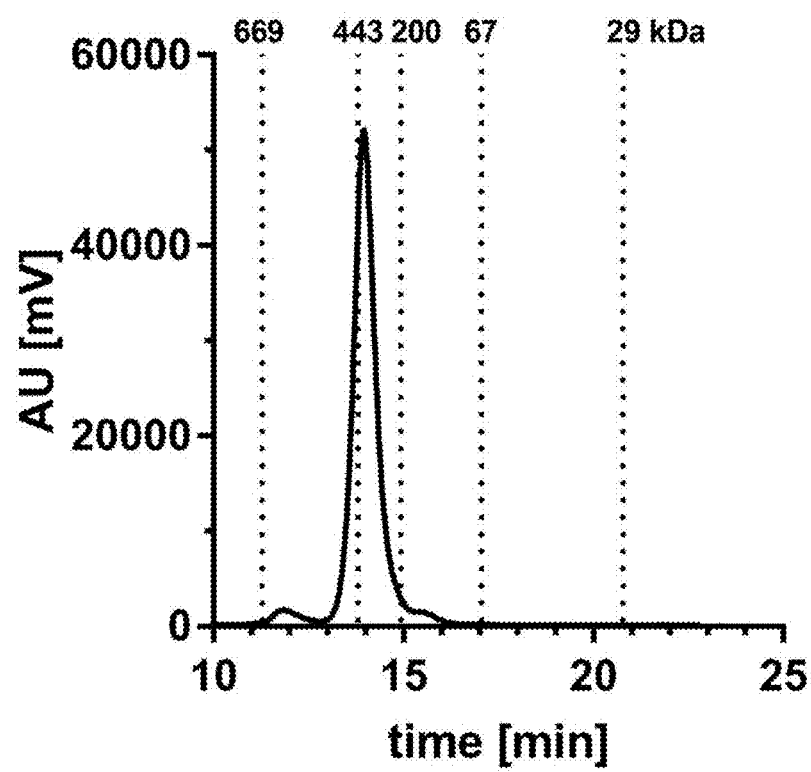
Figure 32E:
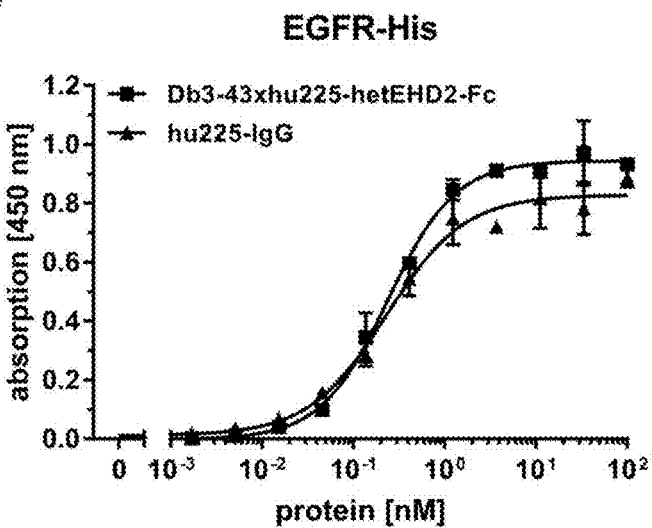
Figure 32E:
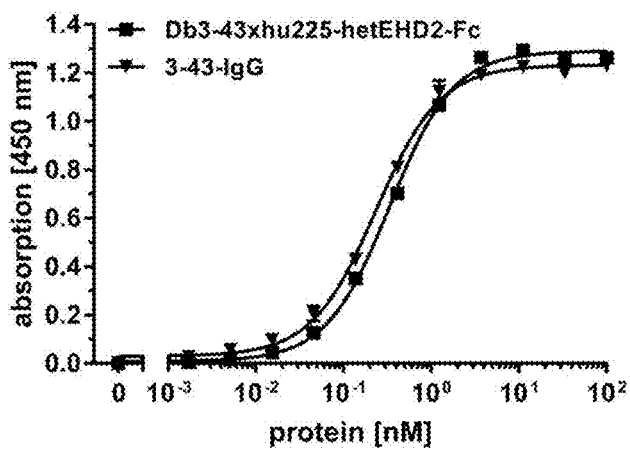
Figure 32F:
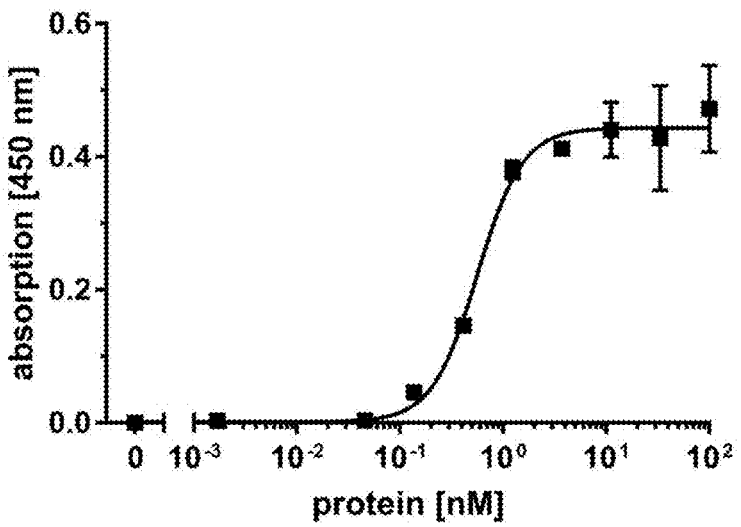

Db3-43xhu225-het1EHD2-Fc was expressed in transiently transfected HEK293-6E cells after co-administration of two plasmids encoding for the light and the heavy chain, using polyethylenimine as transfection reagent. Protein secreted into cell culture supernatant was purified using FcXL-CaptureSelect affinity chromatography. SDS-PAGE analysis revealed two bands under reducing conditions at approximately 70 kDa and 35 kDa corresponding to the heavy and light chain, and one major band under non-reducing conditions at approximately 220 kDa (FIG. 32C). Purity, integrity and homogeneity of the Db3-43xhu225-het1EHD2-Fc molecule were confirmed by size exclusion chromatography (FIG. 32D). Binding of the bispecific Db3-43xhu225-het1EHD2-Fc and the monospecific parental antibodies (hu225-IgG (anti-EGFR) and 3-43-IgG (anti-HER3)) to the extracellular domain (ECD) of EGFR (aa 25-645) and HER3 (aa 21-643) was determined by ELISA. The His-tagged EGFR or HER3 proteins were coated onto polystyrene microtiter plates at a concentration of 2 µg/ml diluted in PBS. Remaining binding sites were blocked with PBS. 2% skimmed milk (MPBS). Plates were then incubated with serial dilution of the bispecific Db3-43xhu225-het1EHD2-Fc or the monospecific parental antibodies. After washing, bound antibodies were detected with an HRP-conjugated anti-human Fc antibody and TMB. $H_2O_2$ as substrate. ELISA analysis revealed that binding activity of the parental antibodies to the extracellular domain (ECD) of EGFR and HER3 is retained in the Db3-43xhu225-het1EHD2-Fc molecule. The bispecific, tetravalent Db3-43xhu225-het1EHD2-Fc showed concentration-dependent binding to EGFR and HER3 with an $EC_{50}$ value in the sub-nanomolar range (0.24 nM for EGFR: 0.34 nM for HER3) (FIG. 32E). The parental antibodies bound with similar $EC_{50}$ values to their corresponding antigens (Table 6). Simultaneous binding to both antigens. EGFR and HER3, was confirmed by a second binding ELISA analysis. As first antigen. EGFR-Fc fusion protein was coated onto polystyrene microtiter plates at 2 µg/ml in PBS. Remaining binding sites were blocked with PBS. 2% skimmed milk (MPBS). Plates were then incubated with serial dilution of the bispecific Db3-43xhu225-het1EHD2-Fc in MPBS. After washing, the second antigen. HER3-His (300 nM diluted in MPBS), was added to the plates for one additional hours at RT. After washing, bound HER3-His (second antigen) was detected with an HRP-conjugated anti-His antibody and TMB. $H_2O_2$ as substrate. The second antigen was bound to the bispecific Db3-43xhu225-het1 EHD2-Fc in a concentration-dependent manner with an $EC_{50}$ value in the sub-nanomolar range (0.56 nM) (FIG. 32F) similar as binding of Db3-43xhu225-het1EHD2-Fc to coated HER3-His. Thus, this result demonstrates the unrestricted accessibility of both antigen binding sites within the Db3-43xhu225-het1EHD2-Fc molecule.

Figure 33A:
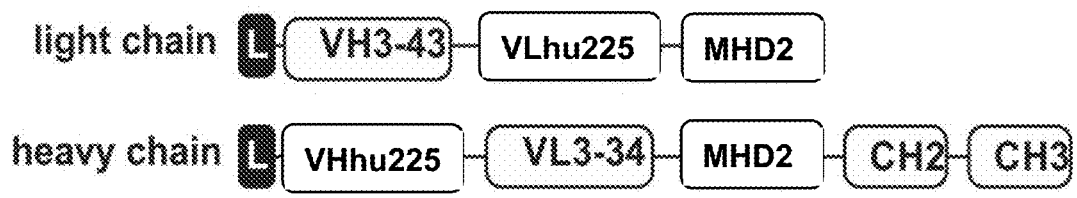
Figure 33B:
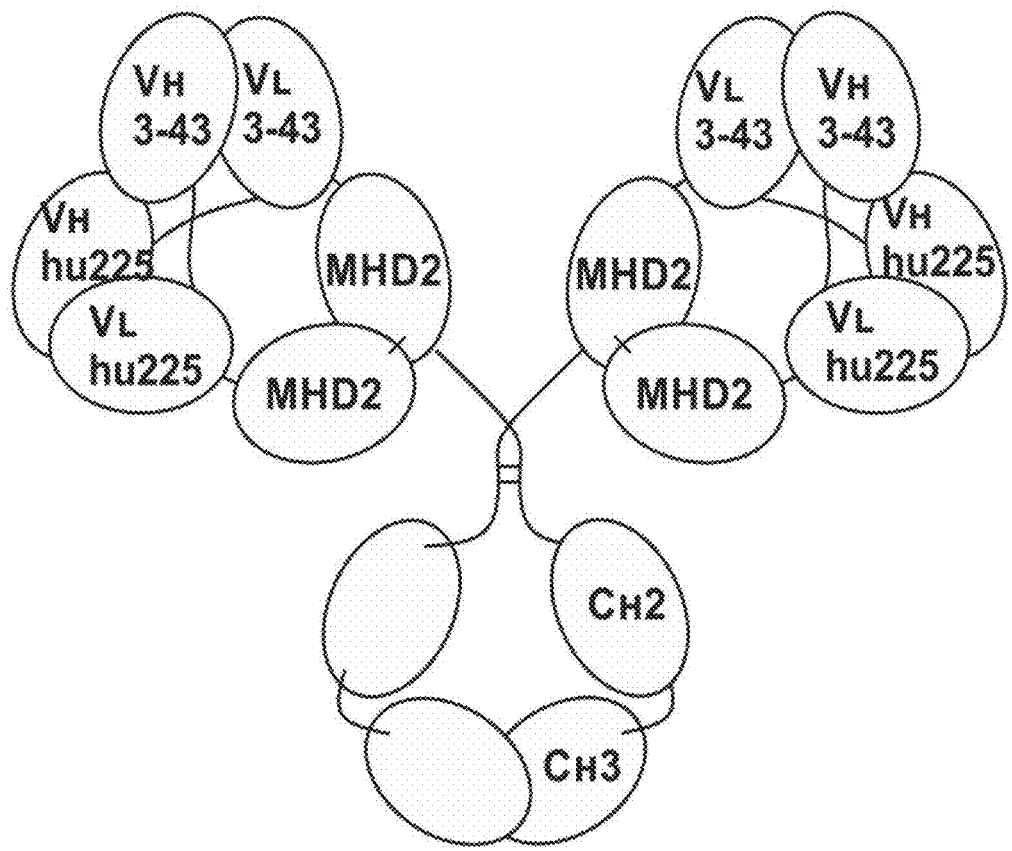

Example 8: A Bispecific and Tetravalent Diabody Fusion Protein Targeting EGFR (Hu225) and HER3 (3-43) Using MHD2 as Dimerization Domain A bispecific, tetravalent Db3-43xhu225-MHD2-Fc molecule was generated by combining a Db molecule, specific for EGFR (hu225; humanized version of C225 (Cetuximab. Erbitux)) and HER3 (3-43), with the $C_H2$ domain of IgM (MHD2) and a homodimeric Fc part. Thus, the Db3-43xhu225-MHD2-Fc molecule consists of two different polypeptides. $V_H3$-43x$V_L$225-MHD2 (light chain) and $V_H$225x$V_L$3-43-MHD2-$C_H2$-$C_H3$ (heavy chain) (FIG. 33A). The bispecific Db3-43xhu225-MHD2-Fc exhibits two antigen binding sites for EGFR and two antigen binding sites for HER3 (FIG. 33B).

Figure 33C:
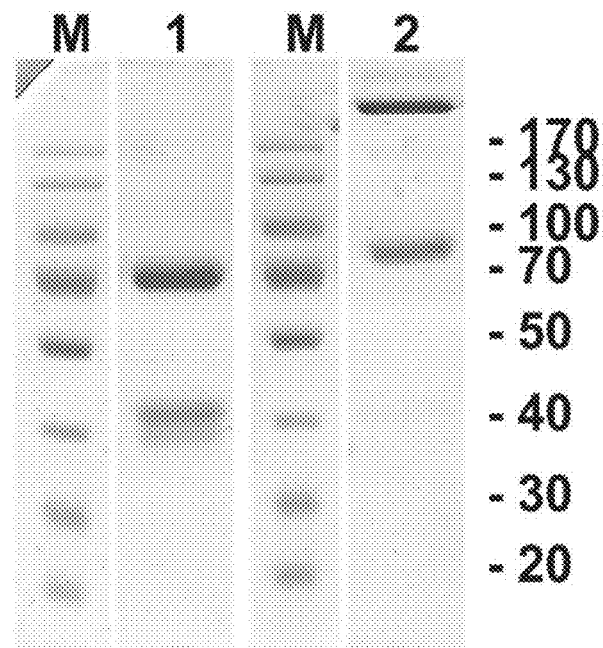
Figure 33D:
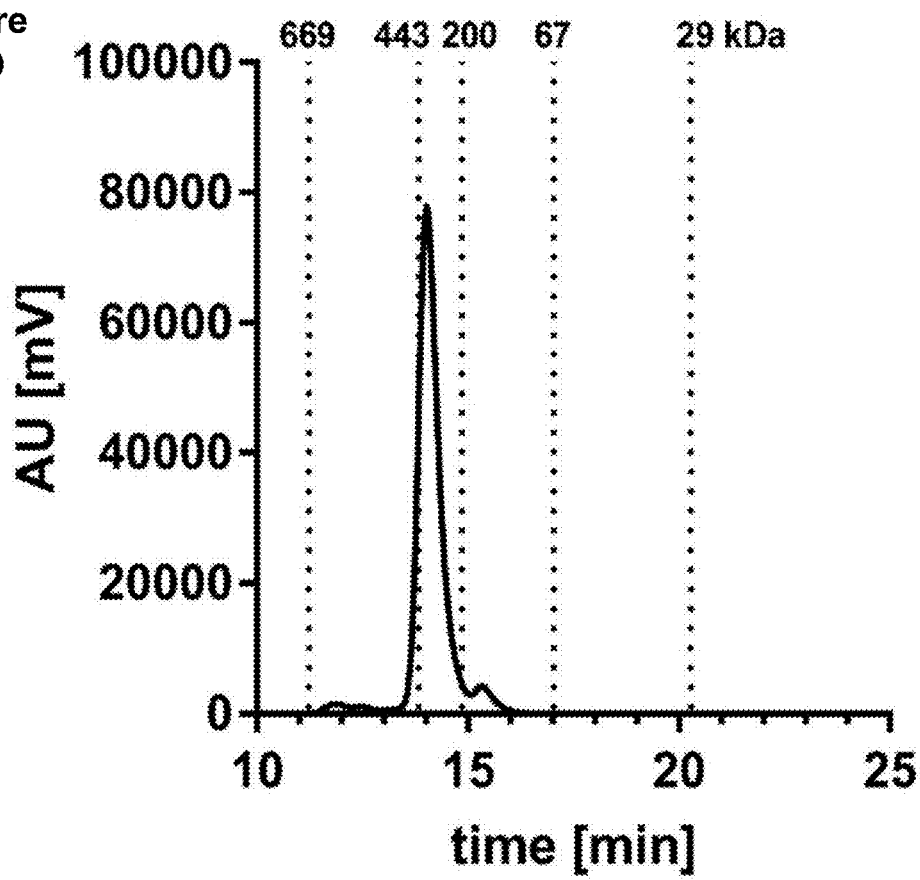
Figure 33E:
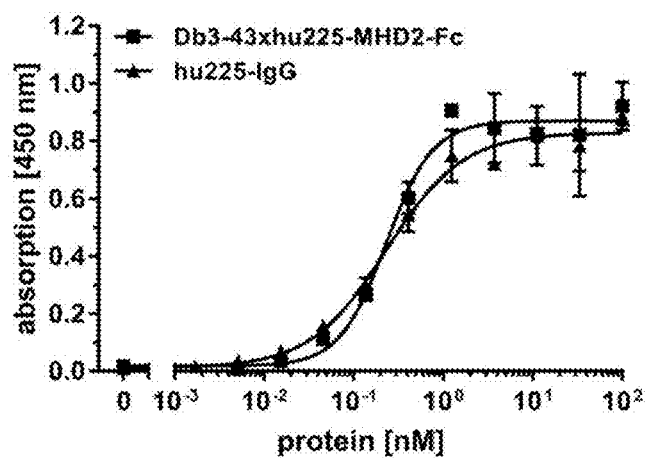
Figure 33E:
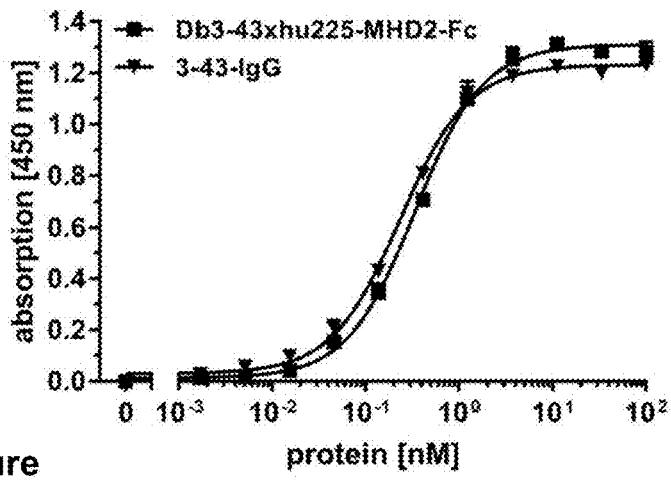
Figure 33F:
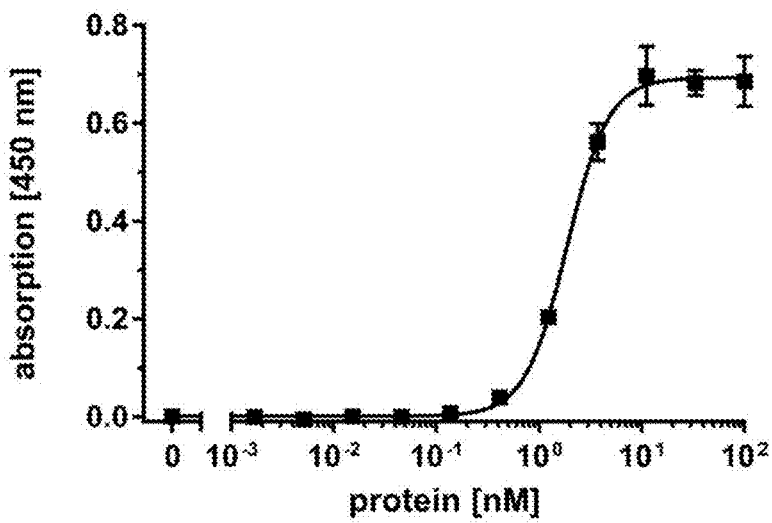

Db3-43xhu225-MHD2-Fc was expressed in transiently transfected HEK293-6E cells after co-administration of two plasmids encoding for the light and the heavy chain, using polyethylenimine as transfection reagent. Protein secreted into cell culture supernatant was purified using FcXL-CaptureSelect affinity chromatography. SDS-PAGE analysis revealed two bands under reducing conditions at approximately 70 kDa and 35 kDa corresponding to the heavy and light chain, and two bands under non-reducing conditions at approximately 200 kDa and 80 kDa corresponding most likely to the dimer of the heavy and the light chain (FIG. 33C). Purity, integrity and homogeneity of the Db3-43xhu225-MHD2-Fc molecule were confirmed by size exclusion chromatography (FIG. 33D). Binding of the Db3-43xhu225-MHD2-Fc and the monospecific parental antibodies (hu225-IgG (anti-EGFR) and 3-43-IgG (anti-HER3)) to the extracellular domain (ECD) of EGFR (aa 25-645) and HER3 (aa 21-643) was determined by ELISA. The His-tagged EGFR or HER3 proteins were coated onto polystyrene microtiter plates at a concentration of 2 µg/ml diluted in PBS. Remaining binding sites were blocked with PBS, 2% skimmed milk (MPBS). Plates were then incubated with serial dilution of the bispecific Db3-43xhu225-MHD2-Fc or the monospecific parental antibodies. After washing, bound antibodies were detected with an HRP-conjugated anti-human Fc antibody and TMB. $H_2O_2$ as substrate. ELISA analysis revealed that binding activity of the parental antibodies to the extracellular domain (ECD) of EGFR and HER3 is retained in the Db3-43xhu225-MHD2-Fc molecule. The bispecific, tetravalent Db3-43xhu225-MHD2-Fc showed concentration-dependent binding to EGFR and HER3 with $EC_{50}$ values in the sub-nanomolar range (0.23 nM for EGFR: 0.34 nM for HER3) (FIG. 33E). The parental antibodies bound with similar $EC_{50}$ values to their corresponding antigens (Table 6). Simultaneous binding to both antigens. EGFR and HER3, was confirmed by a second binding ELISA analysis. As first antigen. EGFR-Fc fusion protein was coated onto polystyrene microtiter plates at 2 µg/ml in PBS. Remaining binding sites were blocked with PBS. 2% skimmed milk (MPBS). Plates were then incubated with serial dilution of the bispecific Db3-43xhu225-EHD2-Fc in MPBS. After washing, the second antigen. HER3-His (300 nM diluted in MPBS), was added to the plates. After washing, bound HER3-His (second antigen) was detected with an HRP-conjugated anti-His antibody and TMB. $H_2O_2$ as substrate. The second antigen was bound to the bispecific Db3-43xhu225-MHD2-Fc in a concentration-dependent manner with an $EC_{50}$ value in the nanomolar range (1.9 nM) (FIG. 33F). This result demonstrated the simultaneous binding of both antigen binding sites within the Db3-43xhu225-MHD2-Fc molecule.

Example 9: Serum Stability of Bispecific, Tetravalent Binding Molecules Targeting EGFR (hu225) and HER3 (3-43)

Stability of the bispecific, tetravalent molecules (Db3-43xhu225-Ig (Example 4). Db3-43xhu225-EHD2-Fc (Example 6). Db3-43xhu225-het1 EHD2-Fc (Example 7). Db3-43xhu225-MHD2-Fc (Example 8)) was analyzed in human plasma. 200 nM of the bispecific molecules diluted in 50% human plasma were incubated at 37° C., for 1, 3, or 7 days. Stability of the proteins was analyzed via ELISA binding studies. The bispecific molecules, which were diluted in PBS and stored at 4° C., were included as control. The His-tagged EGFR or HER3 antigens were coated onto polystyrene microtiter plates at a concentration of 2 µg/ml diluted in PBS.

Remaining binding sites were blocked with PBS. 2% skimmed milk (MPBS). Plates were then incubated with serial dilution of the bispecific molecules (plasma mixture) diluted 1 to 3 in MPBS (starting concentration: 66.66 nM; dilution: 1 to 4). After washing, bound antibodies were detected with a HRP-conjugated anti-human Fc antibody. Compared with the control molecules, ELISA analysis revealed that incubation of all bispecific antibodies in human plasma at 37° C., up to 7 days did only marginal or even not change the binding activity of the bispecific molecules to the extracellular domain of EGFR and HER3. $EC_{50}$ values were determined in the range of 154 to 538 PM for EGFR-His and 198 to 458 PM for HER3-His. In addition, the maximal absorption of the bispecific antibodies, which were incubated for the different time points, was measured in the same range. Thus, the here described bispecific, tetravalent binding molecules obtained high stability under physiological like properties (FIG. 34).

Example 10: In Vivo Half-Life of Bispecific and Tetravalent Diabody-Ig Fusion Protein (Db-Ig) Targeting EGFR (Hu225) and HER3 (3-43)

The pharmacokinetic profile of the bispecific, tetravalent binding molecules (Db3-43xhu225-Ig (Example 4). Db3-

43xhu225-EHD2-Fc (Example 6). Db3-43xhu225-MHD2-Fc (Example 8)) was analyzed in SWISS mice. 25 µg of the protein was diluted in 100 µl sterile PBS and injected intravenously into the tail. After certain time points (3 minutes. 30 minutes, 1 hour. 2 hours. 6 hours. 1 day. 3 days, and 6 days) blood samples were taken from the tail and incubated on ice for 10 minutes. Clotted blood was centrifuged (16.000×g. 20 minutes, 4° C.) and serum samples were stored at −20° C. Protein serum concentration was determined via ELISA. For the Db3-43xhu225-Ig molecule. EGFR-Fc or HER3-Fc fusion proteins were coated onto polystyrene microtiter plates at a concentration of 2 µg/ml diluted in PBS. For Db3-43xhu225-EHD2-Fc and Db3-43xhu225-MHD2-Fc, EGFR-His and HER3-His molecules were used as coated antigens (same conditions). Remaining binding sites were blocked with PBS, 2% skimmed milk (MPBS). Plates were then incubated with serum diluted in MPBS. After washing, bound antibodies were detected either with an HRP-conjugated anti-human Fab antibody for Db3-43xhu225-Ig, or with an HRP-conjugated anti-human Fc antibody for Db3-43xhu225-EHD2-Fc and Db3-43xhu225-MHD2-Fc. TMB and $H_2O_2$ was used as substrate. Serum concentration of the Db3-43xhu225-Ig molecule was interpolated from a standard curve of purified fusion protein and normalized to the 3 minute value (FIG. 35). In general, the pharmacokinetic profiles of the tested bispecific, tetravalent antibodies were similar with terminal half-lives in the range of 3 to 4 days (Table 7). In addition, only marginal differences were observed for the different antibodies using the different coated antigens (EGFR and HER3) in ELISA analysis. Thus, binding of the bispecific, tetravalent molecule to both antigens was still ensured after intravenous application in circulation in the blood for up to seven days.

TABLE 7

Pharmacokinetic profile of bispecific, tetravalent antibodies. Protein concentration of serum samples were measured via ELISA using either EGFR or HER3 as coated antigen. Initial and terminal half-lives of bispecific, tetravalent antibodies were determined by Excel.

| construct | coated antigen | initial half-life [h] | terminal half-life [h] |
|---|---|---|---|
| Db3-43xhu225-Ig | EGFR | 2.7 ± 0.4 | 89.4 ± 2.2 |
| | HER3 | 3.1 ± 1.0 | 86.0 ± 2.7 |
| Db3-43xhu225-EHD2-Fc | EGFR | 3.4 ± 1.8 | 105.0 ± 17.1 |
| | HER3 | 2.6 ± 0.5 | 94.8 ± 5.0 |
| Db3-43xhu225-MHD2-Fc | EGFR | 0.9 ± 0.1 | 73.6 ± 8.0 |
| | HER3 | 1.8 ± 0.5 | 70.8 ± 2.2 |

Figure 36A:
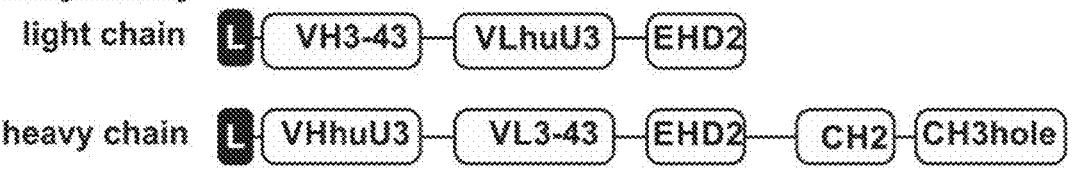
Figure 36A:
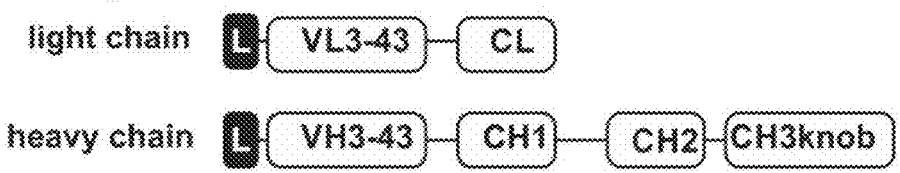
Figure 36B:
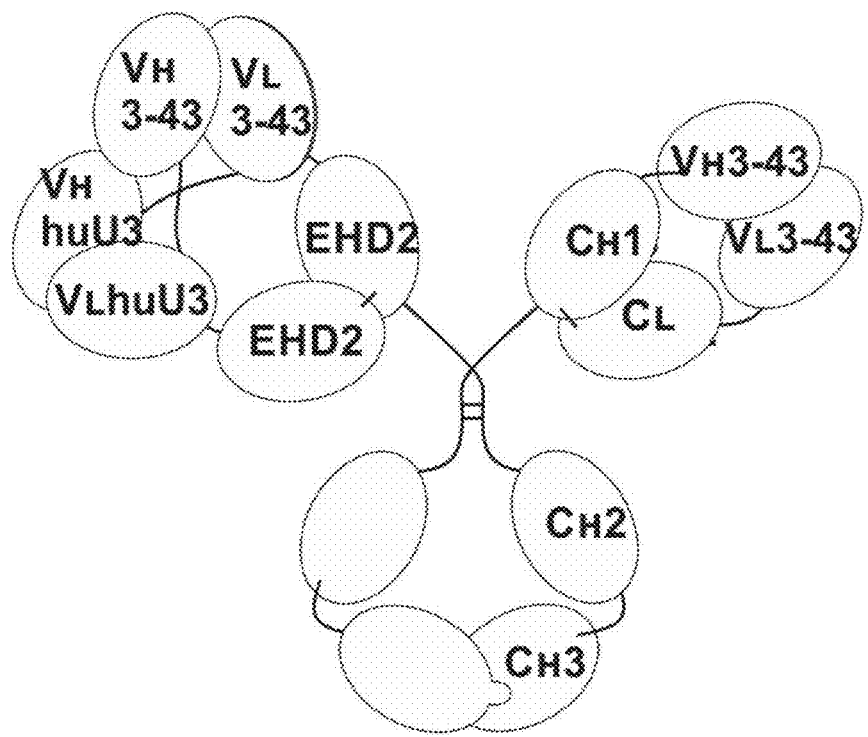

Example 11: A Bispecific, Trivalent Diabody-Fab Fusion Protein Targeting HER3 (3-43) and CD3 (huU3) Using $C_H1/C_L$ and EHD2 as Dimerization Domains A bispecific, trivalent Db3-43xhuU3-EHD2-Fab3-43-$Fc_{kih}$ molecule was generated by combining a Db molecule, specific for HER3 (3-43) and CD3 (huU3; humanized version of UCHT1), with the $C_H2$ domain of IgE (EHD2), together with a HER3-specific Fab molecule by using a heterodimeric Fc part (knob-into-hole technology). Thus, the Db3-43xhuU3-EHD2-Fab3-43-$Fc_{kih}$ molecule consists of four different polypeptides, i) $V_H$3-43x$V_L$huU3-EHD2 (light chain of diabody moiety), ii) $V_H$huU3x$V_L$3-43-EHD2-$C_H2$-$C_H3_{hole}$ (heavy chain of diabody moiety), iii) $V_H$3-43-$C_H1$-$C_H2$-$C_H3_{knob}$ (heavy chain of Fab moiety), and iv) $V_L$3-43-$C_L\lambda$ (light chain of Fab moiety) (FIG. 36A). The bispecific Db3-43xhuU3-EHD2-Fab3-43-$Fc_{kih}$ exhibits two antigen binding sites for HER3 and one antigen binding site for CD3 (FIG. 36B).

Figure 36C:
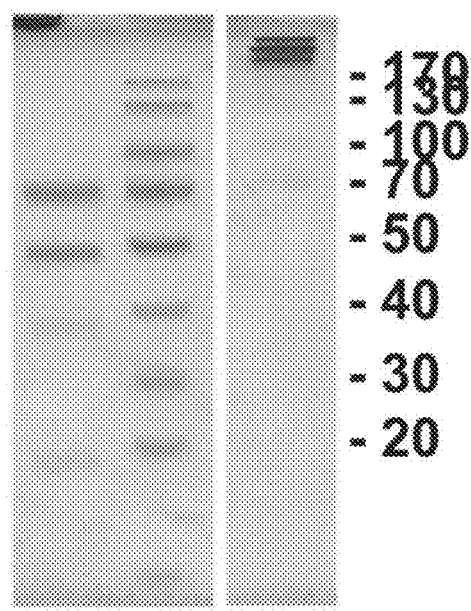
Figure 36D:
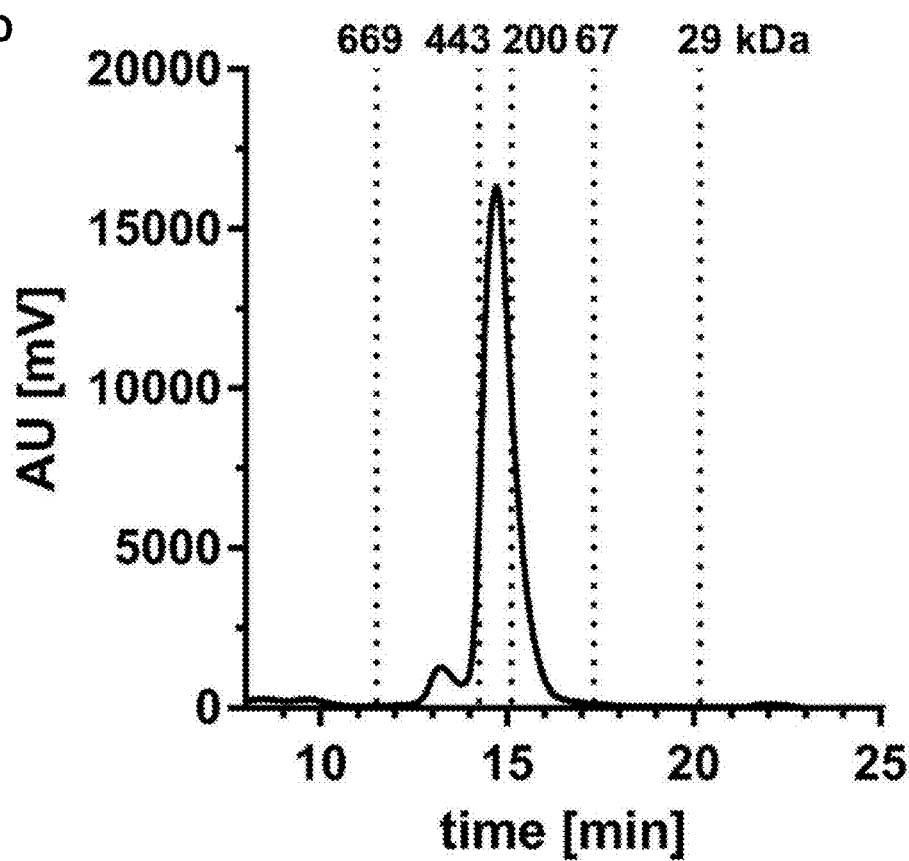
Figure 36E:
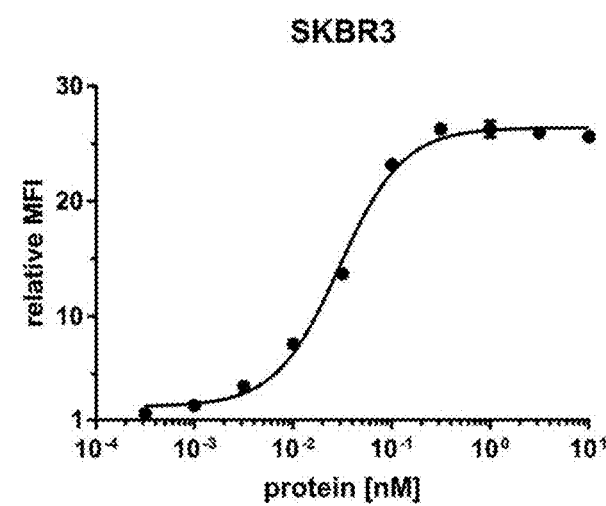
Figure 36E:
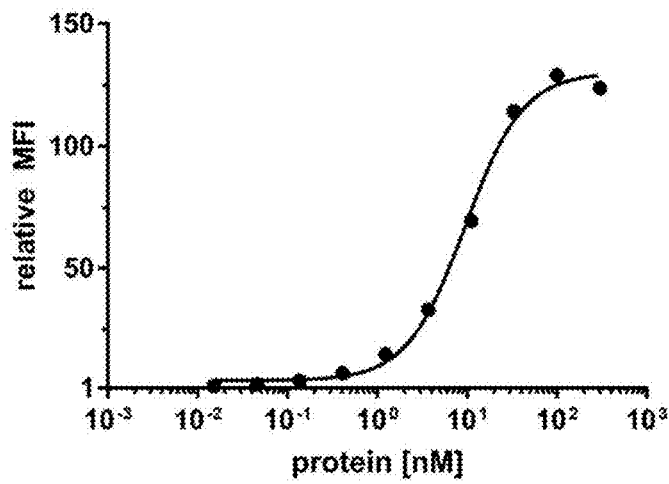
Figure 36F:
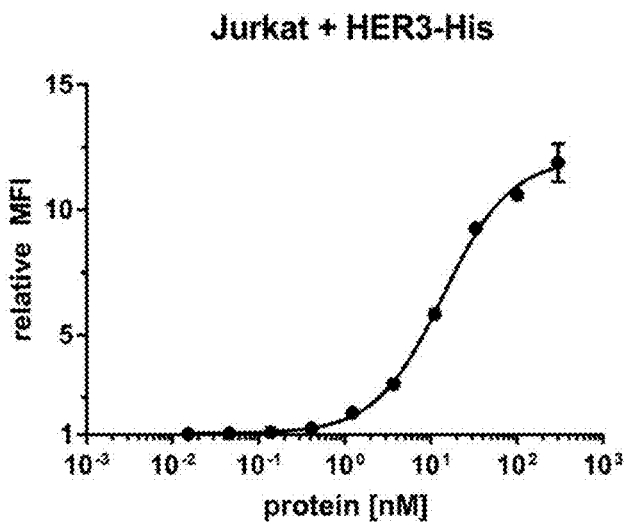

Db3-43xhuU3-EHD2-Fab3-43-$Fc_{kih}$ was expressed in transiently transfected HEK293-6E cells after co-administration of four plasmids encoding for the light and heavy chain of the diabody moiety and of the Fab moiety, using polyethylenimine as transfection reagent. Protein secreted into cell culture supernatant was purified using $C_H1$-CaptureSelect affinity chromatography and size exclusion chromatography using FPLC. SDS-PAGE analysis revealed four bands under reducing conditions at approximately 70 kDa (heavy chain of diabody moiety). 50 kDa (heavy chain of Fab moiety), 35 kDa (light chain of diabody moiety), and 20 kDa (light chain of Fab moiety). Under non-reducing conditions, one major band at approximately 200 kDa and two minor bands (above and below the major band) were observed (FIG. 36C). Purity, integrity and homogeneity of the Db3-43xhuU3-EHD2-Fab3-43-$Fc_{kih}$ molecule were confirmed by size exclusion chromatography (FIG. 36D).

Binding studies of Db3-43xhuU3-EHD2-Fab3-43-$Fc_{kih}$ to HER3-expressing (SKBR3; Table 5) and CD3-expressing cells (Jurkat) were analyzed via flow cytometry. Adherent SKBR3 cells were washed with PBS and shortly trypsinized at 37° C. Trypsin was quenched with FCS containing medium and removed by centrifugation (500×g, 5 minutes). Jurkat cells, which are suspension cells, were directly used without trypsin treatment. 100.000 cells per well were seeded and incubated with a serial dilution of Db3-43xhuU3-EHD2-Fab3-43-$Fc_{kih}$ diluted in PBA (PBS containing 2% (v/v) FCS. 0.02% (w/v) $NaN_3$) for one hour at 4° C. Cells were washed twice using PBA. Bound antibodies were detected using PE-labeled anti-human Fc secondary antibody, which was incubated for another hour at 4° C. After washing, median fluorescence intensity (MFI) was measured with a Milltenyi MACSQuant® Analyzer 10. Relative MFI (to unstained cells) were calculated by MACSQuant® software and Excel. In general, a concentration-dependent binding of the bispecific Db3-43xhuU3-EHD2-Fab3-43-$Fc_{kih}$ to the cells was observed with $EC_{50}$ values of 30 pM for SKBR3 and 9.5 nM for Jurkat cells (FIG. 36E; Table 8). Simultaneous binding of both antigens was tested via flow cytometry using CD3-expressing Jurkat cells. A titration of bispecific Db3-43xhuU3-EHD2-Fab3-43-$Fc_{kih}$ was incubated with the cells for one hour at RT. After washing cells twice with PBA, the second antigen. HER3-His, was added to the cells (300 nM) and incubated for one additional hour at RT. Cells were washed twice using PBA. Bound HER3-His was detected using a PE-labeled anti-His antibody. After washing, median fluorescence intensity (MFI) was measured with a Milltenyi MACSQuant® Analyzer 10. Relative MFI (to unstained cells) were calculated by MACSQuant® software and Excel. Again, bound HER3-His could be detected in a concentration-dependent manner with an $EC_{50}$ value of 13.8 nM, which is similar to the $EC_{50}$ value obtained for binding of Db3-43xhuU3-EHD2-Fab3-43-$Fc_{kih}$ to Jurkat cells in the absence of the second antigen (Table 8). Thus, these binding experiments confirmed the simultaneous binding and the unrestricted accessibility of both antigens (HER3 and CD3) of the Db3-43xhuU3-EHD2-Fab3-43-Fc$_{kih}$ molecule.

TABLE 8

Binding properties of bispecific, trivalent fusion proteins. EC$_{50}$ values [nM] of binding to SKBR-3, Jurkat cells as well as simultaneous binding to CD3 (Jurkat cells) and HER3-His were assessed by flow cytometry.

| construct | SKBR-3 | Jurkat | Jurkat + HER3-His |
|---|---|---|---|
| Db3-43xhuU3-EHD2-Fab3-43-Fc$_{kih}$ | 0.030 | 9.5 | 13.8 |
| Db3-43xhuU3-EHD2-scFv3-43-Fc$_{kih}$ | 0.037 | 8.1 | 9.0 |

Figure 37A:
Figure 37A:
Figure 37A:
Figure 37B:
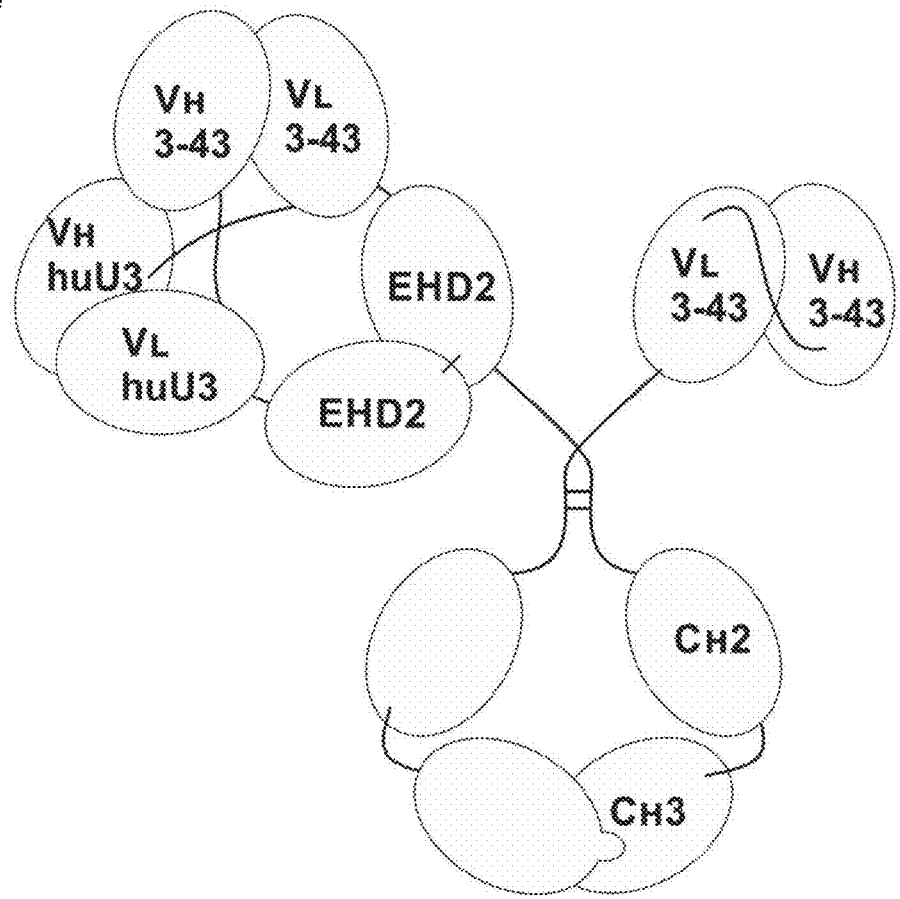

Example 12: A Bispecific, Trivalent Diabody-scFv Fusion Protein Targeting HER3 (3-43) and CD3 (huU3) Using EHD2 as Dimerization Domains A bispecific, trivalent Db3-43xhuU3-EHD2-scFv3-43-Fc$_{kih}$ molecule was generated by combining a Db molecule, specific for HER3 (3-43) and CD3 (huU3; humanized version of UCHT1), with the C$_H$2 domain of IgE (EHD2), together with a HER3-specific scFv molecule by using a heterodimeric Fc part (knob-into-hole technology). Thus, the Db3-43xhuU3-EHD2-scFv3-43-Fc$_{kih}$ molecule consists of three different polypeptides, i) V$_H$3-43xV$_L$huU3-EHD2 (light chain of diabody moiety), ii) V$_H$huU3xV$_L$3-43-EHD2-C$_H$2-C$_H$3$_{hole}$ (heavy chain of diabody moiety), and iii) V$_H$3-43-V$_L$3-43-C$_H$1-C$_H$2-C$_H$3$_{knob}$ (FIG. 37A). The bispecific Db3-43xhuU3-EHD2-scFv3-43-Fc$_{kih}$ exhibits two antigen binding sites for HER3 and one antigen binding site for CD3 (FIG. 37B).

Figure 37C:
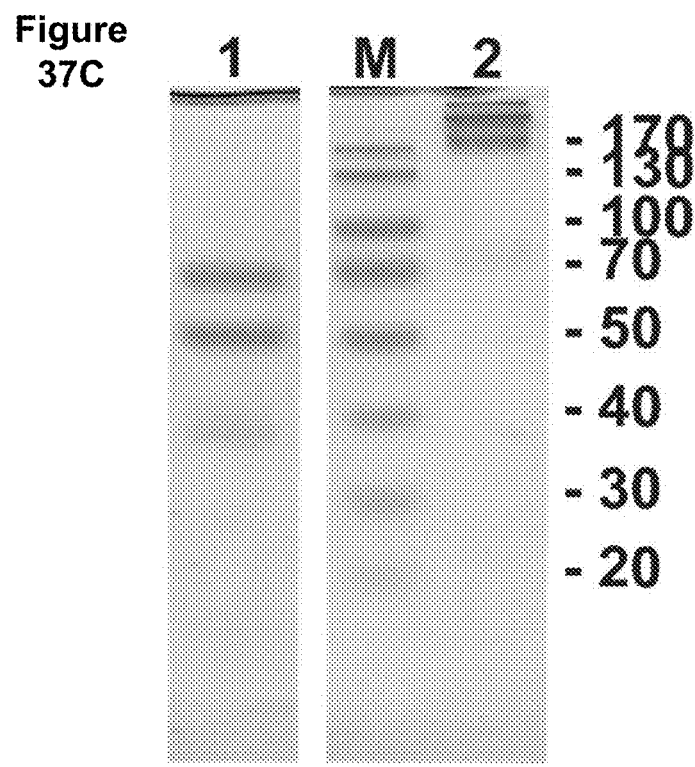
Figure 37D:
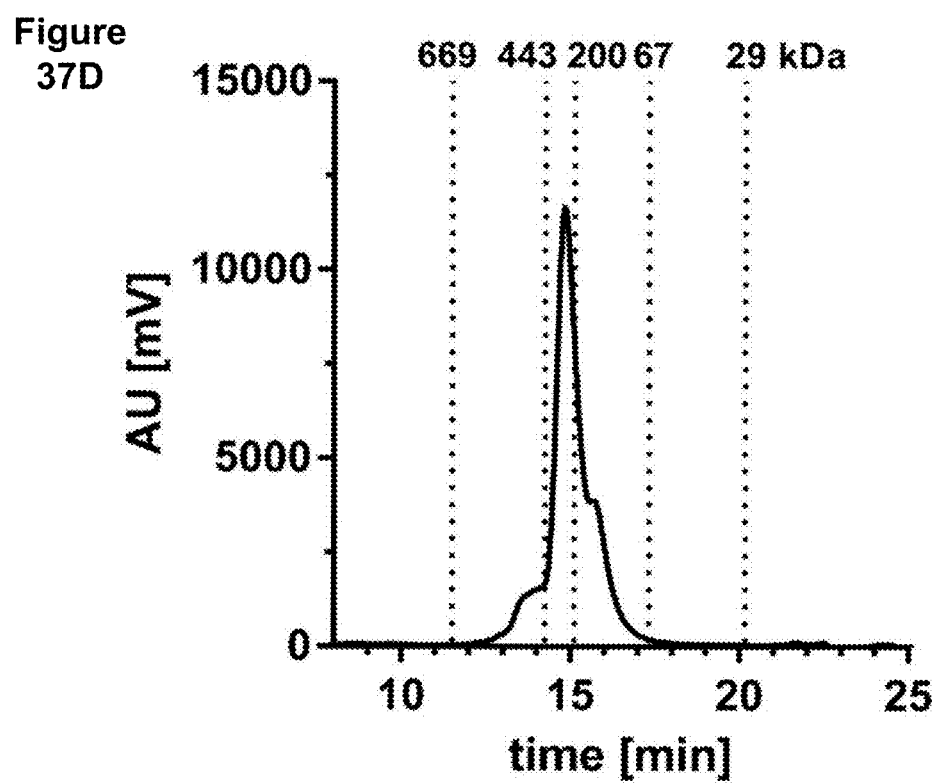
Figure 37E:
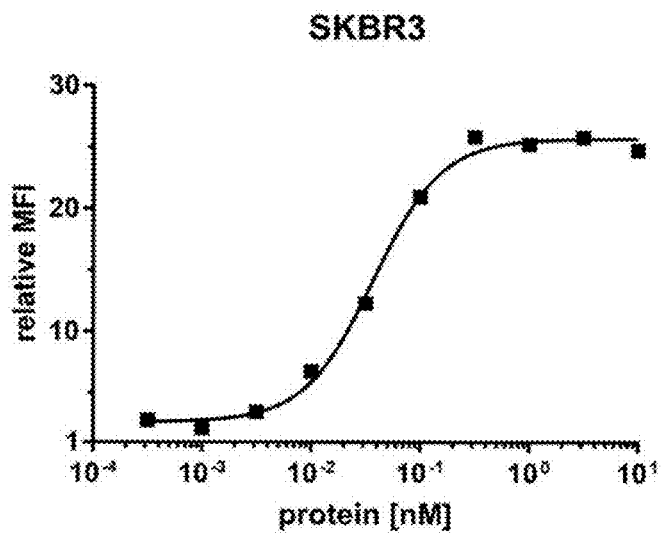
Figure 37E:
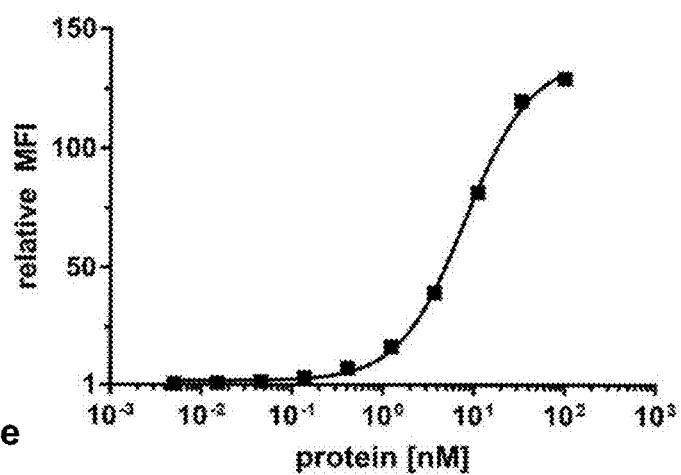

Db3-43xhuU3-EHD2-scFv3-43-Fc$_{kih}$ was expressed in transiently transfected HEK293-6E cells after co-administration of three plasmids encoding for the light chain and the heavy chain of the diabody moiety and for the scFv moiety, using polyethylenimine as transfection reagent. Protein secreted into cell culture supernatant was purified using FcXL-CaptureSelect affinity chromatography and size exclusion chromatography using FPLC. SDS-PAGE analysis revealed three bands under reducing conditions at approximately 70 kDa (heavy chain of diabody moiety), 50 kDa (scFv moiety), and 35 kDa (light chain of diabody moiety). Under non-reducing conditions, one major band at approximately 200 kDa and two minor bands (above and below the major band) were observed (FIG. 37C). Purity, integrity and homogeneity of the Db3-43xhuU3-EHD2-scFv3-43-Fc$_{kih}$ molecule were confirmed by size exclusion chromatography (FIG. 37D).

Figure 37F:
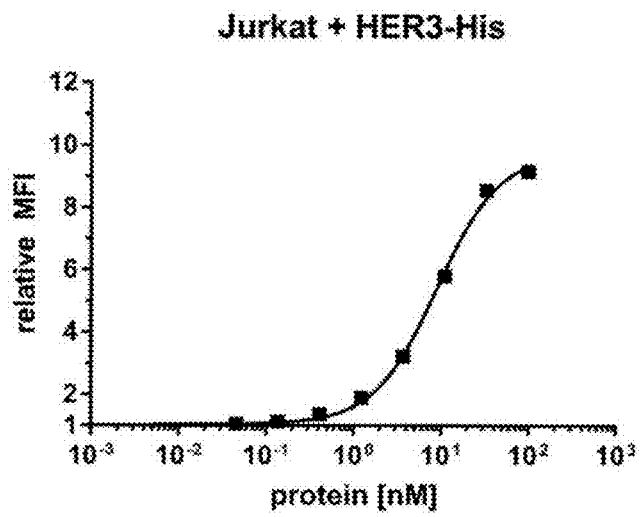

Binding studies of Db3-43xhuU3-EHD2-scFv3-43-Fc$_{kih}$ to HER3-expressing (SKBR3; Table 5) and CD3-expressing cells (Jurkat) were analyzed via flow cytometry. Adherent SKBR3 cells were washed with PBS and shortly trypsinized at 37° C. Trypsin was quenched with FCS containing medium and removed by centrifugation (500×g. 5 minutes). Jurkat cells, which are suspension cells, were directly used without trypsin treatment. 100,000 cells per well were seeded and incubated with a serial dilution of Db3-43xhuU3-EHD2-scFv3-43-Fc$_{kih}$ diluted in PBA (PBS containing 2% (v/v) FCS. 0.02% (w/v) NaN$_3$) for one hour at 4° C. Cells were washed twice using PBA. Bound antibodies were detected using PE-labeled anti-human Fc secondary antibody, which was incubated for another hour at 4° C. After washing, median fluorescence intensity (MFI) was measured with a Milltenyi MACSQuant® Analyzer 10. Relative MFI (to unstained cells) were calculated by MACSQuant® software and Excel. In general, a concentration-dependent binding of the bispecific Db3-43xhuU3-EHD2-scFv3-43-Fc$_{kih}$ to the cells was observed with EC$_{50}$ values of 37 pM for SKBR3 and 8.1 nM for Jurkat cells (FIG. 37E; Table 8). Simultaneous binding of both antigens was tested via flow cytometry using CD3-expressing Jurkat cells. A titration of bispecific Db3-43xhuU3-EHD2-scFv3-43-Fc$_{kih}$ was incubated with the cells for one hour at RT. After washing cells twice with PBA, the second antigen. HER3-His, was added to the cells (300 nM) and incubated for additional hour at RT. Cells were washed twice using PBA. Bound HER3-His was detected using a PE-labeled anti-His antibody. After washing, median fluorescence intensity (MFI) was measured with a Milltenyi MACSQuant® Analyzer 10. Relative MFI (to unstained cells) were calculated by MACSQuant® software and Excel (FIG. 37F). Again, bound HER3-His could be detected in a concentration-dependent manner with an EC$_{50}$ value of 9.0 nM, which is similar to the EC$_{50}$ value obtained for binding of Db3-43xhuU3-EHD2-scFv3-43-Fc$_{kih}$ to Jurkat cells in the absence of the second antigen (Table 8). Thus, these binding experiments confirmed the simultaneous binding and the unrestricted accessibility of both antigens (HER3 and CD3) of the Db3-43xhuU3-EHD2-scFv3-43-FC$_{kih}$ molecule.

Figure 38A:
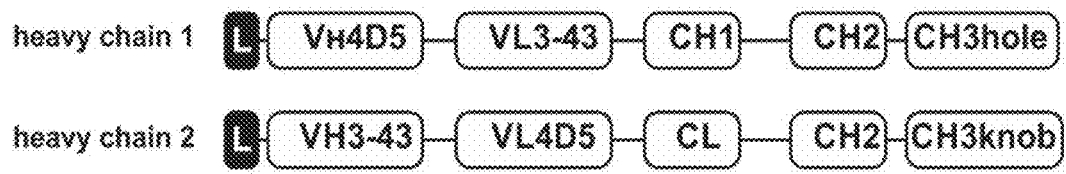
Figure 38B:
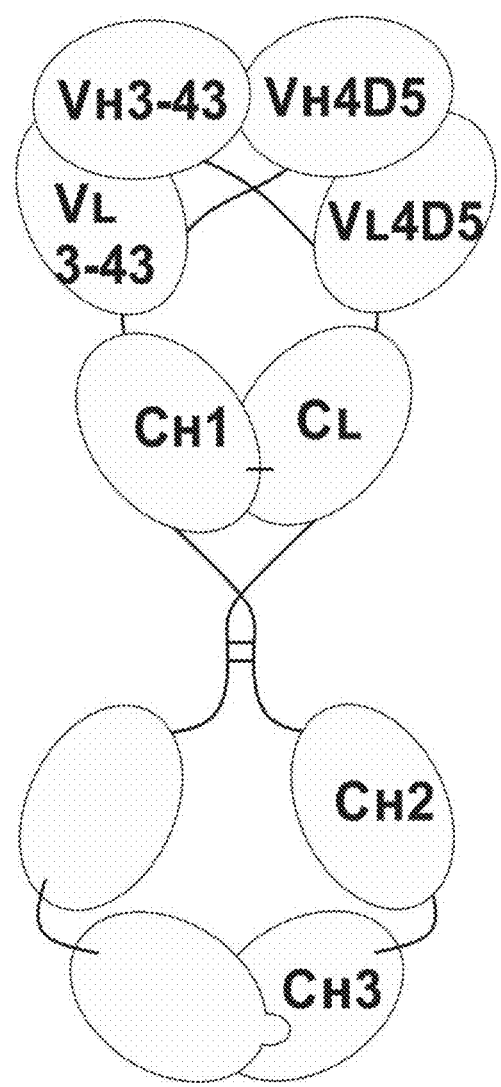

Example 13: A Bispecific, Bivalent Diabody Fusion Protein Targeting HER2 (4D5) and HER3 (3-43) Using C$_H$1/C$_L$ A bispecific, bivalent Db3-43x4D5-Fab-Fc$_{kih}$ molecule was generated by combining a Db molecule, specific for HER2 (4D5; variable domains of Trastuzumab (Herceptin)) and HER3 (3-43), with the C$_H$1/C$_L$ as heterodimeric domain and a heterodimeric Fc part (knob-into-hole technology). Thus, the Db3-43x4D5-Fab-Fc$_{kih}$ molecule consists of two different polypeptides. V$_H$4D5xV$_L$3-43-C$_H$1-C$_H$2-C$_H$3$_{hole}$ (heavy chain 1) and V$_H$3-43xV$_L$4D5-C$_L$-C$_H$2-C$_H$3$_{knob}$ (heavy chain 2) (FIG. 38A). The bispecific, bivalent Db3-43x4D5-Fab-Fc$_{kih}$ exhibits one antigen binding site for HER2 and one antigen binding site for HER3 (FIG. 38B).

Figure 38C:
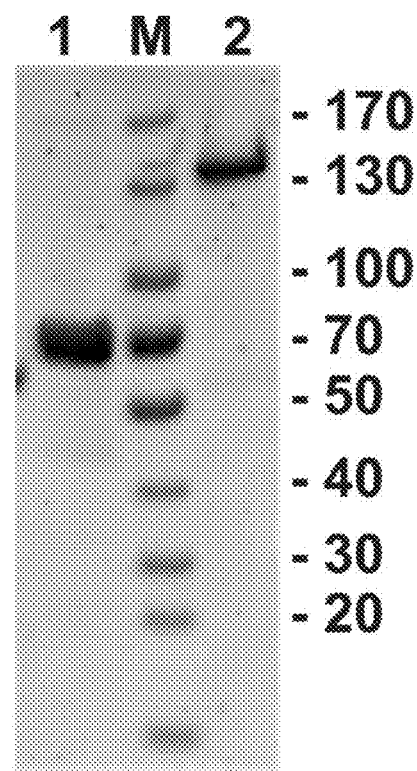
Figure 38D:
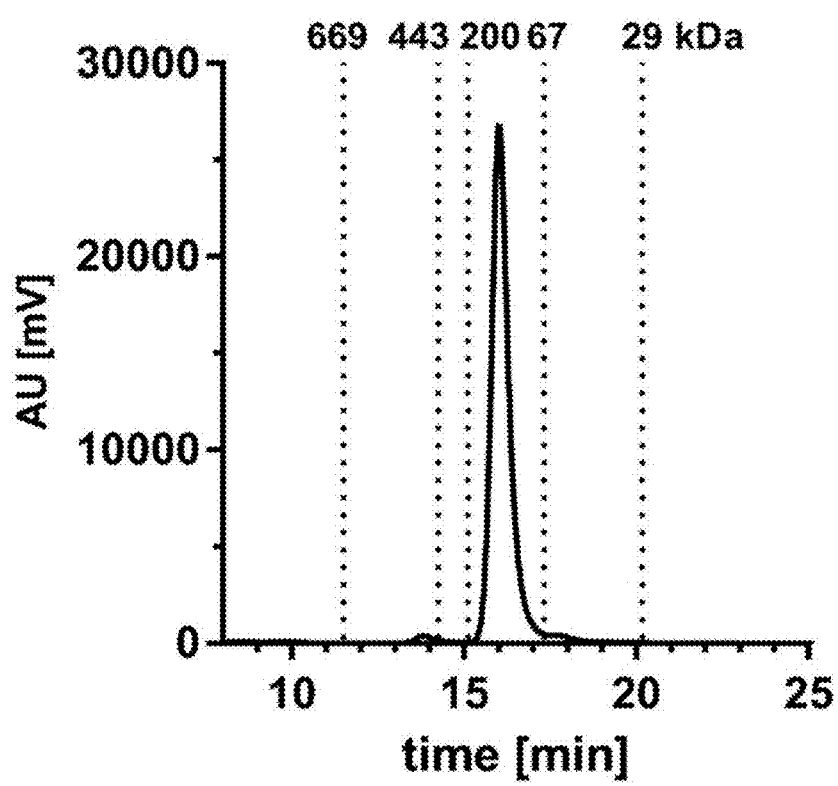
Figure 38E:
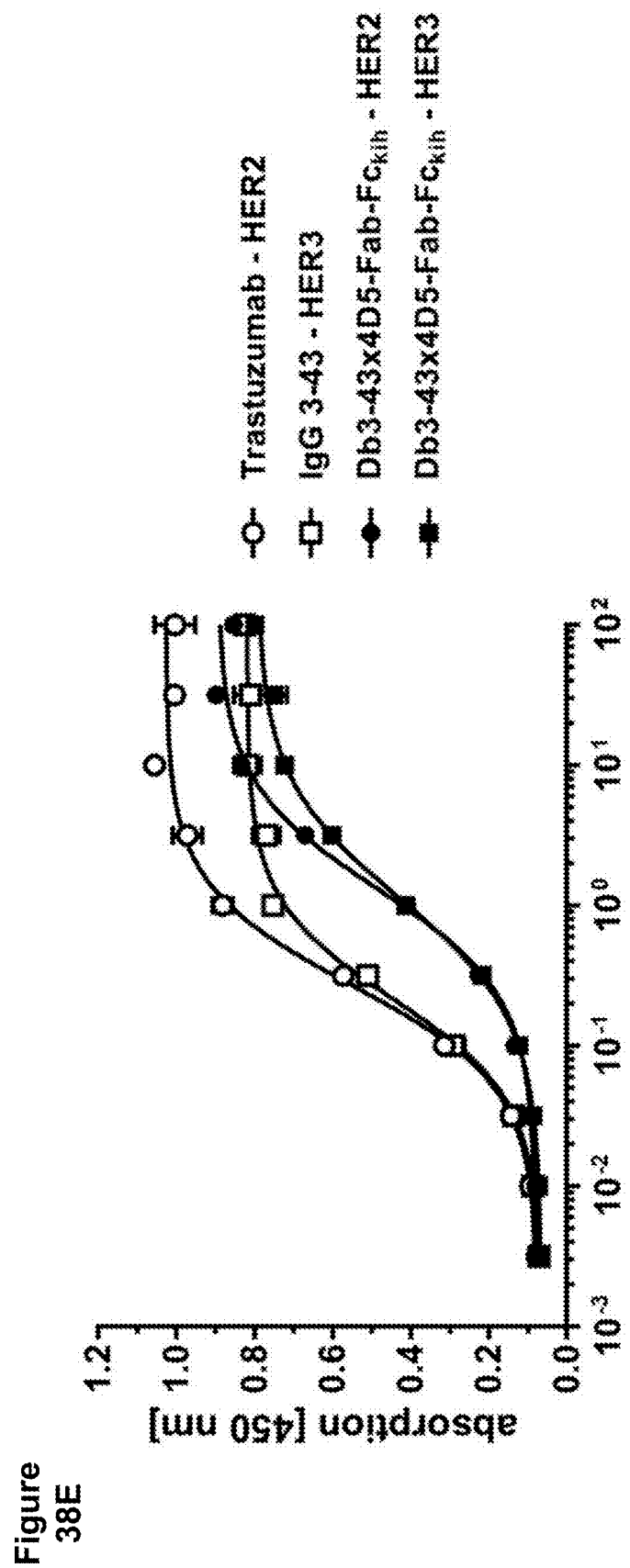

Db3-43x4D5-Fab-Fc$_{kih}$ was expressed in transiently transfected HEK293-6E cells after co-administration of two plasmids encoding for both heavy chains, using polyethylenimine as transfection reagent. Protein secreted into cell culture supernatant was purified using C$_H$1-CaptureSelect affinity chromatography and size exclusion chromatography via FPLC. SDS-PAGE analysis revealed one major bands under reducing conditions at approximately 70 kDa corresponding most likely to both heavy chains of the molecules (same molecular weight). Under non-reducing conditions, one band at approximately 140 kDa was observed corresponding most likely to the intact dimer of the two heavy chains (FIG. 38C). Purity, integrity and homogeneity of the Db3-43x4D5-Fab-Fc$_{kih}$ molecule were confirmed by size exclusion chromatography (FIG. 38D). Binding of the Db3-43x4D5-Fab-Fc$_{kih}$ and the monospecific parental antibodies (Trastuzumab (anti-HER2) and IgG 3-43 (anti-HER3)) to the extracellular domain (ECD) of HER2 (aa 23-652) and HER3 (aa 21-643) was determined by ELISA. The Fc fusion proteins of HER2 or HER3 proteins were coated onto polystyrene microtiter plates at a concentration of 2 µg/ml diluted in PBS. Remaining binding sites were blocked with PBS, 2% skimmed milk (MPBS). Plates were then incubated with serial dilution 20) of the bispecific Db3-43x4D5-Fab-Fc$_{kih}$ or the monospecific parental antibodies. After washing, bound antibodies were detected with an HRP-conjugated anti-human Fab antibody and TMB, $H_2O_2$ as substrate. The bispecific, bivalent Db3-43x4D5-Fab-Fc$_{kih}$ showed concentration-dependent binding to HER2 and HER3 with $EC_{50}$ values in the nanomolar range (1.3 nM for HER2; 1.1 nM for HER3) (FIG. 38E; Table 9). The parental antibodies bound with lower $EC_{50}$ values (0.27 nM for Trastuzumab to HER2; 0.21 nM for IgG 3-43 to HER3) to their corresponding antigens (Table 9). As the parental antibodies bind bivalent their respective antigen, this increased binding of the parental antibodies resulted most likely from the avidity effect. These experiments confirmed binding of Db3-43x4D5-Fab-Fc$_{kih}$ to both antigens, HER2 and HER3, in the expected range (Schmitt et al., 2017).

TABLE 9

Binding properties of Db3-43x4D5-Fab-Fc$_{kih}$. $EC_{50}$ values [nM] of binding to the extracellular domain (ECD) of HER2 and HER3 fusion proteins were determined by ELISA.

| construct | HER2 | HER3 |
|---|---|---|
| Db3-43x4D5-FabFc$_{kih}$ | 1.3 | 1.1 |
| Trastuzumab | 0.27 | n.p. |
| IgG 3-43 | n.p. | 0.21 | n.p.: not performed

The invention claimed is:

1. A multivalent antigen-binding protein complex specifically binding human epidermal growth factor receptor 3 (HER3) and epidermal growth factor receptor (EGFR), wherein the antigen-binding protein complex comprises a dual binding module (DBM1) comprising:
   (a) antigen binding sites selected from the group consisting of:
      (i) amino acid positions 1 to 119 and 125 to 232 of SEQ ID NO: 19; and
      (ii) amino acid positions 1 to 123 and 129 to 235 of SEQ ID NO: 20;
   (b) a first dimerization domain (DD) module comprising two polypeptides, wherein:
      (i) the first polypeptide of the first DD comprises one of $C_H1$ and $C_L$; and
      (ii) the second polypeptide of the first DD comprises the other one of $C_H1$ and $C_L$;
and either:
   (c1) a binding module (BM) comprising:
      (i) the antigen-binding sites of:
         (A) amino acid positions 1 to 119 of SEQ ID NO: 17 and amino acid positions 125 to 231 of SEQ ID NO: 18, or amino acid positions 1 to 119 of SEQ ID NO: 18 and amino acid positions 125 to 235 of SEQ ID NO: 17;
      and
      (ii) and a second DD module comprising two polypeptides, wherein:
         (A) the first polypeptide of the second DD module comprises one of CH1 and CL, and the second polypeptide of the second DD module comprises the other one of CH1 and CL;
         (B) the first polypeptide of the second DD comprises a CH2 domain of IgM (MHD2) and the second polypeptide of the second DD comprises a CH2 domain of IgM (MHD2);
         (C) the first polypeptide of the second DD comprises CH2 domain of IgE (EHD2) and the second polypeptide of the second DD comprises CH2 domain of IgE (EHD2);
         or
         (D) the first polypeptide of the second DD comprises heterodimeric EHD2 (hetEHD2) and the second polypeptide of the second DD comprises hetEHD2;
or
   (c2) a second dual binding module (DBM2) comprising:
      (i) the same antigen-binding sites as DBM1; and
      (ii) a second DD module comprising two polypeptides, wherein:
         (A) the first polypeptide of the second DD comprises MHD2 and the second polypeptide of the second DD comprises MHD2;
         (B) the first polypeptide of the second DD comprises EHD2 and the second polypeptide of the second DD comprises EHD2;
         or
         (C) the first polypeptide of the second DD comprises hetEHD2 and the second polypeptide of the second DD comprises hetEHD2.

2. The multivalent antigen-binding protein complex according to claim 1, wherein the antigen-binding protein complex further comprises a heterodimerization domain (HDM) directly or indirectly linked to the DD module, wherein the HDM comprises two polypeptides, wherein each HDM polypeptide comprises:
   (i) an Fc-part; or
   (ii) a heterodimerizing Fc-part of an antibody.

3. The multivalent antigen-binding protein complex according to claim 1, wherein the antigen-binding sites of SEQ ID NO: 19 and SEQ ID NO: 20 are connected by a peptide linker (L1) having a length of between 4 and 12 amino acid.

4. The multivalent antigen-binding protein complex according to claim 1, wherein the antigen-binding protein complex further comprises a homodimerization or heterodimerization domain (HDM), wherein the HDM comprises two polypeptides, wherein the first HDM polypeptide is directly or indirectly linked to the first DD module, and the second HDM polypeptide is directly or indirectly linked to the second DD module, wherein each HDM polypeptide comprises:
   (i) an Fc-part; or
   (ii) a heterodimerizing Fc-part of an antibody.

5. The multivalent antigen-binding protein complex according to claim 1, wherein the antigen-binding sites of SEQ ID NO: 17, and SEQ ID NO: 18 are connected by a peptide linker (L1) having a length of between 4 and 12 amino acid, and wherein the antigen-binding sites of BM are connected by a peptide linker (L1) having a length of between 4 and 12 amino acid.

6. The multivalent antigen-binding protein complex according to claim 1, wherein the antigen-binding protein complex further comprises a homodimerization or heterodimerization domain (HDM), wherein the HDM comprises two polypeptides, wherein the first HDM polypeptide is directly or indirectly linked to the first DD module, and the second HDM polypeptide is directly or indirectly linked to the second DD module, wherein each HDM polypeptide comprises:
   (i) an Fc-part; or
   (ii) a heterodimerizing Fc-part of an antibody.

7. The multivalent antigen-binding protein complex according to claim 1, wherein the antigen-binding protein complex comprises:
   (i) the amino acid sequence of SEQ ID NO: 17 and SEQ ID NO: 18;
   (ii) the amino acid sequence of SEQ ID NO: 19 and SEQ ID NO: 20; or
   (iii) the amino acid sequence of SEQ ID NO: 32 and SEQ ID NO: 33.

8. The multivalent antigen-binding protein complex of claim 1, further comprising at least one pharmaceutically active moiety and/or imaging molecule.

9. The multivalent antigen-binding protein complex of claim 8, wherein the pharmaceutically active moiety is selected from the group consisting of a ligand and an effector molecule.

10. The multivalent antigen-binding protein complex of claim 9, wherein the ligand is selected from the group consisting of an antigen-binding molecule, a scaffold protein, a ligand, a ligand-binding receptor fragment, and an aptamer.

11. A method for treatment of epidermal growth factor receptor (EGFR) and human epidermal growth factor receptor 3 (HER3) expressing cancer, the method comprising administering to a subject in need thereof an effective amount of the antigen-binding protein complex of claim 1.

12. The antigen-binding protein complex of claim 10, wherein the antigen-binding molecule is selected from the group consisting of a Fab fragment, a Fab' fragment, a heavy chain antibody, a single-domain antibody (sdAb), variable domain of a heavy chain antibody, a single-chain variable fragment (scFv), a tandem scFv, a single-chain diabody, a triple body, a nanoantibody, and a fusion protein thereof.

13. The antigen-binding protein complex of claim 9, wherein the effector molecule is an immune (co)-stimulatory molecule.

* * * * *

SEQUENCE LISTING

```
Sequence total quantity: 36
SEQ ID NO: 1            moltype = AA  length = 5
FEATURE                 Location/Qualifiers
source                  1..5
                        mol_type = protein
                        organism = Homo sapiens
SEQUENCE: 1
GGGGS                                                                    5

SEQ ID NO: 2            moltype = AA  length = 97
FEATURE                 Location/Qualifiers
source                  1..97
                        mol_type = protein
                        organism = Homo sapiens
SEQUENCE: 2
PNIQNPDPAV YQLRDSKSSD KSVCLFTDFD SQTNVSQSKD SDVYITDKTV LDMRSMDFKS  60
NSAVAWSNKS DFACANAFNN SIIPEDTFFP SPESSCD                          97

SEQ ID NO: 3            moltype = AA  length = 130
FEATURE                 Location/Qualifiers
source                  1..130
                        mol_type = protein
                        organism = Homo sapiens
SEQUENCE: 3
DLKNVFPPEV AVFEPSEAEI SHTQKATLVC LATGFYPDHV ELSWWVNGKE VHSGVSTDPQ  60
PLKEQPALND SRYCLSSRLR VSATFWQNPR NHFRCQVQFY GLSENDEWTQ DRAKPVTQIV 120
SAEAWGRADC                                                       130

SEQ ID NO: 4            moltype = AA  length = 98
FEATURE                 Location/Qualifiers
source                  1..98
                        mol_type = protein
                        organism = Homo sapiens
SEQUENCE: 4
GKGNLEWKEP PSMRLKARPS SPGFSVLTCS AFSFYPPELQ LRFLRNGLAA GTGQGDFGPN  60
SDGSFHASSS LTVKSGDEHH YCCIVQHAGL AQPLRVEL                         98

SEQ ID NO: 5            moltype = AA  length = 99
FEATURE                 Location/Qualifiers
source                  1..99
                        mol_type = protein
                        organism = Homo sapiens
SEQUENCE: 5
IQRTPKIQVY SRHPAENGKS NFLNCYVSGF HPSDIEVDLL KNGERIEKVE HSDLSFSKDW  60
SFYLLYYTEF TPTEKDEYAC RVNHVTLSQP KIVKWDRDM                        99

SEQ ID NO: 6            moltype = AA  length = 101
FEATURE                 Location/Qualifiers
source                  1..101
                        mol_type = protein
                        organism = Homo sapiens
```

```
SEQUENCE: 6
GKETLQRTDA  PKTHMTHHAV  SDHEATLRCW  ALSFYPAEIT  LTWQRDGEDQ  TQDTELVETR   60
PAGDGTFQKW  AAVVVPSGQE  QRYTCHVQHE  GLPKPLTLRW  E                       101

SEQ ID NO: 7              moltype = AA  length = 102
FEATURE                   Location/Qualifiers
source                    1..102
                          mol_type = protein
                          organism = Homo sapiens
SEQUENCE: 7
DIETLQRADP  PKTHVTHHPI  SDHEATLRCW  ALGFYPAEIT  LTWQRDGEDQ  TQDTELVETR   60
PAGDRTFQKW  AAVVVPSGEE  QRYTCHVQHE  GLPKPLTLRW  EP                      102

SEQ ID NO: 8              moltype = AA  length = 106
FEATURE                   Location/Qualifiers
source                    1..106
                          mol_type = protein
                          organism = Homo sapiens
SEQUENCE: 8
GRIPVSRGFP  IAEVFTLKPL  EFGKPNTLVC  FVSNLFPPML  TVNWHDHSVP  VEGFGPTFVS   60
AVDGLSFQAF  SYLNFTPEPS  DIFSCIVTHE  PDRYTAIAYW  VPRNAL                  106

SEQ ID NO: 9              moltype = AA  length = 108
FEATURE                   Location/Qualifiers
source                    1..108
                          mol_type = protein
                          organism = Homo sapiens
SEQUENCE: 9
WGSLTNRTRP  PSVQVAKTTP  FNTREPVMLA  CYVWGFYPAE  VTITWRKNGK  LVMHSSAHKT   60
AQPNGDWTYQ  TLSHLALTPS  YGDTYTCVVE  HIGAPEPILR  DWTPGLSP                108

SEQ ID NO: 10             moltype = AA  length = 4
FEATURE                   Location/Qualifiers
source                    1..4
                          mol_type = protein
                          organism = Homo sapiens
SEQUENCE: 10
TVSS                                                                      4

SEQ ID NO: 11             moltype =     length =
SEQUENCE: 11
000

SEQ ID NO: 12             moltype =     length =
SEQUENCE: 12
000

SEQ ID NO: 13             moltype = AA  length = 562
FEATURE                   Location/Qualifiers
source                    1..562
                          mol_type = protein
                          organism = Homo sapiens
SEQUENCE: 13
EVQLVQSGGG  VERPGGSLRL  SCAASGFTFD  DYAMSWVRQA  PGKGLEWVSG  INWQGGSTGY   60
ADSVKGRVTI  SRDNAKNSLY  LQMNSLRAED  TAVYYCAKIL  GAGRGWYFDY  WGKGTTVTVS  120
SGGGGSSELT  QDPAVSVALG  QTVRITCSGD  SLRSYYASWY  QQKPGQAPVL  VIYGANNRPS  180
GIPDRFSGSS  SGNTASLTIT  GAQAEDEADY  YCNSADSSGN  HVVFGGGTKL  TVLASTKGPS  240
VFPLAPSSKS  TSGGTAALGC  LVKDYFPEPV  TVSWNSGALT  SGVHTFPAVL  QSSGLYSLSS  300
VVTVPSSSLG  TQTYICNVNH  KPSNTKVDKK  VEPKSCDKTH  TCPPCPAPPV  AGPSVFLFPP  360
KPKDTLMISR  TPEVTCVVVD  VSHEDPEVKF  NWYVDGVEVH  NAKTKPREEQ  YNSTYRVVSV  420
LTVLHQDWLN  GKEYKCKVSN  KGLPSSIEKT  ISKAKGQPRE  PQVYTLPPSR  DELTKNQVSL  480
TCLVKGFYPS  DIAVEWESNG  QPENNYKTTP  PVLDSDGSFF  LYSKLTVDKS  RWQQGNVFSC  540
SVMHEALHNH  YTQKSLSLSP  GK                                              562

SEQ ID NO: 14             moltype = AA  length = 340
FEATURE                   Location/Qualifiers
source                    1..340
                          mol_type = protein
                          organism = Homo sapiens
SEQUENCE: 14
EVQLVQSGGG  VERPGGSLRL  SCAASGFTFD  DYAMSWVRQA  PGKGLEWVSG  INWQGGSTGY   60
ADSVKGRVTI  SRDNAKNSLY  LQMNSLRAED  TAVYYCAKIL  GAGRGWYFDY  WGKGTTVTVS  120
SGGGGSSELT  QDPAVSVALG  QTVRITCSGD  SLRSYYASWY  QQKPGQAPVL  VIYGANNRPS  180
GIPDRFSGSS  SGNTASLTIT  GAQAEDEADY  YCNSADSSGN  HVVFGGGTKL  TVLRTVAAPS  240
VFIFPPSDEQ  LKSGTASVVC  LLNNFYPREA  KVQWKVDNAL  QSGNSQESVT  EQDSKDSTYS  300
LSSTLTLSKA  DYEKHKVYAC  EVTHQGLSSP  VTKSFNRGEC                          340

SEQ ID NO: 15             moltype = AA  length = 563
FEATURE                   Location/Qualifiers
```

```
source                      1..563
                            mol_type = protein
                            organism = Homo sapiens
SEQUENCE: 15
QVQLQQSGAE VKKPGSAVKV SCKASGGTFS SYAISWVRQA PGQGLEWMGR IIPILGIANY     60
AQKFQGRVTI TADKSTSTAY MELSSLRSED TAVYYCARDG LGDAFDIWGQ GTMVTVSSGG    120
GGSQSALTQP RSVSGSPGQS ITISCTGTSS DVGGYNYVSW YQQHPGKAPK LMIYDVSNRP    180
SGVSNRFSGS KSGNTASLTI SGLQAEDEAD YYCSSYTSSS TLVVFGGGTK LTVLASTKGP    240
SVFPLAPSSK STSGGTAALG CLVKDYFPEP VTVSWNSGAL TSGVHTFPAV LQSSGLYSLS    300
SVVTVPSSSL GTQTYICNVN HKPSNTKVDK KVEPKSCDKT HTCPPCPAPP VAGPSVFLFP    360
PKPKDTLMIS RTPEVTCVVV DVSHEDPEVK FNWYVDGVEV HNAKTKPREE QYNSTYRVVS    420
VLTVLHQDWL NGKEYKCKVS NKGLPSSIEK TISKAKGQPR EPQVYTLPPS RDELTKNQVS    480
LTCLVKGFYP SDIAVEWESN GQPENNYKTT PPVLDSDGSF FLYSKLTVDK SRWQQGNVFS    540
CSVMHEALHN HYTQKSLSLS PGK                                           563

SEQ ID NO: 16               moltype = AA   length = 341
FEATURE                     Location/Qualifiers
source                      1..341
                            mol_type = protein
                            organism = Homo sapiens
SEQUENCE: 16
QVQLQQSGAE VKKPGSAVKV SCKASGGTFS SYAISWVRQA PGQGLEWMGR IIPILGIANY     60
AQKFQGRVTI TADKSTSTAY MELSSLRSED TAVYYCARDG LGDAFDIWGQ GTMVTVSSGG    120
GGSQSALTQP RSVSGSPGQS ITISCTGTSS DVGGYNYVSW YQQHPGKAPK LMIYDVSNRP    180
SGVSNRFSGS KSGNTASLTI SGLQAEDEAD YYCSSYTSSS TLVVFGGGTK LTVLRTVAAP    240
SVFIFPPSDE QLKSGTASVV CLLNNFYPRE AKVQWKVDNA LQSGNSQESV TEQDSKDSTY    300
SLSSTLTLSK ADYEKHKVYA CEVTHQGLSS PVTKSFNRGE C                       341

SEQ ID NO: 17               moltype = AA   length = 564
FEATURE                     Location/Qualifiers
source                      1..564
                            mol_type = protein
                            organism = Homo sapiens
SEQUENCE: 17
EVQLVESGGG LVQPGGSLRL SCAASGFSLT NYGVHWVRQA PGKGLEWLGV IWSGGNTDYN     60
TPFTSRFTIS RDNSKNTLYL QMNSLRAEDT AVYYCARALT YYDYEFAYWG QGTTVTVSSG    120
GGGSQSALTQ PASVSGSPGQ SITISCTGTS SDVGSYNVVS WYQQHPGKAP KLIIYEVSQR    180
PSGVSNRFSG SKSGNTASLT ISGLQTEDEA DYYCSSYAGS SIFVIFGGGT KVTVLASTKG    240
PSVFPLAPSS KSTSGGTAAL GCLVKDYFPE PVTVSWNSGA LTSGVHTFPA VLQSSGLYSL    300
SSVVTVPSSS LGTQTYICNV NHKPSNTKVD KKVEPKSCDK THTCPPCPAP PVAGPSVFLF    360
PPKPKDTLMI SRTPEVTCVV VDVSHEDPEV KFNWYVDGVE VHNAKTKPRE EQYNSTYRVV    420
SVLTVLHQDW LNGKEYKCKV SNKGLPSSIE KTISKAKGQP REPQVYTLPP SRDELTKNQV    480
SLTCLVKGFY PSDIAVEWES NGQPENNYKT TPPVLDSDGS FFLYSKLTVD KSRWQQGNVF    540
SCSVMHEALH NHYTQKSLSL SPGK                                          564

SEQ ID NO: 18               moltype = AA   length = 338
FEATURE                     Location/Qualifiers
source                      1..338
                            mol_type = protein
                            organism = Homo sapiens
SEQUENCE: 18
EVQLLESGGG LVQPGGSLRL SCAASGFTFS HYVMAWVRQA PGKGLEWVSS ISSSGGWTLY     60
ADSVKGRFTI SRDNSKNTLY LQMNSLRAED TAVYYCTRGL KMATIFDYWG QGTLVTVSSG    120
GGGSDIQLTQ SPSFLSASVG DRVTITCRAS QSIGTNIHWY QQKPGKAPKL LIKYASESIS    180
GVPSRFSGSG SGTEFTLTIS SLQPEDFATY YCQQNNNWPT TFGAGTKLEI KRTVAAPSVF    240
IFPPSDEQLK SGTASVVCLL NNFYPREAKV QWKVDNALQS GNSQESVTEQ DSKDSTYSLS    300
STLTLSKADY EKHKVYACEV THQGLSSPVT KSFNRGEC                           338

SEQ ID NO: 19               moltype = AA   length = 561
FEATURE                     Location/Qualifiers
source                      1..561
                            mol_type = protein
                            organism = Homo sapiens
SEQUENCE: 19
EVQLVESGGG LVQPGGSLRL SCAASGFSLT NYGVHWVRQA PGKGLEWLGV IWSGGNTDYN     60
TPFTSRFTIS RDNSKNTLYL QMNSLRAEDT AVYYCARALT YYDYEFAYWG QGTTVTVSSG    120
GGGSQAGLTQ PPAVSVAPGQ TASITCGRDN IGSRSVHWYQ QKPGQAPVLV VYDDSDRPAG    180
IPERFSGSNY ENTATLTISR VEAGDEADYY CQVWGITSDH VVFGGGTKLT VLASTKGPSV    240
FPLAPSSKST SGGTAALGCL VKDYFPEPVT VSWNSGALTS GVHTFPAVLQ SSGLYSLSSV    300
VTVPSSSLGT QTYICNVNHK PSNTKVDKKV EPKSCDKTHT CPPCPAPPVA GPSVFLPPPK    360
PKDTLMISRT PEVTCVVVDV SHEDPEVKFN WYVDGVEVHN AKTKPREEQY NSTYRVVSVL    420
TVLHQDWLNG KEYKCKVSNK GLPSSIEKTI SKAKGQPREP QVYTLPPSRD ELTKNQVSLT    480
CLVKGFYPSD IAVEWESNGQ PENNYKTTPP VLDSDGSFFL YSKLTVDKSR WQQGNVFSCS    540
VMHEALHNHY TQKSLSLSPG K                                             561

SEQ ID NO: 20               moltype = AA   length = 342
FEATURE                     Location/Qualifiers
source                      1..342
                            mol_type = protein
```

```
                            organism = Homo sapiens
SEQUENCE: 20
QVQLQQSGPG LVKPSQTLSL TCAISGDSVS SNRAAWNWIR QSPSRGLEWL GRTYYRSKWY      60
NDYAQSLKSR ITINPDTPKN QFSLQLNSVT PEDTAVYYCA RDGQLGLDAL DIWGQGTMVT     120
VSSGGGGSDI QLTQSPSFLS ASVGDRVTIT CRASQSIGTN IHWYQQKPGK APKLLIKYAS     180
ESISGVPSRF SGSGSGTEFT LTISSLQPED FATYYCQQNN NWPTTFGAGT KLEIKRTVAA     240
PSVFIFPPSD EQLKSGTASV VCLLNNFYPR EAKVQWKVDN ALQSGNSQES VTEQDSKDST     300
YSLSSTLTLS KADYEKHKVY ACEVTHQGLS SPVTKSFNRG EC                        342

SEQ ID NO: 21            moltype = AA  length = 566
FEATURE                  Location/Qualifiers
source                   1..566
                         mol_type = protein
                         organism = Homo sapiens
SEQUENCE: 21
EVQLVESGGG LVQPGGSLRL SCAASGFSLT NYGVHWVRQA PGKGLEWLGV IWSGGNTDYN      60
TPFTSRFTIS RDNSKNTLYL QMNSLRAEDT AVYYCARALT YYDYEFAYWG QGTTVTVSSG     120
GGGSQAGLTQ PPAVSVAPGQ TASITCGRDN IGSRSVHWYQ QKPGQAPVLV VYDDSDRPAG     180
IPERFSGSNY ENTATLTISR VEAGDEADYY CQVWGITSDH VVFGGGTKLT VLASDFTPPT     240
VKILQSSCDG GGHFPPTIQL LCLVSGYTPG TINITWLEDG QVMDVDLSTA STTQEGELAS     300
TQSELTLSQK HWLSDRTYTC QVTYQGHTFE DSTKKCADSN DKTHTCPPCP APPVAGPSVF     360
LFPPKPKDTL MISRTPEVTC VVVDVSHEDP EVKFNWYVDG VEVHNAKTKP REEQYNSTYR     420
VVSVLTVLHQ DWLNGKEYKC KVSNKGLPSS IEKTISKAKG QPREPQVYTL PPSRDELTKN     480
QVSLTCLVKG FYPSDIAVEW ESNGQPENNY KTTPPVLDSD GSFFLYSKLT VDKSRWQQGN     540
VFSCSVMHEA LHNHYTQKSL SLSPGK                                         566

SEQ ID NO: 22            moltype = AA  length = 343
FEATURE                  Location/Qualifiers
source                   1..343
                         mol_type = protein
                         organism = Homo sapiens
SEQUENCE: 22
QVQLQQSGPG LVKPSQTLSL TCAISGDSVS SNRAAWNWIR QSPSRGLEWL GRTYYRSKWY      60
NDYAQSLKSR ITINPDTPKN QFSLQLNSVT PEDTAVYYCA RDGQLGLDAL DIWGQGTMVT     120
VSSGGGGSDI QLTQSPSFLS ASVGDRVTIT CRASQSIGTN IHWYQQKPGK APKLLIKYAS     180
ESISGVPSRF SGSGSGTEFT LTISSLQPED FATYYCQQNN NWPTTFGAGT KLEIKRTDFT     240
PPTVKILQSS CDGGHFPPT IQLLCLVSGY TPGTINITWL EDGQVMDVDL STASTTQEGE     300
LASTQSELTL SQKHWLSDRT YTCQVTYQGH TFEDSTKKCA DSN                       343

SEQ ID NO: 23            moltype = AA  length = 566
FEATURE                  Location/Qualifiers
source                   1..566
                         mol_type = protein
                         organism = Homo sapiens
SEQUENCE: 23
EVQLVESGGG LVQPGGSLRL SCAASGFSLT NYGVHWVRQA PGKGLEWLGV IWSGGNTDYN      60
TPFTSRFTIS RDNSKNTLYL QMNSLRAEDT AVYYCARALT YYDYEFAYWG QGTTVTVSSG     120
GGGSQAGLTQ PPAVSVAPGQ TASITCGRDN IGSRSVHWYQ QKPGQAPVLV VYDDSDRPAG     180
IPERFSGSNY ENTATLTISR VEAGDEADYY CQVWGITSDH VVFGGGTKLT VLASDFTPPT     240
VKILQSSCDG GGHFPPTIQL LCLVSGYTPG TINITWLEDG QVMDVDLSTA STTQEGELAS     300
TQSELTLSQK HWLSDRTYTC QVTYQGHTFE DSTKKSADSN DKTHTCPPCP APPVAGPSVF     360
LFPPKPKDTL MISRTPEVTC VVVDVSHEDP EVKFNWYVDG VEVHNAKTKP REEQYNSTYR     420
VVSVLTVLHQ DWLNGKEYKC KVSNKGLPSS IEKTISKAKG QPREPQVYTL PPSRDELTKN     480
QVSLTCLVKG FYPSDIAVEW ESNGQPENNY KTTPPVLDSD GSFFLYSKLT VDKSRWQQGN     540
VFSCSVMHEA LHNHYTQKSL SLSPGK                                         566

SEQ ID NO: 24            moltype = AA  length = 343
FEATURE                  Location/Qualifiers
source                   1..343
                         mol_type = protein
                         organism = Homo sapiens
SEQUENCE: 24
QVQLQQSGPG LVKPSQTLSL TCAISGDSVS SNRAAWNWIR QSPSRGLEWL GRTYYRSKWY      60
NDYAQSLKSR ITINPDTPKN QFSLQLNSVT PEDTAVYYCA RDGQLGLDAL DIWGQGTMVT     120
VSSGGGGSDI QLTQSPSFLS ASVGDRVTIT CRASQSIGTN IHWYQQKPGK APKLLIKYAS     180
ESISGVPSRF SGSGSGTEFT LTISSLQPED FATYYCQQNN NWPTTFGAGT KLEIKRTDFT     240
PPTVKILQSS SDGGGHFPPT IQLLCLVSGY TPGTIQITWL EDGQVMDVDL STASTTQEGE     300
LASTQSELTL SQKHWLSDRT YTCQVTYQGH TFEDSTKKCA DSN                       343

SEQ ID NO: 25            moltype = AA  length = 571
FEATURE                  Location/Qualifiers
source                   1..571
                         mol_type = protein
                         organism = Homo sapiens
SEQUENCE: 25
EVQLVESGGG LVQPGGSLRL SCAASGFSLT NYGVHWVRQA PGKGLEWLGV IWSGGNTDYN      60
TPFTSRFTIS RDNSKNTLYL QMNSLRAEDT AVYYCARALT YYDYEFAYWG QGTTVTVSSG     120
GGGSQAGLTQ PPAVSVAPGQ TASITCGRDN IGSRSVHWYQ QKPGQAPVLV VYDDSDRPAG     180
IPERFSGSNY ENTATLTISR VEAGDEADYY CQVWGITSDH VVFGGGTKLT VLASAELPPK     240
```

```
VSVFVPPRDG FFGNPRKSKL ICQATGFSPR QIQVSWLREG KQVGSGVTTD VQAEAKESG   300
PTTYKVTSTL TIKESDWLGQ SMFTCRVDHR GLTFQQNASS MCVPDDKTHT CPPCPAPPVA  360
GPSVFLFPPK PKDTLMISRT PEVTCVVVDV SHEDPEVKFN WYVDGVEVHN AKTKPREEQY  420
NSTYRVVSVL TVLHQDWLNG KEYKCKVSNK GLPSSIEKTI SKAKGQPREP QVYTLPPSRD  480
ELTKNQVSLT CLVKGFYPSD IAVEWESNGQ PENNYKTTPP VLDSDGSFFL YSKLTVDKSR  540
WQQGNVFSCS VMHEALHNHY TQKSLSLSPG K                                571

SEQ ID NO: 26           moltype = AA   length = 348
FEATURE                 Location/Qualifiers
source                  1..348
                        mol_type = protein
                        organism = Homo sapiens
SEQUENCE: 26
QVQLQQSGPG LVKPSQTLSL TCAISGDSVS SNRAAWNWIR QSPSRGLEWL GRTYYRSKWY   60
NDYAQSLKSR ITINPDTPKN QFSLQLNSVT PEDTAVYYCA RDGQLGLDAL DIWGQGTMVT  120
VSSGGGGSDI QLTQSPSFLS ASVGDRVTIT CRASQSIGTN IHWYQQKPGK APKLLIKYAS  180
ESISGVPSRF SGSGSGTEFT LTISSLQPED FATYYCQQNN NWPTTFGAGT KLEIKRTAEL  240
PPKVSVFVPP RDGFFGNPRK SKLICQATGF SPRQIQVSWL REGKQVGSGV TTDQVQAEAK  300
ESGPTTYKVT STLTIKESDW LGQSMFTCRV DHRGLTFQQN ASSMCVPD              348

SEQ ID NO: 27           moltype = AA   length = 569
FEATURE                 Location/Qualifiers
source                  1..569
                        mol_type = protein
                        organism = Homo sapiens
SEQUENCE: 27
QVQLVQSGAE VKKPGSSVKV SCKASGGTFS GYTMNWVRQA PGQGLEWMGL INPYKGVSTY   60
NGKFKDRVTI TADKSTSTAY MELSSLRSED TAVYYCARSG YYGDSDWYFD VWGQGTLVTV  120
SSGGGGSQAG LTQPPAVSVA PGQTASITCG RDNIGSRSVH WYQQKPGQAP VLVVYDDSDR  180
PAGIPERFSG SNYENTATLT ISRVEAGDEA DYYCQVWGIT SDHVVFGGGT KLTVLASDFT  240
PPTVKILQSS CDGGGHFPPT IQLLCLVSGY TPGTINITWL EDGQVMDVDL STASTTQEGE  300
LASTQSELTL SQKHWLSDRT YTCQVTYQGH TFEDSTKKCA DSNDKTHTCP PCPAPPVAGP  360
SVFLFPPKPK DTLMISRTPE VTCVVVDVSH EDPEVKFNWY VDGVEVHNAK TKPREEQYNS  420
TYRVVSVLTV LHQDWLNGKE YKCKVSNKGL PSSIEKTISK AKGQPREPQV CTLPPSRDEL  480
TKNQVSLSCA VKGFYPSDIA VEWESNGQPE NNYKTTPPVL DSDGSFFLVS KLTVDKSRWQ  540
QGNVFSCSVM HEALHNHYTQ KSLSLSPGK                                   569

SEQ ID NO: 28           moltype = AA   length = 343
FEATURE                 Location/Qualifiers
source                  1..343
                        mol_type = protein
                        organism = Homo sapiens
SEQUENCE: 28
QVQLQQSGPG LVKPSQTLSL TCAISGDSVS SNRAAWNWIR QSPSRGLEWL GRTYYRSKWY   60
NDYAQSLKSR ITINPDTPKN QFSLQLNSVT PEDTAVYYCA RDGQLGLDAL DIWGQGTMVT  120
VSSGGGGSDI QMTQSPSSLS ASVGDRVTIT CRASQDIRNY LNWYQQKPGK APKLLIYYTS  180
RLHSGVPSRF SGSGSGTDFT FTISSLQPED IATYYCQQGN TLPWTFGQGT KLEIKRTDFT  240
PPTVKILQSS CDGGGHFPPT IQLLCLVSGY TPGTINITWL EDGQVMDVDL STASTTQEGE  300
LASTQSELTL SQKHWLSDRT YTCQVTYQGH TFEDSTKKCA DSN                   343

SEQ ID NO: 29           moltype = AA   length = 454
FEATURE                 Location/Qualifiers
source                  1..454
                        mol_type = protein
                        organism = Homo sapiens
SEQUENCE: 29
QVQLQQSGPG LVKPSQTLSL TCAISGDSVS SNRAAWNWIR QSPSRGLEWL GRTYYRSKWY   60
NDYAQSLKSR ITINPDTPKN QFSLQLNSVT PEDTAVYYCA RDGQLGLDAL DIWGQGTMVT  120
VSSASTKGPS VFPLAPSSKS TSGGTAALGC LVKDYFPEPV TVSWNSGALT SGVHTFPAVL  180
QSSGLYSLSS VVTVPSSSLG TQTYICNVNH KPSNTKVDKK VEPKSCGTDK THTCPPCPAP  240
PVAGPSVFLF PPKPKDTLMI SRTPEVTCVV VDVSHEDPEV KFNWYVDGVE VHNAKTKPRE  300
EQYNSTYRVV SVLTVLHQDW LNGKEYKCKV SNKGLPSSIE KTISKAKGQP REPQVYTLPP  360
CRDELTKNQV SLWCLVKGFY PSDIAVEWES NGQPENNYKT TPPVLDSDGS FFLYSKLTVD  420
KSRWQQGNVF SCSVMHEALH NHYTQKSLSL SPGK                             454

SEQ ID NO: 30           moltype = AA   length = 214
FEATURE                 Location/Qualifiers
source                  1..214
                        mol_type = protein
                        organism = Homo sapiens
SEQUENCE: 30
QAGLTQPPAV SVAPGQTASI TCGRDNIGSR SVHWYQQKPG QAPVLVVYDD SDRPAGIPER   60
FSGSNYENTA TLTISRVEAG DEADYYCQVW GITSDHVVFG GGTKLTVLGQ PKAAPSVTLF  120
PPSSEELQAN KATLVCLISD FYPGAVTVAW KADSSPVKAG VETTTPSKQS NNKYAASSYL  180
SLTPEQWKSH RSYSCQVTHE GSTVEKTVAP TECS                             214

SEQ ID NO: 31           moltype = AA   length = 475
FEATURE                 Location/Qualifiers
source                  1..475
```

```
                    mol_type = protein
                    organism = Homo sapiens
SEQUENCE: 31
QVQLQQSGPG LVKPSQTLSL TCAISGDSVS SNRAAWNWIR QSPSRGLEWL GRTYYRSKWY    60
NDYAQSLKSR ITINPDTPKN QFSLQLNSVT PEDTAVYYCA RDGQLGLDAL DIWGQGTMVT   120
VSSGGGGSGG GGSGGGGSQA GLTQPPAVSV APGQTASITC GRDNIGSRSV HWYQQKPGQA   180
PVLVVYDDSD RPAGIPERFS GSNYENTATL TISRVEAGDE ADYYCQVWGI TSDHVVFGGG   240
TKLTVLAAAD KTHTCPPCPA PPVAGPSVFL FPPKPKDTLM ISRTPEVTCV VVDVSHEDPE   300
VKFNWYVDGV EVHNAKTKPR EEQYNSTYRV VSVLTVLHQD WLNGKEYKCK VSNKGLPSSI   360
EKTISKAKGQ PREPQVYTLP PCRDELTKNQ VSLWCLVKGF YPSDIAVEWE SNGQPENNYK   420
TTPPVLDSDG SFFLYSKLTV DKSRWQQGNV FSCSVMHEAL HNHYTQKSLS LSPGK        475

SEQ ID NO: 32           moltype = AA  length = 564
FEATURE                 Location/Qualifiers
source                  1..564
                        mol_type = protein
                        organism = Homo sapiens
SEQUENCE: 32
EVQLVESGGG LVQPGGSLRL SCAASGFNIK DTYIHWVRQA PGKGLEWVAR IYPTNGYTRY    60
ADSVKGRFTI SADTSKNTAY LQMNSLRAED TAVYYCSRWG GDGFYAMDYW GQGTLVTVSS   120
GGGGSQAGLT QPPAVSVAPG QTASITCGRD NIGSRSVHWY QQKPGQAPVL VVYDDSDRPA   180
GIPERFSGSN YENTATLTIS RVEAGDEADY YCQVWGITSD HVVFGGGTKL TVLASTKGPS   240
VFPLAPSSKS TSGGTAALGC LVKDYFPEPV TVSWNSGALT SGVHTFPAVL QSSGLYSLSS   300
VVTVPSSSLG TQTYICNVNH KPSNTKVDKK VEPKSCGTDK THTCPPCPAP PVAGPSVFLF   360
PPKPKDTLMI SRTPEVTCVV VDVSHEDPEV KFNWYVDGVE VHNAKTKPRE EQYNSTYRVV   420
SVLTVLHQDW LNGKEYKCKV SNKGLPSSIE KTISKAKGQP REPQVCTLPP SRDELTKNQV   480
SLSCAVKGFY PSDIAVEWES NGQPENNYKT TPPVLDSDGS FFLVSKLTVD KSRWQQGNVF   540
SCSVMHEALH NHYTQKSLSL SPGK                                         564

SEQ ID NO: 33           moltype = AA  length = 570
FEATURE                 Location/Qualifiers
source                  1..570
                        mol_type = protein
                        organism = Homo sapiens
SEQUENCE: 33
QVQLQQSGPG LVKPSQTLSL TCAISGDSVS SNRAAWNWIR QSPSRGLEWL GRTYYRSKWY    60
NDYAQSLKSR ITINPDTPKN QFSLQLNSVT PEDTAVYYCA RDGQLGLDAL DIWGQGTMVT   120
VSSGGGGSDI QMTQSPSSLS ASVGDRVTIT CRASQDVNTA VAWYQQKPGK APKLLIYSAS   180
FLYSGVPSRF SGSRSGTDFT LTISSLQPED FATYYCQQHY TTPPTFGQGT KVEIKRTVAA   240
PSVFIFPPSD EQLKSGTASV VCLLNNFYPR EAKVQWKVDN ALQSGNSQES VTEQDSKDST   300
YSLSSTLTLS KADYEKHKVY ACEVTHQGLS SPVTKSFNRG ECGTDKTHTC PPCPAPPVAG   360
PSVFLFPPKP KDTLMISRTP EVTCVVVDVS HEDPEVKFNW YVDGVEVHNA KTKPREEQYN   420
STYRVVSVLT VLHQDWLNGK EYKCKVSNKG LPSSIEKTIS KAKGQPREPQ VYTLPPCRDE   480
LTKNQVSLWC LVKGFYPSDI AVEWESNGQP ENNYKTTPPV LDSDGSFFLY SKLTVDKSRW   540
QQGNVFSCSV MHEALHNHYT QKSLSLSPGK                                   570

SEQ ID NO: 34           moltype = AA  length = 106
FEATURE                 Location/Qualifiers
source                  1..106
                        mol_type = protein
                        organism = Homo sapiens
SEQUENCE: 34
DFTPPTVKIL QSSCDGGGHF PPTIQLLCLV SGYTPGTINI TWLEDGQVMD VDLSTASTTQ    60
EGELASTQSE LTLSQKHWLS DRTYTCQVTY QGHTFEDSTK KCADSN                  106

SEQ ID NO: 35           moltype = AA  length = 111
FEATURE                 Location/Qualifiers
source                  1..111
                        mol_type = protein
                        organism = Homo sapiens
SEQUENCE: 35
AELPPKVSVF VPPRDGFFGN PRKSKLICQA TGFSPRQIQV SWLREGKQVG SGVTTDQVQA    60
EAKESGPTTY KVTSTLTIKE SDWLGQSMFT CRVDHRGLTF QQNASSMCVP D            111

SEQ ID NO: 36           moltype = AA  length = 226
FEATURE                 Location/Qualifiers
source                  1..226
                        mol_type = protein
                        organism = Homo sapiens
SEQUENCE: 36
DKTHTCPPCP APPVAGPSVF LFPPKPKDTL MISRTPEVTC VVVDVSHEDP EVKFNWYVDG    60
VEVHNAKTKP REEQYNSTYR VVSVLTVLHQ DWLNGKEYKC KVSNKGLPSS IEKTISKAKG   120
QPREPQVYTL PPSRDELTKN QVSLTCLVKG FYPSDIAVEW ESNGQPENNY KTTPPVLDSD   180
GSFFLYSKLT VDKSRWQQGN VFSCSVMHEA LHNHYTQKSL SLSPGK                  226
```